US008797310B2

(12) United States Patent
Yamamoto et al.

(10) Patent No.: US 8,797,310 B2
(45) Date of Patent: Aug. 5, 2014

(54) DISPLAY DRIVING CIRCUIT, DEVICE AND METHOD FOR POLARITY INVERSION USING RETENTION CAPACITOR LINES

(75) Inventors: Etsuo Yamamoto, Osaka (JP); Shige Furuta, Osaka (JP); Yuhichiroh Murakami, Osaka (JP); Seijirou Gyouten, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 174 days.

(21) Appl. No.: 13/501,368

(22) PCT Filed: Jun. 2, 2010

(86) PCT No.: PCT/JP2010/059384
§ 371 (c)(1),
(2), (4) Date: Apr. 11, 2012

(87) PCT Pub. No.: WO2011/045954
PCT Pub. Date: Apr. 21, 2011

(65) Prior Publication Data

US 2012/0200614 A1 Aug. 9, 2012

(30) Foreign Application Priority Data

Oct. 16, 2009 (JP) ................................ 2009-239759

(51) Int. Cl.
*G09G 3/36* (2006.01)
*G09G 5/00* (2006.01)
*G06F 3/038* (2013.01)

(52) U.S. Cl.
CPC ............ *G09G 3/3614* (2013.01); *G09G 3/3674* (2013.01); *G09G 3/3655* (2013.01); *G09G 2310/0286* (2013.01); *G09G 2310/0264* (2013.01)
USPC ................ 345/209; 345/96; 345/98; 345/204

(58) Field of Classification Search
CPC ......... G09G 3/3614; G09G 3/36; G09G 5/10; G09G 3/3655; G09G 2310/0286; G09G 2310/0289; G09G 2310/0264
USPC ......... 345/204–211, 87, 98, 96, 100, 204–21, 345/690; 377/64
See application file for complete search history.

(56) References Cited

U.S. PATENT DOCUMENTS 6,529,181 B2 * 3/2003 Nakano et al. .................. 345/98
8,026,887 B2 * 9/2011 Koo et al. ....................... 345/96

(Continued)

FOREIGN PATENT DOCUMENTS

CN 101299324 A 11/2008
JP 07-146666 A 6/1995

(Continued)

OTHER PUBLICATIONS

International Search Report Jun. 2010.

(Continued)

*Primary Examiner* — Dwayne Bost
*Assistant Examiner* — Darlene M Ritchie
(74) *Attorney, Agent, or Firm* — Harness, Dickey & Pierce

(57) ABSTRACT

In a display device (i) which carries out a display based on a video signal whose resolution has been converted to higher resolution (high-resolution conversion driving) and (ii) which carries out CC driving, when the resolution of the video signal is converted by a factor of 2 (double-size display), assuming that a direction in which the gate lines extend is a row-wise direction, signal potentials having the same polarity and the same gray scale are supplied to pixel electrodes included in respective two pixels that correspond to two adjacent gate lines and that are adjacent to each other in the column-wise direction (scanning direction), and a direction of change in the signal potentials written to the pixel electrodes from the source lines varies every two adjacent rows according to the polarities of the signal potentials.

11 Claims, 64 Drawing Sheets

(56) References Cited

U.S. PATENT DOCUMENTS

| | | | | |
|---|---|---|---|---|
| 8,031,158 | B2 * | 10/2011 | Jang et al. | 345/100 |
| 2002/0024482 | A1 * | 2/2002 | Song et al. | 345/87 |
| 2004/0061711 | A1 * | 4/2004 | Kurumisawa et al. | 345/698 |
| 2006/0092111 | A1 * | 5/2006 | Nakao et al. | 345/87 |
| 2006/0109230 | A1 * | 5/2006 | An et al. | 345/98 |
| 2006/0114208 | A1 | 6/2006 | Senda | |
| 2007/0146354 | A1 * | 6/2007 | Kubota et al. | 345/204 |
| 2007/0188431 | A1 * | 8/2007 | Sato et al. | 345/90 |
| 2007/0274433 | A1 * | 11/2007 | Tobita | 377/64 |
| 2008/0309687 | A1 | 12/2008 | Choi et al. | |
| 2009/0073103 | A1 | 3/2009 | Tajiri | |
| 2009/0167739 | A1 * | 7/2009 | Tsubata | 345/208 |
| 2009/0303168 | A1 | 12/2009 | Nagata | |
| 2010/0128009 | A1 | 5/2010 | Okada et al. | |
| 2010/0283715 | A1 * | 11/2010 | Kretz et al. | 345/100 |

FOREIGN PATENT DOCUMENTS

| | | | |
|---|---|---|---|
| JP | 07-230077 | A | 8/1995 |
| JP | 200183943 | A | 3/2001 |
| JP | 2006-145923 | A | 6/2006 |
| JP | 2009-069562 | A | 4/2009 |
| JP | 2009-075225 | A | 4/2009 |
| WO | WO-2008-114479 | A1 | 9/2008 |
| WO | WO-2009/050926 | A1 | 4/2009 |
| WO | WO-2010-146741 | A1 | 12/2010 |
| WO | WO-2011045955 | A1 | 4/2011 |

OTHER PUBLICATIONS

Written Opinion of Search Authority Jun. 2010.

* cited by examiner

Conventional Art

Conventional Art

Conventional Art

Conventional Art

Conventional Art

Conventional Art (a)

Conventional Art

Conventional Art

DISPLAY DRIVING CIRCUIT, DEVICE AND METHOD FOR POLARITY INVERSION USING RETENTION CAPACITOR LINES

TECHNICAL FIELD

The present invention relates to driving of display devices such as liquid crystal display devices having active-matrix liquid crystal display panels and, in particular, to a display driving circuit and a display driving method for driving a display panel in a display device employing a drive system referred to as CC (charge coupling) driving.

BACKGROUND ART

A conventional CC driving system that is employed in an active-matrix liquid crystal display device is disclosed, for example, in Patent Literature 1 (Japanese Patent Application Publication, Tokukai, No. 2001-83943). CC driving is explained by taking as an example the content of disclosure in Patent Literature 1.

FIG. 57 shows a configuration of a device that realizes CC driving. FIG. 58 shows operating waveforms of various signals in CC driving of the device of FIG. 57.

As shown in FIG. 57, the liquid crystal display device that carries out CC driving includes an image display section 110, a source line driving circuit 111, a gate line driving circuit 112, and a CS bus line driving circuit 113.

The image display section 110 includes a plurality of source lines (signal lines) 101, a plurality of gate lines (scanning lines) 102, switching elements 103; pixel electrodes 104; a plurality of CS (capacity storage) bus lines (common electrode lines) 105, retention capacitors 106, liquid crystals 107, and a counter electrode 109. The switching elements 103 are disposed near points of intersection between the plurality of source lines 101 and the plurality of gate lines 102, respectively. The pixel electrodes 104 are connected to the switching elements 103, respectively.

The CS bus lines 105 are paired with the gate lines 102, respectively, and arrange in parallel with one another. Each of the retention capacitors 106 has one end connected to a pixel electrode 104 and the other end connected to a CS bus line 105. The counter electrode 109 is provided in such a way as to face the pixel electrodes 104 with the liquid crystals 107 sandwiched therebetween.

The source line driving circuit 111 is provided so as to drive the source lines 101, and the gate line driving circuit 112 is provided so as to drive the gate lines 102. Further, the CS bus line driving circuit 113 is provided so as to drive the CS bus lines 105.

Each of the switching elements 103 is formed by amorphous silicon (a-Si), polycrystalline silicon (p-Si), monocrystalline silicon (c-Si), and the like. Because of such a structure, a capacitor 108 is formed between the gate and the drain of the switching element 103. This capacitor 108 causes a phenomenon in which a gate pulse from a gate line 102 shifts the electric potential of a pixel electrode 104 toward a negative side.

As shown in FIG. 58, the electric potential Vg of a gate line 102 in the liquid crystal display device is Von only during an H period (horizontal scanning period) in which the gate line 102 is selected, and retained at Voff during the other periods. The electric potential Vs of a source line 101 varies in amplitude depending on a video signal to be displayed, but takes a waveform that reverses its polarity every H period centered on the counter electrode potential Vcom and reverses its polarity in an adjacent H period concerning the same gate line 102 (line inversion driving). Since it is assumed in FIG. 58 that a uniform video signal is being inputted, the electric potential Vs changes with constant amplitude.

The electric potential Vd of the pixel electrode 104 is equal to the electric potential Vs of the source line 101 because the switching element 103 conducts during a period in which the electric potential Vg is Von and, at the moment the electric potential Vg becomes Voff, the electric potential Vd shifts slightly toward a negative side through the gate-drain capacitor 108.

The electric potential Vc of a CS bus line 105 is Ve+ during an H period in which the corresponding gate line 102 is selected and the next H period. Further, the electric potential Vc switches to Ve− during the H period after the next, and then retained at Ve− until the next field. This switching causes the electric potential Vd to be shifted toward a negative side through the retention capacitor 106.

In the result, the electric potential Vd changes with larger amplitude than the electric potential Vs; therefore, the amplitude of change in the electric potential Vs can be made smaller. This allows achieving a simplification of circuitry and a reduction of power consumption in the source line driving circuit 111.

CITATION LIST

Patent Literatures

Patent Literature 1

Japanese Patent Application Publication, Tokukai, No. 2001-83943 A (Publication Date: Mar. 30, 2001)

Patent Literature 2

International Publication No. WO 2009/050926 A1 (Publication Date: Apr. 23, 2009)

SUMMARY OF INVENTION

Technical Problem

The liquid crystal display device employing line inversion driving and CC driving has such a problem that in the first frame after the start of a display, there appear alternate bright and dark transverse stripes every single row (every single horizontal line of the liquid crystal display device).

FIG. 59 is a timing chart showing operation of the liquid crystal display device for explaining the cause of the problem.

In FIG. 59, GSP is a gate start pulse that defines a timing of vertical scanning, and GCK1 (CK) and GCK2 (CKB) are gate clock signals that are outputted from the control circuit to define a timing of operation of the shift register. A period from a falling edge to the next falling edge in GSP corresponds to a single vertical scanning period (1V period). A period from a rising edge in GCK1 to a rising edge in GCK2 and a period from a rising edge in GCK2 to a rising edge in GCK1 each correspond to a single horizontal scanning period (1H period). CMI is a polarity signal that reverses its polarity every single horizontal scanning period.

Further, FIG. 59 shows the following signals in the order named: a source signal S (video signal), which is supplied from the source line driving circuit 111 to a source line 101 (source line 101 provided in the xth column); a gate signal G1, which is supplied from the gate line driving circuit 112 to a gate line 102 provided in the first row; a CS signal CS1, which is supplied from the bus line driving circuit 113 to a CS bus line 105 provided in the first row; and an electric potential Vpix1 of a pixel electrode provided in the first row and the xth column. Similarly, FIG. 59 shows the following signals in the order named: a gate signal G2, which is supplied to a gate line 102 provided in the second row; a CS signal CS2, which is supplied to a CS bus line 105 provided in the second row; and an electric potential Vpix2 of a pixel electrode provided in the second row and the xth column. Furthermore, FIG. 59 shows the following signals in the order named: a gate signal G3, which is supplied to a gate line 102 provided in the third row; a CS signal CS3, which is supplied to a CS bus line 105 provided in the third row; and an electric potential Vpix3 of a pixel electrode provided in the third row and the xth column.

It should be noted that the dotted lines in the electric potentials Vpix1, Vpix2, and Vpix3 indicate the electric potential of the counter electrode 109.

In the following, it is assumed that the start frame of a display picture is a first frame and that the first frame is preceded by an initial state. In the initial state, the source line driving circuit 111, the gate line driving circuit 112, and the CS bus line driving circuit 113 are all in the preparatory stages or in a resting state before entering into normal operation. Therefore, the gate signals G1, G2, and G3 are fixed at a gate-off potential (electric potential at which the gate of a switching element 103 is turned off), and the CS signals CS1, CS2, and CS3 are fixed at one electric potential (e.g., at a low level).

In the first frame after the initial state, the source line driving circuit 111, the gate line driving circuit 112, and the CS bus line driving circuit 113 are all in normal operation. This causes the source signal S to be a signal which has amplitude corresponding to a gray scale represented by a video signal and which reverses its polarity every 1H period.

It should be noted that since it is assumed in FIG. 59 that a uniform picture is displayed, the amplitude of the source signal S is constant. Meanwhile, the gate signals G1, G2, and G3 serve as gate-on potentials (at which the gates of the switching elements 103 are turned on) during the first, second, and third 1H periods, respectively, in an active period (effective scanning period) of each frame, and serve as gate-off potentials during the other periods.

Then, the CS signals CS1, CS2, and CS3 are reversed after their corresponding gate signals G1, G2, and G3 fall, and take such waveforms that they are opposite in direction of reversal to one another. Specifically, in an odd-numbered frame, the CS signal CS2 rises after its corresponding gate signal G2 falls, and the CS signals CS1 and CS3 fall after their corresponding gate signals G1 and G3 fall. Further, in an even-numbered frame, the CS signal CS2 falls after its corresponding gate signal G2 falls, and the CS signals CS1 and CS3 rise after their corresponding gate signals G1 and G3 fall.

It should be noted that the relationship between rising and falling edges in the CS signals CS1, CS2, and CS3 in the odd-numbered and even-numbered frames may be opposite of the relationship stated above. Further, the timing of reversal of the CS signals CS1, CS2, and CS3 may be the falling edges in the gate signals G1, G2, and G3 or later, i.e., the corresponding horizontal scanning periods or later. For example, the CS signals CS1, CS2, and CS3 may be reversed in synchronization with rising edges in gate signals in the next row.

However, since, in the first frame, the CS signals CS1, CS2, and CS3 are all fixed at one electric potential (in FIG. 59, at a low level) in the initial state, the electric potentials Vpix1 and Vpix3 are placed in an irregular state. Specifically, the CS signal CS2 behaves in the same way as in the other odd-numbered frames (third, fifth frame, . . . ) in that it rises after the corresponding gate signal G2 falls, but the CS signals CS1 and CS3 behave differently from the other odd-numbered frames (third, fifth frame, . . . ) in that they are retained at the same electric potential (in FIG. 59, at a low level) after the corresponding gate signals G1 and G3 fall.

For this reason, in the first frame, there occurs a change in electric potential of the CS signal CS2 as usual in the pixel electrodes 104 in the second row. Therefore, while the electric potential Vpix2 is subjected to an electric potential shift caused by a change in electric potential of the CS signal CS2, there occur no changes in electric potential of the CS signals CS1 and CS3 in the pixel electrodes 104 in the first and third rows. Accordingly, the electric potentials Vpix1 and Vpix3 are not subjected to an electric potential shift (as indicated by shaded areas in FIG. 59). In the result, despite inputting of source signals S of the same gray scale, there occurs a difference in luminance between the first and third rows and the second row due to a difference between the electric potentials Vpix1 and Vpix3 and the electric potential Vpix2. This difference in luminance appears as a difference in luminance between an odd-numbered row and an even-numbered row in the image display section as a whole. Therefore, there appear alternate bright and dark transverse stripes every single row in a picture in the first frame.

A technology capable of suppressing the appearance of such transverse stripes is disclosed in Patent Literature 2. The technology of Patent Literature 2 is described below with reference to FIGS. 60 through 62. FIG. 60 is a block diagram showing a configuration of driving circuits (a gate line driving circuit 30 and a CS bus line driving circuit 40) shown in Patent Literature 2. FIG. 61 is a timing chart showing waveforms of various signals of a liquid crystal display device. FIG. 62 is a timing chart showing waveforms of various signals that are inputted to and outputted from the CS bus line driving circuit.

As shown in FIG. 60, the CS bus line driving circuit 40 has a plurality of CS circuits 41, 42, 43, . . . , 4*n* corresponding to their respective rows. The CS circuits 41, 42, 43, . . . , 4*n* include D latch circuits 41*a*, 42*a*, 43*a*, . . . , 4*na* and OR circuits 41*b*, 42*b*, 43*b*, . . . , 4*nb*, respectively. In the following description, the CS circuits 41 and 42, which correspond to the first and second rows respectively, are taken as an example.

Input signals to the CS circuit 41 are the gate signals G1 and G2, a polarity signal POL, and a rest signal RESET, and input signals to the CS circuit 42 are the gate signals G2 and G3, the polarity signal POL, and the reset signal REST. The polarity signal POL and the reset signal RESET are inputted from the control circuit (not illustrated).

The OR circuit 41*b* receives the gate signal G1 from the corresponding gate line 12 and the gate signal G2 from the gate line 12 of the next row and thereby outputs a signal g1 shown in FIG. 62. Further, the OR circuit 42*b* receives the gate signal G2 from the corresponding gate line 12 and the gate signal G3 from the gate line 12 in the next row and thereby outputs a signal g2 shown in FIG. 62.

The D latch circuit 41*a* receives the reset signal RESET via its terminal CL, receives the polarity signal POL via its terminal D, and receives the output g1 via its clock terminal CK from the OR circuit 41*b*. In accordance with a change in electric potential level of the signal g1 (from a low level to a high level or from a high level to a low level) that the D latch circuit 41*a* receives via its clock terminal CK, the D latch circuit 41*a* outputs, as a CS signal CS1, an input state (low level or high level) of the polarity signal POL that it receives via its terminal D, and the CS signal CS1 indicates the change in electric potential level. Specifically, when the electric potential level of the signal g1 that the D latch circuit 41*a* receives via its clock terminal CK is a high level, the latch circuit 41*a* outputs an input state (low level or high level) of the polarity signal POL that it receives via its terminal D.

When the electric potential level of the signal g1 that the latch circuit 41*a* receives via its clock terminal CK has changed from a high level to a low level, the latch circuit 41*a* latches the input state (low level or high level) of the polarity signal POL that it received via its terminal D at the time of change, and keeps the latched state until the next time when the electric potential level of the signal g1 that the latch circuit 41*a* receives via its clock terminal CK is raised to a high level. Then, the D latch circuit 41*a* outputs the latched state as the CS signal CS1, shown in FIG. 62, which indicates the change in electric potential level, via its terminal Q.

Further, similarly, the D latch circuit 42*a* receives the reset signal RESET via its terminal CL, receives the polarity signal POL via its terminal D, and receives the output g2 via its clock terminal CK from the OR circuit 42*b*. This allows the D latch circuit 42*a* to output a CS signal CS2, shown in FIG. 62, which indicates a change in electric potential level, via its terminal Q.

The foregoing configuration causes the CS signals CS1 and CS2 to be different in electric potential from each other at points in time where the gate signals in the first and second rows fall. Therefore, as shown in FIG. 61, the electric potential Vpix1 is subjected to an electric potential shift caused by a change in electric potential of the CS signal CS1, and the electric potential Vpix2 is subjected to an electric potential shift caused by a change in electric potential of the CS signal CS2. This allows eliminating such alternate bright and dark transverse stripes every single row as those shown in FIG. 59.

However, the technology disclosed in Patent Literature 2 is premised on line (1H) inversion driving by which the polarity of the voltage of a pixel electrode is reversed every single row (single line, single horizontal scanning period). That is, driving is carried out so that the electric potential of a CS signal varies every single line. Therefore, the electric potential of a CS signal cannot be made to vary, for example, every two rows. This causes such a problem that when this driving method is applied to a display device which carries out a display based on a video signal whose resolution has been converted to higher resolution (e.g., displays a double-size picture), there appear alternate bright and dark transverse stripes in a display picture.

The following description discusses why transverse stripes appear when resolution conversion driving is carried out. (a) of FIG. 63 shows (i) display pictures displayed during normal driving and (ii) polarities of signal potentials supplied to pixel electrodes corresponding to the display pictures. (b) of FIG. 63 shows (i) the display picture shown in the upper left area (enclosed by a dotted line) in (a) of FIG. 63 and (ii) polarities of signal potentials supplied to the pixel electrodes as observed in a case where the resolution of the corresponding video signal has been converted by a factor of 2 both in the row-wise and column-wise directions (i.e., double-size display).

The resolution conversion driving is carried out such that depending on the conversion factor, signals having the same polarity and the same electric potential (gray scale) are supplied to a plurality of pixels adjacent to each other in the column-wise direction (scanning direction). For example, in the case of a double-size display, (i) a source signal S supplied to the pixel electrode of the pixel located in the third row and the second column shown in (a) of FIG. 63 and (ii) a source signal S supplied to the pixel electrode of each of the pixels located in the fifth and sixth rows and the third and fourth columns shown in (b) of FIG. 63 are equal in polarity (which is here a negative polarity) and electric potential (gray scale) to each other.

FIG. 64 is a timing chart showing waveforms of various signals observed in a case where double-size display driving is employed in a conventional liquid crystal display device. Each of the reference signs "AA" to "SA" assigned to a source signal S shown in FIG. 64 corresponds to a single horizontal scanning period, and indicates a signal potential (gray scale) during that horizontal scanning period. For example, the source signal S in the first frame exhibits identical signal potentials of a positive polarity ("AA") during the first and second horizontal scanning periods, and exhibits identical signal potentials of a negative polarity ("KA") during the third and fourth horizontal scanning periods. Further, the source signal S in the second frame exhibits identical signal potentials of a negative polarity ("II") during the first and second horizontal scanning periods, and exhibits identical signal potentials of a positive polarity ("KI") during the third and fourth horizontal scanning periods. Since polarities of voltages of pixel electrodes are reversed every two rows (two lines) like above in the case of the resolution conversion driving which realizes a double-size display, there appear alternate bright and dark transverse stripes (shaded areas in FIG. 64) in a display picture in a display device that employs line (1H) inversion driving.

The above example is a case where the conversion factor is of a double size. However, also in a case where the conversion factor is of a triple size or the resolution has been converted only in the column-wise direction, there will undesirably appear alternate bright and dark transverse stripes in a display picture.

That is, according to a conventional technique, in a case where a liquid crystal display device that employs CC driving carries out a display based on a video signal whose resolution has been converted to higher resolution (i.e., carries out an n-fold display (n is an integer of two or greater)), a problem arises in which there appear alternate bright and dark transverse stripes in a display picture.

The present invention has been made in view of the problem, and an object of the present invention is to provide a display driving circuit and a display driving method each employing CC driving, which display driving circuit and display driving method are capable of improving display quality by eliminating appearance of alternate bright and dark transverse stripes that appear in a display picture when a display is carried out based on a video signal whose resolution has been converted to higher resolution.

Solution to Problem

A display driving circuit in accordance with the present invention is a display driving circuit for use in a display device (i) which carries out a display based on a video signal whose resolution has been converted to higher resolution and (ii) in which by supplying retention capacitor wire signals to retention capacitor wires forming capacitors with pixel electrodes included in pixels, signal potentials written to the pixel electrodes from data signal lines are changed in a direction corresponding to polarities of the signal potentials, wherein, assuming that a direction in which scanning signal lines extend is a row-wise direction, when the resolution of the video signal is converted by a factor of n (n is an integer of two or greater) at least in a column-wise direction, signal potentials having the same polarity and the same gray scale are supplied to pixel electrodes included in respective n pixels that correspond to n adjacent scanning signal lines and that are adjacent to each other in the column-wise direction, and a direction of change in the signal potentials written to the pixel electrodes from the data signal lines varies every n adjacent rows according to the polarities of the signal potentials.

According to the display driving circuit, signal potentials written to the pixel electrodes are changed, by the retention capacitor wire signals, in a direction corresponding to polarities of the signal potentials. This realizes CC driving. Further, according to the display driving circuit, a display is carried out based on a video signal whose resolution has been converted by a factor of n (n is an integer of two or greater) at least in the column-wise direction. This realizes high-resolution conversion driving (n-fold display driving).

Further, according to the configuration, a direction of change in the signal potentials written to the pixel electrodes from the data signal lines varies every n adjacent rows according to the polarities of the signal potentials. For example, in a case of carrying out a display based on a video signal whose resolution has been converted by a factor of 2 (double-size display driving) in both the column-wise and row-wise directions, a direction of change in the signal potentials written to the pixel electrodes varies every two adjacent rows. This eliminates appearance of alternate bright and dark transverse stripes in a display picture (see FIG. 64). Accordingly, it is possible to eliminate appearance of alternate bright and dark transverse stripes in a display picture when a display device employing CC driving carries out high-resolution conversion driving (n-fold display driving), and thus possible to improve display quality of the display device.

A display device in accordance with the present invention includes: any one of the foregoing display driving circuits; and a display panel.

A display driving method in accordance with the present invention is a method for driving a display device (i) which carries out a display based on a video signal whose resolution has been converted to higher resolution and (ii) in which by supplying retention capacitor wire signals to retention capacitor wires forming capacitors with pixel electrodes included in pixels, signal potentials written to the pixel electrodes from data signal lines are changed in a direction corresponding to polarities of the signal potentials, said method including: when the resolution of the video signal is converted by a factor of n (n is an integer of two or greater) at least in a column-wise direction, supplying signal potentials having the same polarity and the same gray scale to pixel electrodes included in respective n pixels that correspond to n adjacent scanning signal lines and that are adjacent to each other in the column-wise direction, assuming that a direction in which scanning signal lines extend is a row-wise direction; and causing a direction of change in the signal potentials written to the pixel electrodes from the data signal lines to vary every n adjacent rows according to the polarities of the signal potentials.

The display driving method can bring about the same effects as those brought about by the configuration of the display driving circuit.

Advantageous Effects of Invention

As has been described, a display driving circuit and a display driving method in accordance with the present invention are each configured such that, in a case where a display is carried out by CC driving based on a video signal whose resolution has been converted by a factor of n at least in a column-wise direction, a direction of change in signal potentials written to pixel electrodes from data signal lines varies every n adjacent rows depending on the polarities of the signal potentials. This allows a display device employing CC driving to eliminate appearance of alternate bright and dark transverse stripes that appear in a display picture when carrying out a display based on a video signal whose resolution has been converted by a factor of n, and to improve display quality.

BRIEF DESCRIPTION OF DRAWINGS

FIG. 1 is a block diagram showing a configuration of a liquid crystal display device according to an embodiment of the present invention.

FIG. 2 is an equivalent circuit diagram showing an electrical configuration of each pixel in the liquid crystal display device of FIG. 1.

FIG. 3 is a block diagram showing a configuration of a gate line driving circuit and a CS bus line driving circuit in Example 1.

FIG. 4 is a timing chart showing waveforms of various signals of a liquid crystal display device 1 in Example 1.

FIG. 5 shows waveforms of various signals that are inputted to and outputted from the CS bus line driving circuit of the liquid crystal display device 1 in Example 1.

FIG. 6 shows relations between (i) polarity signals and shift resister outputs inputted to CS circuits in Example 1 and (ii) CS signals outputted from the CS circuits in Example 1.

FIG. 7 is a timing chart showing waveforms of various signals as observed in a case where a liquid crystal display device 1 in Example 2 carries out 3-line (3H) inversion driving.

FIG. 8 shows waveforms of various signals that are inputted to and outputted from a CS bus line driving circuit of the liquid crystal display device 1 in Example 2.

FIG. 9 shows relations between (i) polarity signals and shift resister outputs inputted to CS circuits in Example 2 and (ii) CS signals outputted from the CS circuits in Example 2.

FIG. 10 is a block diagram showing a configuration of a gate line driving circuit and a CS bus line driving circuit in Example 3.

FIG. 11 is a timing chart showing waveforms of various signals as observed in a case where a liquid crystal display device 1 in Example 3 carries out 2-line (2H) inversion driving.

FIG. 12 is a timing chart showing waveforms of various signals that are inputted to and outputted from the CS bus line driving circuit of the liquid crystal display device 1 in Example 3.

FIG. 13 shows relations between (i) polarity signals and shift resister outputs inputted to CS circuits in Example 3 and (ii) CS signals outputted from the CS circuits in Example 3.

FIG. 14 is a timing chart showing waveforms of various signals as observed in a case where a liquid crystal display device 1 in Example 4 carries out 3-line (3H) inversion driving.

FIG. 15 is a timing chart showing waveforms of various signals that are inputted to and outputted from a CS bus line driving circuit of the liquid crystal display device 1 in Example 4.

FIG. 16 shows relations between (i) polarity signals and shift resister outputs inputted to CS circuits in Example 4 and (ii) CS signals outputted from the CS circuits in Example 4.

FIG. 17 is a block diagram showing a configuration of a gate line driving circuit and a CS bus line driving circuit in Example 5.

FIG. 18 is a timing chart showing waveforms of various signals as observed in a case where a liquid crystal display device 1 in Example 5 carries out 2-line (2H) inversion driving.

FIG. 19 shows waveforms of various signals that are inputted to and outputted from the CS bus line driving circuit of the liquid crystal display device 1 in Example 5.

FIG. 20 shows relations between (i) polarity signals and shift resister outputs inputted to CS circuits in Example 5 and (ii) CS signals outputted from the CS circuits in Example 5.

FIG. 21 is a timing chart showing waveforms of various signals as observed in a case where the liquid crystal display device 1 in Example 5 carries out 3-line (3H) inversion driving.

FIG. 22 shows waveforms of various signals that are inputted to and outputted from a CS bus line driving circuit of a liquid crystal display device 1 in Example 6.

FIG. 23 shows relations between (i) polarity signals and shift resister outputs inputted to CS circuits in Example 6 and (ii) CS signals outputted from the CS circuits in Example 6.

FIG. 24 is a timing chart showing waveforms of various signals as observed in a case where a liquid crystal display device 2 in Example 7 carries out 4-line (4H) inversion driving.

FIG. 25 is a block diagram showing a configuration of a gate line driving circuit and a CS bus line driving circuit in Example 7.

FIG. 26 shows waveforms of various signals that are inputted to and outputted from the CS bus line driving circuit of the liquid crystal display device 2 in Example 7.

FIG. 27 shows relations between (i) polarity signals and shift resister outputs inputted to CS circuits in Example 7 and (ii) CS signals outputted from the CS circuits in Example 7.

FIG. 28 is a timing chart showing waveforms of various signals as observed in a case where a liquid crystal display device 3 in Example 8 carries out 2-line (2H) inversion driving.

FIG. 29 is a block diagram showing a configuration of a gate line driving circuit and a CS bus line driving circuit in Example 8.

FIG. 30 shows waveforms of various signals that are inputted to and outputted from the CS bus line driving circuit of the liquid crystal display device 3 in Example 8.

FIG. 31 shows relations between (i) polarity signals and shift resister outputs inputted to CS circuits in Example 8 and (ii) CS signals outputted from the CS circuits in Example 8.

FIG. 32 is a timing chart showing waveforms of various signals as observed in a case where a liquid crystal display device 3 in Example 9 carries out 3-line (3H) inversion driving.

FIG. 33 is a block diagram showing a configuration of a gate line driving circuit and a CS bus line driving circuit in Example 9.

FIG. 34 shows waveforms of various signals that are inputted to and outputted from the CS bus line driving circuit of the liquid crystal display device 3 in Example 9.

FIG. 35 shows relations between (i) polarity signals and shift resister outputs inputted to CS circuits in Example 9 and (ii) CS signals outputted from the CS circuits in Example 9.

FIG. 36 is a block diagram showing a configuration of a gate line driving circuit and a CS bus line driving circuit in Example 10.

FIG. 37 is a timing chart showing waveforms of various signals as observed in a case where a liquid crystal display device 3 in Example 10 carries out 3-line (3H) inversion driving.

FIG. 38 shows waveforms of various signals that are inputted to and outputted from the CS bus line driving circuit of the liquid crystal display device 3 in Example 10.

FIG. 39 shows relations between (i) polarity signals and shift resister outputs inputted to CS circuits in Example 10 and (ii) CS signals outputted from the CS circuits in Example 10.

FIG. 40 is a block diagram showing a configuration of a gate line driving circuit and a CS bus line driving circuit in Example 11.

FIG. 41 is a timing chart showing waveforms of various signals as observed in a case where a liquid crystal display device 3 in Example 11 carries out 2-line (2H) inversion driving.

FIG. 42 shows waveforms of various signals that are inputted to and outputted from the CS bus line driving circuit of the liquid crystal display device 3 in Example 11.

FIG. 43 shows relations between (i) polarity signals and shift resister outputs inputted to CS circuits in Example 11 and (ii) CS signals outputted from the CS circuits in Example 11.

FIG. 44 is a timing chart showing waveforms of various signals as observed in a case where a liquid crystal display device 4 in Example 12 carries out 3-line (3H) inversion driving.

FIG. 45 is a block diagram showing a configuration of a gate line driving circuit and a CS bus line driving circuit in Example 12.

FIG. 46 shows waveforms of various signals that are inputted to and outputted from the CS bus line driving circuit of the liquid crystal display device 4 in Example 12.

FIG. 47 shows relations between (i) polarity signals and shift resister outputs inputted to CS circuits in Example 12 and (ii) CS signals outputted from the CS circuits in Example 12.

FIG. 48 is a timing chart showing waveforms of various signals as observed in a case where a liquid crystal display device 4 in Example 13 carries out 3-line (3H) inversion driving.

FIG. 49 is a block diagram showing a configuration of a gate line driving circuit and a CS bus line driving circuit in Example 13.

FIG. 50 shows waveforms of various signals that are inputted to and outputted from the CS bus line driving circuit of the liquid crystal display device 4 in Example 13.

FIG. 51 shows relations between (i) polarity signals and shift resister outputs inputted to CS circuits in Example 13 and (ii) CS signals outputted from the CS circuits in Example 13.

FIG. 52 is a block diagram showing another configuration of a gate line driving circuit of a liquid crystal display device of the present invention.

FIG. 53 is a block diagram showing a configuration of a liquid crystal display device including the gate line driving circuit shown in FIG. 52.

FIG. 54 is a block diagram showing a configuration of a shift register circuit constituting the gate line driving circuit shown in FIG. 52.

FIG. 55 is a circuit diagram showing a configuration of a flip-flop constituting the shift register circuit shown in FIG. 54.

FIG. 56 is a timing chart showing an operation of the flip-flop shown in FIG. 55.

FIG. 57 is a block diagram showing a configuration of a conventional liquid crystal display device employing CC driving.

FIG. 58 is a timing chart showing waveforms of various signals in the conventional liquid crystal display device.

FIG. 59 is a timing chart showing waveforms of various signals of the conventional liquid crystal display device.

FIG. 60 is a block diagram showing another configuration of a gate line driving circuit and a CS bus line driving circuit of a conventional liquid crystal display device.

FIG. 61

Figure 60:
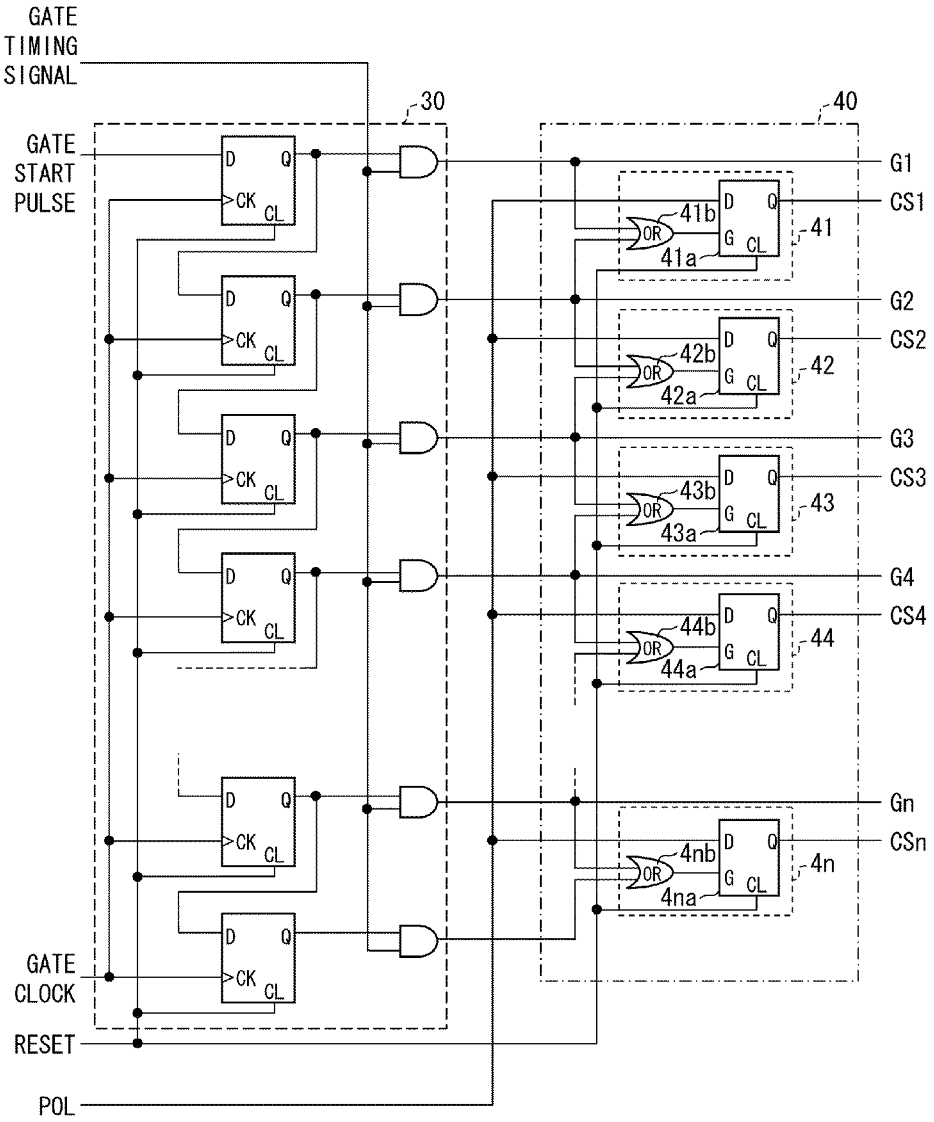
FIG. 60
Figure 61:
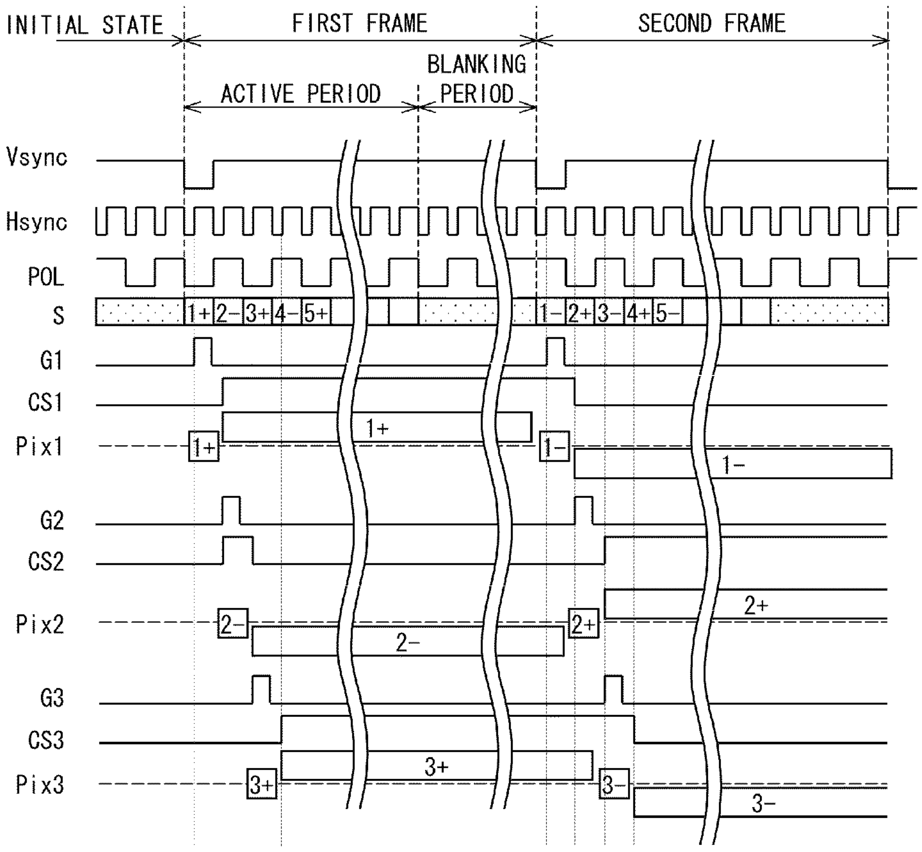

FIG. 61 is a timing chart showing waveforms of various signals of a liquid crystal display device including the driving circuits shown in FIG. 60.

FIG. 62

Figure 62:
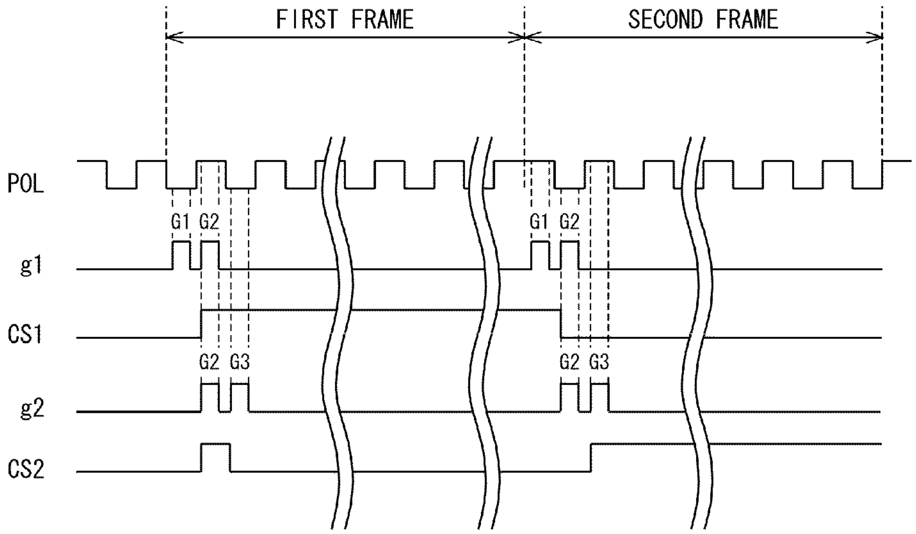

FIG. 62 is a timing chart showing waveforms of various signals that are inputted to and outputted from the CS bus line driving circuit shown in FIG. 60.

FIG. 63

Figure 63:
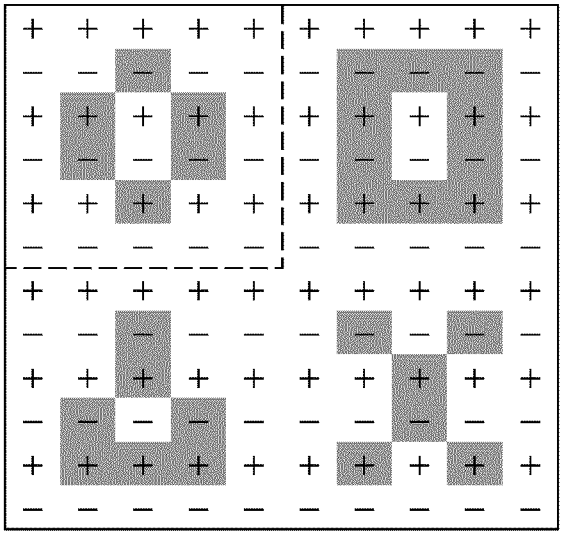
Figure 63:
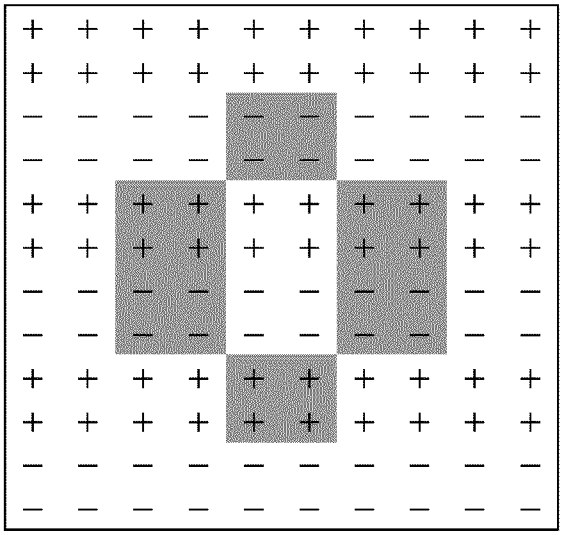

FIG. 63 is a set of diagrams (a) and (b) showing polarities of signal potentials supplied to pixel electrodes, (a) showing polarities of signal potentials supplied to pixel electrodes during normal driving, (b) showing (i) a display picture shown in the upper left area (enclosed by a dotted line) in (a) and (ii) polarities of signal potentials supplied to pixel electrodes as observed in a case where the resolution of a video signal has been converted by a factor of 2 (double-size display).

FIG. 64

Figure 64:
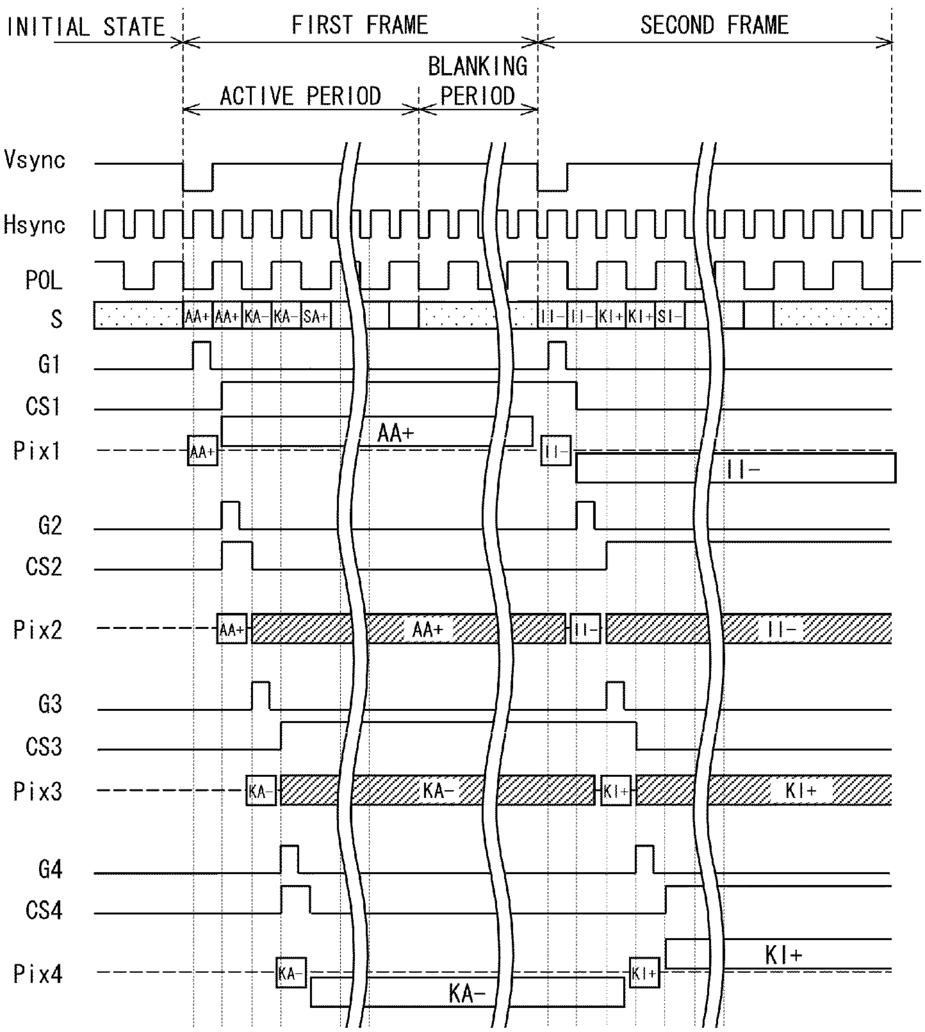

FIG. 64 is a timing chart showing waveforms of various signals observed in a case where a conventional liquid crystal display device carries out double-size display driving.

DESCRIPTION OF EMBODIMENTS

Embodiment 1

An embodiment of the present invention is described below with reference to FIGS. 1 to 23.

Figure 1:
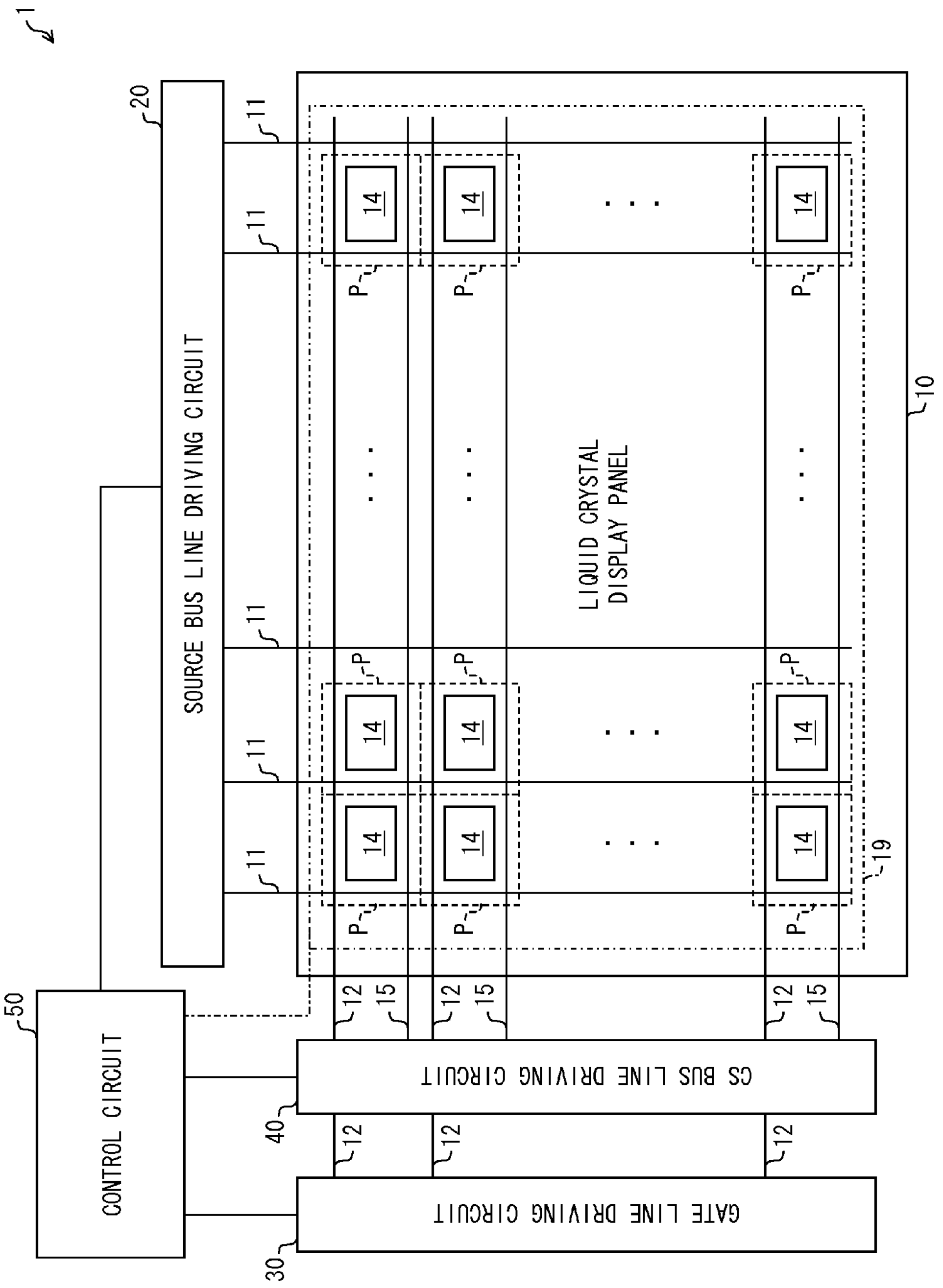
FIG. 1
Figure 2:
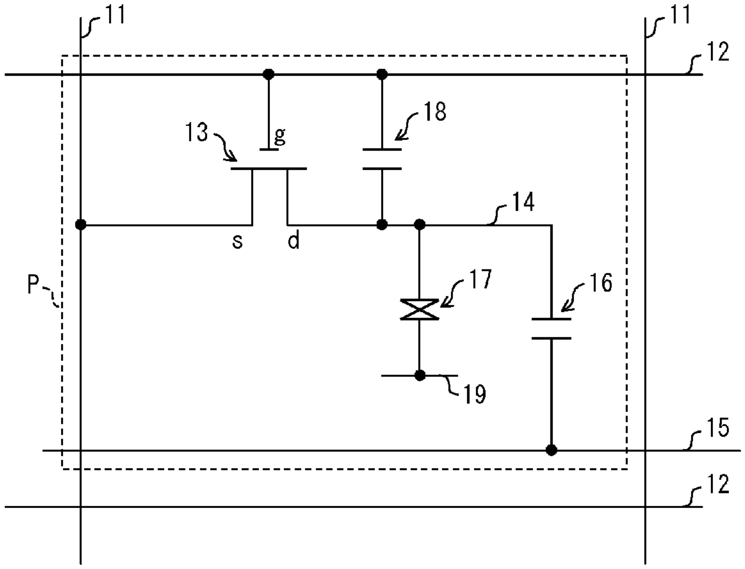
FIG. 2

First, a configuration of a liquid crystal display device 1 corresponding to a display device of the present invention is described with reference to FIGS. 1 and 2. FIG. 1 is a block diagram showing an overall configuration of the liquid crystal display device 1, and FIG. 2 is an equivalent circuit diagram showing an electrical configuration of each pixel of the liquid crystal display device 1.

The liquid crystal display device 1 includes: an active-matrix liquid crystal display panel 10, which corresponds to a display panel of the present invention; a source bus line driving circuit 20, which corresponds to a data signal line driving circuit of the present invention; a gate line driving circuit 30, which corresponds to a scanning signal line driving circuit of the present invention; a CS bus line driving circuit 40, which corresponds to a retention capacitor wire driving circuit of the present invention; and a control circuit 50, which corresponds to a control circuit of the present invention.

The liquid crystal display panel 10, constituted by sandwiching liquid crystals between an active matrix substrate and a counter substrate (not illustrated), has a large number of pixels P arranged in rows and columns.

Moreover, the liquid crystal display panel 10 includes: source bus lines 11, provided on the active matrix substrate, which correspond to data signal lines of the present invention; gate lines 12, provided on the active matrix substrate, which correspond to scanning signal lines of the present invention; thin-film transistors (hereinafter referred to as "TFTs") 13, provided on the active matrix substrate, which correspond to switching element of the present invention; pixel electrodes 14, provided on the active matrix substrate, which correspond to pixel electrodes of the present invention; CS bus lines 15, provided on the active matrix substrate, which correspond to retention capacitor wires of the present invention; and a counter electrode 19 provided on the counter substrate. It should be noted that each of the TFTs 13, omitted from FIG. 1, is shown in FIG. 2 alone.

The source bus lines 11 are arranged one by one in columns in parallel with one another along a column-wise direction (longitudinal direction), and the gate lines 12 are arranged one by one in rows in parallel with one another along a row-wise direction (transverse direction). The TFTs 13 are each provided in correspondence with a point of intersection between a source bus line 11 and a gate line 12, so are the pixel electrodes 14. Each of the TFTs 13 has its source electrode s connected to the source bus line 11, its gate electrode g connected to the gate line 12, and its drain electrode d connected to a pixel electrode 14. Further, each of the pixel electrode 14 forms a liquid crystal capacitor 17 with the counter electrode 19 with liquid crystals sandwiched between the pixel electrode 14 and the counter electrode 19.

With this, when a gate signal (scanning signal) supplied to the gate line 12 causes the gate of the TFT 13 to be on and a source signal (data signal) from the source bus line 11 is written to the pixel electrode 14, the pixel electrode 14 is given an electric potential corresponding to the source signal. In the result, the electric potential corresponding to the source signal is applied to the liquid crystals sandwiched between the pixel electrode 14 and the counter electrode 19. This allows realization of a gray-scale display corresponding to the source signal.

The CS bus lines 15 are arranged one by one in rows in parallel with one another along a row-wise direction (transverse direction), in such a way as to be paired with the gate lines 12, respectively. The CS bus lines 15 each form a retention capacitor 16 (referred to also as "auxiliary capacitor") with each one of the pixel electrodes 14 arranged in each row, thereby being capacitively coupled to the pixel electrodes 14.

It should be noted that since, because of its structure, the TFT 13 has a pull-in capacitor 18 formed between the gate electrode g and the drain electrode d, the electric potential of the pixel electrode 14 is affected (pulled in) by a change in electric potential of the gate line 12. However, for simplification of explanation, such an effect is not taken into consideration here.

The liquid crystal display panel 10 thus configured is driven by the source bus line driving circuit 20, the gate line driving circuit 30, and the CS bus line driving circuit 40. Further, the control circuit 50 supplies the source bus line driving circuit 20, the gate line driving circuit 30, and the CS bus line driving circuit 40 with various signals that are necessary for driving the liquid crystal display panel 10.

In the present embodiment, during an active period (effective scanning period) in a vertical scanning period that is periodically repeated, each row is allotted a horizontal scanning period in sequence and scanned in sequence. For that purpose, in synchronization with a horizontal scanning period in each row, the gate line driving circuit 30 sequentially outputs a gate signal for turning on the TFTs 13 to the gate line 12 in that row. The gate line driving circuit 30 will be described in detail later.

The source bus line driving circuit 20 outputs a source signal to each source bus line 11. This source signal is obtained by the source bus line driving circuit 20 receiving a video signal from an outside of the liquid crystal display device 1 via the control circuit 50, allotting the video signal to each column, and giving the video signal a boost or the like.

Figure 4:
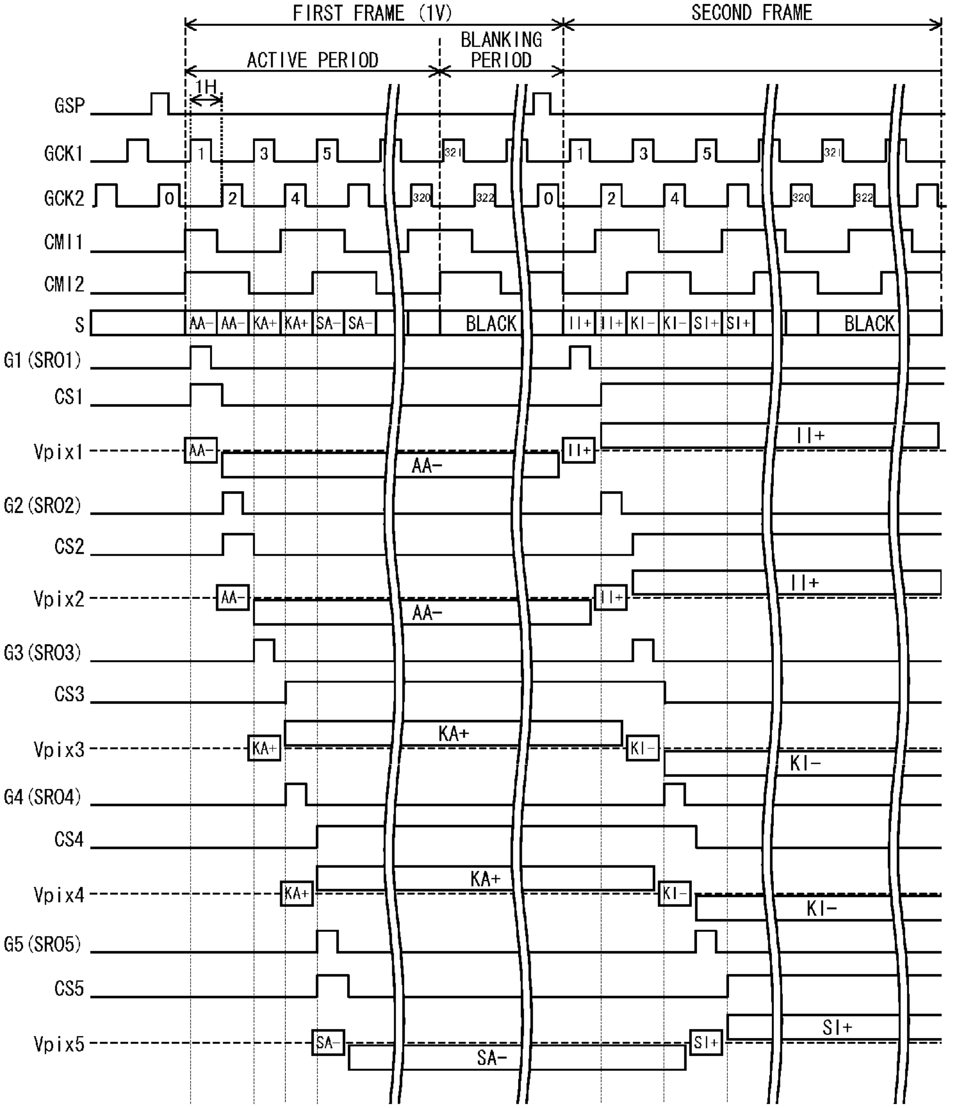
FIG. 4

Further, in order to carry out so-called n-line (nH) inversion driving, the source bus line driving circuit 20 is configured such that the polarity of the source signal it outputs is (i) identical for all pixels in an identical row and reversed every n adjacent lines and (ii) reversed in synchronization with vertical scanning periods. For example, as shown in FIG. 4, which shows timings of 2-line (2H) inversion driving, the polarity of a source signal S during the horizontal scanning periods in the first and second rows is reverse to the polarity of the source signal S during the horizontal scanning periods in the third and fourth rows. Further, the polarity of the source signal S during the horizontal scanning period in the first row in the first frame is reverse to the polarity of the source signal S during the horizontal scanning period in the first row in the second frame. That is, in the case of the n-line (nH) inversion driving, the source signal S reverses its polarity (polarity of an electric potential of a pixel electrode) every n lines (n rows).

Further, in order to carry out a display based on a video signal whose resolution has been converted (by a factor of n) to higher resolution at least in the column-wise direction, the source bus line driving circuit 20 supplies signal potentials having the same polarity and the same gray scale every n rows (n lines). For example, in a case of carrying out a display based on a video signal whose resolution as been converted by a factor of 2 in both the column-wise and row-wise directions, source signals S supplied to the first and second rows have the same voltage polarity and the same gray scale, whereas source signals S supplied to the third and fourth rows have the same voltage polarity and the same gray scale. It should be noted that although the following description assumes that one row (one line) corresponds to one horizontal scanning period, this does not imply any limitation on the present invention.

The CS bus line driving circuit 40 outputs a CS signal corresponding to a retention capacitor wire signal of the present invention to each CS bus line 15. This CS signal is a signal whose electric potential switches (rises or falls) between two values (high and low electric potential levels), and is controlled such that the electric potential at a point in time where the TFTs 13 in the corresponding row are switched from on to off (i.e., at a point in time where the gate signal falls) varies every n adjacent lines. The CS bus line driving circuit 40 will be described in detail later.

The control circuit 50 controls the gate line driving circuit 30, the source bus line driving circuit 20, and the CS bus line driving circuit 40, thereby causing each of them to output signals as shown in FIG. 4.

The liquid crystal display device having the above configuration is configured to (i) convert resolution of a video signal by a factor of n (n is an integer of two or greater) at least in the column-wise direction and (ii) carry out n-line inversion driving. Although the liquid crystal display device in accordance with the present embodiment is configured to covert resolution of a video signal by a factor of n both in the column-wise and row-wise directions, this does not imply any limitation. Therefore, the liquid crystal display device can be configured to convert the resolution by a factor of n only in the column-wise direction. In the following, an embodiment in which a display is carried out based on a video signal whose resolution has been converted by a factor n both in the column-wise and row-wise directions (n-fold-size display driving) is taken as an example.

Example 1

FIG. 4 is a timing chart showing waveforms of various signals in a liquid crystal display device 1 that employs double-size display driving. In FIG. 4, as in FIG. 64, GSP is a gate start pulse that defines a timing of vertical scanning, and GCK1 (CK) and GCK2 (CKB) are gate clocks that are outputted from the control circuit 50 to define a timing of operation of the shift register. A period from a falling edge to the next falling edge in GSP corresponds to a single vertical scanning period (1V period). A period from a rising edge in GCK1 to a rising edge in GCK2 and a period from a rising edge GCK2 to a rising edge in GCK1 each correspond to a single horizontal scanning period (1H period). CMI1 and CMI2 are each a polarity signal that reverses its polarity at predetermined timings.

Further, FIG. 4 shows the following signals in the order named: a source signal S (video signal), which is supplied from the source bus line driving circuit 20 to a source bus line 11 (source bus line 11 provided in the xth column); a gate signal G1, which is supplied from the gate line driving circuit 30 to a gate line 12 provided in the first row; a CS signal CS1, which is supplied from the bus line driving circuit 40 to a CS bus line 15 provided in the first row; and an electric potential waveform Vpix1 of a pixel electrode 14 provided in the first row and the xth column. FIG. 4 shows the following signals in the order named: a gate signal G2, which is supplied to a gate line 12 provided in the second row; a CS signal CS2, which is supplied to a CS bus line 15 provided in the second row; and an electric potential waveform Vpix2 of a pixel electrode 14 provided in the second row and the xth column. FIG. 4 shows the following signals in the order named: a gate signal G3, which is supplied to a gate line 12 provided in the third row; a CS signal CS3, which is supplied to a CS bus line 15 provided in the third row; and an electric potential waveform Vpix3 of a pixel electrode 14 provided in the third row and the xth column. As to the fourth and fifth rows, FIG. 4 similarly shows a gate signal G4, a CS signal CS4, and an electric potential waveform Vpix4 in the order named and a gate signal G5, a CS signal CS5, and an electric potential waveform Vpix5 in the order named.

It should be noted that the dotted lines in the electric potentials Vpix1, Vpix2, Vpix3, Vpix4, and Vpix5 indicate the electric potential of the counter electrode 19.

In the following, it is assumed that the start frame of a display picture is a first frame and that the first frame is preceded by an initial state. As shown in FIG. 4, during an initial state, the CS signals CS1 to CS5 are all fixed at one electric potential (in FIG. 4, at a low level). In the first frame, the CS signal CS1 in the first row is at a high level at a point in time where the corresponding gate signals G1 (which corresponds to the output SRO1 from the corresponding shift register circuit SR1) falls. The CS signal CS2 in the second row is at a high level at a point in time where the corresponding gate signals G2 falls. The CS signal CS3 in the third row is at a low level at a point in time where the corresponding gate signals G3 falls. The CS signal CS4 in the fourth row is at a low level at a point in time where the corresponding gate signals G4 falls. The CS signal CS5 in the fifth row is at a high level at a point in time where the corresponding gate signals G5 falls.

It should be noted that the source signal S is a signal which has amplitude corresponding to a gray scale represented by a video signal and which reverses its polarity every two horizontal scanning period (2H). The source signal S has the same electric potential (gray scale) during two adjacent horizontal scanning periods (2H) and has the same electric potential (gray scale) during next two adjacent horizontal scanning periods (2H). That is, each of the reference signs "AA" to "SA" shown in FIG. 4 corresponds to a single horizontal scanning period, and indicates a signal potential (gray scale) during that horizontal scanning period. For example, the source signal S in the first frame exhibits identical signal potentials (gray scales) of a negative polarity ("AA") during the first and second horizontal scanning periods, and exhibits identical signal potentials of a positive polarity ("KA") during the third and fourth horizontal scanning periods. Further, the source signal S in the second frame exhibits identical signal potentials of a positive polarity ("II") during the first and second horizontal scanning periods, and exhibits identical signal potentials of a negative polarity ("KI") during the third and fourth horizontal scanning periods. Meanwhile, the gate signals G1 to G5 serve as gate-on potentials during the first to fifth 1H periods, respectively, in an active period (effective scanning period) of each frame, and serve as gate-off potentials during the other periods.

Then, the CS signals CS1 to CS5 switch between high and low electric potential levels after their corresponding gate signals G1 to G5 fall. Specifically, in the first frame, the CS signals CS1 and CS2 fall after their corresponding gate signals G1 and G2 fall, respectively, and the CS signals CS3 and CS4 rise after their corresponding signals G3 and G4 fall, respectively. It should be noted that in the second frame, this relationship is reversed, i.e., the CS signals CS1 and CS2 rise after their corresponding gate signals G1 and G2 fall, respectively, and the CS signals CS3 and CS4 fall after their corresponding gate signals G3 and G4 fall, respectively.

Thus, in the liquid crystal display device 1 that employs double-size display driving, the electric potential of each CS signal at a point in time where the gate signal falls varies every two rows in correspondence with the polarity of the source signal S; therefore, in the first frame, the electric potentials Vpix1 to Vpix5 of the pixel electrodes 14 are all properly shifted by the CS signals CS1 to CS5, respectively. Therefore, inputting of source signals S of the same gray scale causes the positive and negative electric potential differences between the electric potential of the counter electrode and the shifted electric potential of each of the pixel electrodes 14 to be equal to each other. That is, in the first frame, in which a source signal having a negative polarity and the same electric potential (gray scale) is written to pixels corresponding to two adjacent rows in the same column of pixels and a source signal having a positive polarity and the same electric potential (gray scale) is written to pixels corresponding to two adjacent pixels next to the two rows in the same column of pixels, the electric potentials of the CS signals corresponding to the first two rows are not polarity-reversed during the writing to the pixels corresponding to the first two rows, are polarity-reversed in a negative direction after the writing, and are not polarity-reversed until the next writing, and the electric potentials of the CS signals corresponding to the next two rows are not polarity-reversed during the writing to the pixels corresponding to the next two rows, are polarity-reversed in a positive direction after the writing, and are not polarity-reversed until the next writing. This realizes 2-line inversion driving in CC driving.

Moreover, the foregoing configuration allows the electric potentials Vpix1 to Vpix5 of the pixel electrodes 14 to be properly shifted by the CS signals CS1 to CS5, respectively, even in a case of double-size display driving (2-line inversion driving). This allows pixel electrodes 14 that are supplied with the same signal potential to be equal in electric potential to each other, thus making it possible to eliminate the appearance of transverse stripes shown in FIG. 64.

A specific configuration of the gate line driving circuit 30 and the CS bus line driving circuit 40 for achieving the aforementioned control is described here.

Figure 3:
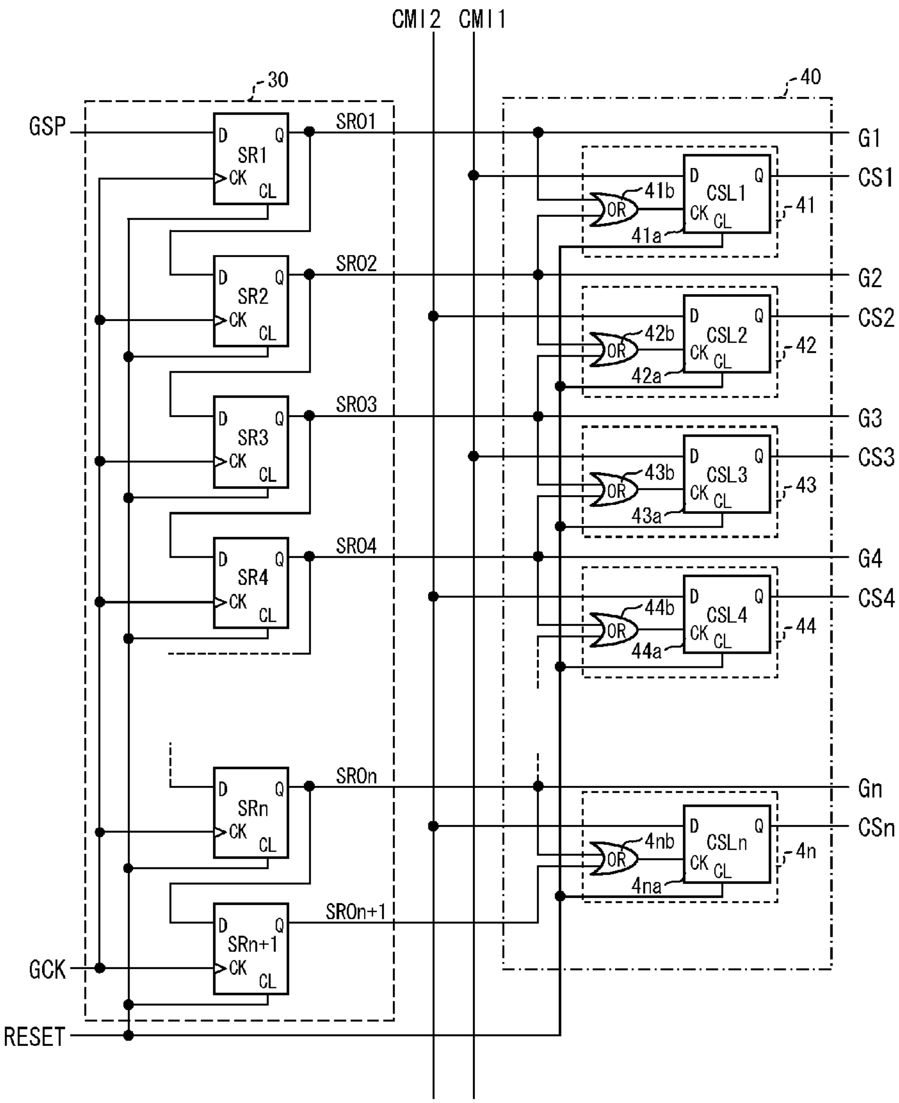
FIG. 3

FIG. 3 shows a configuration of the gate line driving circuit 30 and the CS bus line driving circuit 40. The CS bus line driving circuit 40 includes a plurality of CS circuits 41, 42, 43, . . . , and 4*n* corresponding to respective rows. The CS circuits 41, 42, 43, . . . , and 4*n* include respective D latch circuits 41*a*, 42*a*, 43*a*, . . . , and 4*na*; and respective OR circuits (logic circuits) 41*b*, 42*b*, 43*b*, . . . , and 4*nb*. The gate line driving circuit 30 includes a plurality of shift register circuits SR1, SR2, SR3, . . . , and SRn. Note here that, although the gate line driving circuit 30 and the CS bus line driving circuit 40 are located on one side of a liquid crystal display panel in FIG. 3, this does not imply any limitation.

The gate line driving circuit 30 and the CS bus line driving circuit 40 may be located on respective different sides of the liquid crystal display panel.

Input signals to the CS circuit 41 are shift register outputs SRO1 and SRO2 corresponding to respective gate signals G1 and G2, a polarity signal CMI1, and a reset signal RESET. Input signals to the CS circuit 42 are shift register outputs SRO2 and SRO3 corresponding to respective gate signals G2 and G3, a polarity signal CMI2, and the reset signal RESET. Input signals to the CS circuit 43 are shift register outputs SRO3 and SRO4 corresponding to respective gate signals G3 and G4, the polarity signal CMI1, and the reset signal RESET. Input signals to the CS circuit 44 are shift register outputs SRO4 and SRO5 corresponding to respective gate signals G4 and G5, the polarity signal CMI2, and the reset signal RESET. As described above, each CS circuit receives a shift register output SROn in the corresponding nth row and a shift register output SROn+1 in the next row, and receives one of the polarity signals CMI1 and CMI2 which alternate every row. The polarity signals CMI1 and CMI2 reverse their polarities every two horizontal scanning periods, and are out of phase with each other by one horizontal scanning period (refer to FIG. 4). The polarity signals CMI1 and CMI2 and the reset signal RESET are supplied from the control circuit 50.

In the following, for convenience of description, mainly the CS circuits 42 and 43 corresponding to the second and third rows, respectively, are taken as an example.

The D latch circuit 42*a* receives the reset signal RESET via its reset terminal CL, receives the polarity signal CMI2 (retention target signal) via its data terminal D (second input section), and receives an output from the OR circuit 42*b* via its clock terminal CK (first input section). In accordance with a change (from a low level to a high level or from a high level to a low level) in electric potential level of the signal that it receives via its clock terminal CK, the D latch circuit 42*a* outputs, as a CS signal CS2 indicative of the change in electric potential level, an input state (low level or high level) of the polarity signal CMI2 that it receives via its data terminal D.

Specifically, when the electric potential level of the signal that the D latch circuit 42*a* receives via its clock terminal CK is at a high level, the D latch circuit 42*a* outputs an input state (low level or high level) of the polarity signal CMI2 that it receives via its terminal D. When the electric potential level of the signal that the D latch circuit 42*a* receives via its clock terminal CK has changed from a high level to a low level, the latch circuit 42*a* latches an input state (low level or high level) of the polarity signal CMI2 that it receives via its terminal D at the time of change, and keeps the latched state until the next time when the electric potential level of the signal that the latch circuit 42*a* receives via its clock terminal CK is raised to a high level. Then, the D latch circuit 42*a* outputs the CS signal CS2, which indicates the change in electric potential level, via its output terminal Q.

Similarly, the D latch circuit 43*a* receives the resent signal RESET via its reset terminal CL, and receives the polarity signal CMI1 via its data terminal D. Meanwhile, the D latch circuit 43*a* receives, via its clock terminal CK, an output from the OR circuit 43*b*. This causes the D latch circuit 43*a* to output a CS signal CS3, which indicates a change in electric potential level, via its output terminal Q (output section).

Figure 5:
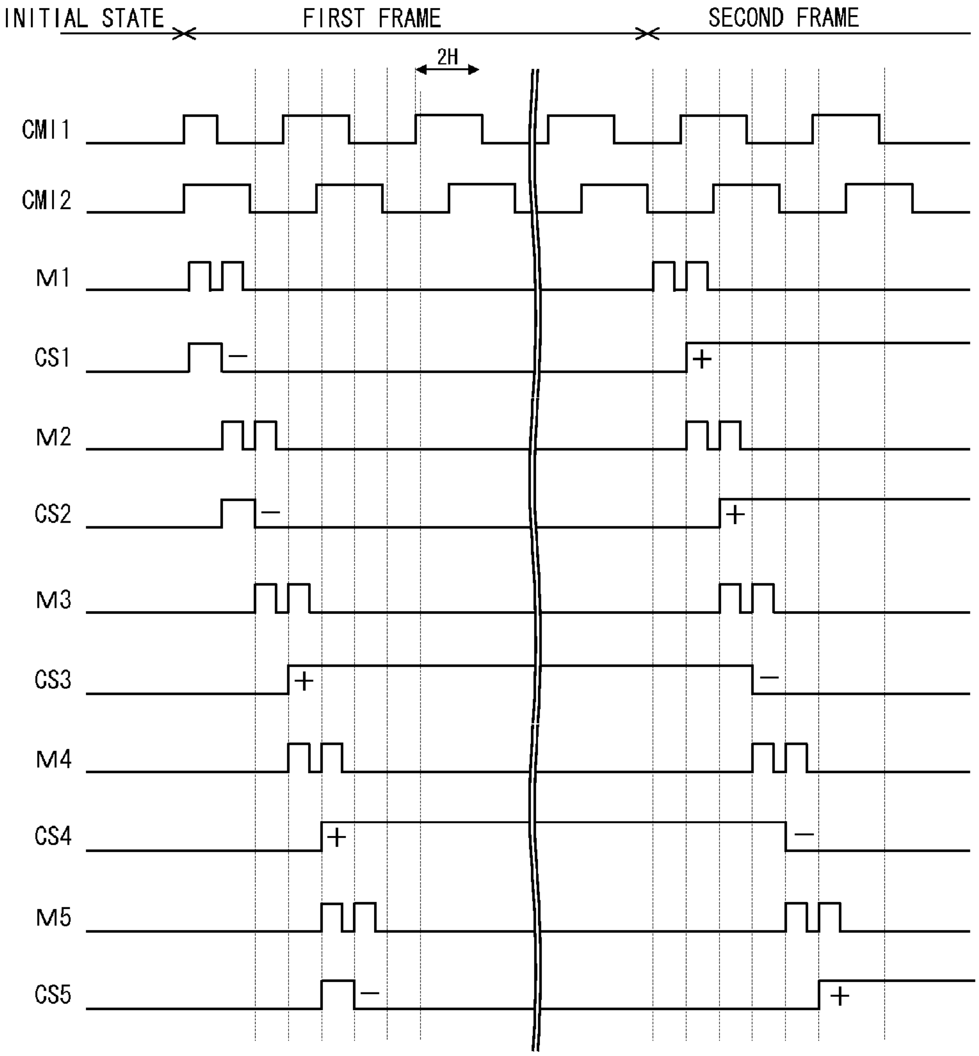
FIG. 5

The OR circuit 42*b* receives the output signal SRO2 from the shift resister circuit SR2 in its corresponding row and the output signal SRO3 from the shift register circuit SR3 in the next row and thereby outputs a signal M2 shown in FIG. 5. Further, the OR circuit 43*b* receives the output signal SRO3 from the shift register circuit SR3 in its corresponding row and the output signal SRO4 from the shift register circuit SR4 in the next row and thereby outputs a signal M3 shown in FIG. 5.

A shift register output SRO supplied to each OR circuit is generated by a well-known method in the gate line driving circuit 30 (see FIG. 3) which includes D-type flip-flop circuits. The gate line driving circuit 30 sequentially shifts a gate start pulse GSP, which is supplied from the control circuit 50, to a shift register circuit SR in the next stage at a timing of the gate clock GCK having a frequency of one horizontal scanning period.

FIG. 5 shows waveforms of various signals that are inputted to and outputted from the CS bus line driving circuit 40 of the liquid crystal display device 1 of Example 1.

First, the following describes changes in waveforms of various signals in the second row. During an initial state, the D latch circuit 42*a* of the CS circuit 42 receives the polarity signal CMI2 via its terminal D and receives the reset signal RESET via its reset terminal CL. The reset signal RESET causes the electric potential of the CS signal CS2 that the D latch circuit 42*a* outputs via its output terminal Q to be retained at a low level.

After that, the shift register output SRO2 corresponding to the gate signal G2 to be supplied to the gate line 12 in the second row is outputted from the shift register circuit SR2, and is inputted to one terminal of the OR circuit 42*b* of the CS circuit 42. Then, a change (from low to high) in electric potential of the shift register output SRO2 in the signal M2 is inputted to the clock terminal CK. Upon receiving the change (from low to high) in electric potential of the shift register output SRO2 via its clock terminal CK, the D latch circuit 42*a* transfers an input state of the polarity signal CMI2 that it received via its data terminal D at the point in time, i.e., transfers a high level. That is, the electric potential of the CS signal CS2 is switched from a low level to a high level at a time when there is a change (from low to high) in electric potential of the shift register output SRO2. The D latch circuit 42*a* outputs the high level until there is a change (from high to low) in electric potential of the shift register output SRO2 in the signal M2 inputted to the clock terminal CK (i.e., during a period of time in which the signal M2 is at a high level). Then, upon receiving a change (from high to low) in electric potential of the shift register output SRO2 in the signal M2 via its clock terminal CK, the D latch circuit 42*a* latches an input state of the polarity signal CMI2 that it received at the point in time, i.e., latches a high level. After that, the D latch circuit 42*a* retains the high level until the signal M2 is raised to a high level.

Then, the shift register output SRO3 that has been shifted to the third row in the gate line driving circuit 30 is supplied to the other terminal of the OR circuit 42*b*. The shift register output SRO3 is supplied also to one terminal of the OR circuit 43*b* of the CS circuit 43.

The D latch circuit 42*a* receives a change (from low to high) in electric potential of the shift register output SRO3 in the signal M2 via its clock terminal CK, and transfers an input state of the polarity signal CMI2 that it received via its terminal D at the point in time, i.e., transfers a low level.

That is, the electric potential of the CS signal CS2 is switched from a high level to a low level at a time when there is a change (from low to high) in electric potential of the shift register output SRO3. The D latch circuit 42*a* outputs the low level until there is a change (from high to low) in electric potential of the shift register output SRO3 in the signal M2 inputted to the clock terminal CK (i.e., during a period of time in which the signal M2 is at a high level). Next, upon receiving a change (from high to low) in electric potential of the shift register output SRO3 in the signal M2 via its clock terminal CK, the D latch circuit 42*a* latches an input state of the polarity signal CMI2 that it received at the point in time, i.e., latches a low level. After that, the D latch circuit 42*a* retains the low level until the signal M2 is raised to a high level in the second frame.

In the second frame, the D latch circuit 42*a* transfers an input state (low level) of the polarity signal CMI2 that it received via its terminal D during a period of time in which the shift register output SRO2 in the signal M2 is at a high level, latches an input state (low level) of the polarity signal CMI2 that it received at a point in time where it received a change (from high to low) in electric potential of the shift register output SRO2, and then retains the low level until the next time the signal M2 is raised to a high level.

Then, upon receiving a change (from low to high) in electric potential of the shift register output SRO3 via its clock terminal CK, the D latch circuit 42*a* transfers an input state of the polarity signal CMI2 that it received via its terminal D at the point in time, i.e., transfers a high level. That is, the electric potential of the CS signal CS2 is switched from a low level to a high level at a time when there is a change (from low to high) in electric potential of the shift register output SRO3. Then, the D latch circuit 42*a* outputs the high level until there is a change (from high to low) in electric potential of the shift register output SRO3 inputted to the clock terminal CK (i.e., during a period of time in which the signal M2 is at a high level). Next, upon receiving a change (from high to low) in electric potential of the shift register output SRO2 via its clock terminal CK, the D latch circuit 42*a* latches an input state of the polarity signal CMI2 that it received at the point in time, i.e., latches a high level. After that, the D latch circuit 42*a* retains the high level until the signal M2 is raised to a high level in the third frame.

Note that, in the first row, the polarity signal CMI1 is latched in accordance with the shift register outputs SRO1 and SRO2, thereby a CS signal CS1 shown in FIG. 5 is outputted.

Next, the following describes changes in waveforms of various signals in the third row. During the initial state, the D latch circuit 43*a* of the CS circuit 43 receives the polarity signal CMI1 via its terminal D and receives the reset signal RESET via its reset terminal CL. The reset signal RESET causes the electric potential of the CS signal CS3 that the D latch circuit 43*a* outputs via its output terminal Q to be retained at a low level.

After that, the shift register output SRO3 corresponding to the gate signal G3 to be supplied to the gate line 12 in the third row is outputted from the shift register circuit SR3, and is inputted to one terminal of the OR circuit 43*b* of the CS circuit 43. Then, a change (from low to high) in electric potential of the shift register output SRO3 in the signal M3 is inputted to the clock terminal CK. Upon receiving the change in electric potential of the shift register output SRO3 in the signal M3, the D latch circuit 43*a* transfers an input state of the polarity signal CMI1 that it received via its terminal D at the point in time, i.e., transfers a low level. Then, the D latch circuit 43*a* outputs the low level until the next time when there is a change (from high to low) in electric potential of the shift register output SRO3 in the signal M3 inputted to the clock terminal CK (i.e., during a period of time in which the signal M3 is at a high level). Then, upon receiving a change (from high to low) in electric potential of the shift register output SRO3 in the signal M3 via its clock terminal CK, the D latch circuit 43*a* latches an input state of the polarity signal CMI1 that it received at the point in time, i.e., latches a low level. After that, the D latch circuit 43*a* retains the low level until the signal M3 is raised to a high level.

Next, the shift register output SRO4 that has been shifted to the fourth row in the gate line driving circuit 30 is supplied to the other terminal of the OR circuit 43*b*. The shift register output SRO4 is supplied also to one terminal of the OR circuit 44*b* of the CS circuit 44.

The D latch circuit 43*a* receives a change (from low to high) in electric potential of the shift register output SRO4 in the signal M3 via its clock terminal CK, and transfers an input state of the polarity signal CMI1 that it received via its terminal D at the point in time, i.e., transfers a high level. That is, the electric potential of the CS signal CS3 is switched from a low level to a high level at a time when there is a change (from low to high) in electric potential of the shift register output SRO4. The D latch circuit 43*a* outputs the high level until there is a change (from high to low) in electric potential of the shift register output SRO4 in the signal M3 inputted to the clock terminal CK (i.e., during a period of time in which the signal M3 is at a high level). Next, upon receiving a change (from high to low) in electric potential of the shift register output SRO4 in the signal M3 via its clock terminal CK, the D latch circuit 43*a* latches an input state of the polarity signal CMI1 that it received at the point in time, i.e., latches a high level. After that, the D latch circuit 43*a* retains the high level until the signal M3 is raised to a high level in the second frame.

In the second frame, the D latch circuit 43*a* transfers an input state (high level) of the polarity signal CMI1 that it received via its terminal D during a period of time in which the shift register output SRO3 in the signal M3 is at a high level, latches an input state (high level) of the polarity signal CMI1 that it received at a point in time where it received a change (from high to low) in electric potential of the shift register output SRO3, and then retains the high level until the next time the signal M3 is raised to a high level.

Next, the D latch circuit 43*a* receives a change (from low to high) in electric potential of the shift register output SRO4 via its clock terminal CK, and transfers an input state of the polarity signal CMI1 that it received via its terminal D at the point in time, i.e., transfers a low level. That is, the electric potential of the CS signal CS3 is switched from a high level to a low level at a time when there is a change (from low to high) in electric potential of the shift register output SRO4.

Then, the D latch circuit 43*a* outputs the low level until the next time when there is a change (from high to low) in electric potential of the shift register output SRO4 inputted to the clock terminal CK (i.e., during a period of time in which the signal M3 is at a high level). Then, upon receiving a change (from high to low) in electric potential of the shift register output SRO4 via its clock terminal CK, the D latch circuit 43*a* latches an input state of the polarity signal CMI1 that it received at the point in time, i.e., latches a low level. After that, the D latch circuit 43*a* retains the low level until the signal M3 is raised to a high level in the third frame.

Note that, in the fourth row, the polarity signal CMI2 is latched in accordance with the shift register outputs SRO4 and SRO5, thereby a CS signal CS4 shown in FIG. 5 is outputted.

As described above, each of the CS circuits 41, 42, 43, . . . , and 4*n* corresponding to the respective rows makes it possible, in each frame in 2-line inversion driving, to switch the electric potential of a CS signal at a point in time where a gate signal in a corresponding row falls (at a point in time where a TFT 13 is switched from on to off) between high and low levels after the gate signal in this row falls.

That is, in Example 1, (i) a CS signal CSn supplied to the CS bus line 15 in the nth row is generated by latching an electric potential level of the polarity signal CMI1 at a point in time where the gate signal Gn in the nth row rises and an electric potential level of the polarity signal CMI1 at a point in time where the gate signal G(n+1) in the (n+1)th row rises and (ii) a CS signal CSn+1 supplied to the CS bus line 15 in the (n+1)th row is generated by latching an electric potential level of the polarity signal CMI2 at a point in time where the gate signal G(n+1) in the (n+1)th row rises and an electric potential level of the polarity signal CMI2 at a point in time where the gate signal G(n+2) in the (n+2)th row rises. Further, (iii) a CS signal CSn+2 supplied to the CS bus line 15 in the (n+2)th row is generated by latching an electric potential level of the polarity signal CMI1 at a point in time where the gate signal G(n+2) in the (n+2)th row rises and an electric potential level of the polarity signal CMI1 at a point in time where the gate signal G(n+3) in the (n+3)th row rises and (iv) a CS signal CSn+3 supplied to the CS bus line 15 in the (n+3)th row is generated by latching an electric potential level of the polarity signal CMI2 at a point in time where the gate signal G(n+3) in the (n+3)th row rises and an electric potential level of the polarity signal CMI2 at a point in time where the gate signal G(n+4) in the (n+4)th row rises.

This allows the CS bus line driving circuit 40 to operate properly even in the liquid crystal display device 1 that employs double-size display driving. Accordingly, it is possible to eliminate irregular waveforms that cause transverse stripes. This makes it possible to eliminate appearance of alternate bright and dark transverse stripes in a display picture, and thus possible to improve display quality.

Figure 6:
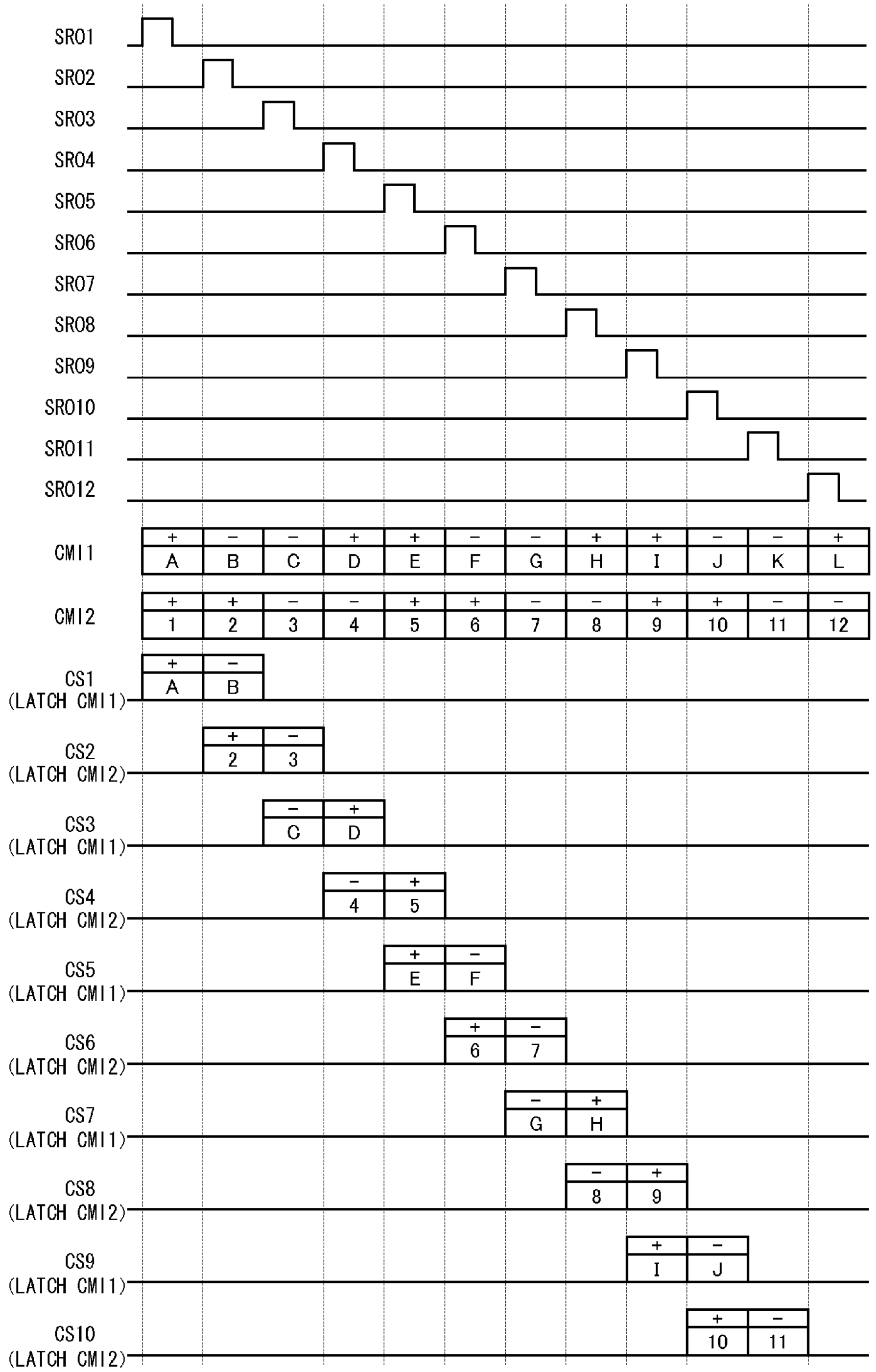
FIG. 6

The following description discusses how the polarity signals CMI1 and CMI2 supplied to the CS circuits 4*n* are related to the shift register outputs SROn. FIG. 6 shows relations between (ii) the polarity signal CMI1 (or CMI2) and the shift register outputs SROn which are inputted to the CS circuits 4*n* and (ii) the CS signals CSn outputted from the CS circuits 4*n*.

As to the CMI1 shown in FIG. 6, each of the sings A to L corresponds to a single horizontal scanning period, and indicates a polarity (positive polarity or negative polarity) during that horizontal scanning period. For example, the CMI1 has a negative polarity during the second horizontal scanning period "B", has a negative polarity during the third horizontal scanning period "C", has a positive polarity during the fourth horizontal scanning period "D", and has a positive polarity during the fifth horizontal scanning period "E". As to the CMI2, each of the signs 1 to 12 corresponds to a single horizontal scanning period, and indicates a polarity during that horizontal scanning period. For example, the CMI2 has a positive polarity during the first horizontal scanning period "1", has a positive polarity during the second horizontal scanning period "2", has a negative polarity during the third horizontal scanning period "3", and has a negative polarity during the fourth horizontal scanning period "4". In this way, the CMI1 and the CMI2 reverse their polarity every two horizontal scanning periods, and are out of phase with each other by one horizontal scanning period. Each of the CS circuits 4*n* receives one of the polarity signals CMI1 and CMI2 which alternate every row. For example, the CS circuit 41 receives the CMI1, the CS circuit 42 receives the CMI2, and the CS circuit 43 receives the CMI1 (see FIG. 3).

The CS circuit 4*n* receives, via its clock terminal CK, a shift register output SROn in the nth row and a shift register output SROn+1 in the next (n+1)th row. This causes the CS circuit 4*n* to latch (i) a CMI that the CS circuit 4*n* receives via its data terminal D during the nth horizontal scanning period and (ii) a CMI that the CS circuit 4*n* receives via its data terminal D during the (n+1)th horizontal scanning period. For example, the CS circuit 41 loads a positive polarity of "A" of the CMI1 during the first horizontal scanning period, and loads a negative polarity of "B" of the CMI1 during the second horizontal scanning period. The CS circuit 42 loads a positive polarity of "2" of the CMI2 during the second horizontal scanning period, and loads a negative polarity of "3" of the CMI2 during the third horizontal scanning period. The CS circuit 43 loads a negative polarity of "C" of the CMI1 during the third horizontal scanning period, and loads a positive polarity of "D" of the CMI1 during the fourth horizontal scanning period. The CS circuit 44 loads a negative polarity of "4" of the CMI2 during the fourth horizontal scanning period, and loads a positive polarity of "5" of the CMI2 during the fifth horizontal scanning period. In this way, the CS signals CSn as shown in FIGS. 4 and 5 are outputted.

Example 2

Figure 7:
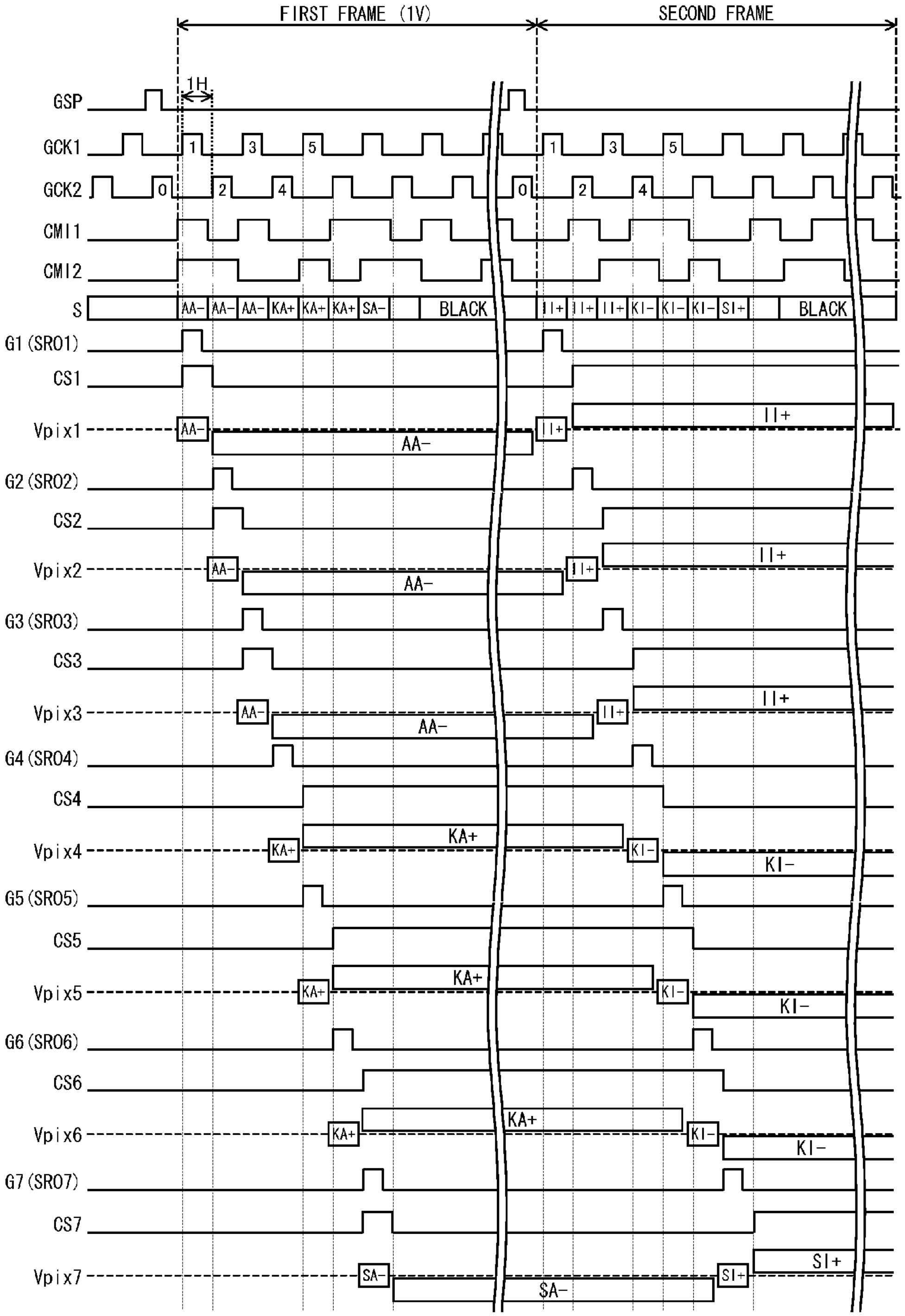
FIG. 7

FIG. 7 is a timing chart showing waveforms of various signals in triple-size display driving of the liquid crystal display device 1 shown in FIG. 3. In FIG. 7, the CMI1 and CMI2 reverse their polarities at timings different from those in FIG. 4.

As shown in FIG. 7, during an initial state, the CS signals CS1 to CS7 are all fixed at one electric potential (in FIG. 7, at a low level). In the first frame, the CS signal CS1 in the first row is at a high level at a point in time where the corresponding gate signals G1 falls. The CS signal CS2 in the second row is at a high level at a point in time where the corresponding gate signals G2 falls. The CS signal CS3 in the third row is at a high level at a point in time where the corresponding gate signals G3 falls. In contrast, the CS signal CS4 in the fourth row is at a low level at a point in time where the corresponding gate signals G4 falls, and the CS signal CS5 in the fifth row is at a low level at a point in time where the corresponding gate signals G5 falls. The CS signal CS6 in the sixth row is at a low level at a point in time where the corresponding gate signals G6 falls. The CS signal CS7 in the seventh row is at a high level at a point in time where the corresponding gate signals G7 falls.

It should be noted that the source signal S is a signal which has amplitude corresponding to a gray scale represented by a video signal and which reverses its polarity every three horizontal scanning period (3H). The source signal S has the same electric potential during three adjacent horizontal scanning periods (3H) and has the same electric potential during next three adjacent horizontal scanning periods (3H). That is, each of the reference signs "AA" to "SA" shown in FIG. 7 corresponds to a single horizontal scanning period, and indicates a signal potential (gray scale) during that horizontal scanning period. For example, the source signal S in the first frame exhibits identical signal potentials of a negative polarity ("AA") during the first, second and third horizontal scanning periods, and exhibits identical signal potentials of a positive polarity ("KA") during the fourth, fifth and sixth horizontal scanning periods. Further, the source signal S in the second frame exhibits identical signal potentials of a positive polarity ("II") during the first, second and third horizontal scanning periods, and exhibits identical signal potentials of a negative polarity ("KI") during the fourth, fifth and sixth horizontal scanning periods. Meanwhile, the gate signals G1 to G7 serve as gate-on potentials during the first to seventh 1H periods, respectively, in an active period (effective scanning period) of each frame, and serve as gate-off potentials during the other periods.

Then, the CS signals CS1 to CS7 switch between high and low electric potential levels after their corresponding gate signals G1 to G7 fall. Specifically, in the first frame, the CS signals CS1, CS2 and CS3 fall after their corresponding gate signals G1, G2 and G3 fall, respectively, and the CS signals CS4, CS5 and CS6 rise after their corresponding signals G4, G5 and G6 fall, respectively. It should be noted that, in the second frame, this relationship is reversed, i.e., the CS signals CS1, CS2 and CS3 rise after their corresponding gate signals G1, G2 and G3 fall, respectively, and the CS signals CS4, CS5 and CS6 fall after their corresponding gate signals G4, G5 and G6 fall, respectively.

Thus, in the liquid crystal display device 1 that employs triple-size display driving, the electric potential of each CS signal at a point in time where the gate signal falls varies every three rows in correspondence with the polarity of the source signal S; therefore, in the first frame, the electric potentials Vpix1 to Vpix7 of the pixel electrodes 14 are all properly shifted by the CS signals CS1 to CS7, respectively. Therefore, inputting of source signals S of the same gray scale causes the positive and negative electric potential differences between the electric potential of the counter electrode and the shifted electric potential of each of the pixel electrodes 14 to be equal to each other. That is, in the first frame, in which a source signal having a negative polarity and the same electric potential (gray scale) is written to pixels corresponding to three adjacent rows in the same column of pixels and a source signal having a positive polarity and the same electric potential (gray scale) is written to pixels corresponding to three adjacent rows next to the three rows in the same column of pixels, the electric potentials of the CS signals corresponding to the first three rows are not polarity-reversed during the writing to the pixels corresponding to the first three rows, are polarity-reversed in a negative direction after the writing, and are not polarity-reversed until the next writing, and the electric potentials of the CS signals corresponding to the next three rows are not polarity-reversed during the writing to the pixels corresponding to the next three rows, are polarity-reversed in a positive direction after the writing, and are not polarity-reversed until the next writing. This realizes 3-line inversion driving in CC driving.

Moreover, the foregoing configuration allows the electric potentials Vpix1 to Vpix7 of the pixel electrodes 14 to be properly shifted by the CS signals CS1 to CS7, respectively, even in a case of triple-size display driving (3-line inversion driving). This allows pixel electrodes 14 that are supplied with the same signal potential to be equal in electric potential to each other, thus making it possible to eliminate the appearance of transverse stripes shown in FIG. 64. As a result, it is possible to improve display quality.

A specific configuration of the gate line driving circuit 30 and the CS bus line driving circuit 40 for achieving the aforementioned control is described here.

According to the gate line driving circuit 30 and the CS bus line driving circuit 40 of Example 2, the polarity signals CMI1 and CMI2 reverse their polarity at timings different from those in Example 1. The other configurations are the same as those shown in FIG. 3. Each CS circuit receives a shift register output SROn in the corresponding nth row and a shift register output SROn+1 in the next row, and receives one of the polarity signals CMI1 and CMI2 which alternate every row. The polarity signals CMI1 and CMI2 are set so as to reverse their polarities at the timings shown in FIG. 7.

Figure 8:
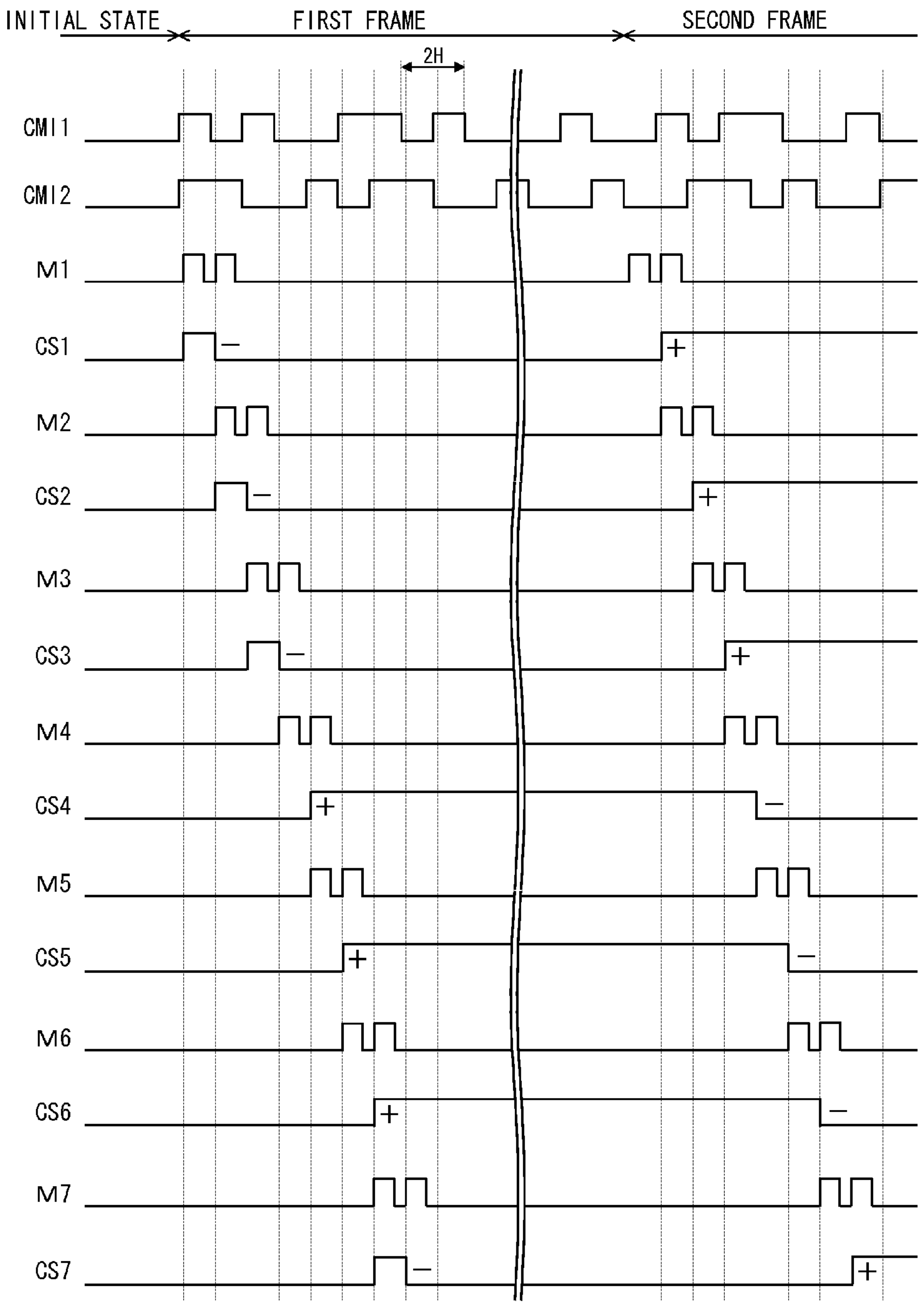
FIG. 8

The following description discusses, with reference to FIGS. 7 and 8, the liquid crystal display device 1 which employs triple-size display driving. In the following, descriptions of connections in the gate line driving circuit 30 and the CS bus line driving circuit 40 are omitted. FIG. 8 shows waveforms of various signals inputted to and outputted from the CS bus line driving circuit 40 of the liquid crystal display device 1 of Example 2. In the following, for convenience of description, operations in the first frame are explained by taking as an example the CS circuits 42, 43 and 44 corresponding to the second, third and fourth rows, respectively.

First, the following describes changes in waveforms of various signals in the second row. During an initial state, the D latch circuit 42*a* of the CS circuit 42 receives the polarity signal CMI2 via its terminal D and receives the reset signal RESET via its reset terminal CL. The reset signal RESET causes the electric potential of the CS signal CS2 that the D latch circuit 42*a* outputs via its output terminal Q to be retained at a low level.

After that, the shift register output SRO2 corresponding to the gate signal G2 to be supplied to the gate line 12 in the second row is outputted from the shift register circuit SR2, and is inputted to one terminal of the OR circuit 42*b* of the CS circuit 42. Then, a change (from low to high) in electric potential of the shift register output SRO2 in the signal M2 is inputted to the clock terminal CK. Upon receiving the change (from low to high) in electric potential of the shift register output SRO2 via its clock terminal CK, the D latch circuit 42*a* transfers an input state of the polarity signal CMI2 that it received via its data terminal D at the point in time, i.e., transfers a high level. That is, the electric potential of the CS signal CS2 is switched from a low level to a high level at a time when there is a change (from low to high) in electric potential of the shift register output SRO2. The D latch circuit 42*a* outputs the high level until there is a change (from high to low) in electric potential of the shift register output SRO2 in the signal M2 inputted to the clock terminal CK (i.e., during a period of time in which the signal M2 is at a high level). Then, upon receiving a change (from high to low) in electric potential of the shift register output SRO2 in the signal M2 via its clock terminal CK, the D latch circuit 42*a* latches an input state of the polarity signal CMI2 that it received at the point in time, i.e., latches a high level. After that, the D latch circuit 42*a* retains the high level until the signal M2 is raised to a high level.

Then, the shift register output SRO3 that has been shifted to the third row in the gate line driving circuit 30 is supplied to the other terminal of the OR circuit 42*b*. The shift register output SRO3 is supplied also to one terminal of the OR circuit 43*b* of the CS circuit 43.

The D latch circuit 42*a* receives a change (from low to high) in electric potential of the shift register output SRO3 in the signal M2 via its clock terminal CK, and transfers an input state of the polarity signal CMI2 that it received via its terminal D at the point in time, i.e., transfers a low level. That is, the electric potential of the CS signal CS2 is switched from a high level to a low level at a time when there is a change (from low to high) in electric potential of the shift register output SRO3. The D latch circuit 42*a* outputs the low level until there is a change (from high to low) in electric potential of the shift register output SRO3 in the signal M2 inputted to the clock terminal CK (i.e., during a period of time in which the signal M2 is at a high level). Next, upon receiving a change (from high to low) in electric potential of the shift register output SRO3 in the signal M2 via its clock terminal CK, the D latch circuit 42*a* latches an input state of the polarity signal CMI2 that it received at the point in time, i.e., latches a low level. After that, the D latch circuit 42*a* retains the low level until the signal M2 is raised to a high level in the second frame.

In the second frame, the D latch circuit 42*a* transfers an input state (low level) of the polarity signal CMI2 that it received via its data terminal D during a period of time in which the shift register output SRO2 in the signal M2 is at a high level, latches an input state (low level) of the polarity signal CMI2 that it received at a point in time where it received a change (from high to low) in electric potential of the shift register output SRO2, and then retains the low level until the next time the signal M2 is raised to a high level.

Then, upon receiving a change (from low to high) in electric potential of the shift register output SRO3 via its clock terminal CK, the D latch circuit 42*a* transfers an input state of the polarity signal CMI2 that it received via its data terminal D at the point in time, i.e., transfers a high level. That is, the electric potential of the CS signal CS2 is switched from a low level to a high level at a time when there is a change (from low to high) in electric potential of the shift register output SRO3. The D latch circuit 42*a* outputs the high level until there is a change (from high to low) in electric potential of the shift register output SRO3 inputted to the clock terminal CK (i.e., during a period of time in which the signal M2 is at a high level). Then, upon receiving a change (from high to low) in electric potential of the shift register output SRO2 via its clock terminal CK, the D latch circuit 42*a* latches an input state of the polarity signal CMI2 that it received at the point in time, i.e., latches a high level. After that, the D latch circuit 42*a* retains the high level until the signal M2 is raised to a high level in the third frame.

Note that, in the first row, the polarity signal CMI1 is latched in accordance with the shift register outputs SRO1 and SRO2, thereby a CS signal CS1 shown in FIG. 8 is outputted.

Next, the following describes changes in waveforms of various signals in the third row. During the initial state, the D latch circuit 43*a* of the CS circuit 43 receives the polarity signal CMI1 via its terminal D and receives the reset signal RESET via its reset terminal CL. The reset signal RESET causes the electric potential of the CS signal CS3 that the D latch circuit 43*a* outputs via its output terminal Q to be retained at a low level.

After that, the shift register output SRO3 corresponding to the gate signal G3 to be supplied to the gate line 12 in the third row is outputted from the shift register circuit SR3, and is inputted to one terminal of the OR circuit 43*b* of the CS circuit 43. Then, a change (from low to high) in electric potential of the shift register output SRO3 in the signal M3 is inputted to the clock terminal CK. Upon receiving the change in electric potential of the shift register output SRO3 in the signal M3, the D latch circuit 43*a* transfers an input state of the polarity signal CMI1 that it received via its terminal D at the point in time, i.e., transfers a high level. That is, the electric potential of the CS signal CS3 is switched from a low level to a high level at a time when there is a change (low to high) in electric potential of the shift register output SRO3. Then, the D latch circuit 43*a* outputs the high level until there is a change (from high to low) in electric potential of the shift register output SRO3 in the signal M3 inputted to the clock terminal CK (i.e., during a period of time in which the signal M3 is at a high level). Then, upon receiving a change (from high to low) in electric potential of the shift register output SRO3 in the signal M3 via its clock terminal CK, the D latch circuit 43*a* latches an input state of the polarity signal CMI1 that it received at the point in time, i.e., latches a high level. After that, the D latch circuit 43*a* retains the high level until the signal M3 is raised to a high level.

Then, the shift register output SRO4 that has been shifted to the fourth row in the gate line driving circuit 30 is supplied to the other terminal of the OR circuit 43*b*. The shift register output SRO4 is supplied also to one terminal of the OR circuit 43*b* of the CS circuit 43.

The D latch circuit 43*a* receives a change (from low to high) in electric potential of the shift register output SRO4 in the signal M3 via its clock terminal CK, and transfers an input state of the polarity signal CMI1 that it received via its terminal D at the point in time, i.e., transfers a low level. That is, the electric potential of the CS signal CS3 is switched from a high level to a low level at a time when there is a change (from low to high) in electric potential of the shift register output SRO4. The D latch circuit 43*a* outputs the low level until there is a change (from high to low) in electric potential of the shift register output SRO4 in the signal M3 inputted to the clock terminal CK (i.e., during a period of time in which the signal M3 is at a high level). Next, upon receiving a change (from high to low) in electric potential of the shift register output SRO4 in the signal M3 via its clock terminal CK, the D latch circuit 43*a* latches an input state of the polarity signal CMI1 that it received at the point in time, i.e., latches a low level. After that, the D latch circuit 43*a* retains the low level until the signal M3 is raised to a high level in the second frame.

In the second frame, the D latch circuit 43*a* transfers an input state (low level) of the polarity signal CMI1 that it received via its data terminal D during a period of time in which the shift register output SRO3 in the signal M3 is at a high level, latches an input state (low level) of the polarity signal CMI1 that it received at a point in time where it received a change (from high to low) in electric potential of the shift register output SRO3, and then retains the low level until the next time the signal M3 is raised to a high level.

Then, upon receiving a change (from low to high) in electric potential of the shift register output SRO4 via its clock terminal CK, the D latch circuit 43*a* transfers an input state of the polarity signal CMI1 that it received via its data terminal D at the point in time, i.e., transfers a high level. That is, the electric potential of the CS signal CS3 is switched from a low level to a high level at a time when there is a change (from low to high) in electric potential of the shift register output SRO3. The D latch circuit 43*a* outputs the high level until there is a change (from high to low) in electric potential of the shift register output SRO4 inputted to the clock terminal CK (i.e., during a period of time in which the signal M3 is at a high level). Then, upon receiving a change (from high to low) in electric potential of the shift register output SRO3 via its clock terminal CK, the D latch circuit 43*a* latches an input state of the polarity signal CMI1 that it received at the point in time, i.e., latches a high level. After that, the D latch circuit 43*a* retains the high level until the signal M3 is raised to a high level in the third frame.

Next, the following describes changes in waveforms of various signals in the fourth row. During the initial state, the D latch circuit 44*a* of the CS circuit 44 receives the polarity signal CMI2 via its terminal D and receives the reset signal RESET via its reset terminal CL. The reset signal RESET causes the electric potential of the CS signal CS4 that the D latch circuit 44*a* outputs via its output terminal Q to be retained at a low level.

After that, the shift register output SRO4 for the fourth row is outputted from the shift register circuit SR4, and is inputted to one terminal of the OR circuit 44*b* of the CS circuit 44. Then, a change (from low to high) in electric potential of the shift register output SRO4 in the signal M4 is inputted to the clock terminal CK. Upon receiving the change (from low to high) in electric potential of the shift register output SRO4 via its clock terminal CK, the D latch circuit 44*a* transfers an input state of the polarity signal CMI2 that it received via its data terminal D at the point in time, i.e., transfers a low level. The D latch circuit 44*a* outputs the low level until there is a change (from high to low) in electric potential of the shift register output SRO4 in the signal M4 inputted to the clock terminal CK (i.e., during a period of time in which the signal M4 is at a high level). Then, upon receiving a change (from high to low) in electric potential of the shift register output SRO4 in the signal M4 via its clock terminal CK, the D latch circuit 44*a* latches an input state of the polarity signal CMI2 that it received at the point in time, i.e., latches a low level. After that, the D latch circuit 44*a* retains the low level until the signal M4 is raised to a high level.

Next, the shift register output SRO5 that has been shifted to the fifth row in the gate line driving circuit 30 is supplied to the other terminal of the OR circuit 44*b*. The shift register output SRO5 is supplied also to one terminal of the OR circuit 45*b* of the CS circuit 45.

The D latch circuit 44*a* receives a change (from low to high) in electric potential of the shift register output SRO5 in the signal M4 via its clock terminal CK, and transfers an input state of the polarity signal CMI2 that it received via its terminal D at the point in time, i.e., transfers a high level. That is, the electric potential of the CS signal CS4 is switched from a low level to a high level at a time when there is a change (from low to high) in electric potential of the shift register output SRO5. The D latch circuit 44*a* outputs the high level until there is a change (from high to low) in electric potential of the shift register output SRO5 in the signal M4 inputted to the clock terminal CK (i.e., during a period of time in which the signal M4 is at a high level). Next, upon receiving a change (from high to low) in electric potential of the shift register output SRO5 in the signal M4 via its clock terminal CK, the D latch circuit 44*a* latches an input state of the polarity signal CMI2 that it received at the point in time, i.e., latches a high level. After that, the D latch circuit 44*a* retains the high level until the signal M4 is raised to a high level in the second frame.

In the second frame, the D latch circuit 44*a* transfers an input state (high level) of the polarity signal CMI2 that it received via its data terminal D during a period of time in which the shift register output SRO4 in the signal M4 is at a high level, latches an input state (high level) of the polarity signal CMI2 that it received at a point in time where it received a change (from high to low) in electric potential of the shift register output SRO4, and then retains the high level until the next time the signal M4 is raised to a high level.

Then, upon receiving a change (from low to high) in electric potential of the shift register output SRO5 via its clock terminal CK, the D latch circuit 44*a* transfers an input state of the polarity signal CMI2 that it received via its data terminal D at the point in time, i.e., transfers a low level. That is, the electric potential of the CS signal CS4 is switched from a high level to a low level at a time when there is a change (from low to high) in electric potential of the shift register output SRO5.

The D latch circuit 44*a* then outputs the low level until there is a change (from high to low) in electric potential of the shift register output SRO5 inputted to the clock terminal CK (i.e., during a period of time in which the signal M4 is at a high level). Then, upon receiving a change (from high to low) in electric potential of the shift register output SRO5 via its clock terminal CK, the D latch circuit 44*a* a latches an input state of the polarity signal CMI2 that it received at the point in time, i.e., latches a low level. After that, the D latch circuit 44*a* retains the low level until the signal M4 is raised to a high level in the third frame.

By the operations as so far described, (i) in the first to third rows, electric potentials of CS signals at points in time where gate signals in their corresponding rows fall (i.e., at points in time where TFTs 13 are switched from on to off) are caused to fall after the gate signals in these rows fall and (ii) in the fourth to six rows, electric potentials of CS signals at points in time where gate signals in their corresponding rows fall (i.e., at points in time where TFTs 13 are switched from on to off) are caused to rise after the gate signals in these rows fall (see FIGS. 7 and 8).

As has been described, according to Example 2, 3H inversion driving can be carried out by adjusting, in the liquid crystal display device 1 configured as shown in FIG. 3, timings at which the polarity signals CMI1 and CMI2 reverse their polarities. This allows the CS bus line driving circuit 40 to operate properly even in the liquid crystal display device 1 that employs triple-size display driving. Accordingly, it is possible to eliminate irregular waveforms that cause transverse stripes. This makes it possible to eliminate appearance of alternate bright and dark transverse stripes in a display picture, and thus possible to improve display quality.

Figure 9:
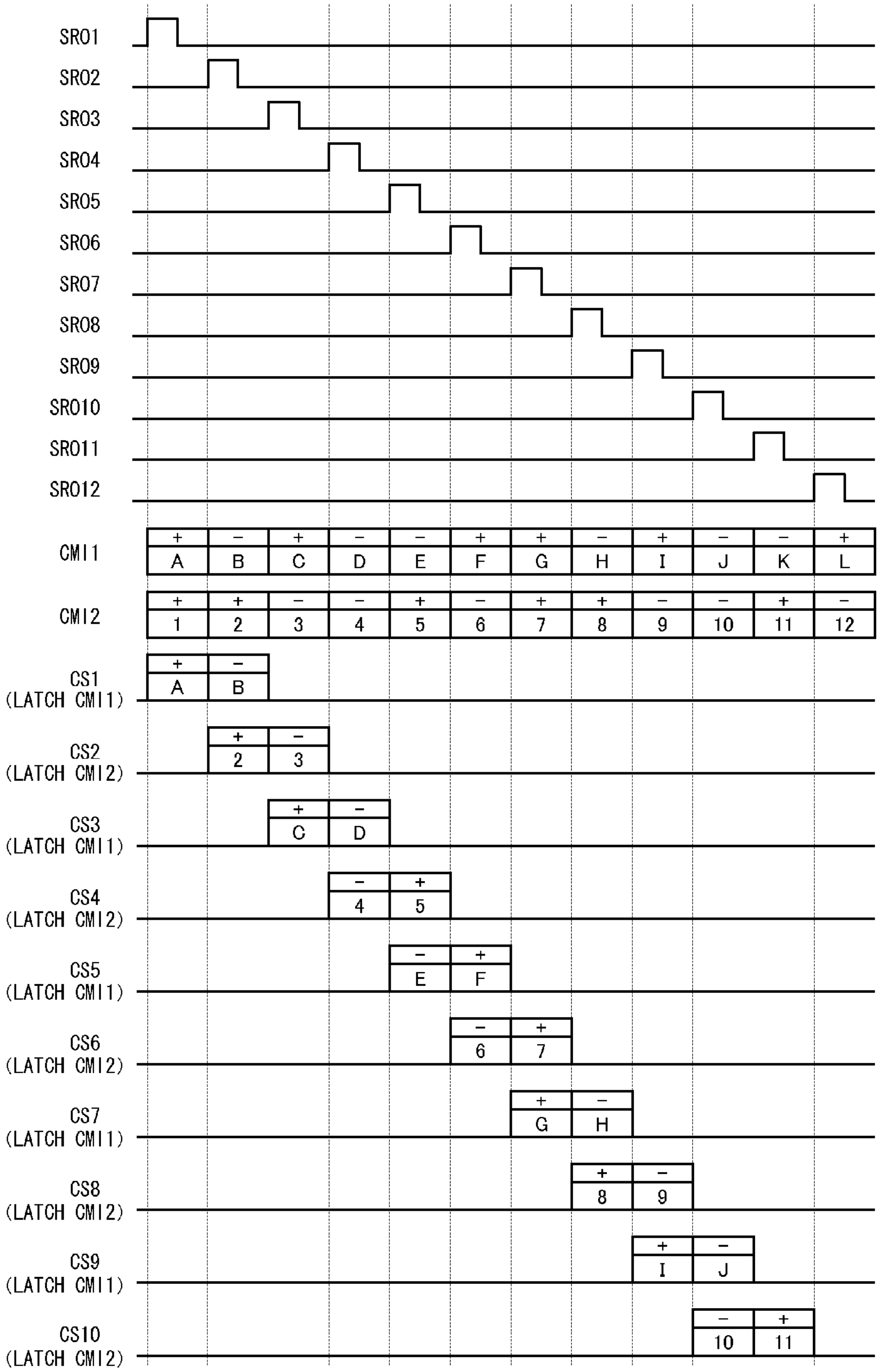
FIG. 9

The following description discusses how the polarity signals CMI1 and CMI2 supplied to the CS circuits 4*n* are related to the shift register outputs SROn. FIG. 9 shows relations between (i) the polarity signal CMI1 (or CMI2) and the shift register outputs SROn which are inputted to the CS circuits 4*n* and (ii) the CS signals CSn outputted from the CS circuits 4*n*.

As to the CMI1 shown in FIG. 9, each of the sings A to L corresponds to a single horizontal scanning period, and indicates a polarity during that horizontal scanning period. For example, the CMI1 has a negative polarity during the second horizontal scanning period "B", has a positive polarity during the third horizontal scanning period "C", has a negative polarity during the fourth horizontal scanning period "D", and has a negative polarity during the fifth horizontal scanning period "E". As to the CMI2, each of the signs 1 to 12 corresponds to a single horizontal scanning period, and indicates a polarity during that horizontal scanning period. For example, the CMI2 has a positive polarity during the first horizontal scanning period "1", has a positive polarity during the second horizontal scanning period "2", has a negative polarity during the third horizontal scanning period "3", and has a negative polarity during the fourth horizontal scanning period "4". Each of the CS circuits 4*n* receives one of the polarity signals CMI1 and CMI2 which alternate every row. For example, the CS circuit 41 receives the CMI1, the CS circuit 42 receives the CMI2, and the CS circuit 43 receives the CMI1.

The CS circuit 4*n* receives, via its clock terminal CK, a shift register output SROn in the nth row and a shift register output SROn+1 in the next (n+1)th row. This causes the CS circuit 4*n* to latch (i) a CMI that the CS circuit 4*n* receives via its data terminal D during the nth horizontal scanning period and (ii) a CMI signal that the CS circuit 4*n* receives via its data terminal D during the (n+1)th horizontal scanning period. For example, the CS circuit 41 loads a positive polarity of "A" of the CMI1 during the first horizontal scanning period, and loads a negative polarity of "B" of the CMI1 during the second horizontal scanning period. The CS circuit 42 loads a positive polarity of "2" of the CMI2 during the second horizontal scanning period, and loads a negative polarity of "3" of the CMI2 during the third horizontal scanning period. The CS circuit 43 loads a positive polarity of "C" of the CMI1 during the third horizontal scanning period, and loads a negative polarity of "D" of the CMI1 during the fourth horizontal scanning period. The CS circuit 44 loads a negative polarity of "4" of the CMI2 during the fourth horizontal scanning period, and loads a positive polarity of "5" of the CMI2 during the fifth horizontal scanning period. In this way, the CS signals CSn as shown in FIGS. 7 and 8 are outputted.

As has been described in Examples 1 and 2, even according to the liquid crystal display device 1 shown in FIG. 3, 2H inversion driving and 3H inversion driving can be carried out by using two polarity signals CMI1 and CMI2 that reverse their polarities at the same time or at respective different timings. Similarly, 4H, . . . , and nH (n line) inversion driving can be realized by adjusting timings at which the polarity signals CMI1 and CMI2 reverse their polarities. This allows carrying out double-size display driving and triple-size display driving. Similarly, quadruple-size, . . . , n-fold-size display driving can be realized by adjusting timings at which the polarity signals CMI1 and CMI2 reverse their polarities.

Example 3

Figure 10:
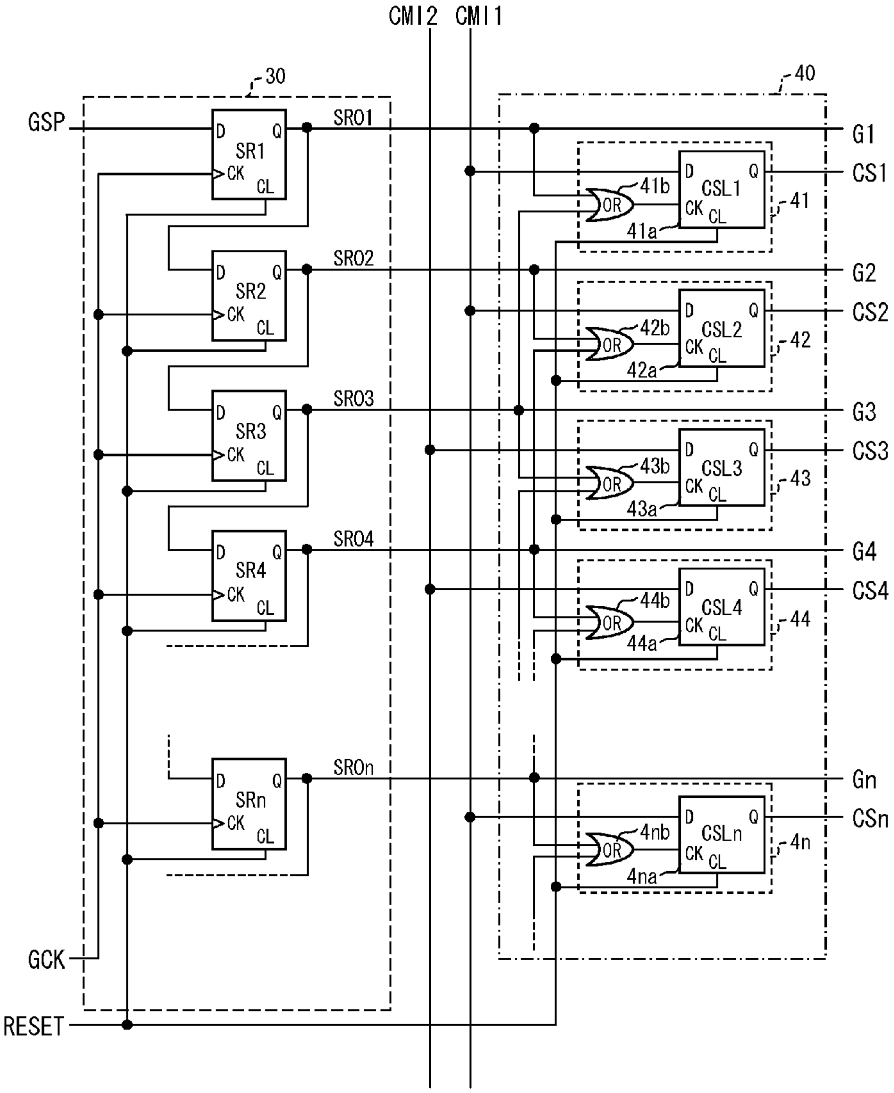
FIG. 10
Figure 11:
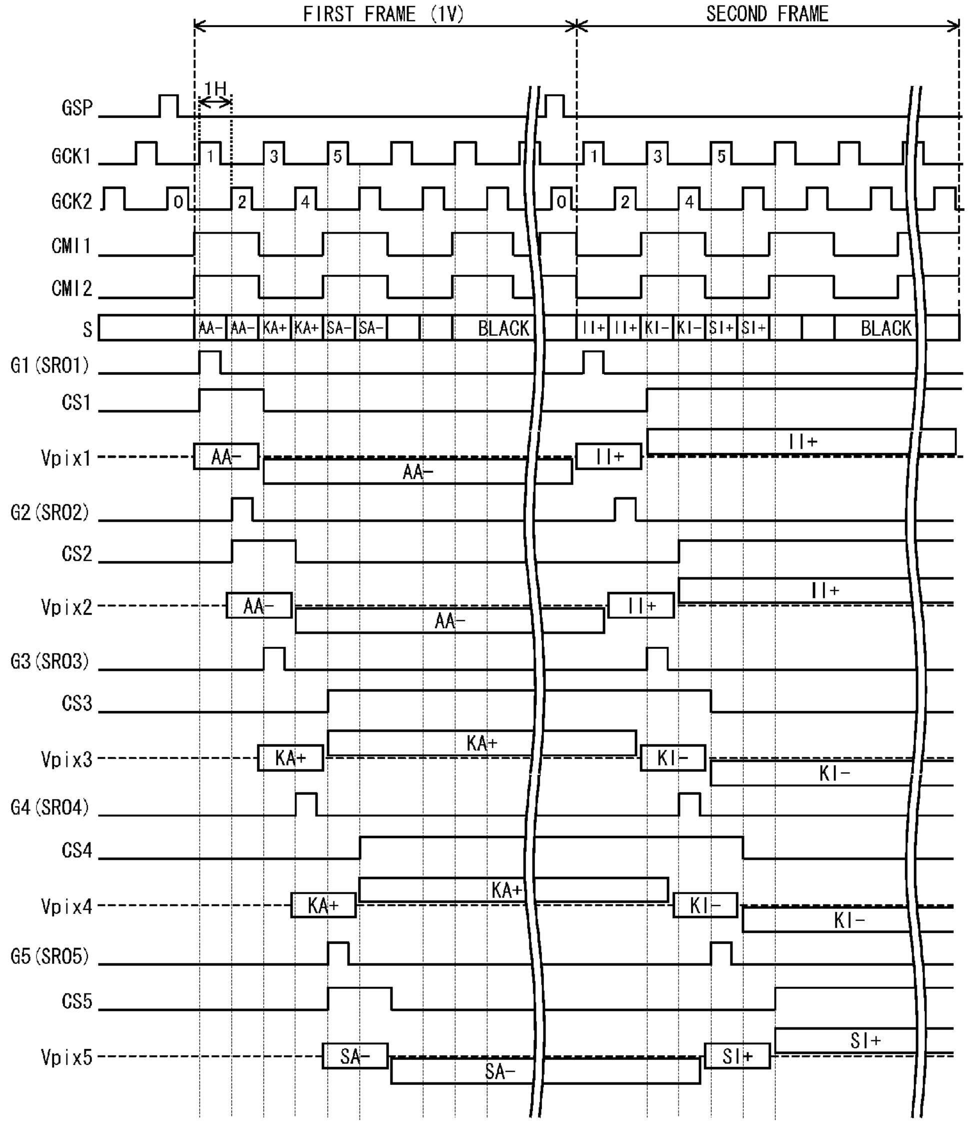
FIG. 11

Examples 1 and 2 each discuss a configuration in which a CS circuit 4*n* in the nth row receives a shift register output SROn in the corresponding nth row and a shift register output SROn+1 in the next (n+1)th row. Note, however, that the liquid crystal display device 1 of the present invention is not limited to this. For example, as shown in FIG. 10, the liquid crystal display device 1 can be configured such that the CS circuit 4*n* in the nth row receives a shift register output SROn in the corresponding nth row and a shift register output SROn+2 in the (n+2)th row. That is, the CS circuit 41 receives the shift register output SRO1 in the corresponding row and the shift register output SRO3 in the third row. FIG. 11 is a timing chart showing waveforms of various signals in the liquid crystal display device 1 which is configured like above and carries out a double-size display. As shown in FIG. 11, during an initial state, the CS signals CS1 to CS5 are all fixed at one electric potential (in FIG. 11, at a low level). In the first frame, the CS signal CS1 in the first row is at a high level at a point in time where the corresponding gate signals G1 falls. The CS signal CS2 in the second row is at a high level at a point in time where the corresponding gate signal G2 falls. The CS signal CS3 in the third row is at a low level at a point in time where the corresponding gate signals G3 falls. The CS signal CS4 in the fourth row is at a low level at a point in time where the corresponding gate signals G4 falls. The CS signal CS5 in the fifth row is at a high level at a point in time where the corresponding gate signals G5 falls. The source signal S is a signal which has amplitude corresponding to a gray scale represented by a video signal and which reverses its polarity every 2H periods.

Then, the CS signals CS1 to CS5 switch between high and low electric potential levels after their corresponding gate signals G1 to G5 fall. Specifically, in the first frame, the CS signals CS1 and CS2 fall after their corresponding gate signals G1 and G2 fall, respectively, and the CS signals CS3 and CS4 rise after their corresponding signals G3 and G4 fall, respectively. It should be noted that in the second frame, this relationship is reversed, i.e., the CS signals CS1 and CS2 rise after their corresponding gate signals G1 and G2 fall, respectively, and the CS signals CS3 and CS4 fall after their corresponding gate signals G3 and G4 fall, respectively.

This realizes 2H inversion driving, and eliminates appearance of alternate bright and dark transverse stripes in a display picture and thus improves display quality.

A specific configuration of the gate line driving circuit 30 and the CS bus line driving circuit 40 for achieving the aforementioned control is described here.

Input signals to the CS circuit 41 are shift register outputs SRO1 and SRO3 corresponding to respective gate signals G1 and G3, a polarity signal CMI1, and a reset signal RESET. Input signals to the CS circuit 42 are shift register outputs SRO2 and SRO4 corresponding to respective gate signals G2 and G4, a polarity signal CMI1, and the reset signal RESET. Input signals to the CS circuit 43 are shift register outputs SRO3 and SRO5 corresponding to respective gate signals G3 and G5, the polarity signal CMI2, and the reset signal RESET. Input signals to the CS circuit 44 are shift register outputs SRO4 and SRO6 corresponding to respective gate signals G4 and G6, the polarity signal CMI2, and the reset signal RESET. Each CS circuit receives one of the polarity signals CMI1 and CMI2 which alternate every two rows. That is, as described above, the CS circuits 41 and 42 each receive the CMI1, the CS circuits 43 and 44 each receive the CMI2, and the CS circuits 45 and 46 each receive the CMI1. The polarity signals CMI1 and CMI2 reverse their polarities every two horizontal scanning periods, and have the same phase. Therefore, according to the present example, it is possible to employ a configuration in which only one of the polarity signals CMI1 and CMI2 is used and is supplied to each CS circuit.

Figure 12:
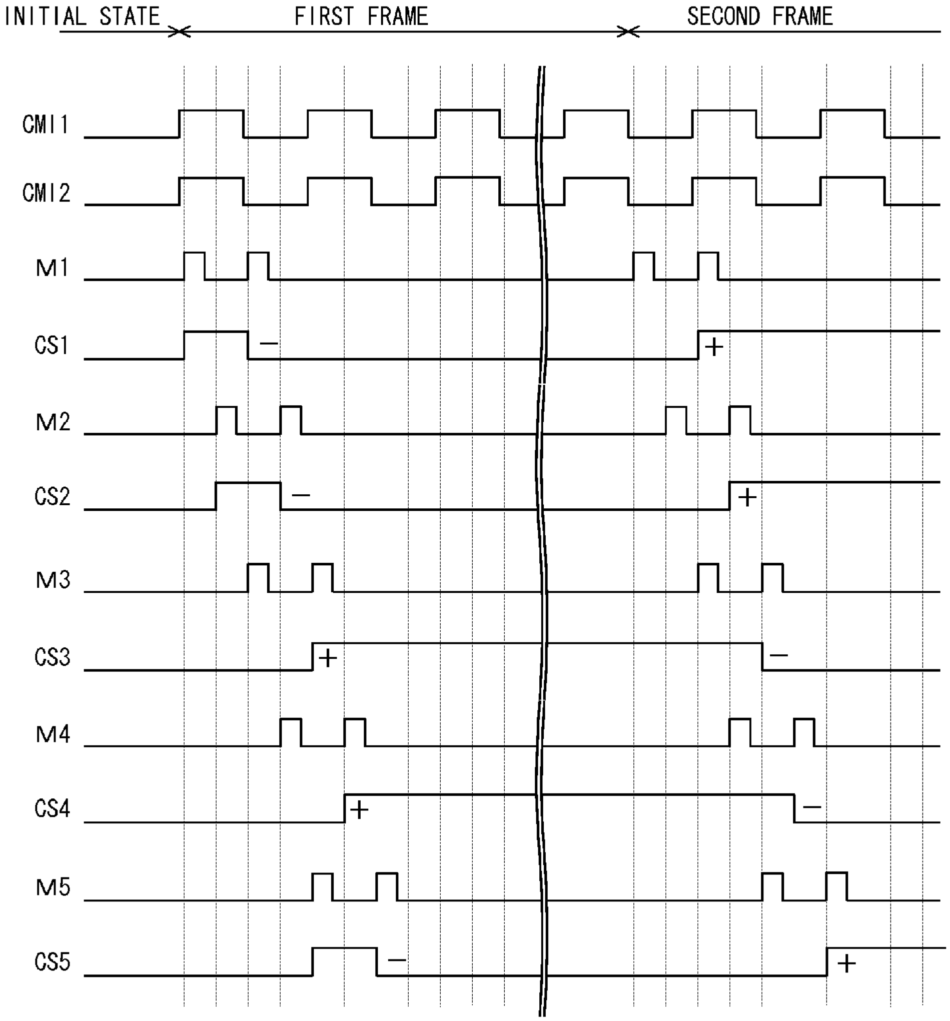
FIG. 12

In the following, for convenience of description, operations in the first frame are explained by taking as an example mainly the CS circuits 42 and 43 corresponding to the second and third rows, respectively. FIG. 12 shows waveforms of various signals that are inputted to and outputted from the CS bus line driving circuit 40 of the liquid crystal display device 1 of Example 3.

First, the following describes changes in waveforms of various signals in the second row. During an initial state, the D latch circuit 42*a* of the CS circuit 42 receives the polarity signal CMI1 via its terminal D and receives the reset signal RESET via its reset terminal CL. The reset signal RESET causes the electric potential of the CS signal CS2 that the D latch circuit 42*a* outputs via its output terminal Q to be retained at a low level.

After that, the shift register output SRO2 corresponding to the gate signal G2 to be supplied to the gate line 12 in the second row is outputted from the shift register circuit SR2, and is inputted to one terminal of the OR circuit 42*b* of the CS circuit 42. Then, a change (from low to high) in electric potential of the shift register output SRO2 in the signal M2 is inputted to the clock terminal CK. Upon receiving the change (from low to high) in electric potential of the shift register output SRO2 via its clock terminal CK, the D latch circuit 42*a* transfers an input state of the polarity signal CMI1 that it received via its terminal D at the point in time, i.e., transfers a high level. That is, the electric potential of the CS signal CS2 is switched from a low level to a high level at a time when there is a change (from low to high) in electric potential of the shift register output SRO2. The D latch circuit 42*a* outputs the high level until there is a change (from high to low) in electric potential of the shift register output SRO2 in the signal M2 inputted to the clock terminal CK (i.e., during a period of time in which the signal M2 is at a high level). Then, upon receiving a change (from high to low) in electric potential of the shift register output SRO2 in the signal M2 via its clock terminal CK, the D latch circuit 42*a* latches an input state of the polarity signal CMI1 that it received at the point in time, i.e., latches a high level. After that, the D latch circuit 42*a* retains the high level until the signal M2 is raised to a high level.

Then, the shift register output SRO4 that has been shifted to the fourth row in the gate line driving circuit 30 is supplied to the other terminal of the OR circuit 42*b*. The shift register output SRO4 is supplied also to one terminal of the OR circuit 44*b* of the CS circuit 44.

The D latch circuit 42*a* receives a change (from low to high) in electric potential of the shift register output SRO4 in the signal M2 via its clock terminal CK, and transfers an input state of the polarity signal CMI1 that it received via its terminal D at the point in time, i.e., transfers a low level. That is, the electric potential of the CS signal CS2 is switched from a high level to a low level at a time when there is a change (from low to high) in electric potential of the shift register output SRO4. The D latch circuit 42*a* outputs the low level until there is a change (from high to low) in electric potential of the shift register output SRO4 in the signal M2 inputted to the clock terminal CK (i.e., during a period of time in which the signal M2 is at a high level). Next, upon receiving a change (from high to low) in electric potential of the shift register output SRO4 in the signal M2 via its clock terminal CK, the D latch circuit 42*a* latches an input state of the polarity signal CMI1 that it received at the point in time, i.e., latches a low level. After that, the D latch circuit 42*a* retains the low level until the signal M2 is raised to a high level in the second frame.

Next, the following describes changes in waveforms of various signals in the third row. During the initial state, the D latch circuit 43*a* of the CS circuit 43 receives the polarity signal CMI2 via its data terminal D and receives the reset signal RESET via its reset terminal CL. The reset signal RESET causes the electric potential of the CS signal CS3 that the D latch circuit 43*a* outputs via its output terminal Q to be retained at a low level.

After that, the shift register output SRO3 in the third row is outputted from the shift register circuit SR3, and is inputted to one terminal of the OR circuit 43*b* of the CS circuit 43. Then, a change (from low to high) in electric potential of the shift register output SRO3 in the signal M3 is inputted to the clock terminal CK. Upon receiving the change in electric potential of the shift register output SRO3 in the signal M3, the D latch circuit 43*a* transfers an input state of the polarity signal CMI2 that it received via its data terminal D at the point in time, i.e., transfers a low level. Then, the D latch circuit 43*a* outputs the low level until the next time when there is a change (from high to low) in electric potential of the shift register output SRO3 in the signal M3 inputted to the clock terminal CK (i.e., during a period of time in which the signal M3 is at a high level). Then, upon receiving a change (from high to low) in electric potential of the shift register output SRO3 in the signal M3 via its clock terminal CK, the D latch circuit 43*a* latches an input state of the polarity signal CMI2 that it received at the point in time, i.e., latches a low level. After that, the D latch circuit 43*a* retains the low level until the signal M3 is raised to a high level.

Next, the shift register output SRO5 that has been shifted to the fifth row in the gate line driving circuit 30 is supplied to the other terminal of the OR circuit 43*b*. The shift register output SRO5 is supplied also to one terminal of the OR circuit 45*b* of the CS circuit 45.

The D latch circuit 43*a* receives a change (from low to high) in electric potential of the shift register output SRO5 in the signal M3 via its clock terminal CK, and transfers an input state of the polarity signal CMI2 that it received via its terminal D at the point in time, i.e., transfers a high level.

That is, the electric potential of the CS signal CS3 is switched from a low level to a high level at a time when there is a change (from low to high) in electric potential of the shift register output SRO5. The D latch circuit 43*a* outputs the high level until there is a change (from high to low) in electric potential of the shift register output SRO5 in the signal M3 inputted to the clock terminal CK (i.e., during a period of time in which the signal M3 is at a high level). Next, upon receiving a change (from high to low) in electric potential of the shift register output SRO5 in the signal M3 via its clock terminal CK, the D latch circuit 43*a* latches an input state of the polarity signal CMI2 that it received at the point in time, i.e., latches a high level. After that, the D latch circuit 43*a* retains the high level until the signal M3 is raised to a high level in the second frame.

As has been described, according to Example 3, (i) a CS signal CSn supplied to the CS bus line 15 in the nth row is generated by latching an electric potential level of the polarity signal CMI1 at a point in time where the gate signal Gn in the nth row rises and an electric potential level of the polarity signal CMI1 at a point in time where the gate signal G(n+2) in the (n+2)th row rises and (ii) a CS signal supplied to the CS bus line 15 in the (n+1)th row is generated by latching an electric potential level of the polarity signal CMI1 at a point in time where the gate signal G(n+1) in the (n+1)th row rises and an electric potential level of the polarity signal CMI1 at a point in time where the gate signal G(n+3) in the (n+3)th row rises. Further, (iii) a CS signal supplied to the CS bus line 15 in the (n+2)th row is generated by latching an electric potential level of the polarity signal CMI2 at a point in time where the gate signal G(n+2) in the (n+2)th row rises and an electric potential level of the polarity signal CMI2 at a point in time where the gate signal G(n+4) in the (n+4)th row rises and (iv) a CS signal supplied to the CS bus line 15 in the (n+3)th row is generated by latching an electric potential level of the polarity signal CMI2 at a point in time where the gate signal G(n+3) in the (n+3)th row rises and an electric potential level of the polarity signal CMI2 at a point in time where the gate signal G(n+5) in the (n+5)th row rises.

This allows the CS bus line driving circuit 40 to operate properly even in the liquid crystal display device 1 that employs double-size display driving. Accordingly, it is possible to eliminate irregular waveforms that cause transverse stripes. This makes it possible to eliminate the appearance of alternate bright and dark transverse stripes in a display picture, and thus possible to improve display quality.

Figure 13:
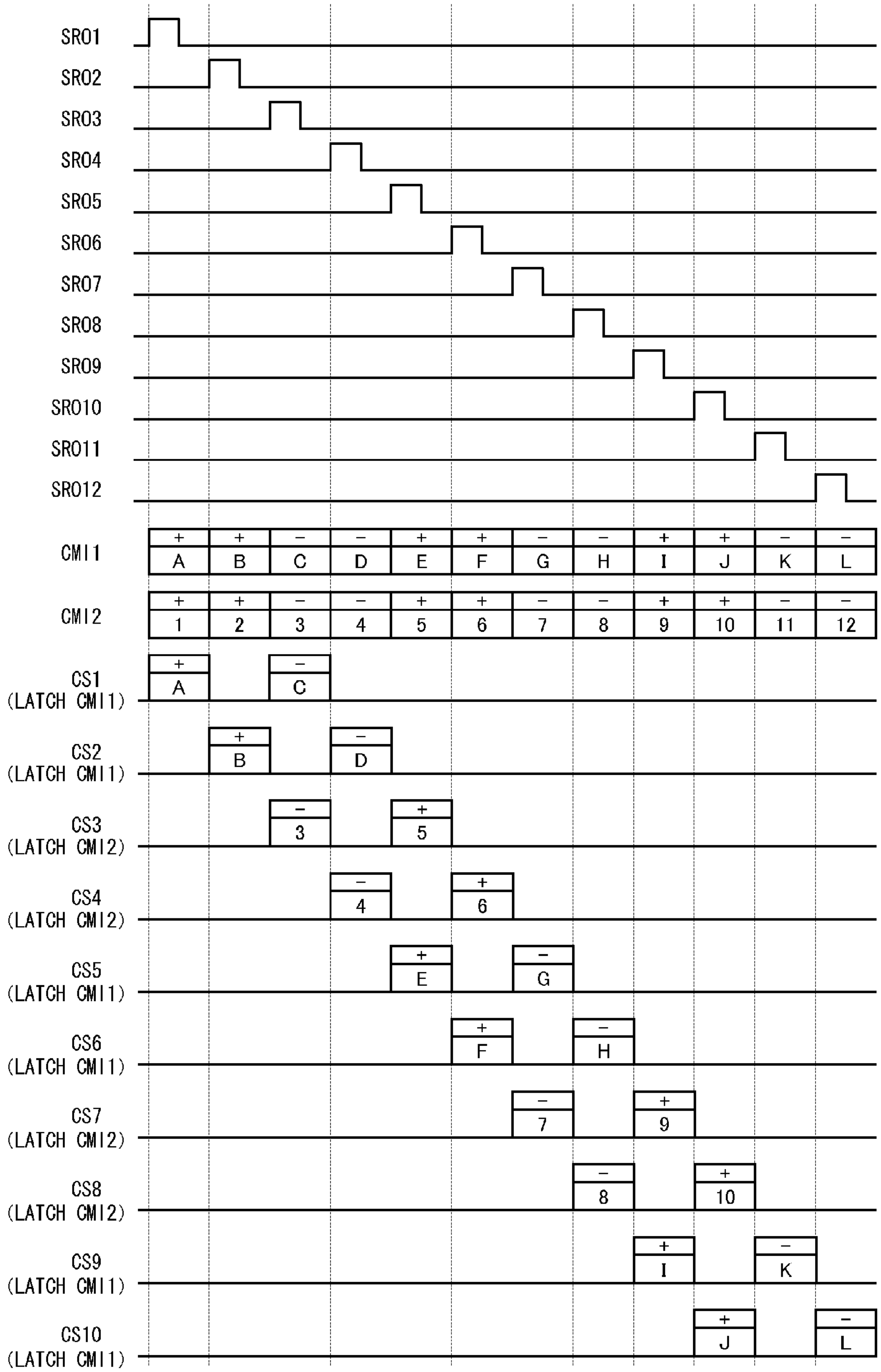
FIG. 13

The following description discusses how the polarity signals CMI1 and CMI2 supplied to the CS circuits 4*n* are related to the shift register outputs SROn. FIG. 13 shows relations between (i) the polarity signal CMI1 (or CMI2) and the shift register outputs SROn which are inputted to the CS circuits 4*n* and (ii) the CS signals CSn outputted from the CS circuits 4*n*.

As to the CMI1 shown in FIG. 13, each of the signs A to L corresponds to a single horizontal scanning period, and indicates a polarity during that horizontal scanning period. For example, the CMI1 has a positive polarity during the second horizontal scanning period "B", has a negative polarity during the third horizontal scanning period "C", has a negative polarity during the fourth horizontal scanning period "D", and has a positive polarity during the fifth horizontal scanning period "E". As to the CMI2, each of the signs 1 to 12 corresponds to a single horizontal scanning period, and indicates a polarity during that horizontal scanning period. For example, the CMI2 has a positive polarity during the first horizontal scanning period "1", has a positive polarity during the second horizontal scanning period "2", has a negative polarity during the third horizontal scanning period "3", and has a negative polarity during the fourth horizontal scanning period "4". Each of the CS circuits 4*n* receives one of the polarity signals CMI1 and CMI2 which alternate every two rows. For example, the CS circuits 41 and 42 each receive the CMI1, the CS circuits 43 and 44 each receive the CMI2, and the CS circuits 45 and 46 each receive the CMI1.

The CS circuit 4*n* receives, via its clock terminal CK, a shift register output SROn in the nth row and a shift register output SROn+2 in the (n+2)th row. This causes the CS circuit 4*n* to latch (i) a CMI that the CS circuit 4*n* receives via its data terminal D during the nth horizontal scanning period and (ii) a CMI signal that the CS circuit 4*n* receives via its data terminal D during the (n+2)th horizontal scanning period. For example, the CS circuit 41 loads a positive polarity of "A" of the CMI1 during the first horizontal scanning period, and loads a negative polarity of "C" of the CMI1 during the third horizontal scanning period. The CS circuit 42 loads a positive polarity of "B" of the CMI1 during the second horizontal scanning period, and loads a negative polarity of "D" of the CMI1 during the fourth horizontal scanning period. The CS circuit 43 loads a negative polarity of "3" of the CMI2 during the third horizontal scanning period, and loads a positive polarity of "5" of the CMI2 during the fifth horizontal scanning period. The CS circuit 44 loads a negative polarity of "4" of the CMI2 during the fourth horizontal scanning period, and loads a positive polarity of "6" of the CMI2 during the sixth horizontal scanning period. In this way, the CS signals CSn as shown in FIGS. 11 and 12 are outputted.

Example 4

Figure 14:
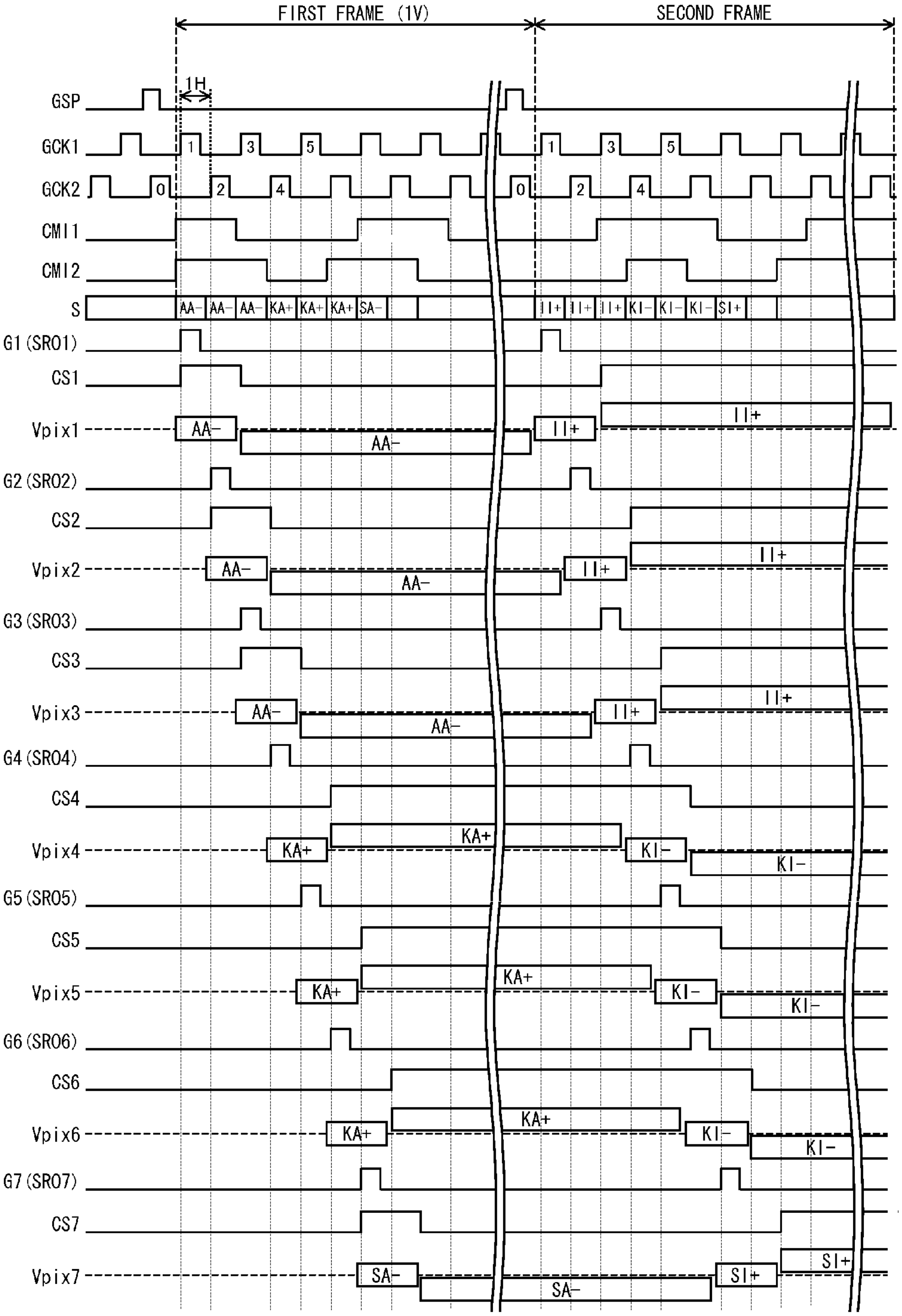
FIG. 14

FIG. 14 is a timing chart showing waveforms of various signals in triple-size display driving of the liquid crystal display device 1 shown in FIG. 10. In FIG. 14, the CMI1 and CMI2 reverse their polarities at timings different from those in FIG. 11.

As shown in FIG. 14, during an initial state, the CS signals CS1 to CS7 are all fixed at one electric potential (in FIG. 14, at a low level). In the first frame, the CS signal CS1 in the first row is at a high level at a point in time where the corresponding gate signals G1 falls. The CS signal CS2 in the second row is at a high level at a point in time where the corresponding gate signals G2 falls. The CS signal CS3 in the third row is at a high level at a point in time where the corresponding gate signals G3 falls. In contrast, the CS signal CS4 in the fourth row is at a low level at a point in time where the corresponding gate signals G4 falls. The CS signal CS5 in the fifth row is at a low level at a point in time where the corresponding gate signals G5 falls. The CS signal CS6 in the sixth row is at a low level at a point in time where the corresponding gate signals G6 falls. The CS signal CS7 in the seventh row is at a high level at a point in time where the corresponding gate signals G7 falls.

It should be noted that the source signal S is a signal which has amplitude corresponding to a gray scale represented by a video signal and which reverses its polarity every three horizontal scanning periods (3H). The source signal S has the same electric potential during three adjacent horizontal scanning periods (3H) and has the same electric potential during next three adjacent horizontal scanning periods (3H). That is, each of the reference signs "AA" to "SA" shown in FIG. 14 corresponds to a single horizontal scanning period, and indicates a signal potential (gray scale) during that horizontal scanning period. For example, the source signal S in the first frame exhibits identical signal potentials (gray scale) of a negative polarity ("AA") during the first, second and third horizontal scanning periods, and exhibits identical signal potentials of a positive polarity ("KA") during the fourth, fifth and sixth horizontal scanning periods. Further, the source signal S in the second frame exhibits identical signal potentials of a positive polarity ("II") during the first, second and third horizontal scanning periods, and exhibits identical signal potentials of a negative polarity ("KI") during the fourth, fifth and sixth horizontal scanning periods. Meanwhile, the gate signals G1 to G7 serve as gate-on potentials during the first to seventh 1H periods, respectively, in an active period (effective scanning period) of each frame, and serve as gate-off potentials during the other periods.

Then, the CS signals CS1 to CS7 switch between high and low electric potential levels after their corresponding gate signals G1 to G7 fall. Specifically, in the first frame, the CS signals CS1, CS2 and CS3 fall after their corresponding gate signals G1, G2 and G3 fall, respectively, and the CS signals CS4, CS5 and CS6 rise after their corresponding signals G4, G5 and G6 fall, respectively. It should be noted that in the second frame, this relationship is reversed, i.e., the CS signals CS1, CS2 and CS3 rise after their corresponding gate signals G1, G2 and G3 fall, respectively, and the CS signals CS4, CS5 and CS6 fall after their corresponding gate signals G4, G5 and G6 fall, respectively Thus, in the liquid crystal display device 1 that employs triple-size display driving, the electric potential of each CS signal at a point in time where the gate signal falls varies every three rows in correspondence with the polarity of the source signal S; therefore, in the first frame, the electric potentials Vpix1 to Vpix7 of the pixel electrodes 14 are all properly shifted by the CS signals CS1 to CS7, respectively. Therefore, inputting of source signals S of the same gray scale causes the positive and negative electric potential differences between the electric potential of the counter electrode and the shifted electric potential of each of the pixel electrodes 14 to be equal to each other. That is, in the first frame, in which a source signal having a negative polarity and the same electric potential is written to pixels corresponding to three adjacent rows in the same column of pixels and a source signal having a positive polarity and the same electric potential is written to pixels corresponding to three adjacent rows next to the three rows in the same column of pixels, the electric potentials of the CS signals corresponding to the first three rows are not polarity-reversed during the writing to the pixels corresponding to the first three rows, are polarity-reversed in a negative direction after the writing, and are not polarity-reversed until the next writing, and the electric potentials of the CS signals corresponding to the next three rows are not polarity-reversed during the writing to the pixels corresponding to the next three rows, are polarity-reversed in a positive direction after the writing, and are not polarity-reversed until the next writing. This realizes 3-line inversion driving in CC driving.

Moreover, the foregoing configuration allows the electric potentials Vpix1 to Vpix7 of the pixel electrodes 14 to be properly shifted by the CS signals CS1 to CS7, respectively, even in a case of triple-size display driving (3-line inversion driving). This allows pixel electrodes 14 that are supplied with the same signal potential to be equal in electric potential to each other, thus making it possible to eliminate the appearance of transverse stripes shown in FIG. 64.

A specific configuration of the gate line driving circuit 30 and the CS bus line driving circuit 40 for achieving the aforementioned control is described here.

According to the gate line driving circuit 30 and the CS bus line driving circuit 40 of Example 4, the polarity signals CMI1 and CMI2 reverse their polarities at timings different from those in Example 3. The other configurations are the same as those shown in FIG. 10. Each CS circuit receives a shift register output SROn in the corresponding nth row and a shift register output SROn+2 in the (n+2)th row, and receives one of the polarity signals CMI1 and CMI2 which alternate every two rows. That is, as described earlier, the CS circuits 41 and 42 each receive the CMI1, the CS circuits 43 and 44 each receive the CMI2, and the CS circuits 45 and 46 each receive the CMI1. The polarity signals CMI1 and CMI2 are set so as to reverse their polarities at the timings shown in FIG. 14.

Figure 15:
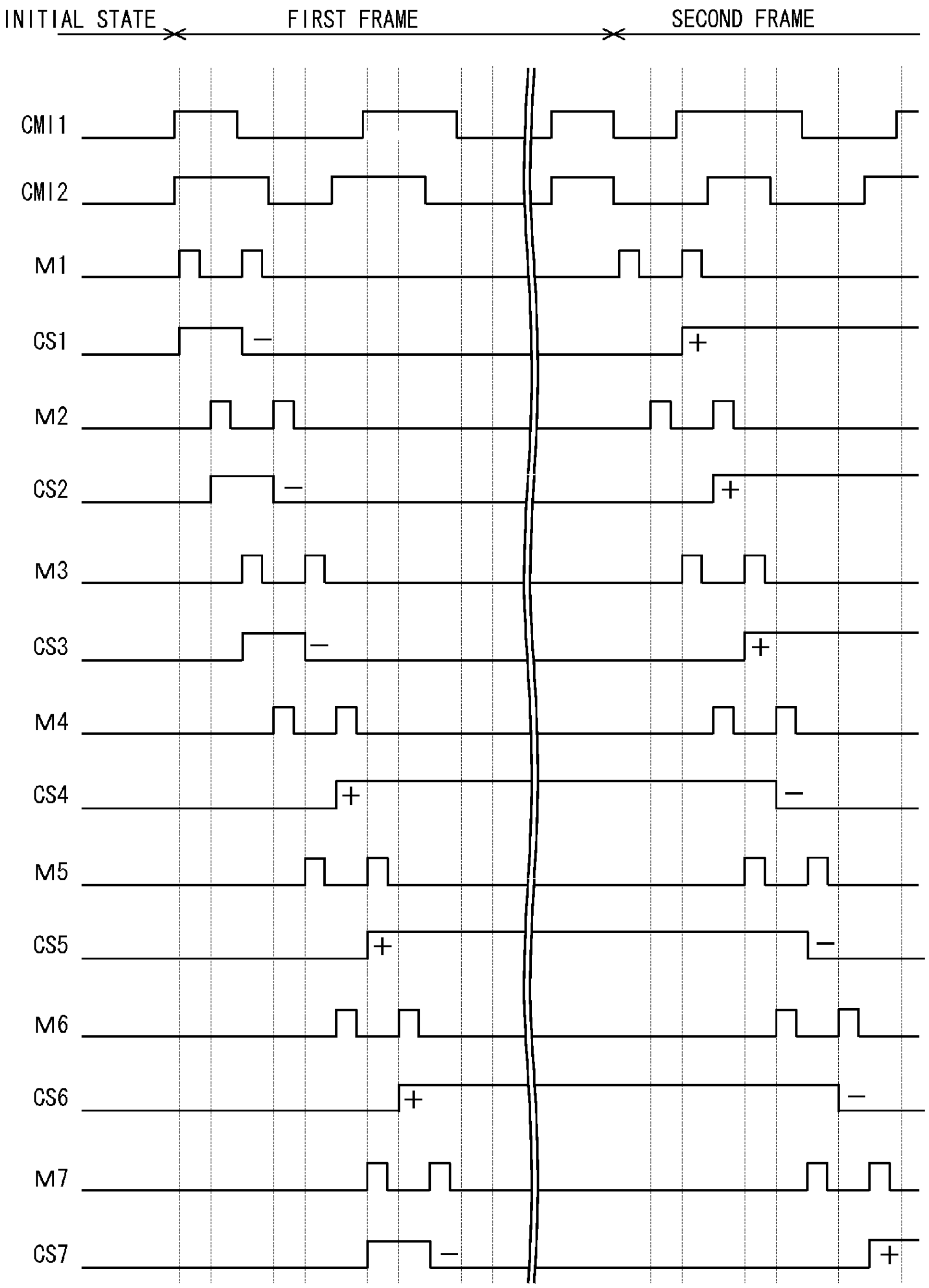
FIG. 15

The following description discusses, with reference to FIGS. 14 and 15, the liquid crystal display device 1 which employs triple-size display driving. In the following, descriptions of connections in the gate line driving circuit 30 and the CS bus line driving circuit 40 are omitted. FIG. 15 shows waveforms of various signals inputted to and outputted from the CS bus line driving circuit 40 of the liquid crystal display device 1 of Example 4. In the following, for convenience of description, operations in the first frame are explained by taking as an example mainly the CS circuits 42, 43 and 44 corresponding to the second, third and fourth rows, respectively.

First, the following describes changes in waveforms of various signals in the second row. During an initial state, the D latch circuit 42*a* of the CS circuit 42 receives the polarity signal CMI1 via its terminal D and receives the reset signal RESET via its reset terminal CL. The reset signal RESET causes the electric potential of the CS signal CS2 that the D latch circuit 42*a* outputs via its output terminal Q to be retained at a low level.

After that, the shift register output SRO2 corresponding to the gate signal G2 to be supplied to the gate line 12 in the second row is outputted from the shift register circuit SR2, and is inputted to one terminal of the OR circuit 42*b* of the CS circuit 42. Then, a change (from low to high) in electric potential of the shift register output SRO2 in the signal M2 is inputted to the clock terminal CK. Upon receiving the change (from low to high) in electric potential of the shift register output SRO2 via its clock terminal CK, the D latch circuit 42*a* transfers an input state of the polarity signal CMI1 that it received via its terminal D at the point in time, i.e., transfers a high level. That is, the electric potential of the CS signal CS2 is switched from a low level to a high level at a time when there is a change (from low to high) in electric potential of the shift register output SRO2. The D latch circuit 42*a* outputs the high level until there is a change (from high to low) in electric potential of the shift register output SRO2 in the signal M2 inputted to the clock terminal CK (i.e., during a period of time in which the signal M2 is at a high level). Then, upon receiving a change (from high to low) in electric potential of the shift register output SRO2 in the signal M2 via its clock terminal CK, the D latch circuit 42*a* latches an input state of the polarity signal CMI1 that it received at the point in time, i.e., latches a high level. After that, the D latch circuit 42*a* retains the high level until the signal M2 is raised to a high level.

Then, the shift register output SRO4 that has been shifted to the fourth row in the gate line driving circuit 30 is supplied to the other terminal of the OR circuit 42*b*. The shift register output SRO4 is supplied also to one terminal of the OR circuit 44*b* of the CS circuit 44.

The D latch circuit 42*a* receives a change (from low to high) in electric potential of the shift register output SRO4 in the signal M2 via its clock terminal CK, and transfers an input state of the polarity signal CMI1 that it received via its terminal D at the point in time, i.e., transfers a low level. That is, the electric potential of the CS signal CS2 is switched from a high level to a low level at a time when there is a change (from low to high) in electric potential of the shift register output SRO4. The D latch circuit 42*a* outputs the low level until there is a change (from high to low) in electric potential of the shift register output SRO4 in the signal M2 inputted to the clock terminal CK (i.e., during a period of time in which the signal M2 is at a high level). Next, upon receiving a change (from high to low) in electric potential of the shift register output SRO4 in the signal M2 via its clock terminal CK, the D latch circuit 42*a* latches an input state of the polarity signal CMI1 that it received at the point in time, i.e., latches a low level. After that, the D latch circuit 42*a* retains the low level until the signal M2 is raised to a high level in the second frame.

Next, the following describes changes in waveforms of various signals in the third row. During the initial state, the D latch circuit 43*a* of the CS circuit 43 receives the polarity signal CMI2 via its terminal D and receives the reset signal RESET via its reset terminal CL. The reset signal RESET causes the electric potential of the CS signal CS3 that the D latch circuit 43*a* outputs via its output terminal Q to be retained at a low level.

After that, the shift register output SRO3 corresponding to the gate signal G3 to be supplied to the gate line 12 in the third row is outputted from the shift register circuit SR3, and is inputted to one terminal of the OR circuit 43*b* of the CS circuit 43. Then, a change (from low to high) in electric potential of the shift register output SRO3 in the signal M3 is inputted to the clock terminal CK. Upon receiving the change in electric potential of the shift register output SRO3 in the signal M3, the D latch circuit 43*a* transfers an input state of the polarity signal CMI2 that it received via its terminal D at the point in time, i.e., transfers a high level. That is, the electric potential of the CS signal CS3 is switched from a low level to a high level at a time when there is a change (from low to high) in electric potential of the shift register output SRO3. Then, the D latch circuit 43*a* outputs the high level until there is a change (from high to low) in electric potential of the shift register output SRO3 in the signal M3 inputted to the clock terminal CK (i.e., during a period of time in which the signal M3 is at a high level). Then, upon receiving a change (from high to low) in electric potential of the shift register output SRO3 in the signal M3 via its clock terminal CK, the D latch circuit 43*a* latches an input state of the polarity signal CMI2 that it received at the point in time, i.e., latches a high level. After that, the D latch circuit 43*a* retains the high level until the signal M3 is raised to a high level.

Then, the shift register output SRO5 that has been shifted to the fifth row in the gate line driving circuit 30 is supplied to the other terminal of the OR circuit 43*b*. The shift register output SRO5 is supplied also to one terminal of the OR circuit 45*b* of the CS circuit 45.

The D latch circuit 43*a* receives a change (from low to high) in electric potential of the shift register output SRO5 in the signal M3 via its clock terminal CK, and transfers an input state of the polarity signal CMI2 that it received via its terminal D at the point in time, i.e., transfers a low level. That is, the electric potential of the CS signal CS3 is switched from a high level to a low level at a time when there is a change (from low to high) in electric potential of the shift register output SRO5. The D latch circuit 43*a* outputs the low level until there is a change (from high to low) in electric potential of the shift register output SRO5 in the signal M3 inputted to the clock terminal CK (i.e., during a period of time in which the signal M3 is at a high level). Next, upon receiving a change (from high to low) in electric potential of the shift register output SRO5 in the signal M3 via its clock terminal CK, the D latch circuit 43*a* latches an input state of the polarity signal CMI2 that it received at the point in time, i.e., latches a low level. After that, the D latch circuit 43*a* retains the low level until the signal M3 is raised to a high level in the second frame.

Next, the following describes changes in waveforms of various signals in the fourth row. During the initial state, the D latch circuit 44*a* of the CS circuit 44 receives the polarity signal CMI2 via its data terminal D and receives the reset signal RESET via its reset terminal CL. The reset signal RESET causes the electric potential of the CS signal CS4 that the D latch circuit 44*a* outputs via its output terminal Q to be retained at a low level.

After that, the shift register output SRO4 in the fourth row is outputted from the shift register circuit SR4, and is inputted to one terminal of the OR circuit 44*b* of the CS circuit 44. Then, a change (from low to high) in electric potential of the shift register output SRO4 in the signal M4 is inputted to the clock terminal CK. Upon receiving the change (from low to high) in electric potential of the shift register output SRO4 via its clock terminal CK, the D latch circuit 44*a* transfers an input state of the polarity signal CMI2 that it received via its data terminal D at the point in time, i.e., transfers a low level. Then, the D latch circuit 44*a* outputs the low level until the next time when there is a change (from high to low) in electric potential of the shift register output SRO4 in the signal M4 inputted to the clock terminal CK (i.e., during a period of time in which the signal M4 is at a high level). Then, upon receiving a change (from high to low) in electric potential of the shift register output SRO4 in the signal M4 via its clock terminal CK, the D latch circuit 44*a* latches an input state of the polarity signal CMI2 that it received at the point in time, i.e., latches a low level. After that, the D latch circuit 44*a* retains the low level until the signal M4 is raised to a high level.

Next, the shift register output SRO6 that has been shifted to the sixth row in the gate line driving circuit 30 is supplied to the other terminal of the OR circuit 44*b*. The shift register output SRO6 is supplied also to one terminal of the OR circuit 46*b* of the CS circuit 46.

The D latch circuit 44*a* receives a change (from low to high) in electric potential of the shift register output SRO6 in the signal M4 via its clock terminal CK, and transfers an input state of the polarity signal CMI2 that it received via its terminal D at the point in time, i.e., transfers a high level. That is, the electric potential of the CS signal CS4 is switched from a low level to a high level at a time when there is a change (from low to high) in electric potential of the shift register output SRO6. The D latch circuit 44*a* outputs the high level until the next time when there is a change (from high to low) in electric potential of the shift register output SRO6 in the signal M4 inputted to the clock terminal CK (i.e., during a period of time in which the signal M4 is at a high level). Next, upon receiving a change (from high to low) in electric potential of the shift register output SRO6 in the signal M4 via its clock terminal CK, the D latch circuit 44*a* latches an input state of the polarity signal CMI2 that it received at the point in time, i.e., latches a high level. After that, the D latch circuit 44*a* retains the high level until the signal M4 is raised to a high level in the second frame.

By the operations as so far described, (i) in the first to third rows, electric potentials of CS signals at points in time where gate signals in their corresponding rows fall (i.e., at points in time where TFTs 13 are switched from on to off) are caused to fall after the gate signals in these rows fall and (ii) in the fourth to six rows, electric potentials of CS signals at points in time where gate signals in their corresponding rows fall (i.e., at points in time where TFTs 13 are switched from on to off) are caused to rise after the gate signals in these rows fall (see FIGS. 14 and 15).

As has been described, according to Example 4, 3H inversion driving can be carried out by adjusting, in the liquid crystal display device configured as shown in FIG. 10, timings at which the polarity signals CMI1 and CMI2 reverse their polarities. This allows the CS bus line driving circuit 40 to operate properly even in the liquid crystal display device 1 that employs triple-size display driving. Accordingly, it is possible to eliminate irregular waveforms that cause transverse stripes. This makes it possible to eliminate the appearance of alternate bright and dark transverse stripes in a display picture, and thus possible to improve display quality.

Figure 16:
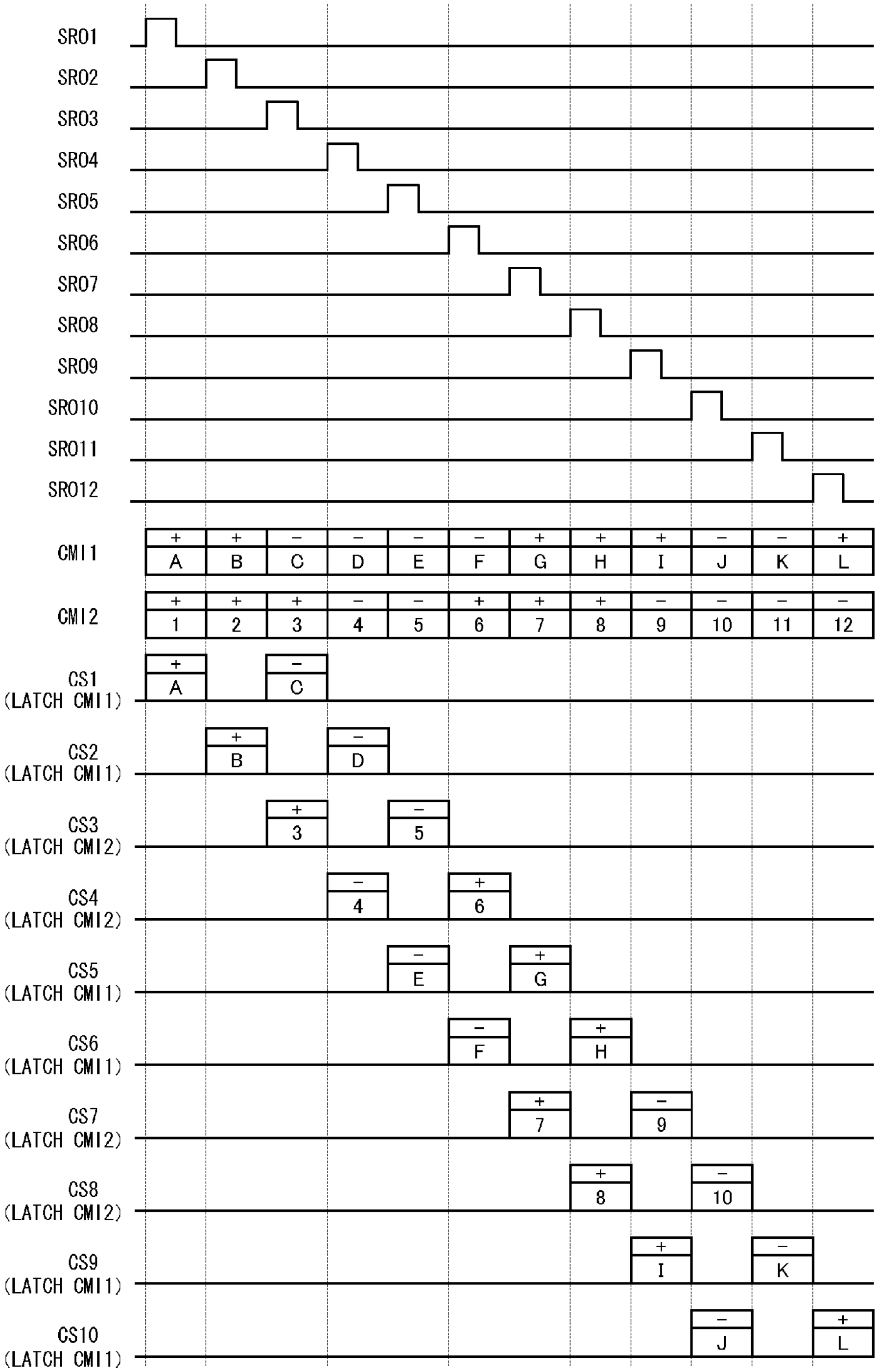
FIG. 16

The following description discusses how the polarity signals CMI1 and CMI2 supplied to the CS circuits 4*n* are related to the shift register outputs SROn. FIG. 16 shows relations between (i) the polarity signal CMI1 (or CMI2) and the shift register outputs SROn which are inputted to the CS circuits 4*n* and (ii) the CS signals CSn outputted from the CS circuits 4*n*.

As to the CMI1 shown in FIG. 16, each of the signs A to L corresponds to a single horizontal scanning period, and indicates a polarity during that horizontal scanning period. For example, the CMI1 has a positive polarity during the second horizontal scanning period "B", has a negative polarity during the third horizontal scanning period "C", has a negative polarity during the fourth horizontal scanning period "D", and has a negative polarity during the fifth horizontal scanning period "E". As to the CMI2, each of the signs 1 to 12 corresponds to a single horizontal scanning period, and indicates a polarity during that horizontal scanning period. For example, the CMI2 has a positive polarity during the first horizontal scanning period "1", has a positive polarity during the second horizontal scanning period "2", has a positive polarity during the third horizontal scanning period "3", and has a negative polarity during the fourth horizontal scanning period "4". Each of the CS circuits 4*n* receives one of the polarity signals CMI1 and CMI2 which alternate every two rows. For example, the CS circuits 41 and 42 each receive the CMI1, the CS circuits 43 and 44 each receive the CMI2, and the CS circuits 45 and 46 each receive the CMI1.

The CS circuit 4*n* receives, via its clock terminal CK, a shift register output SROn in the nth row and a shift register output SROn+2 in the (n+2)th row. This causes the CS circuit 4*n* to latch (i) a CMI that the CS circuit 4*n* receives via its data terminal D during the nth horizontal scanning period and (ii) a CMI signal that the CS circuit 4*n* receives via its data terminal D during the (n+2)th horizontal scanning period. For example, the CS circuit 41 loads a positive polarity of "A" of the CMI1 during the first horizontal scanning period, and loads a negative polarity of "C" of the CMI1 during the third horizontal scanning period. The CS circuit 42 loads a positive polarity of "B" of the CMI1 during the second horizontal scanning period, and loads a negative polarity of "D" of the CMI1 during the fourth horizontal scanning period. The CS circuit 43 loads a positive polarity of "3" of the CMI2 during the third horizontal scanning period, and loads a negative polarity of "5" of the CMI2 during the fifth horizontal scanning period. The CS circuit 44 loads a negative polarity of "4" of the CMI2 during the fourth horizontal scanning period, and loads a positive polarity of "6" of the CMI2 during the sixth horizontal scanning period. In this way, the CS signals CSn as shown in FIGS. 14 and 15 are outputted.

As so far described in Examples 3 and 4, even according to the liquid crystal display device 1 shown in FIG. 10, 2H inversion driving and 3H inversion driving can be carried out by using two polarity signals CMI1 and CMI2 that reverse their polarities at the same time or at respective different timings. Similarly, 4H, . . . , and nH inversion driving can be realized by adjusting timings at which the polarity signals CMI1 and CMI2 reverse their polarities. This allows carrying out double-size display driving and triple-size display driving. Similarly, quadruple-size, . . . , n-fold-size display driving can be realized by adjusting timings at which the polarity signals CMI1 and CMI2 reverse their polarities.

Example 5

Figure 17:
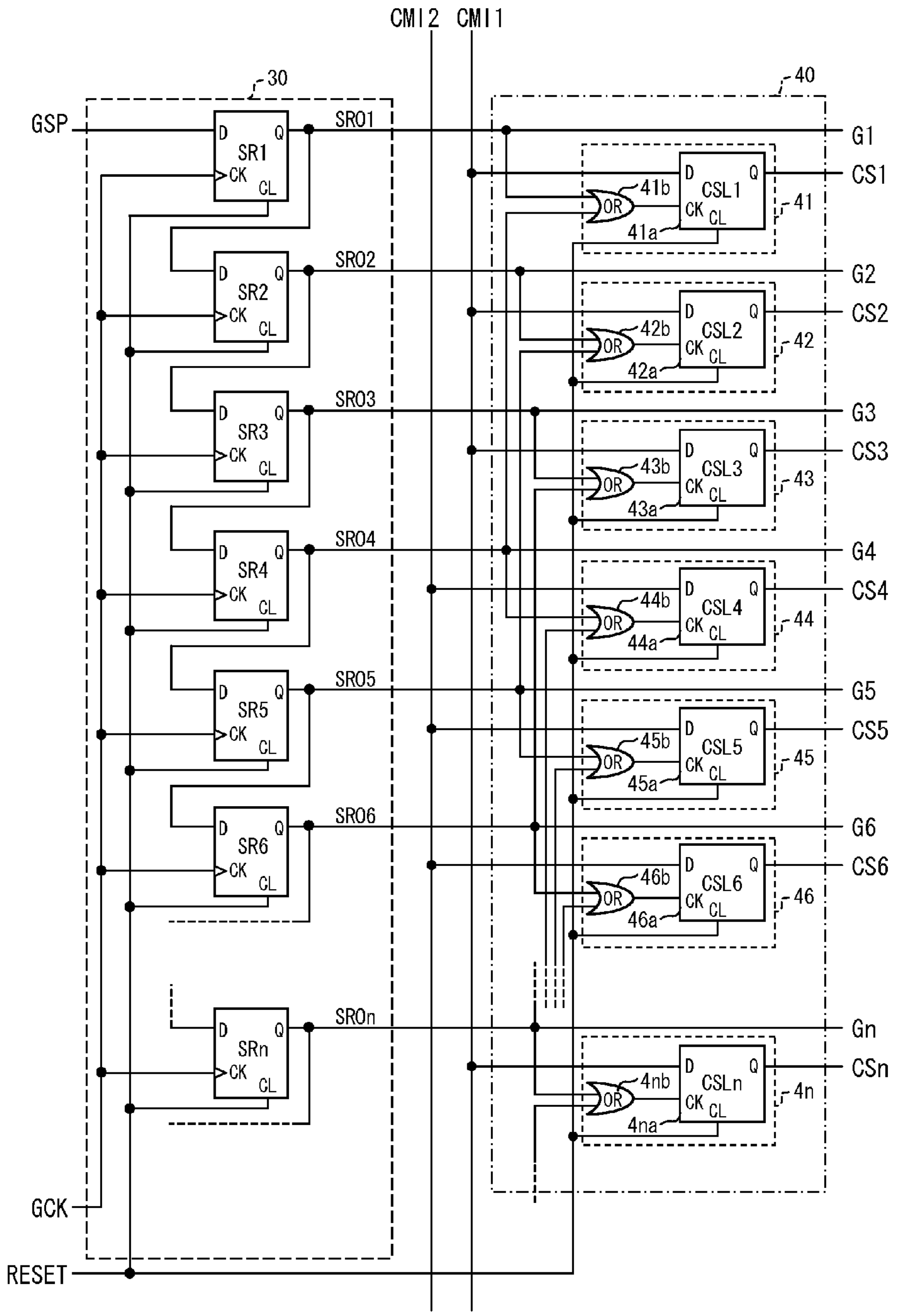
FIG. 17
Figure 18:
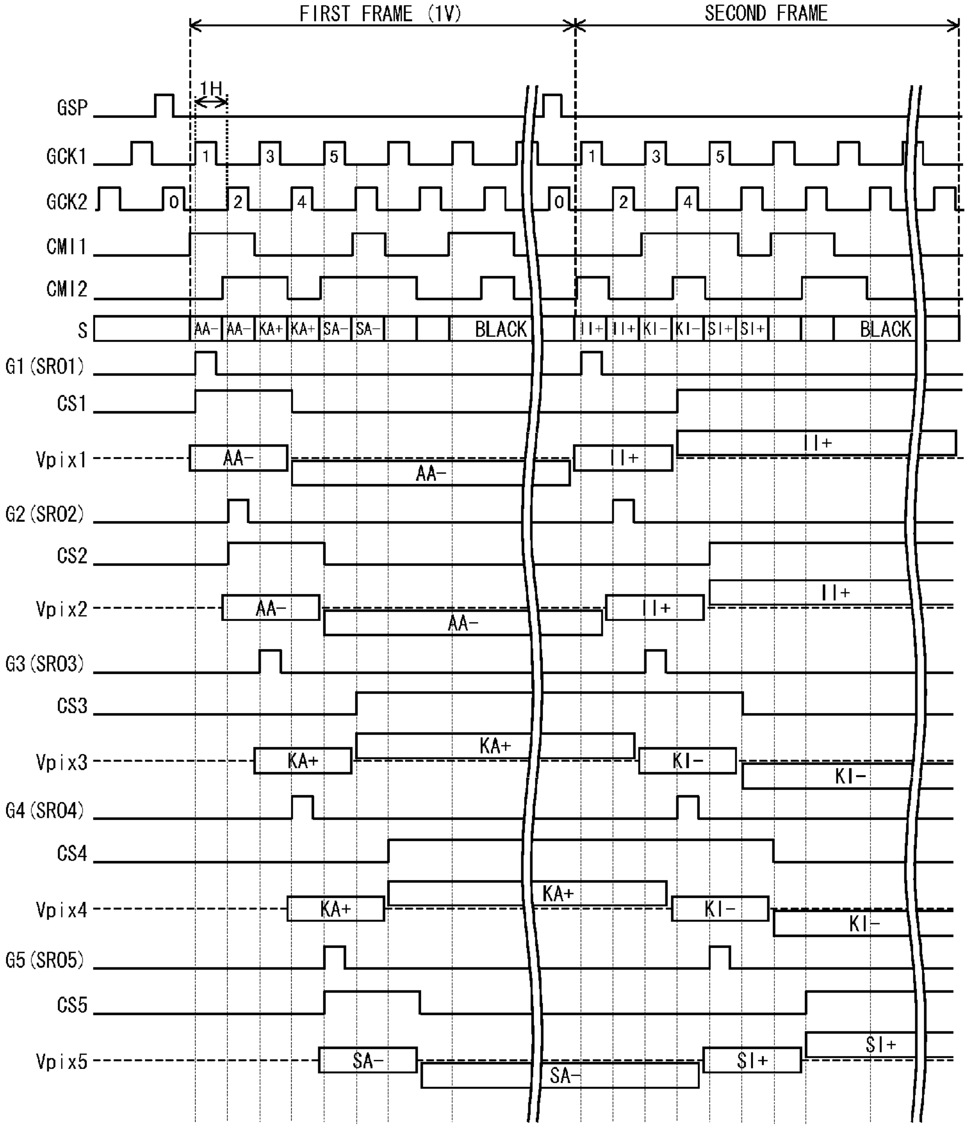
FIG. 18

Examples 3 and 4 each discuss a configuration in which a CS circuit 4*n* in the nth row receives a shift register output SROn in the corresponding nth row and a shift register output SROn+2 in the (n+2)th row. Note, however, that the liquid crystal display device of the present invention is not limited to this. For example, as shown in FIG. 17, the liquid crystal display device can be configured such that a CS circuit 4*n* in the nth row receives a shift register output SROn in the corresponding nth row and a shift register output SROn+3 in the (n+3)th row. That is, the CS circuit 41 receives the shift register output SRO1 in a corresponding row and the shift register output SRO4 in the fourth row. FIG. 18 is a timing chart showing waveforms of various signals in the liquid crystal display device 1 which is configured like above and carries out a double-size display. As shown in FIG. 18, during an initial state, the CS signals CS1 to CS5 are all fixed at one electric potential (in FIG. 18, at a low level). In the first frame, the CS signal CS1 in the first row is at a high level at a point in time where the corresponding gate signals G1 falls. The CS signal CS2 in the second row is at a high level at a point in time where the corresponding gate signals G2 falls. The CS signal CS3 in the third row is at a low level at a point in time where the corresponding gate signals G3 falls. The CS signal CS4 in the fourth row is at a low level at a point in time where the corresponding gate signals G4 falls. The CS signal CS5 in the fifth row is at a high level at a point in time where the corresponding gate signals G5 falls. The source signal S is a signal which has amplitude corresponding to a gray scale represented by a video signal and which reverses its polarity every 2H periods.

Then, the CS signals CS1 to CS5 switch between high and low electric potential levels after their corresponding gate signals G1 to G5 fall. Specifically, in the first frame, the CS signals CS1 and CS2 fall after their corresponding gate signals G1 and G2 fall, respectively, and the CS signals CS3 and CS4 rise after their corresponding signals G3 and G4 fall, respectively. It should be noted that in the second frame, this relationship is reversed, i.e., the CS signals CS1 and CS2 rise after their corresponding gate signals G1 and G2 fall, respectively, and the CS signals CS3 and CS4 fall after their corresponding gate signals G3 and G4 fall, respectively.

This realizes 2H inversion driving, and eliminates appearance of alternate bright and dark transverse stripes in a display picture and thus improves display quality.

A specific configuration of the gate line driving circuit 30 and the CS bus line driving circuit 40 for achieving the aforementioned control is described here.

As shown in FIG. 17, the CS circuit 41 receives shift register outputs SRO1 and SRO4 corresponding to respective gate signals G1 and G4, a polarity signal CMI1, and a reset signal RESET. The CS circuit 42 receives shift register outputs SRO2 and SRO5 corresponding to respective gate signals G2 and G5, the polarity signal CMI1, and the reset signal RESET. The CS circuit 43 receives shift register outputs SRO3 and SRO6 corresponding to respective gate signals G3 and G6, the polarity signal CMI1, and the reset signal RESET. The CS circuit 44 receives shift register outputs SRO4 and SRO7 corresponding to respective gate signals G4 and G7, the polarity signal CMI2, and the reset signal RESET. Each CS circuit receives one of the polarity signals CMI1 and CMI2 which alternate every three rows. That is, as described above, the CS circuits 41, 42 and 43 each receive the CMI1, the CS circuits 44, 45 and 46 each receive the CMI2, and the CS circuits 47, 48 and 49 each receive the CMI1. The polarity signals CMI1 and CMI2 reverse their polarities at the timings shown in FIG. 18.

Figure 19:
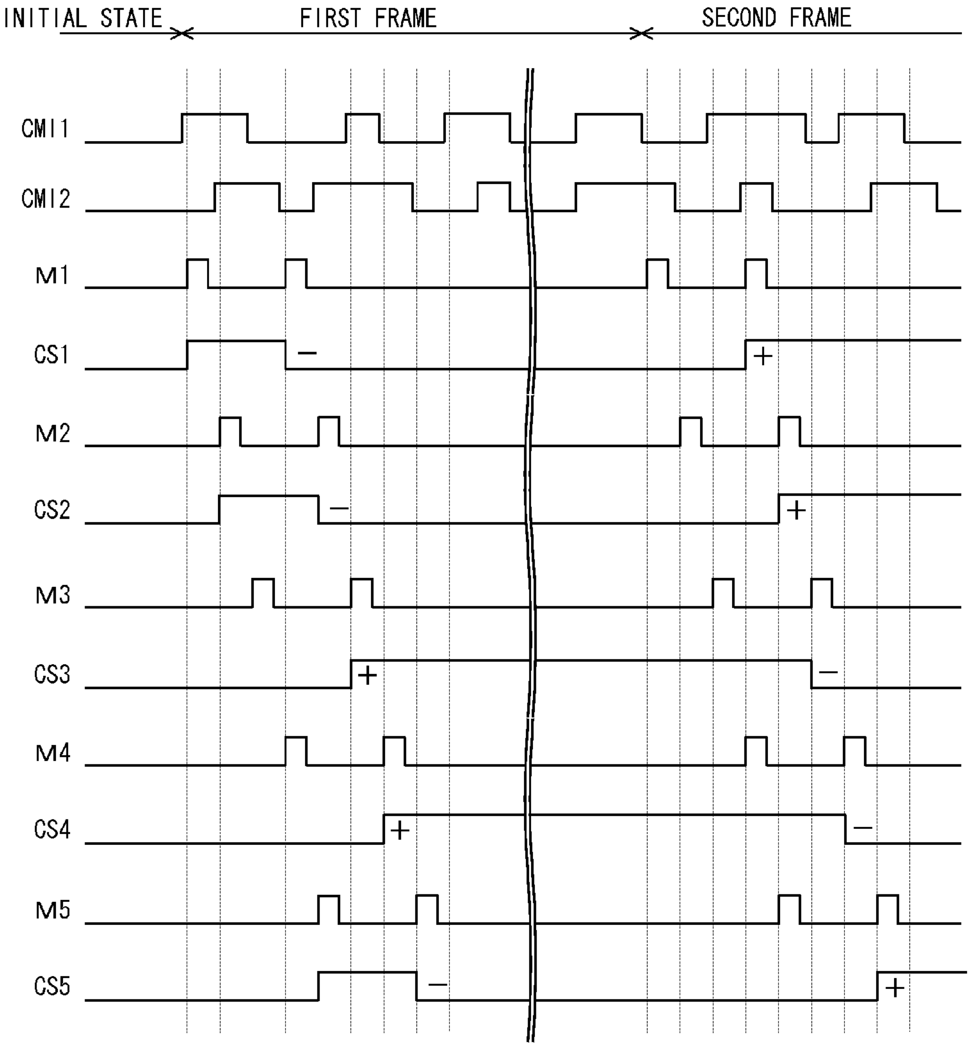
FIG. 19

In the following, for convenience of description, operations in the first frame are explained by taking as an example mainly the CS circuits 42 and 43 corresponding to the second and third rows, respectively. FIG. 19 shows waveforms of various signals that are inputted to and outputted from the CS bus line driving circuit 40 of the liquid crystal display device 1 of Example 5.

First, the following describes changes in waveforms of various signals in the second row. During an initial state, the D latch circuit 42*a* of the CS circuit 42 receives the polarity signal CMI1 via its terminal D and receives the reset signal RESET via its reset terminal CL. The reset signal RESET causes the electric potential of the CS signal CS2 that the D latch circuit 42*a* outputs via its output terminal Q to be retained at a low level.

After that, the shift register output SRO2 corresponding to the gate signal G2 to be supplied to the gate line 12 in the second row is outputted from the shift register circuit SR2, and is inputted to one terminal of the OR circuit 42*b* of the CS circuit 42. Then, a change (from low to high) in electric potential of the shift register output SRO2 in the signal M2 is inputted to the clock terminal CK. Upon receiving the change (from low to high) in electric potential of the shift register output SRO2 via its clock terminal CK, the D latch circuit 42*a* transfers an input state of the polarity signal CMI1 that it received via its terminal D at the point in time, i.e., transfers a high level. That is, the electric potential of the CS signal CS2 is switched from a low level to a high level at a time when there is a change (from low to high) in electric potential of the shift register output SRO2. The D latch circuit 42*a* outputs the high level until there is a change (from high to low) in electric potential of the shift register output SRO2 in the signal M2 inputted to the clock terminal CK (i.e., during a period of time in which the signal M2 is at a high level). Then, upon receiving a change (from high to low) in electric potential of the shift register output SRO2 in the signal M2 via its clock terminal CK, the D latch circuit 42*a* latches an input state of the polarity signal CMI1 that it received at the point in time, i.e., latches a high level. After that, the D latch circuit 42*a* retains the high level until the signal M2 is raised to a high level.

Then, the shift register output SRO5 that has been shifted to the fifth row in the gate line driving circuit 30 is supplied to the other terminal of the OR circuit 42*b*. The shift register output SRO5 is supplied also to one terminal of the OR circuit 45*b* of the CS circuit 45.

The D latch circuit 42*a* receives a change (from low to high) in electric potential of the shift register output SRO5 in the signal M2 via its clock terminal CK, and transfers an input state of the polarity signal CMI1 that it received via its terminal D at the point in time, i.e., transfers a low level. That is, the electric potential of the CS signal CS2 is switched from a high level to a low level at a time when there is a change (from low to high) in electric potential of the shift register output SRO5. The D latch circuit 42*a* outputs the low level until there is a change (from high to low) in electric potential of the shift register output SRO5 in the signal M2 inputted to the clock terminal CK (i.e., during a period of time in which the signal M2 is at a high level). Next, upon receiving a change (from high to low) in electric potential of the shift register output SRO5 in the signal M2 via its clock terminal CK, the D latch circuit 42*a* latches an input state of the polarity signal CMI1 that it received at the point in time, i.e., latches a low level. After that, the D latch circuit 42*a* retains the low level until the signal M2 is raised to a high level in the second frame.

Next, the following describes changes in waveforms of various signals in the third row. During the initial state, the D latch circuit 43*a* of the CS circuit 43 receives the polarity signal CMI1 via its data terminal D and receives the reset signal RESET via its reset terminal CL. The reset signal RESET causes the electric potential of the CS signal CS3 that the D latch circuit 43*a* outputs via its output terminal Q to be retained at a low level.

After that, the shift register output SRO3 in the third row is outputted from the shift register circuit SR3, and is inputted to one terminal of the OR circuit 43*b* of the CS circuit 43. Then, a change (from low to high) in electric potential of the shift register output SRO3 in the signal M3 is inputted to the clock terminal CK. Upon receiving the change in electric potential of the shift register output SRO3 in the signal M3 via the clock terminal CK, the D latch circuit 43*a* transfers an input state of the polarity signal CMI1 that it received via its data terminal D at the point in time, i.e., transfers a low level. Then, the D latch circuit 43*a* outputs the low level until the next time when there is a change (from high to low) in electric potential of the shift register output SRO3 in the signal M3 inputted to the clock terminal CK (i.e., during a period of time in which the signal M3 is at a high level). Then, upon receiving a change (from high to low) in electric potential of the shift register output SRO3 in the signal M3 via its clock terminal CK, the D latch circuit 43*a* latches an input state of the polarity signal CMI1 that it received at the point in time, i.e., latches a low level. After that, the D latch circuit 43*a* retains the low level until the signal M3 is raised to a high level.

Next, the shift register output SRO6 that has been shifted to the sixth row in the gate line driving circuit 30 is supplied to the other terminal of the OR circuit 43*b*. The shift register output SRO6 is supplied also to one terminal of the OR circuit 46*b* of the CS circuit 46.

The D latch circuit 43*a* receives a change (from low to high) in electric potential of the shift register output SRO6 in the signal M3 via its clock terminal CK, and transfers an input state of the polarity signal CMI1 that it received via its terminal D at the point in time, i.e., transfers a high level. That is, the electric potential of the CS signal CS3 is switched from a low level to a high level at a time when there is a change (from low to high) in electric potential of the shift register output SRO6. The D latch circuit 43*a* outputs the high level until the next time when there is a change (from high to low) in electric potential of the shift register output SRO6 in the signal M3 inputted to the clock terminal CK (i.e., during a period of time in which the signal M3 is at a high level). Next, upon receiving a change (from high to low) in electric potential of the shift register output SRO6 in the signal M3 via its clock terminal CK, the D latch circuit 43*a* latches an input state of the polarity signal CMI1 that it received at the point in time, i.e., latches a high level. After that, the D latch circuit 43*a* retains the high level until the signal M3 is raised to a high level in the second frame.

As has been described, according to Example 5, (i) a CS signal CS supplied to the CS bus line 15 in the nth row is generated by latching an electric potential level of the polarity signal CMI1 at a point in time where the gate signal Gn in the nth row rises and an electric potential level of the polarity signal CMI1 at a point in time where the gate signal G(n+3) in the (n+3)th row rises and (ii) a CS signal supplied to the CS bus line 15 in the (n+1)th row is generated by latching an electric potential level of the polarity signal CMI1 at a point in time where the gate signal G(n+1) in the (n+1)th row rises and an electric potential level of the polarity signal CMI1 at a point in time where the gate signal G(n+4) in the (n+4)th row rises. Further, (iii) a CS signal supplied to the CS bus line 15 in the (n+2)th row is generated by latching an electric potential level of the polarity signal CMI1 at a point in time where the gate signal G(n+2) in the (n+2)th row rises and an electric potential level of the polarity signal CMI1 at a point in time where the gate signal G(n+5) in the (n+5)th row rises and (iv) a CS signal supplied to the CS bus line 15 in the (n+3)th row is generated by latching an electric potential level of the polarity signal CMI2 at a point in time where the gate signal G(n+3) in the (n+3)th row rises and an electric potential level of the polarity signal CMI2 at a point in time where the gate signal G(n+6) in the (n+6)th row rises.

This allows the CS bus line driving circuit 40 to operate properly even in the liquid crystal display device 1 that employs double-size display driving. Accordingly, it is possible to eliminate irregular waveforms that cause transverse stripes. This makes it possible to eliminate the appearance of alternate bright and dark transverse stripes in a display picture, and thus possible to improve display quality.

Figure 20:
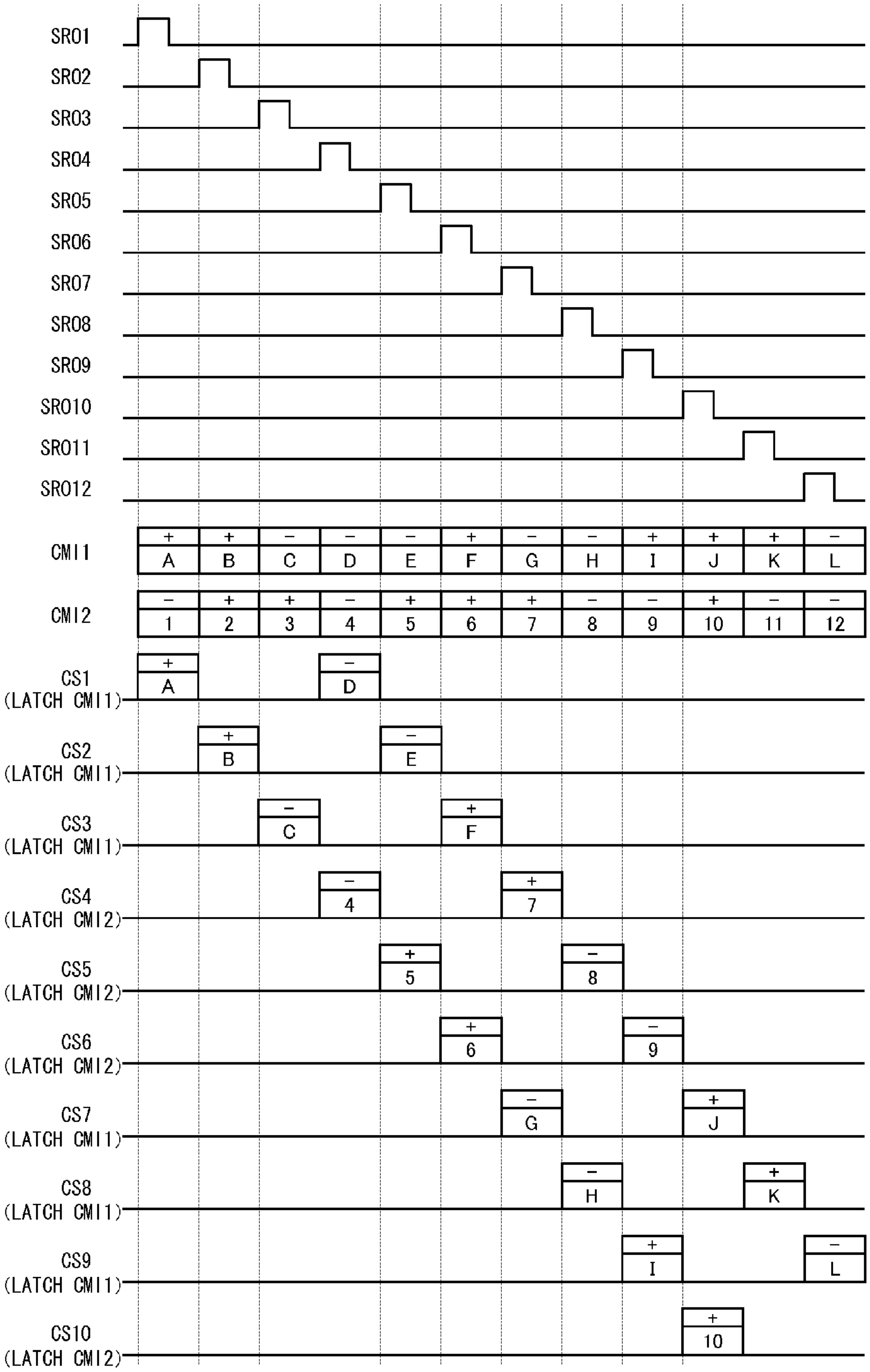
FIG. 20

The following description discusses how the polarity signals CMI1 and CMI2 supplied to the CS circuits 4*n* are related to the shift register outputs SROn. FIG. 20 shows relations between (i) the polarity signal CMI1 (or CMI2) and the shift register outputs SROn which are inputted to the CS circuits 4*n* and (ii) the CS signals CSn outputted from the CS circuits 4*n*.

As to the CMI1 shown in FIG. 20, each of the signs A to L corresponds to a single horizontal scanning period, and indicates a polarity during that horizontal scanning period. For example, the CMI1 has a positive polarity during the second horizontal scanning period "B", has a negative polarity during the third horizontal scanning period "C", has a negative polarity during the fourth horizontal scanning period "D", and has a negative polarity during the fifth horizontal scanning period "E". As to the CMI2, each of the signs 1 to 12 corresponds to a single horizontal scanning period, and indicates a polarity during that horizontal scanning period. For example, the CMI2 has a negative polarity during the first horizontal scanning period "1", has a positive polarity during the second horizontal scanning period "2", has a positive polarity during the third horizontal scanning period "3", and has a negative polarity during the fourth horizontal scanning period "4". The CMI1 and the CMI2 are set so as to reverse their polarities at the timings shown in FIG. 20. Each of the CS circuits 4*n* receives one of the polarity signals CMI1 and CMI2 which alternate every three rows. For example, the CS circuits 41, 42 and 43 each receive the CMI1, the CS circuits 44, 45 and 46 each receive the CMI2, and the CS circuits 47, 48 and 49 each receive the CM11.

The CS circuit 4*n* receives, via its clock terminal CK, a shift register output SROn in the nth row and a shift register output SROn+2 in the next (n+2)th row. This causes the CS circuit 4*n* to latch (i) a CMI that the CS circuit 4*n* receives via its data terminal D during the nth horizontal scanning period and (ii) a CMI signal that the CS circuit 4*n* receives via its data terminal D during the (n+2)th horizontal scanning period. For example, the CS circuit 41 loads a positive polarity of "A" of the CMI1 during the first horizontal scanning period, and loads a negative polarity of "D" of the CMI1 during the fourth horizontal scanning period. The CS circuit 42 loads a positive polarity of "B" of the CMI1 during the second horizontal scanning period, and loads a negative polarity of "E" of the CMI1 during the fifth horizontal scanning period. The CS circuit 43 loads a negative polarity of "C" of the CMI1 during the third horizontal scanning period, and loads a positive polarity of "F" of the CMI1 during the sixth horizontal scanning period. The CS circuit 44 loads a negative polarity of "4" of the CMI2 during the fourth horizontal scanning period, and loads a positive polarity of "7" of the CMI2 during the seventh horizontal scanning period. In this way, the CS signals CSn as shown in FIGS. 18 and 19 are outputted.

Example 6

Figure 21:
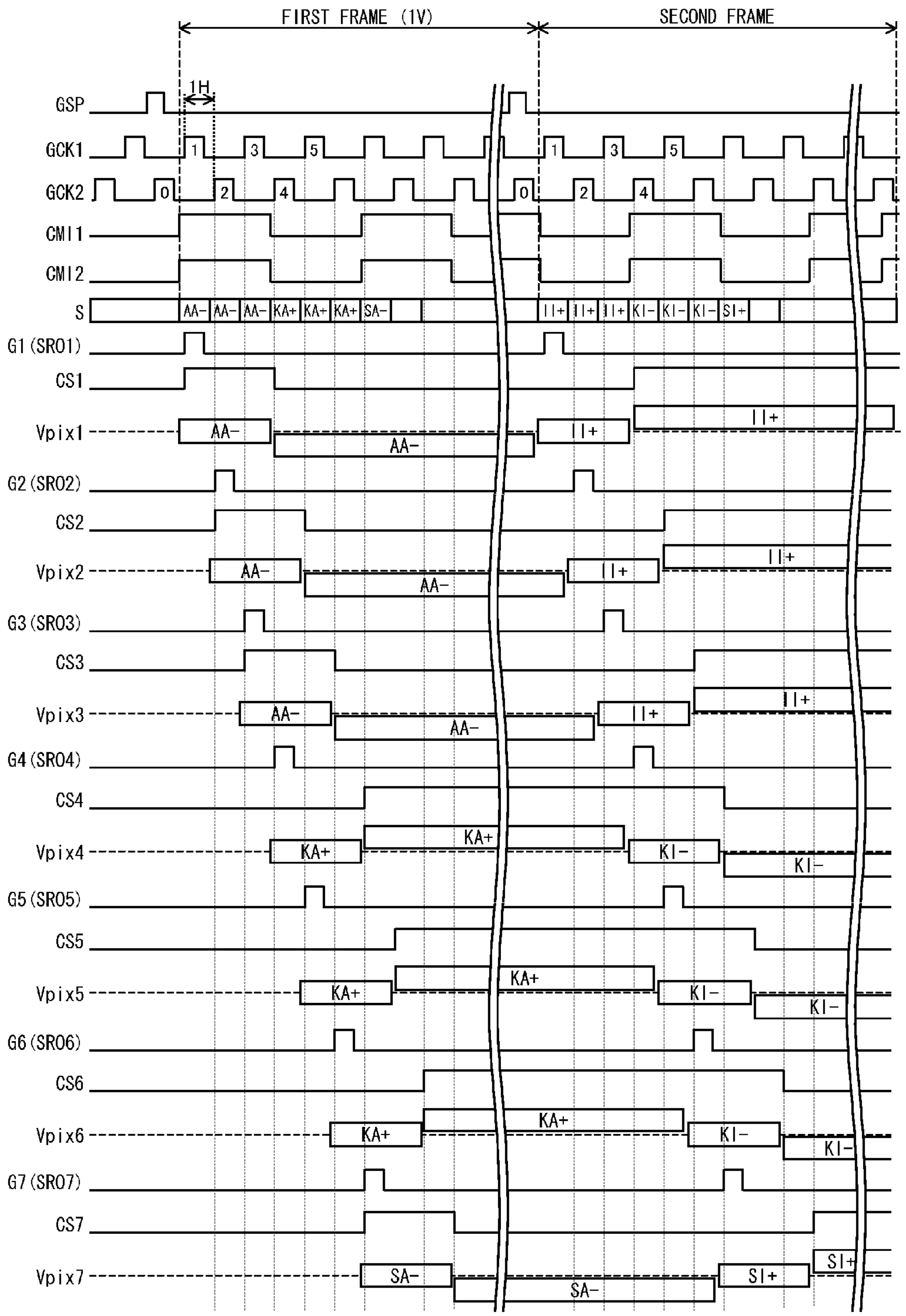
FIG. 21

FIG. 21 is a timing chart showing waveforms of various signals observed in a case where triple-size display driving is employed in the liquid crystal display device 1 shown in FIG. 17. According to FIG. 21, the polarity signals CMI1 and CMI2 are set so as to reverse their polarities every three horizontal scanning periods (3H) and have the same phase. Therefore, according to the present example, it is possible to employ a configuration in which only one of the polarity signals CMI1 and CMI2 is used and is supplied to each CS circuit.

As shown in FIG. 21, during an initial state, the CS signals CS1 to CS7 are all fixed at one electric potential (in FIG. 21, at a low level). In the first frame, the CS signal CS1 in the first row is at a high level at a point in time where the corresponding gate signals G1 falls. The CS signal CS2 in the second row is at a high level at a point in time where the corresponding gate signals G2 falls. The CS signal CS3 in the third row is at a high level at a point in time where the corresponding gate signals G3 falls. In contrast, the CS signal CS4 in the fourth row is at a low level at a point in time where the corresponding gate signals G4 falls, and the CS signal CS5 in the fifth row is at a low level at a point in time where the corresponding gate signals G5 falls. The CS signal CS6 in the sixth row is at a low level at a point in time where the corresponding gate signals G6 falls. The CS signal CS7 in the seventh row is at a high level at a point in time where the corresponding gate signals G7 falls.

It should be noted that the source signal S is a signal which has amplitude corresponding to a gray scale represented by a video signal and which reverses its polarity every three horizontal scanning period. The source signal S has the same electric potential (gray scale) during three adjacent horizontal scanning periods (3H) and has the same electric potential (gray scale) during next three adjacent horizontal scanning periods (3H). That is, each of the reference signs "AA" to "SA" shown in FIG. 21 corresponds to a single horizontal scanning period, and indicates a signal potential (gray scale) during that horizontal scanning period. For example, the source signal S in the first frame exhibits identical signal potentials of a negative polarity ("AA") during the first, second and third horizontal scanning periods, and exhibits identical signal potentials of a positive polarity ("KA") during the fourth, fifth and sixth horizontal scanning periods. Further, the source signal S in the second frame exhibits identical signal potentials of a positive polarity ("II") during the first, second and third horizontal scanning periods, and exhibits identical signal potentials of a negative polarity ("KI") during the fourth, fifth and sixth horizontal scanning periods ("KI"). Meanwhile, the gate signals G1 to G7 serve as gate-on potentials during the first to seventh 1H periods, respectively, in an active period (effective scanning period) of each frame, and serve as gate-off potentials during the other periods.

Then, the CS signals CS1 to CS7 switch between high and low electric potential levels after their corresponding gate signals G1 to G7 fall. Specifically, in the first frame, the CS signals CS1, CS2 and CS3 fall after their corresponding gate signals G1, G2 and G3 fall, respectively, and the CS signals CS4, CS5 and CS5 rise after their corresponding signals G4, G5 and G6 fall, respectively. It should be noted that in the second frame, this relationship is reversed, i.e., the CS signals CS1, CS2 and CS3 rise after their corresponding gate signals G1, G2 and G3 fall, respectively, and the CS signals CS4, CS5 and CS6 fall after their corresponding gate signals G4, G5 and G6 fall, respectively.

Thus, in the liquid crystal display device 1 that employs triple-size display driving, the electric potential of each CS signal at a point in time where the gate signal falls varies every three rows in correspondence with the polarity of the source signal S; therefore, in the first frame, the electric potentials Vpix1 to Vpix7 of the pixel electrodes 14 are all properly shifted by the CS signals CS1 to CS7, respectively. Therefore, inputting of source signals S of the same gray scale causes the positive and negative electric potential differences between the electric potential of the counter electrode and the shifted electric potential of each of the pixel electrodes 14 to be equal to each other. That is, in the first frame, in which a source signal having a negative polarity and the same electric potential (gray scale) is written to pixels corresponding to three adjacent rows in the same column of pixels and a source signal having a positive polarity and the same electric potential (gray scale) is written to pixels corresponding to three adjacent rows next to the three rows in the same column of pixels, the electric potentials of the CS signals corresponding to the first three rows are not polarity-reversed during the writing to the pixels corresponding to the first three rows, are polarity-reversed in a negative direction after the writing, and are not polarity-reversed until the next writing, and the electric potentials of the CS signals corresponding to the next three rows are not polarity-reversed during the writing to the pixels corresponding to the next three rows, are polarity-reversed in a positive direction after the writing, and are not polarity-reversed until the next writing. This realizes 3-line inversion driving in CC driving.

Moreover, the foregoing configuration allows the electric potentials Vpix1 to Vpix7 of the pixel electrodes 14 to be properly shifted by the CS signals CS1 to CS7, respectively, even in a case of triple-size display driving (3-line inversion driving). This allows pixel electrodes 14 that are supplied with the same signal potential to be equal in electric potential to each other, thus making it possible to eliminate the appearance of transverse stripes shown in FIG. 64.

A specific configuration of the gate line driving circuit 30 and the CS bus line driving circuit 40 for achieving the aforementioned control is described here.

According to the gate line driving circuit 30 and the CS bus line driving circuit 40 of Example 6, the polarity signals CMI1 and CMI2 reverse their polarities at timings different from those in Example 5. The other configurations are the same as those shown in FIG. 17. Each CS circuit receives a shift register output SROn in the corresponding nth row and a shift register output SROn+3 in the (n+3)th row, and receives one of the polarity signals CMI1 and CMI2 which alternate every three rows. That is, as described earlier, the CS circuits 41, 42 and 43 each receive the CMI1, the CS circuits 44, 45 and 46 each receive the CMI2, and the CS circuits 47, 48 and 49 each receive the CMI1. The polarity signals CMI1 and CMI2 are set as shown in FIG. 21.

Figure 22:
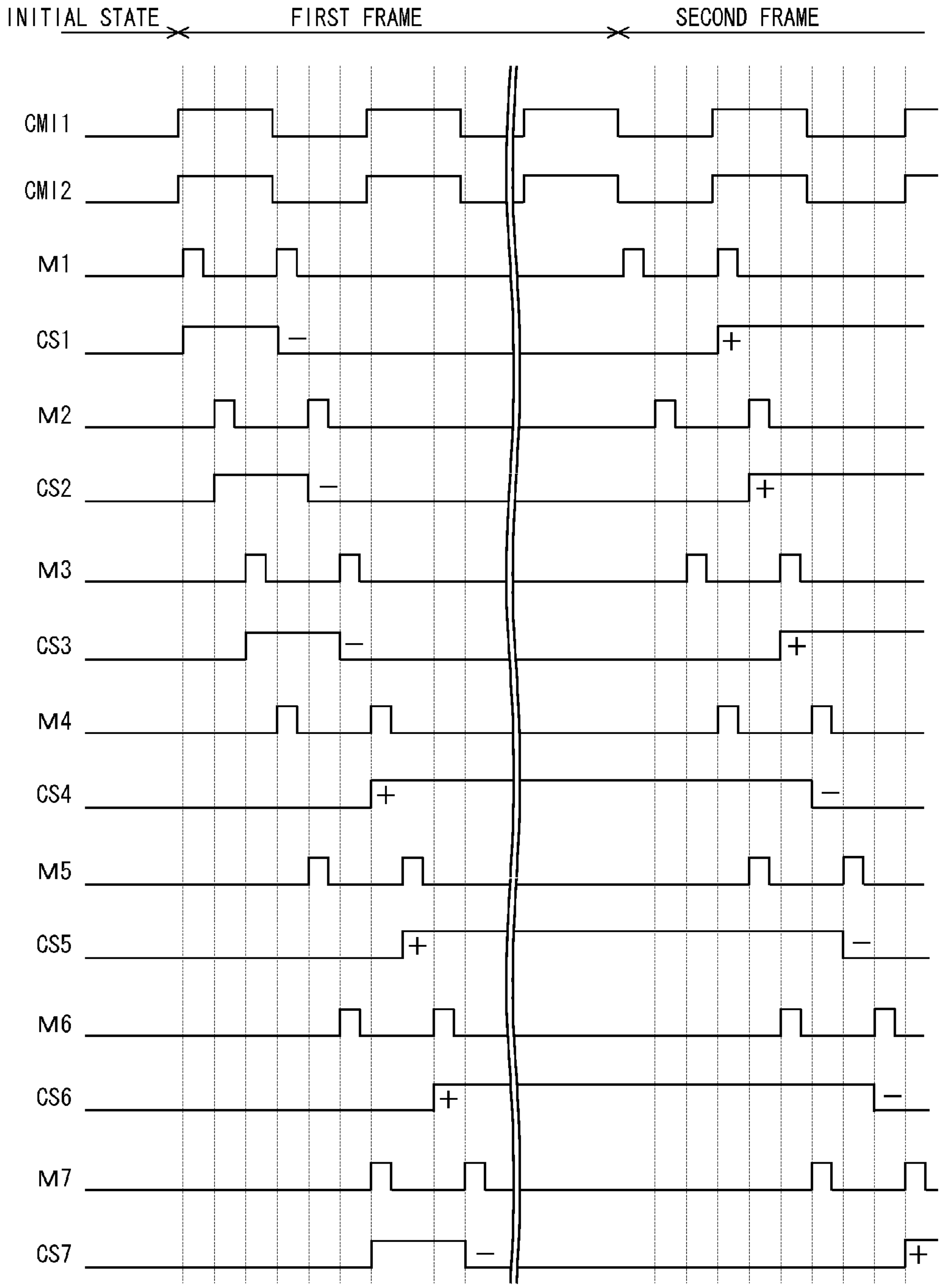
FIG. 22

The following description discusses, with reference to FIGS. 21 and 22, the liquid crystal display device 1 which employs triple-size display driving. In the following, descriptions of connections in the gate line driving circuit 30 and the CS bus line driving circuit 40 are omitted. FIG. 22 shows waveforms of various signals inputted to and outputted from the CS bus line driving circuit 40 of the liquid crystal display device 1 of Example 6. In the following, for convenience of description, operations in the first frame are explained by taking as an example mainly the CS circuits 42, 43 and 44 corresponding to the second, third and fourth rows, respectively.

First, the following describes changes in waveforms of various signals in the second row. During an initial state, the D latch circuit 42*a* of the CS circuit 42 receives the polarity signal CMI1 via its terminal D and receives the reset signal RESET via its reset terminal CL. The reset signal RESET causes the electric potential of the CS signal CS2 that the D latch circuit 42*a* outputs via its output terminal Q to be retained at a low level.

After that, the shift register output SRO2 corresponding to the gate signal G2 to be supplied to the gate line 12 in the second row is outputted from the shift register circuit SR2, and is inputted to one terminal of the OR circuit 42*b* of the CS circuit 42. Then, a change (from low to high) in electric potential of the shift register output SRO2 in the signal M2 is inputted to the clock terminal CK. Upon receiving the change (from low to high) in electric potential of the shift register output SRO2 via its clock terminal CK, the D latch circuit 42*a* transfers an input state of the polarity signal CMI1 that it received via its terminal D at the point in time, i.e., transfers a high level. That is, the electric potential of the CS signal CS2 is switched from a low level to a high level at a time when there is a change (from low to high) in electric potential of the shift register output SRO2. The D latch circuit 42*a* outputs the high level until there is a change (from high to low) in electric potential of the shift register output SRO2 in the signal M2 inputted to the clock terminal CK (i.e., during a period of time in which the signal M2 is at a high level). Then, upon receiving a change (from high to low) in electric potential of the shift register output SRO2 in the signal M2 via its clock terminal CK, the D latch circuit 42*a* latches an input state of the polarity signal CMI1 that it received at the point in time, i.e., latches a high level. After that, the D latch circuit 42*a* retains the high level until the signal M2 is raised to a high level.

Then, the shift register output SRO5 that has been shifted to the fifth row in the gate line driving circuit 30 is supplied to the other terminal of the OR circuit 42*b*. The shift register output SRO5 is supplied also to one terminal of the OR circuit 45*b* of the CS circuit 45.

The D latch circuit 42*a* receives a change (from low to high) in electric potential of the shift register output SRO5 in the signal M2 via its clock terminal CK, and transfers an input state of the polarity signal CMI1 that it received via its terminal D at the point in time, i.e., transfers a low level. That is, the electric potential of the CS signal CS2 is switched from a high level to a low level at a time when there is a change (from low to high) in electric potential of the shift register output SRO5. The D latch circuit 42*a* outputs the low level until there is a change (from high to low) in electric potential of the shift register output SRO5 in the signal M2 inputted to the clock terminal CK (i.e., during a period of time in which the signal M2 is at a high level). Next, upon receiving a change (from high to low) in electric potential of the shift register output SRO5 in the signal M2 via its clock terminal CK, the D latch circuit 42*a* latches an input state of the polarity signal CMI1 that it received at the point in time, i.e., latches a low level. After that, the D latch circuit 42*a* retains the low level until the signal M2 is raised to a high level in the second frame.

Next, the following describes changes in waveforms of various signals in the third row. During the initial state, the D latch circuit 43*a* of the CS circuit 43 receives the polarity signal CMI1 via its terminal D and receives the reset signal RESET via its reset terminal CL. The reset signal RESET causes the electric potential of the CS signal CS3 that the D latch circuit 43*a* outputs via its output terminal Q to be retained at a low level.

After that, the shift register output SRO3 corresponding to the gate signal G3 to be supplied to the gate line 12 in the third row is outputted from the shift register circuit SR3, and is inputted to one terminal of the OR circuit 43*b* of the CS circuit 43. Then, a change (from low to high) in electric potential of the shift register output SRO3 in the signal M3 is inputted to the clock terminal CK. Upon receiving the change in electric potential of the shift register output SRO3 in the signal M3 via its clock terminal CK, the D latch circuit 43*a* transfers an input state of the polarity signal CMI1 that it received via its terminal D at the point in time, i.e., transfers a high level. That is, the electric potential of the CS signal CS3 is switched from a low level to a high level at a time when there is a change (from low to high) in electric potential of the shift register output SRO3. Then, the D latch circuit 43*a* outputs the high level until there is a change (from high to low) in electric potential of the shift register output SRO3 in the signal M3 inputted to the clock terminal CK (i.e., during a period of time in which the signal M3 is at a high level). Then, upon receiving a change (from high to low) in electric potential of the shift register output SRO3 in the signal M3 via its clock terminal CK, the D latch circuit 43*a* latches an input state of the polarity signal CMI1 that it received at the point in time, i.e., latches a high level. After that, the D latch circuit 43*a* retains the high level until the signal M3 is raised to a high level.

Then, the shift register output SRO6 that has been shifted to the sixth row in the gate line driving circuit 30 is supplied to the other terminal of the OR circuit 43*b*. The shift register output SRO6 is supplied also to one terminal of the OR circuit 45*b* of the CS circuit 46.

The D latch circuit 43*a* receives a change (from low to high) in electric potential of the shift register output SRO6 in the signal M3 via its clock terminal CK, and transfers an input state of the polarity signal CMI1 that it received via its terminal D at the point in time, i.e., transfers a low level. That is, the electric potential of the CS signal CS3 is switched from a high level to a low level at a time when there is a change (from low to high) in electric potential of the shift register output SRO6. The D latch circuit 43*a* outputs the low level until there is a change (from high to low) in electric potential of the shift register output SRO6 in the signal M3 inputted to the clock terminal CK (i.e., during a period of time in which the signal M3 is at a high level). Next, upon receiving a change (from high to low) in electric potential of the shift register output SRO6 in the signal M3 via its clock terminal CK, the D latch circuit 43*a* latches an input state of the polarity signal CMI1 that it received at the point in time, i.e., latches a low level. After that, the D latch circuit 43*a* retains the low level until the signal M3 is raised to a high level in the second frame.

Next, the following describes changes in waveforms of various signals in the fourth row. During the initial state, the D latch circuit 44*a* of the CS circuit 44 receives the polarity signal CMI2 via its terminal D and receives the reset signal RESET via its reset terminal CL. The reset signal RESET causes the electric potential of the CS signal CS4 that the D latch circuit 44*a* outputs via its output terminal Q to be retained at a low level.

After that, the shift register output SRO4 in the fourth row is outputted from the shift register circuit SR4, and is inputted to one terminal of the OR circuit 44*b* of the CS circuit 44. Then, a change (from low to high) in electric potential of the shift register output SRO4 in the signal M4 is inputted to the clock terminal CK. Upon receiving the change (from low to high) in electric potential of the shift register output SRO4 via its clock terminal CK, the D latch circuit 44*a* transfers an input state of the polarity signal CMI2 that it received via its data terminal D at the point in time, i.e., transfers a low level. The D latch circuit 44*a* outputs the low level until the next time when there is a change (from high to low) in electric potential of the shift register output SRO4 in the signal M4 inputted to the clock terminal CK (i.e., during a period of time in which the signal M4 is at a high level). Then, upon receiving a change (from high to low) in electric potential of the shift register output SRO4 in the signal M4 via its clock terminal CK, the D latch circuit 44*a* latches an input state of the polarity signal CMI2 that it received at the point in time, i.e., latches a low level. After that, the D latch circuit 44*a* retains the low level until the signal M4 is raised to a high level.

Next, the shift register output SRO7 that has been shifted to the seventh row in the gate line driving circuit 30 is supplied to the other terminal of the OR circuit 44*b*. The shift register output SRO7 is supplied also to one terminal of the OR circuit 47*b* of the CS circuit 47.

The D latch circuit 44*a* receives a change (from low to high) in electric potential of the shift register output SRO7 in the signal M4 via its clock terminal CK, and transfers an input state of the polarity signal CMI2 that it received via its terminal D at the point in time, i.e., transfers a high level. That is, the electric potential of the CS signal CS4 is switched from a low level to a high level at a time when there is a change (from low to high) in electric potential of the shift register output SRO7. The D latch circuit 44*a* outputs the high level until the next time when there is a change (from high to low) in electric potential of the shift register output SRO7 in the signal M4 inputted to the clock terminal CK (i.e., during a period of time in which the signal M4 is at a high level). Next, upon receiving a change (from high to low) in electric potential of the shift register output SRO7 in the signal M4 via its clock terminal CK, the D latch circuit 44*a* latches an input state of the polarity signal CMI2 that it received at the point in time, i.e., latches a high level. After that, the D latch circuit 44*a* retains the high level until the signal M4 is raised to a high level in the second frame.

By the operations as so far described, (i) in the first to third rows, electric potentials of CS signals at points in time where gate signals in their corresponding rows fall (i.e., at points in time where TFTs 13 are switched from on to off) are caused to fall after the gate signals in these rows fall and (ii) in the fourth to six rows, electric potentials of CS signals at points in time where gate signals in their corresponding rows fall (i.e., at points in time where TFTs 13 are switched from on to off) are caused to rise after the gate signals in these rows fall (see FIGS. 21 and 22).

As has been described, according to Example 6, 3H inversion driving can be carried out by adjusting, in the liquid crystal display device 1 configured as shown in FIG. 17, timings at which the polarity signals CMI1 and CMI2 reverse their polarities. This allows the CS bus line driving circuit 40 to operate properly even in the liquid crystal display device 1 that employs triple-size display driving. Accordingly, it is possible to eliminate irregular waveforms that cause transverse stripes. This makes it possible to eliminate the appearance of alternate bright and dark transverse stripes in a display picture, and thus possible to improve display quality.

Figure 23:
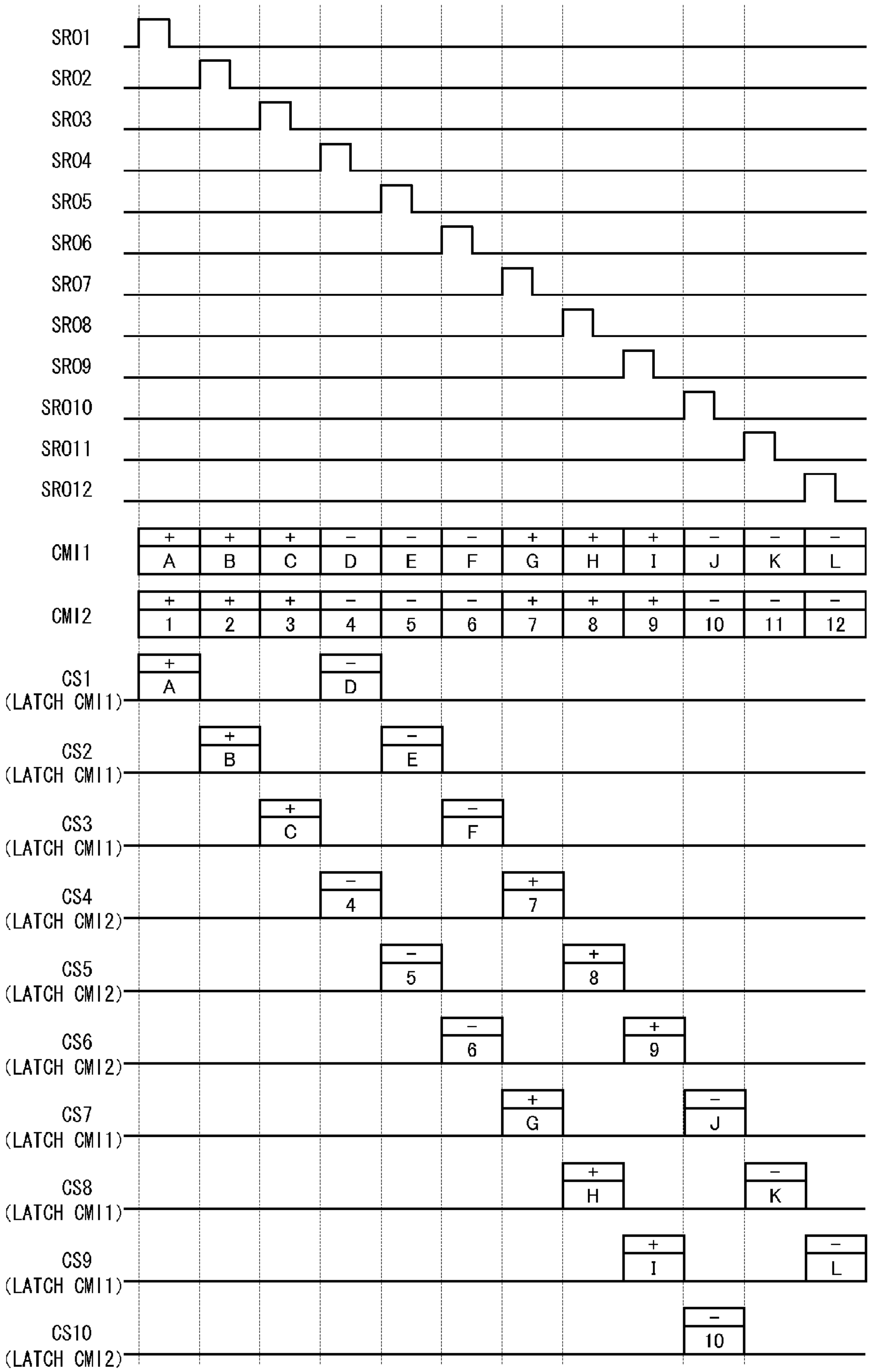
FIG. 23

The following description discusses how the polarity signals CMI1 and CMI2 supplied to the CS circuits 4*n* are related to the shift register outputs SROn. FIG. 23 shows relations between (i) the polarity signal CMI1 (or CMI2) and the shift register outputs SROn which are inputted to the CS circuits 4*n* and (ii) the CS signals CSn outputted from the CS circuits 4*n*.

As to the CMI1 shown in FIG. 23, each of the signs A to L corresponds to a single horizontal scanning period, and indicates a polarity during that horizontal scanning period. For example, the CMI1 has a positive polarity during the second horizontal scanning period "B", has a positive polarity during the third horizontal scanning period "C", has a negative polarity during the fourth horizontal scanning period "D", and has a negative polarity during the fifth horizontal scanning period "E". As to the CMI2, each of the signs 1 to 12 corresponds to a single horizontal scanning period, and indicates a polarity during that horizontal scanning period. For example, the CMI2 has a positive polarity during the first horizontal scanning period "1", has a positive polarity during the second horizontal scanning period "2", has a positive polarity during the third horizontal scanning period "3", and has a negative polarity during the fourth horizontal scanning period "4". Further, each of the CS circuits 4*n* receives one of the polarity signals CMI1 and CMI2 which alternate every three rows. For example, the CS circuits 41, 42 and 43 each receive the CMI1, the CS circuits 44, 45 and 46 each receive the CMI2, and the CS circuits 47, 48 and 49 each receive the CMI1.

The CS circuit 4*n* receives, via its clock terminal CK, a shift register output SROn in the nth row and a shift register output SROn+3 in the (n+3)th row. This causes the CS circuit 4*n* to latch (i) a CMI that the CS circuit 4*n* receives via its data terminal D during the nth horizontal scanning period and (ii) a CMI signal that the CS circuit 4*n* receives via its data terminal D during the (n+3)th horizontal scanning period. For example, the CS circuit 41 loads a positive polarity of "A" of the CMI1 during the first horizontal scanning period, and loads a negative polarity of "D" of the CMI1 during the fourth horizontal scanning period. The CS circuit 42 loads a positive polarity of "B" of the CMI1 during the second horizontal scanning period, and loads a negative polarity of "E" of the CMI1 during the fifth horizontal scanning period. The CS circuit 43 loads a positive polarity of "C" of the CMI1 during the third horizontal scanning period, and loads a negative polarity of "F" of the CMI1 during the sixth horizontal scanning period. The CS circuit 44 loads a negative polarity of "4" of the CMI2 during the fourth horizontal scanning period, and loads a positive polarity of "7" of the CMI2 during the seventh horizontal scanning period. In this way, the CS signals CSn as shown in FIGS. 21 and 22 are outputted.

As has been described in Examples 5 and 6, even according to the liquid crystal display device 1 shown in FIG. 17, 2H inversion driving and 3H inversion driving can be carried out by using two polarity signals CMI1 and CMI2 that reverse their polarities at the same time or at respective different timings. Similarly, 4H, . . . , and nH inversion driving can be realized by adjusting timings at which the polarity signals CMI1 and CMI2 reverse their polarities. This allows carrying out double-size display driving and triple-size display driving. Similarly, quadruple-size, . . . , n-fold-size display driving can be realized by adjusting timings at which the polarity signals CMI1 and CMI2 reverse their polarities.

Embodiment 2

Another embodiment of the present invention is described below with reference to FIGS. 25 to 27. Note that, for convenience, members having functions identical to those of the respective members described in Embodiment 1 are given respective identical reference numerals, and their descriptions are omitted here. Note also that terms defined in Embodiment 1 are used in the present Examples also according to those definitions, unless otherwise noted.

A schematic arrangement of a liquid crystal display device 2 according to the present embodiment is identical to that of the liquid crystal display device 1 of Embodiment 1 shown in FIGS. 1 and 2. Accordingly, a description of the schematic arrangement of the liquid crystal display device 2 is omitted here. The following description specifically discusses a gate line driving circuit 30 and a CS bus line driving circuit 40. In the present liquid crystal display device 2, one signal line is provided for the CS bus line driving circuit 40 to receive a polarity signal CMI from the control circuit 50 (see FIG. 1). This configuration achieves n-line inversion (nH) driving for employing n-fold-size display driving, by adjusting frequency of polarity reversal of the polarity signal CMI. In a case of a 2H inversion driving, this configuration is achievable by having, in the configuration shown in FIGS. 10 and 11, the polarity signal CMI be one of either of CMI1 or CMI2, and by setting the polarity reversal timing as every two lines. Moreover, in a case of 3H inversion driving, this configuration is achievable by having, in the driving shown in FIGS. 17 and 21, the polarity signal CMI be one of either of the CMI1 or the CMI2, and by setting the polarity reversal timing as every three lines.

As such, n-line (nH) inversion driving with a single-phase polarity signal CMI can be achieved by inputting a logical sum (output from OR circuit) of (i) a shift register output SROm from a current stage (mth stage) and (ii) a shift register output SROm+n from the (m+n)th stage to a latch circuit CSLm of the mth stage via its clock terminal CK, and setting the polarity reversal timing of the polarity signal CMI to be inputted via the data terminal D as an n horizontal scanning period (nH). The following describes as a typical example a configuration for achieving 4H inversion driving to employ quadruple-size display driving.

Example 7

Figure 24:
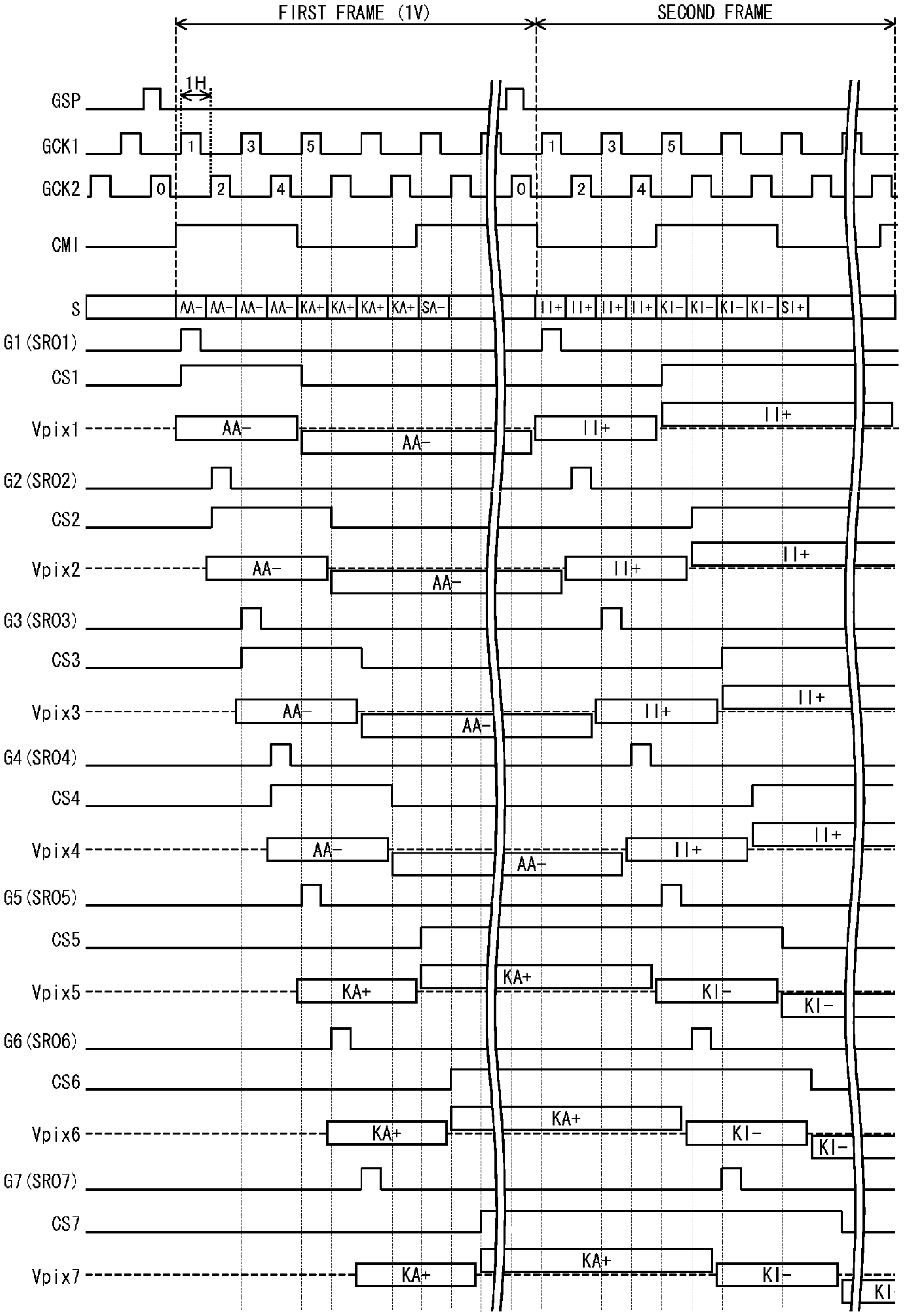
FIG. 24

FIG. 24 is a timing chart showing waveforms of various signals in a liquid crystal display device 2 that employs 4-line (4H) inversion driving. In FIG. 24, GSP is a gate start pulse that defines a timing of vertical scanning, and GCK1 (CK) and GCK2 (CKB) are gate clocks that are outputted from the control circuit 50 to define a timing of operation of the shift register. A period from a falling edge to the next falling edge in GSP corresponds to a single vertical scanning period (1V period). A period from a rising edge in GCK1 to a rising edge in GCK2 and a period from a rising edge GCK2 to a rising edge in GCK1 each correspond to a single horizontal scanning period (1H period). The polarity signal CMI reverses its polarity every four horizontal scanning periods (4H).

Further, FIG. 24 shows the following signals in the order named: a source signal S (video signal), which is supplied from the source bus line driving circuit 20 to a source bus line 11 (source bus line 11 provided in the xth column); a gate signal G1, which is supplied from the gate line driving circuit 30 to a gate line 12 provided in the first row; a CS signal CS1, which is supplied from the bus line driving circuit 40 to a CS bus line 15 provided in the first row; and an electric potential waveform Vpix1 of a pixel electrode 14 provided in the first row and the xth column. FIG. 24 shows the following signals in the order named: a gate signal G2, which is supplied to a gate line 12 provided in the second row; a CS signal CS2, which is supplied to a CS bus line 15 provided in the second row; and an electric potential waveform Vpix2 of a pixel electrode 14 provided in the second row and the xth column. The same applies with the third to ninth rows.

It should be noted that the dotted lines in the electric potentials Vpix1 through Vpix9 indicate the electric potential of the counter electrode 19.

In the following, it is assumed that the start frame of a display picture is a first frame and that the first frame is preceded by an initial state. As shown in FIG. 24, during the initial state, the CS signals CS1 to CS9 are all fixed at one electric potential (in FIG. 24, at a low level). In the first frame, the CS signals CS1 to CS4 in respective first to fourth rows are at a high level at points in time where corresponding gate signals G1 (which corresponds to the output SRO1 from the corresponding shift register circuit SR1) to G4 (which corresponds to the output SRO4 from the corresponding shift register circuit SR1) respectively fall. The CS signals CS5 to CS8 in respective fifth to eighth rows are at a low level at points in time where corresponding gate signals G5 to G8 respectively fall. The CS signal CS9 in the ninth row is at a high level at a point in time where a corresponding gate signal G9 falls.

It should be noted that the source signal S is a signal which has amplitude corresponding to a gray scale represented by a video signal and which reverses its polarity every four horizontal scanning periods (4H). The source signal S has the same electric potential (gray scale) during two adjacent horizontal scanning periods (2H) and has the same electric potential (gray scale) during next two adjacent horizontal scanning periods (2H). That is, each of the reference signs "AA" to "SA" shown in FIG. 24 corresponds to a single horizontal scanning period, and indicates a signal potential (gray scale) during that horizontal scanning period. For example, the source signal S in the first frame exhibits identical signal polarities of a negative polarity ("AA") during the first to fourth horizontal scanning periods, and exhibits identical signal polarities of a positive polarity ("KA") during the fifth to eighth horizontal scanning periods. Further, the source signal S in the second frame exhibits identical signal potentials of a positive polarity ("II") during the first to fourth horizontal scanning periods, and exhibits identical signal potentials of a negative polarity ("KI") during the fifth to eighth horizontal scanning periods. Meanwhile, the gate signals G1 to G9 serve as gate-on potentials during the first to ninth 1H periods, respectively, in an active period (effective scanning period) of each frame, and serve as gate-off potentials during the other periods.

Then, the CS signals CS1 to CS9 switch between high and low electric potential levels after their corresponding gate signals G1 to G9 fall. Specifically, in the first frame, the CS signals CS1 to CS4 fall after their corresponding gate signals G1 to G4 fall, the CS signals CS5 to CS8 rise after their corresponding signals G5 to G8 fall, and the CS signal CS9 falls after its corresponding gate signal G9 falls. It should be noted that in the second frame, this relationship is reversed, i.e., the CS signals CS1 to CS4 rise after their corresponding gate signals G1 to G4 fall, the CS signals CS5 to CS8 fall after their corresponding gate signals G5 to G8 fall, and the CS signal CS9 rises after its corresponding gate signal G9 falls.

Thus, in the liquid crystal display device 2 that employs quadruple-size display driving, the electric potential of each CS signal at a point in time where the gate signal falls varies every four rows in correspondence with the polarity of the source signal S. Therefore, in the first frame, the electric potentials Vpix1 to Vpix9 of the pixel electrodes 14 are all properly shifted by the CS signals CS1 to CS9, respectively. Accordingly, inputting of source signals S of the same gray scale causes the positive and negative electric potential differences between the electric potential of the counter electrode and the shifted electric potential of each of the pixel electrodes 14 to be equal to each other. That is, in the first frame, in which a source signal having a negative polarity and the same electric potential is written to pixels corresponding to four adjacent rows in the same column of pixels and a source signal having a positive polarity and the same electric potential is written to pixels corresponding to four adjacent pixels next to the four rows in the same column of pixels, the electric potentials of the CS signals CS1 to CS4 corresponding to the first four rows are not polarity-reversed during the writing to the pixels corresponding to the first four rows, are polarity-reversed in a negative direction after the writing, and are not polarity-reversed until the next writing, and the electric potentials of the CS signals CS5 to CS8 corresponding to the next four rows are not polarity-reversed during the writing to the pixels corresponding to the next four rows, are polarity-reversed in a positive direction after the writing, and are not polarity-reversed until the next writing. This realizes quadruple-size display driving in CC driving. Further, the configuration allows the electric potentials Vpix1 to Vpix9 of the pixel electrodes 14 to be property shifted by the CS signals CS1 to CS9, respectively. This makes it possible to eliminate appearance of alternate dark and bright transverse stripes in a display picture.

A specific configuration of the gate line driving circuit 30 and the CS bus line driving circuit 40 for achieving the aforementioned control is described here.

Figure 25:
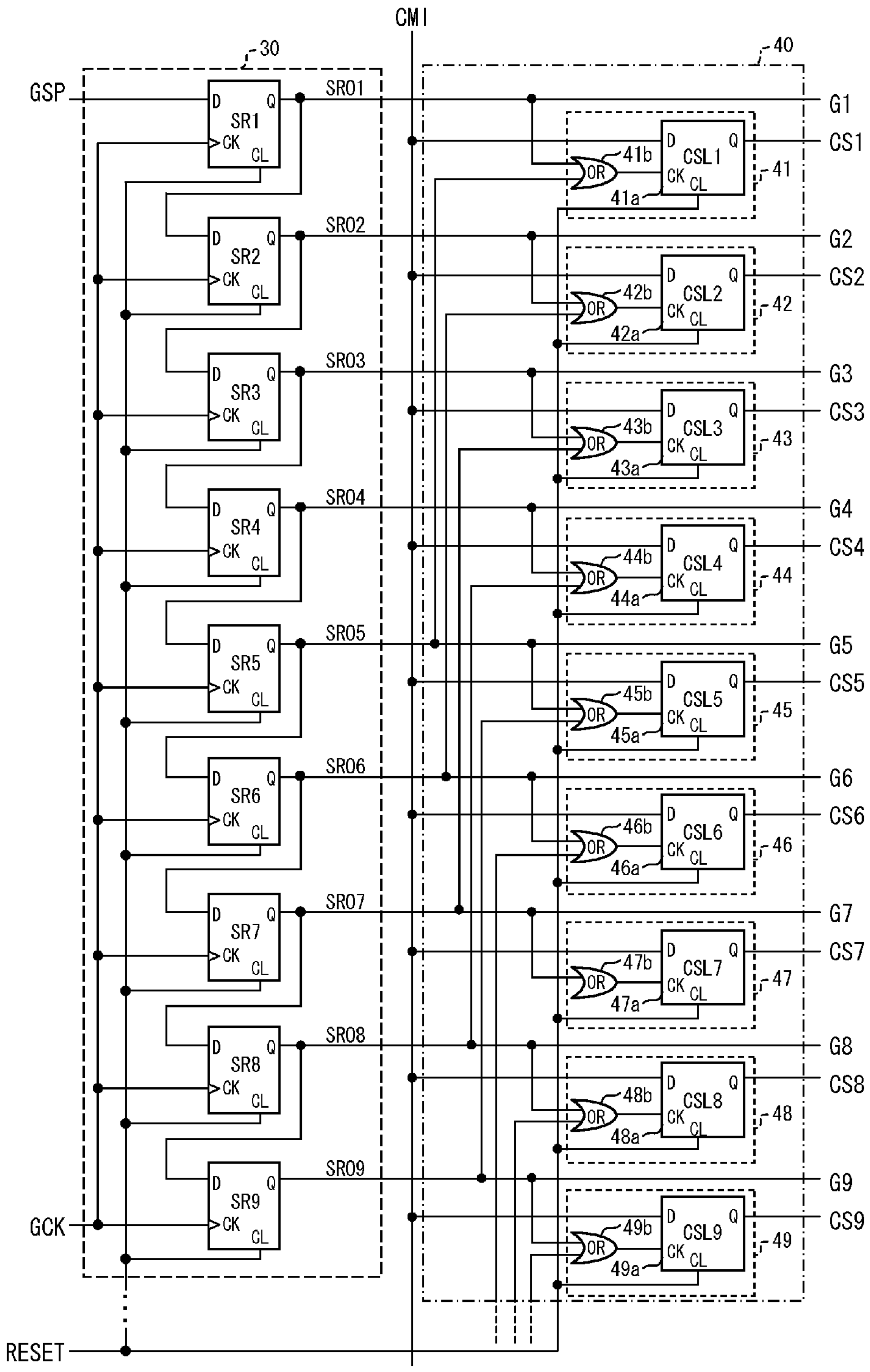
FIG. 25

FIG. 25 shows a configuration of the gate line driving circuit 30 and the CS bus line driving circuit 40. The CS bus line driving circuit 40 includes a plurality of CS circuits 41, 42, 43, . . . corresponding to respective rows. The CS circuits 41, 42, 43, . . . include respective D latch circuits 41*a*, 42*a*, 43*a*, . . . and respective OR circuits 41*b*, 42*b*, 43*b*, . . . . The gate line driving circuit 30 includes a plurality of shift register circuits SR1, SR2, SR3, . . . . Note here that, although the gate line driving circuit 30 and the CS bus line driving circuit 40 are located on one side of a liquid crystal display panel in FIG. 25, this does not imply any limitation. The gate line driving circuit 30 and the CS bus line driving circuit 40 may be located on respective different sides of the liquid crystal display panel.

Input signals to the CS circuit 41 are shift register outputs SRO1 and SRO5 corresponding to respective gate signals G1 and G5, a polarity signal CMI, and a reset signal RESET. Input signals to the CS circuit 42 are shift register outputs SRO2 and SRO6 corresponding to respective gate signals G2 and G6, the polarity signal CMI, and the reset signal RESET. Input signals to the CS circuit 43 are shift register outputs SRO3 and SRO7 corresponding to respective gate signals G3 and G7, the polarity signal CMI, and the reset signal RESET. Input signals to the CS circuit 44 are shift register outputs SRO4 and SRO8 corresponding to respective gate signals G4 and G8, the polarity signal CMI, and the reset signal RESET. As described above, each CS circuit receives a shift register output SROm in the corresponding mth row and a shift register output SROm+4 in the (m+4)th row, and receives the polarity signal CMI. The polarity signal CMI reverses its polarity every four horizontal scanning periods (see FIG. 24). The polarity signal CMI and the reset signal RESET are supplied from the control circuit 50.

In the following, for convenience of description, mainly the CS circuits 44 and 45 corresponding to the fourth and fifth rows, respectively, are taken as an example.

The D latch circuit 44*a* receives the reset signal RESET via its reset terminal CL, receives the polarity signal CMI via its data terminal D, and receives an output from the OR circuit 44*b* via its clock terminal CK. In accordance with a change (from a low level to a high level or from a high level to a low level) in electric potential level of the signal that the D latch circuit 44*a* receives via its clock terminal CK, the D latch circuit 44*a* outputs, as a CS signal CS4 indicative of the change in electric potential level, an input state (low level or high level) of the polarity signal CMI that it receives via its data terminal D.

Specifically, when the electric potential level of the signal that the D latch circuit 44*a* receives via its clock terminal CK is at a high level, the D latch circuit 44*a* outputs an input state (low level or high level) of the polarity signal CMI that it received via its data terminal D. When the electric potential level of the signal that the D latch circuit 44*a* receives via its clock terminal CK changes from a high level to a low level, the D latch circuit 44*a* latches an input state (low level or high level) of the polarity signal CMI that it received via its terminal D at the time of change, and keeps the latched state until the next time when the electric potential level of the signal that the latch circuit 44*a* receives via its clock terminal CK is raised to a high level. Then, the D latch circuit 44*a* outputs the CS signal CS4, which indicates the change in electric potential level, via its output terminal Q.

Similarly, the D latch circuit 45*a* receives the reset signal RESET via its reset terminal CL, and receives the polarity signal CMI via its data terminal D. Meanwhile, the D latch circuit 45*a* receives, via its clock terminal CK, an output from the OR circuit 45*b*. This causes the D latch circuit 45*a* to output a CS signal CS5, which indicates a change in electric potential level, via its output terminal Q.

Figure 26:
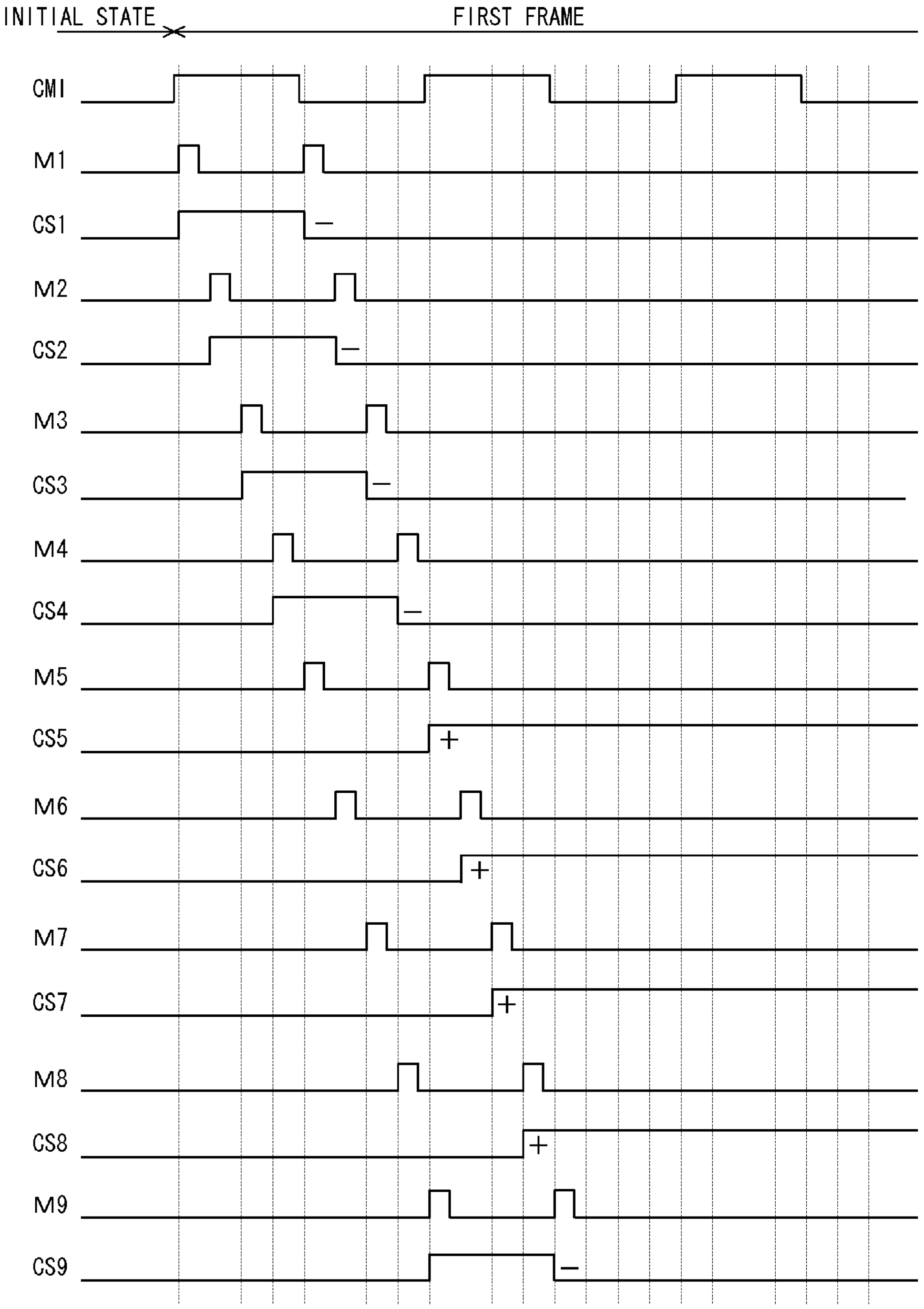
FIG. 26

The OR circuit 44*b* receives the output signal SRO4 from the shift register circuit SR4 in its corresponding fourth row and the output signal SRO8 from the shift register circuit SR8 in the eighth row and thereby outputs a signal M4 shown in FIG. 26. Further, the OR circuit 45*b* receives the output signal SRO5 from the shift register circuit SR5 in its corresponding row and the output signal SRO9 from the shift register circuit SR9 in the ninth row and thereby outputs a signal M5 shown in FIG. 26.

A shift register output SRO supplied to each OR circuit is generated by a well-known method in the gate line driving circuit 30 (see FIG. 24) which includes D-type flip-flop circuits. The gate line driving circuit 30 sequentially shifts a gate start pulse GSP, which is supplied from the control circuit 50, to a shift register circuit SR in the next stage at a timing of the gate clock GCK having a frequency of one horizontal scanning period.

FIG. 26 shows waveforms of various signals that are inputted to and outputted from the CS bus line driving circuit 40 of the liquid crystal display device 2 of Example 7.

First, the following describes changes in waveforms of various signals in the fourth row. During an initial state, the D latch circuit 44*a* of the CS circuit 44 receives the polarity signal CMI via its terminal D and receives the reset signal RESET via its reset terminal CL. The reset signal RESET causes the electric potential of the CS signal CS4 that the D latch circuit 44*a* outputs via its output terminal Q to be retained at a low level.

After that, the shift register output SRO4 corresponding to the gate signal G4 to be supplied to the gate line 12 in the fourth row is outputted from the shift register circuit SR4, and is inputted to one terminal of the OR circuit 44*b* of the CS circuit 44. Then, a change (from low to high) in electric potential of the shift register output SRO4 in the signal M4 is inputted to the clock terminal CK. Upon receiving the change (from low to high) in electric potential of the shift register output SRO4 via its clock terminal CK, the D latch circuit 44*a* transfers an input state of the polarity signal CMI that it received via its terminal D at the point in time, i.e., transfers a high level. That is, the electric potential of the CS signal CS4 is switched from a low level to a high level at a time when there is a change (from low to high) in electric potential of the shift register output SRO4. The D latch circuit 44*a* outputs the high level until there is a change (from high to low) in electric potential of the shift register output SRO4 in the signal M4 inputted to the clock terminal CK (i.e., during a period of time in which the signal M4 is at a high level). Then, upon receiving a change (from high to low) in electric potential of the shift register output SRO4 in the signal M4 via its clock terminal CK, the D latch circuit 44*a* latches an input state of the polarity signal CMI that it received at the point in time, i.e., latches a high level. After that, the D latch circuit 44*a* retains the high level until the signal M4 is raised to a high level.

Then, the shift register output SRO8 that has been shifted to the eighth row in the gate line driving circuit 30 is supplied to the other terminal of the OR circuit 44*b*. The shift register output SRO8 is supplied also to one terminal of the OR circuit 48*b* of the CS circuit 48.

The D latch circuit 44*a* receives a change (from low to high) in electric potential of the shift register output SRO8 in the signal M4 via its clock terminal CK, and transfers an input state of the polarity signal CMI that it received via its terminal D at the point in time, i.e., transfers a low level. That is, the electric potential of the CS signal CS4 is switched from a high level to a low level at a time when there is a change (from low to high) in electric potential of the shift register output SRO8. The D latch circuit 44*a* outputs the low level until there is a change (from high to low) in electric potential of the shift register output SRO8 in the signal M4 inputted to the clock terminal CK (i.e., during a period of time in which the signal M4 is at a high level). Next, upon receiving a change (from high to low) in electric potential of the shift register output SRO8 in the signal M4 via its clock terminal CK, the D latch circuit 44*a* latches an input state of the polarity signal CMI that it received at the point in time, i.e., latches a low level. After that, the D latch circuit 44*a* retains the low level until the signal M4 is raised to a high level in the second frame.

It should be noted that the first to third rows have identical waveforms as that of the fourth row, as shown in FIG. 26.

Next, the following describes changes in waveforms of various signals in the fifth row. During the initial state, the D latch circuit 45*a* of the CS circuit 45 receives the polarity signal CMI via its data terminal D and receives the reset signal RESET via its reset terminal CL. The reset signal RESET causes the electric potential of the CS signal CS5 that the D latch circuit 45*a* outputs via its output terminal Q to be retained at a low level.

After that, the shift register output SRO5 corresponding to the gate signal G5 to be supplied to the gate line 12 in the fifth row is outputted from the shift register circuit SR5, and is inputted to one terminal of the OR circuit 45*b* of the CS circuit 45. Then, the D latch circuit 45*a* receives a change (from low to high) in electric potential of the shift register output SRO5 in the signal M5 via its clock terminal CK. Upon receiving the change in electric potential of the shift register output SRO5 in the signal M5 via its clock terminal CK, the D latch circuit 45*a* transfers an input state of the polarity signal CMI that it received via its data terminal D at the point in time, i.e., transfers a low level. Then, the D latch circuit 45*a* outputs the low level until the next time when there is a change (from high to low) in electric potential of the shift register output SRO5 in the signal M5 inputted to the clock terminal CK (i.e., during a period of time in which the signal M5 is at a high level). Next, upon receiving a change (from high to low) in electric potential of the shift register output SRO5 in the signal M5 via its clock terminal CK, the D latch circuit 45*a* latches an input state of the polarity signal CMI that it received at the point in time, i.e., latches a low level. After that, the D latch circuit 45*a* retains the low level until the signal M5 is raised to a high level.

Then, the shift register output SRO9 that has been shifted to the ninth row in the gate line driving circuit 30 is supplied to the other terminal of the OR circuit 45*b*. The shift register output SRO9 is supplied also to one terminal of the OR circuit 49*b* of the CS circuit 49.

The D latch circuit 45*a* receives a change (from low to high) in electric potential of the shift register output SRO9 in the signal M5 via its clock terminal CK, and transfers an input state of the polarity signal CMI that it received via its terminal D at the point in time, i.e., transfers a high level. That is, the electric potential of the CS signal CS5 is switched from a low level to a high level at a time when there is a change (from low to high) in electric potential of the shift register output SRO9. The D latch circuit 45*a* outputs the high level until the next time when there is a change (from high to low) in electric potential of the shift register output SRO9 in the signal M5 inputted to the clock terminal CK (i.e., during a period of time in which the signal M5 is at a high level). Next, upon receiving a change (from high to low) in electric potential of the shift register output SRO9 in the signal M5 via its clock terminal CK, the D latch circuit 45*a* latches an input state of the polarity signal CMI that it received at the point in time, i.e., latches a high level. After that, the D latch circuit 45*a* retains the high level until the signal M5 is raised to a high level in the second frame.

As shown in FIG. 26, the sixth to eighth rows have identical waveforms as that of the fifth row. Moreover, as shown in FIG. 24, in the second frame the polarity of the polarity signal CMI is reversed, so therefore the first to fourth rows have identical waveforms as those of the fifth to eighth rows in the first frame, respectively, and the fifth to eighth rows have identical waveforms as those of first to fourth rows in the first frame, respectively. As to the third and subsequent frames, operations are performed for each row so as to repeat the waveforms of the first frame and the second frame, alternately.

As described above, each of the CS circuits 41, 42, 43, . . . , and 4*n* corresponding to the respective rows makes it possible, in each frame in 4H inversion driving, to switch the electric potential of a CS signal at a point in time where a gate signal in a corresponding row falls (at a point in time where a TFT 13 is switched from on to off) between high and low levels after the gate signal in this row falls.

That is, in Example 7, (i) a CS signal CS m supplied to the CS bus line 15 in the mth row is generated by latching an electric potential level of the polarity signal CMI at a point in time where the gate signal Gm in the mth row rises and an electric potential level of the polarity signal CMI at a point in time where the gate signal G(m+4) in the (m+4)th row rises and (ii) a CS signal CSm+1 supplied to the CS bus line 15 in the (m+1)th row is generated by latching an electric potential level of the polarity signal CMI at a point in time where the gate signal G(m+1) in the (m+1)th row rises and an electric potential level of the polarity signal CMI at a point in time where the gate signal G(m+5) in the (m+5)th row rises.

This allows the CS bus line driving circuit 40 to operate properly even in the liquid crystal display device 2 that employs quadruple-size display driving. Accordingly, it is possible to eliminate irregular waveforms that cause transverse stripes. This makes it possible to prevent the appearance of alternate bright and dark transverse stripes in a display picture, and thus possible to improve display quality.

The following description discusses how a polarity signal CMI supplied to CS circuits is related to shift register outputs SRO. FIG. 27 shows relations between (i) the polarity signal CMI and the shift register outputs SRO which are inputted to the CS circuits and (ii) the CS signal CS outputted from the CS circuits.

Figure 27:
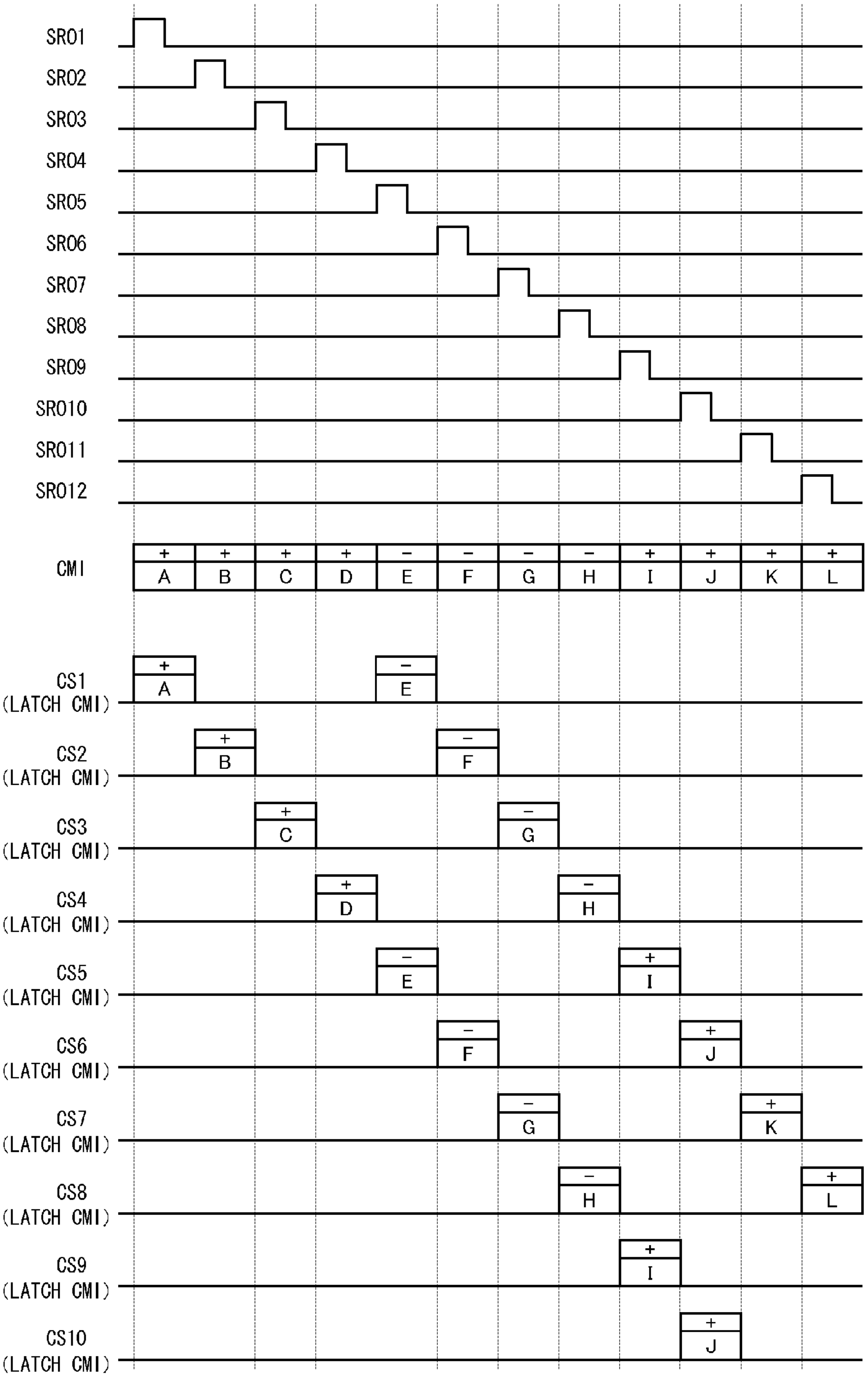
FIG. 27

As to the CMI shown in FIG. 27, each of the signs A to L corresponds to a single horizontal scanning period, and indicates a polarity (positive polarity or negative polarity) during that horizontal scanning period. For example, the CMI has a positive polarity during the second horizontal scanning period "B", has a positive polarity during the third horizontal scanning period "C", has a positive polarity during the fourth horizontal scanning period "D", and has a negative polarity during the fifth horizontal scanning period "E". In this way, the CMI reverses its polarity every four horizontal scanning periods.

The CS circuit receives, via its clock terminal CK, a shift register output SROm in the mth row and a shift register output SROm+4 in the (m+4)th row. This causes the CS circuit to latch (i) a CMI that the CS circuit receives via its data terminal D during the mth horizontal scanning period and (ii) a CMI signal that the CS circuit receives via its data terminal D during the (m+4)th horizontal scanning period. For example, the CS circuit 41 corresponding to the first row loads a positive polarity of "A" of the CMI during the first horizontal scanning period, and loads a negative polarity of "E" of the CMI during the fifth horizontal scanning period. The CS circuit 42 corresponding to the second row loads a positive polarity of "B" of the CMI during the second horizontal scanning period, and loads a negative polarity of "F" of the CMI during the sixth horizontal scanning period. The CS circuit 43 corresponding to the third row loads a positive polarity of "C" of the CMI during the third horizontal scanning period, and loads a negative polarity of "G" of the CMI during the seventh horizontal scanning period. The CS circuit 44 corresponding to the fourth row loads a positive polarity of "D" of the CMI during the fourth horizontal scanning period, and loads a negative polarity of "H" of the CMI during the eighth horizontal scanning period. The CS circuit 45 corresponding to the fifth row loads a negative polarity of "E" of the CMI during the fifth horizontal scanning period, and loads a positive polarity of "I" of the CMI during the ninth horizontal scanning period. In this way, the CS signals CS as shown in FIGS. 24 and 26 are outputted.

Embodiment 3

Another embodiment of the present invention is described below with reference to FIGS. 28 to 43. Note that, for convenience, members having functions identical to those of the respective members described in Embodiment 1 are given respective identical reference numerals, and their descriptions are omitted here. Note also that terms defined in Embodiment 1 are used in the present Examples also according to those definitions, unless otherwise noted.

A schematic arrangement of a liquid crystal display device 3 according to the present embodiment is identical to that of the liquid crystal display device 1 of Embodiment 1 shown in FIGS. 1 and 2. Accordingly, a description of the schematic arrangement of the liquid crystal display device 3 is omitted here. The following description specifically discusses a gate line driving circuit 30 and a CS bus line driving circuit 40. Similarly with Embodiment 1, the present liquid crystal display device 3 is provided with two signal lines for supplying polarity signals CMI from a control circuit 50 (see FIG. 1) to the CS bus line driving circuit 40. The polarity signals CMI1 and CMI2 supplied via the respective signal lines have waveforms whose polarities are reverse to each other. In order to realize n-line inversion (nH) driving for carrying out n-fold-size display driving, in such an arrangement, the polarity reversal timings of the polarity signals CMI1 and CMI2 are adjusted, and the polarity signals CMI1 and CMI2 to be received by latch circuits CSL of respective rows are set. Specific examples are described below.

Example 8

Figure 28:
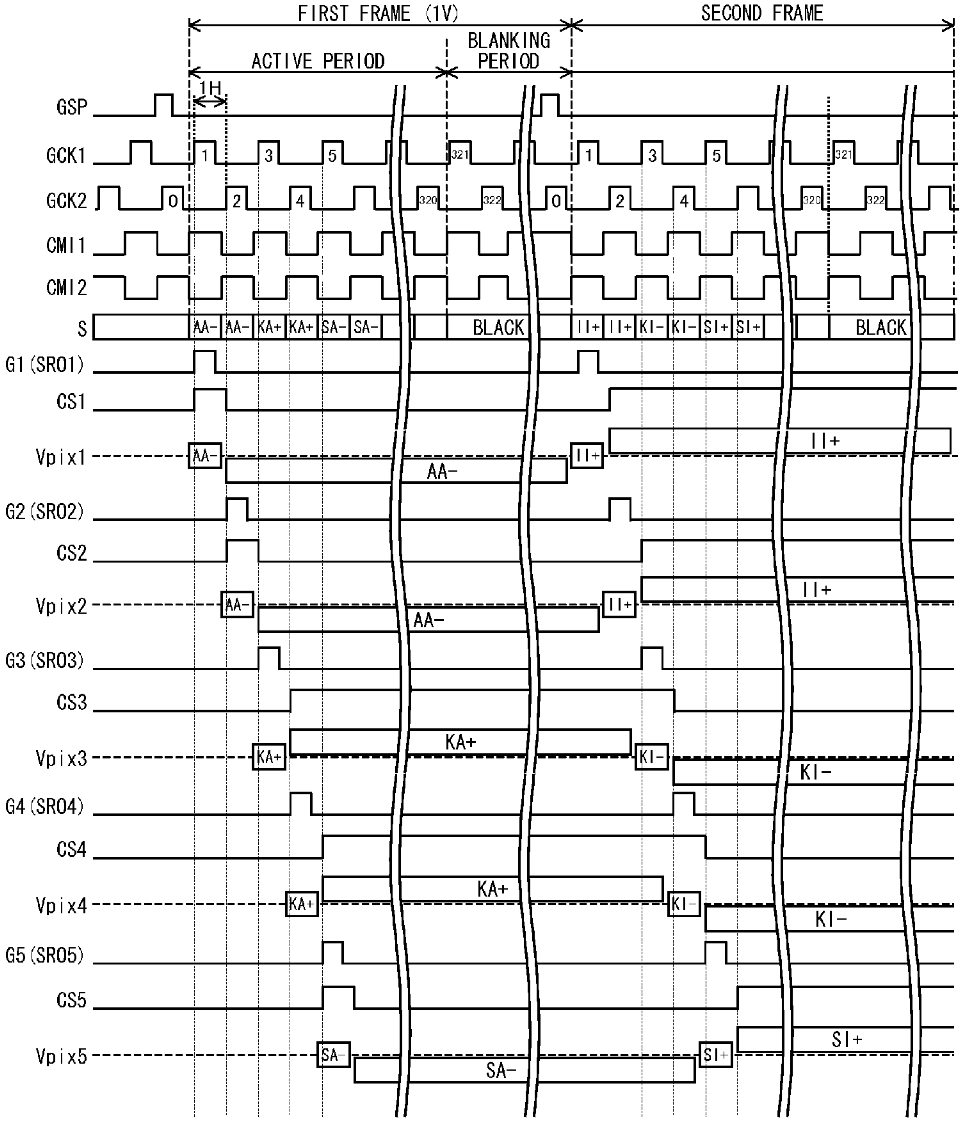
FIG. 28

FIG. 28 is a timing chart showing waveforms of various signals in a liquid crystal display device 3 that employs 2-line (2H) inversion driving. In FIG. 28, polarity signals CMI1 and CMI2 are set so that the polarity signals CMI1 and CMI2 reverse their polarities every one horizontal scanning period (1H) and the polarity signals CMI1 and CMI2 are reverse to each other in their polarity.

As shown in FIG. 28, during an initial state, the CS signals CS1 to CS5 are all fixed at one electric potential (in FIG. 28, at a low level). In the first frame, the CS signal CS1 in the first row is at a high level at a point in time where the corresponding gate signal G1 (which corresponds to the output SRO1 from the corresponding shift register circuit SR1) falls. The CS signal CS2 in the second row is at a high level at a point in time where the corresponding gate signal G2 falls. The CS signal CS3 in the third row is at a low level at a point in time where the corresponding gate signal G3 falls. The CS signal CS4 in the fourth row is at a low level at a point in time where the corresponding gate signal G4 falls. The CS signal CS5 in the fifth row is at a high level at a point in time where the corresponding gate signal G5 falls.

It should be noted here that the source signal S is a signal which has amplitude corresponding to a gray scale represented by a video signal and which reverses its polarity every two horizontal scanning periods (2H). The source signal S has the same electric potential (gray scale) during two adjacent horizontal scanning periods (2H) and has the same electric potential (gray scale) during next two adjacent horizontal scanning periods (2H). That is, each of the reference signs "AA" to "SA" shown in FIG. 28 corresponds to a single horizontal scanning period, and indicates a signal potential (gray scale) during that horizontal scanning period. For example, the source signal S in the first frame exhibits identical signal potentials of a negative polarity ("AA") during the first and second horizontal scanning periods, and exhibits identical signal potentials of a positive polarity ("KA") during the third and fourth horizontal scanning periods. Further, the source signal S in the second frame exhibits identical signal potentials of a positive polarity ("II") during the first and second horizontal scanning periods, and exhibits identical signal potentials of a negative polarity ("KI") during the third and fourth horizontal scanning periods. Moreover, since it is assumed in FIG. 28 that a uniform picture is displayed, the amplitude of the source signal S is constant. Meanwhile, the gate signals G1 to G5 serve as gate-on potentials during the first to fifth 1H periods, respectively, in an active period (effective scanning period) of each frame, and serve as gate-off potentials during the other periods.

Then, the CS signals CS1 to CS5 switch between high and low electric potential levels after their corresponding gate signals G1 to G5 fall. Specifically, in the first frame, the CS signals CS1 and CS2 fall after their corresponding gate signals G1 and G2 fall, respectively, and the CS signals CS3 and CS4 rise after their corresponding signals G3 and G4 fall, respectively. It should be noted that in the second frame, this relationship is reversed, i.e., the CS signals CS1 and CS2 rise after their corresponding gate signals G1 and G2 fall, respectively, and the CS signals CS3 and CS4 fall after their corresponding gate signals G3 and G4 fall, respectively.

This eliminates appearance of alternate bright and dark transverse stripes in a display picture, and makes it possible to improve display quality.

A specific configuration of the gate line driving circuit 30 and the CS bus line driving circuit 40 for achieving the aforementioned control is described here.

Figure 29:
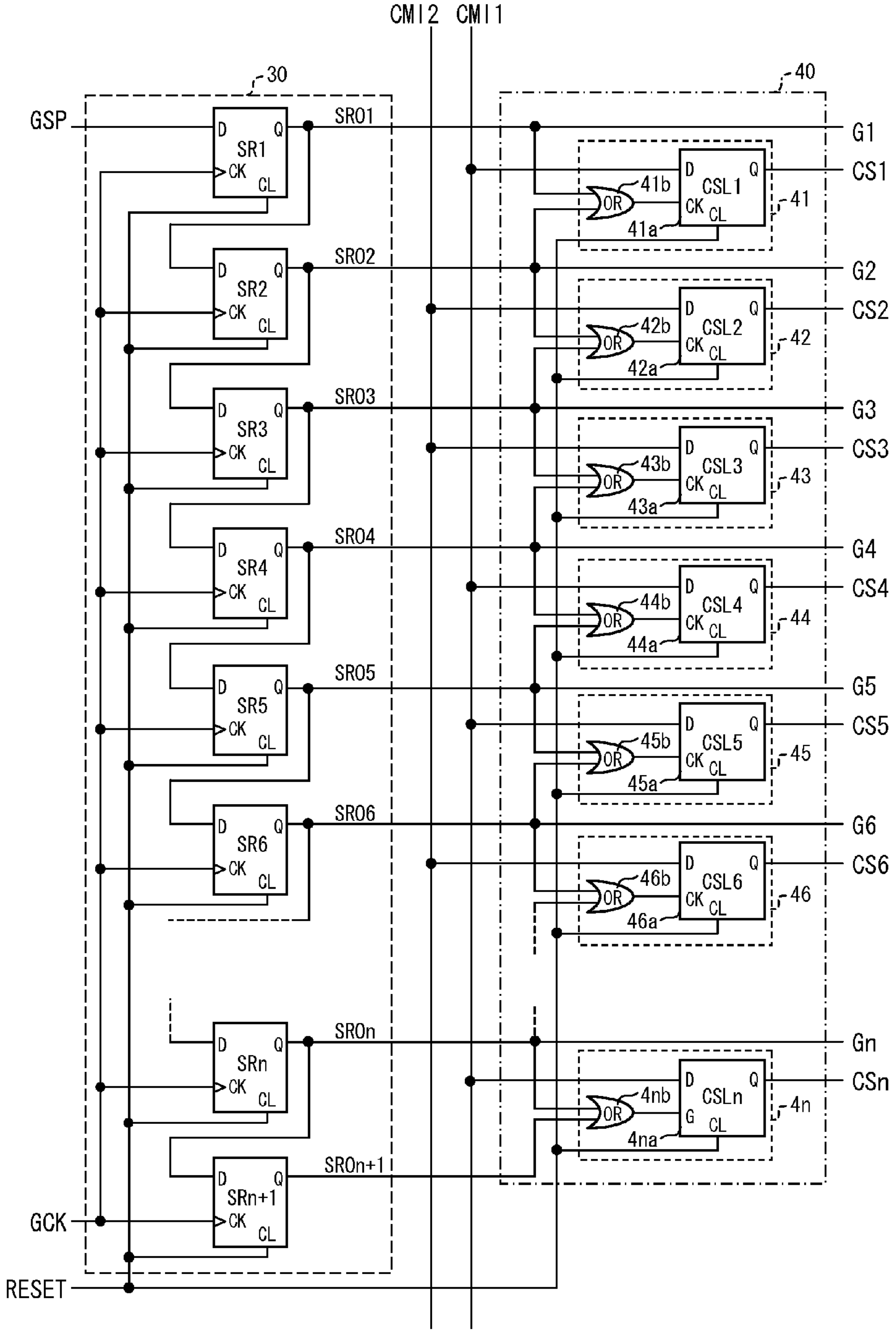
FIG. 29

FIG. 29 shows a configuration of the gate line driving circuit 30 and the CS bus line driving circuit 40. The CS bus line driving circuit 40 includes a plurality of CS circuits 41, 42, 43, . . . , and 4*n* corresponding to respective rows. The CS circuits 41, 42, 43, . . . , and 4*n* include respective D latch circuits 41*a*, 42*a*, 43*a*, . . . , and 4*na*; and respective OR circuits 41*b*, 42*b*, 43*b*, . . . , and 4*nb*. The gate line driving circuit 30 includes a plurality of shift register circuits SR1, SR2, SR3, . . . , and SRn. Note here that, although the gate line driving circuit 30 and the CS bus line driving circuit 40 are located on one side of a liquid crystal display panel in FIG. 29, this does not imply any limitation. The gate line driving circuit 30 and the CS bus line driving circuit 40 may be located on respective different sides of the liquid crystal display panel.

Input signals to the CS circuit 41 are shift register outputs SRO1 and SRO2 corresponding to respective gate signals G1 and G2, a polarity signal CMI1, and a reset signal RESET. Input signals to the CS circuit 42 are shift register outputs SRO2 and SRO3 corresponding to respective gate signals G2 and G3, a polarity signal CMI2, and the reset signal RESET. Input signals to the CS circuit 43 are shift register outputs SRO3 and SRO4 corresponding to respective gate signals G3 and G4, the polarity signal CMI2, and the reset signal RESET. Input signals to the CS circuit 44 are shift register outputs SRO4 and SRO5 corresponding to respective gate signals G4 and G5, the polarity signal CMI1, and the reset signal RESET. As described above, each CS circuit receives a shift register output SROn in the corresponding nth row and a shift register output SROn+1 in the next row, and receives one of the polarity signals CMI1 and CMI2 which alternate every two rows. The polarity signals CMI1 and CMI2 and the reset signal RESET are supplied from the control circuit 50.

Figure 30:
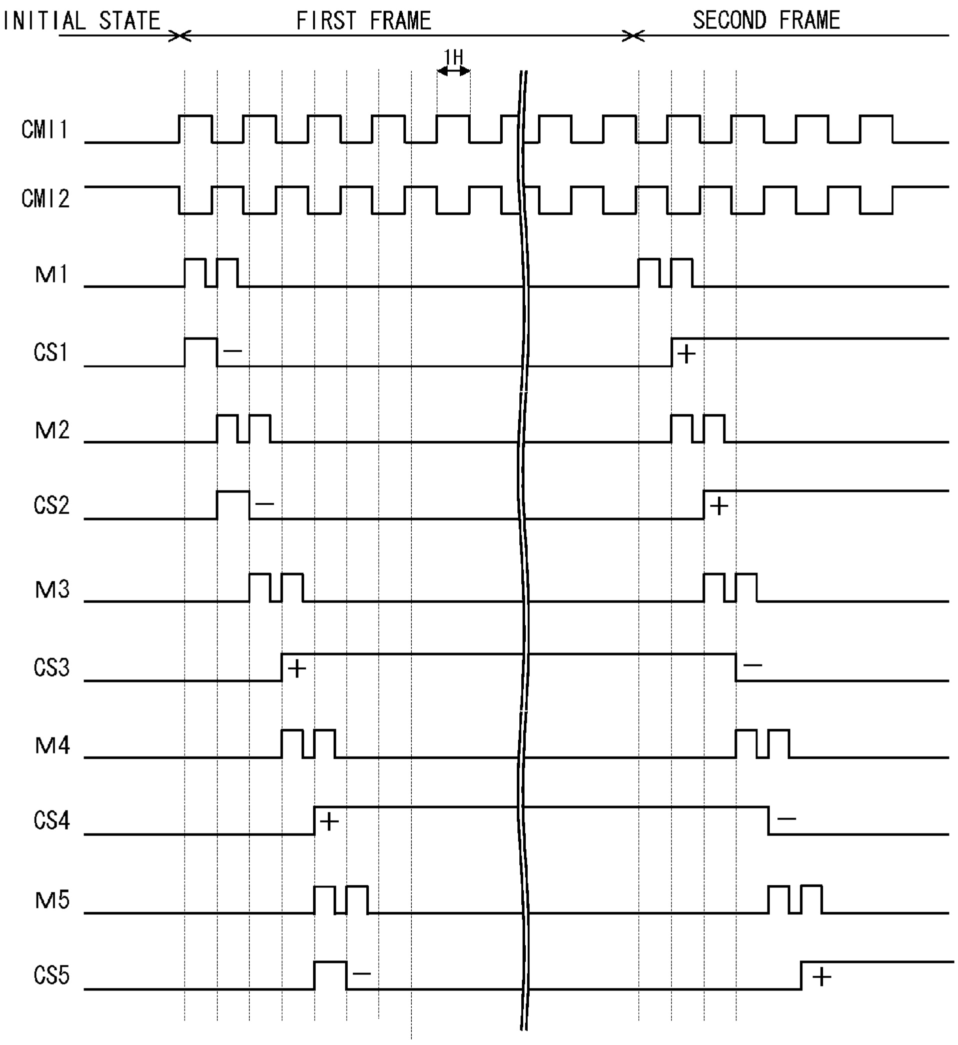
FIG. 30

In the following, for convenience of description, mainly the CS circuits 42 and 43 corresponding to the second and third rows, respectively, are taken as an example. FIG. 30 shows waveforms of various signals inputted to and outputted from the CS bus line driving circuit 40 of the liquid crystal display device 3 of Example 8.

First, the following describes changes in waveforms of various signals in the second row. During an initial state, the D latch circuit 42*a* of the CS circuit 42 receives the polarity signal CMI2 via its terminal D and receives the reset signal RESET via its reset terminal CL. The reset signal RESET causes the electric potential of the CS signal CS2 that the D latch circuit 42*a* outputs via its output terminal Q to be retained at a low level.

After that, the shift register output SRO2 corresponding to the gate signal G2 to be supplied to the gate line 12 in the second row is outputted from the shift register circuit SR2, and is inputted to one terminal of the OR circuit 42*b* of the CS circuit 42. Then, a change (from low to high) in electric potential of the shift register output SRO2 in the signal M2 is inputted to the clock terminal CK. Upon receiving the change (from low to high) in electric potential of the shift register output SRO2 via its clock terminal CK, the D latch circuit 42*a* transfers an input state of the polarity signal CMI2 that it received via its terminal D at the point in time, i.e., transfers a high level. That is, the electric potential of the CS signal CS2 is switched from a low level to a high level at a time when there is a change (from low to high) in electric potential of the shift register output SRO2. The D latch circuit 42*a* outputs the high level until there is a change (from high to low) in electric potential of the shift register output SRO2 in the signal M2 inputted to the clock terminal CK (i.e., during a period of time in which the signal M2 is at a high level). Then, upon receiving a change (from high to low) in electric potential of the shift register output SRO2 in the signal M2 via its clock terminal CK, the D latch circuit 42*a* latches an input state of the polarity signal CMI2 that it received at the point in time, i.e., latches a high level. After that, the D latch circuit 42*a* retains the high level until the signal M2 is raised to a high level.

Then, the shift register output SRO3 that has been shifted to the third row in the gate line driving circuit 30 is supplied to the other terminal of the OR circuit 42*b*. The shift register output SRO3 is supplied also to one terminal of the OR circuit 43*b* of the CS circuit 43.

The D latch circuit 42*a* receives a change (from low to high) in electric potential of the shift register output SRO3 in the signal M2 via its clock terminal CK, and transfers an input state of the polarity signal CMI2 that it received via its terminal D at the point in time, i.e., transfers a low level. That is, the electric potential of the CS signal CS2 is switched from a high level to a low level at a time when there is a change (from low to high) in electric potential of the shift register output SRO3. The D latch circuit 42*a* outputs the low level until there is a change (from high to low) in electric potential of the shift register output SRO3 in the signal M2 inputted to the clock terminal CK (i.e., during a period of time in which the signal M2 is at a high level). Next, upon receiving a change (from high to low) in electric potential of the shift register output SRO3 in the signal M2 via its clock terminal CK, the D latch circuit 42*a* latches an input state of the polarity signal CMI2 that it received at the point in time, i.e., latches a low level. After that, the D latch circuit 42*a* retains the low level until the signal M2 is raised to a high level in the second frame.

In the second frame, the D latch circuit 42*a* transfers an input state (low level) of the polarity signal CMI2 that it received via its data terminal D during a period of time in which the shift register output SRO2 in the signal M2 is at a high level, latches an input state (low level) of the polarity signal CMI2 that it received at a point in time where it receives a change (from high to low) in electric potential of the shift register output SRO2, and then retains the low level until the next time the signal M2 is raised to a high level.

Next, upon receiving a change (from low to high) in electric potential of the shift register output SRO3 via its clock terminal CK, the D latch circuit 42*a* transfers an input state of the polarity signal CMI2 that it received via its data terminal D at the point in time, i.e., transfers a high level. That is, the electric potential of the CS signal CS2 is switched from a low level to a high level at a time when there is a change (from low to high) in electric potential of the shift register output SRO3. The D latch circuit 42*a* outputs the high level until there is a change (from high to low) in electric potential of the shift register output SRO3 inputted to the clock terminal CK (i.e., during a period of time in which the signal M2 is at a high level). Then, upon receiving a change (from high to low) in electric potential of the shift register output SRO3 via its clock terminal CK, the D latch circuit 42*a* latches an input state of the polarity signal CMI2 that it received at the point in time, i.e., latches a high level. After that, the D latch circuit 42*a* retains the high level until the signal M2 is raised to a high level in the third frame.

Note that, in the first row, the polarity signal CMI1 is latched in accordance with the shift register outputs SRO1 and SRO2, thereby a CS signal CS1 shown in FIG. 30 is outputted.

Next, the following describes changes in waveforms of various signals in the third row. During the initial state, the D latch circuit 43*a* of the CS circuit 43 receives the polarity signal CMI2 via its data terminal D and receives the reset signal RESET via its reset terminal CL. The reset signal RESET causes the electric potential of the CS signal CS3 that the D latch circuit 43*a* outputs via its output terminal Q to be retained at a low level.

After that, the shift register output SRO3 corresponding to the gate signal G3 to be supplied to the gate line 12 in the third row is outputted from the shift register circuit SR3, and is inputted to one terminal of the OR circuit 43*b* of the CS circuit 43. Then, a change (from low to high) in electric potential of the shift register output SRO3 in the signal M3 is inputted to the clock terminal CK. Upon receiving the change in electric potential of the shift register output SRO3 in the signal M3 via its clock terminal CK, the D latch circuit 43*a* transfers an input state of the polarity signal CMI2 that it received via its data terminal D at the point in time, i.e., transfers a low level. Then, the D latch circuit 43*a* outputs the low level until the next time when there is a change (from high to low) in electric potential of the shift register output SRO3 in the signal M3 inputted to the clock terminal CK (i.e., during a period of time in which the signal M3 is at a high level). Then, upon receiving a change (from high to low) in electric potential of the shift register output SRO3 in the signal M3 via its clock terminal CK, the D latch circuit 43*a* latches an input state of the polarity signal CMI2 that it received at the point in time, i.e., latches a low level. After that, the D latch circuit 43*a* retains the low level until the signal M3 is raised to a high level.

Then, the shift register output SRO4 that has been shifted to the fourth row in the gate line driving circuit 30 is supplied to the other terminal of the OR circuit 43*b*. The shift register output SRO4 is supplied also to one terminal of the OR circuit 44*b* of the CS circuit 44.

The D latch circuit 43*a* receives a change (from low to high) in electric potential of the shift register output SRO4 in the signal M3 via its clock terminal CK, and transfers an input state of the polarity signal CMI2 that it received via its terminal D at the point in time, i.e., transfers a high level. That is, the electric potential of the CS signal CS3 is switched from a low level to a high level at a time when there is a change (from low to high) in electric potential of the shift register output SRO4. The D latch circuit 43*a* outputs the high level until the next time when there is a change (from high to low) in electric potential of the shift register output SRO4 in the signal M3 inputted to the clock terminal CK (i.e., during a period of time in which the signal M3 is at a high level). Next, upon receiving a change (from high to low) in electric potential of the shift register output SRO4 in the signal M3 via its clock terminal CK, the D latch circuit 43*a* latches an input state of the polarity signal CMI2 that it received at the point in time, i.e., latches a high level. After that, the D latch circuit 43*a* retains the high level until the signal M3 is raised to a high level in the second frame.

In the second frame, the D latch circuit 43*a* transfers an input state (high level) of the polarity signal CMI2 that it received via its data terminal D during a period of time in which the shift register output SRO3 in the signal M3 is at a high level, latches an input state (high level) of the polarity signal CMI2 that it received at a point in time where it received a change (from high to low) in electric potential of the shift register output SRO3, and then retains the high level until the next time when the signal M3 is raised to a high level.

Next, the D latch circuit 43*a* receives a change (from low to high) in electric potential of the shift register output SRO4 via its clock terminal CK, and transfers an input state of the polarity signal CMI2 that it received via its data terminal D at the point in time, i.e., transfers a low level. That is, the electric potential of the CS signal CS3 is switched from a high level to a low level at a time when there is a change (from low to high) in electric potential of the shift register output SRO4.

Then, the D latch circuit 43*a* outputs the low level until the next time when there is a change (from high to low) in electric potential of the shift register output SRO4 inputted to the clock terminal CK (i.e., during a period of time in which the signal M3 is at a high level). Next, upon receiving a change (from high to low) in electric potential of the shift register output SRO4 via its clock terminal CK, the D latch circuit 43*a* latches an input state of the polarity signal CMI2 that it received at the point in time, i.e., latches a low level. After that, the D latch circuit 43*a* retains the low level until the signal M3 is raised to a high level in the third frame.

It should be noted that, in the fourth row, the polarity signal CMI1 is latched in accordance with the shift register outputs SRO4 and SRO5, thereby a CS signal CS4 shown in FIG. 30 is outputted.

As described above, each of the CS circuits 41, 42, 43, . . . , and 4*n* corresponding to the respective rows makes it possible, in each frame in 2H inversion driving, to switch the electric potential of a CS signal at a point in time where a gate signal in a corresponding row falls (at a point in time where a TFT 13 is switched from on to off) between high and low levels after the gate signal in this row falls.

That is, in Example 8, (i) a CS signal CSn supplied to the CS bus line 15 in the nth row is generated by latching an electric potential level of the polarity signal CMI1 at a point in time where the gate signal Gn in the nth row rises and an electric potential level of the polarity signal CMI1 at a point in time where the gate signal G(n+1) in the (n+1)th row rises and (ii) a CS signal CSn+1 supplied to the CS bus line 15 in the (n+1)th row is generated by latching an electric potential level of the polarity signal CMI1 at a point in time where the gate signal G(n+1) in the (n+1)th row rises and an electric potential level of the polarity signal CMI1 at a point in time where the gate signal G(n+2) in the (n+2)th row rises. Moreover, (i) a CS signal CSn+2 supplied to the CS bus line 15 of the (n+2)th row is generated by latching an electric potential of the polarity signal CMI2 at a point in time where the gate signal G(n+2) in the (n+2)th row rises and an electric potential level of the polarity signal CMI2 at a point in time where the gate signal G(n+3) in the (n+3)th row rises, and (ii) a CS signal CSn+3 supplied to the CS bus line 15 in the (n+3)th row is generated by latching an electric potential level of the polarity signal CMI2 at a point in time where the gate signal G(n+3) in the (n+3)th row rises and an electric potential level of the polarity signal CMI2 at a point in time where the gate signal G(n+4) in the (n+4)th row rises.

This allows the CS bus line driving circuit 40 to operate properly even in the liquid crystal display device 3 that employs double-size display driving. Accordingly, it is possible to eliminate irregular waveforms that cause transverse stripes. This makes it possible to prevent the appearance of alternate bright and dark transverse stripes in a display picture, and thus possible to improve display quality.

Figure 31:
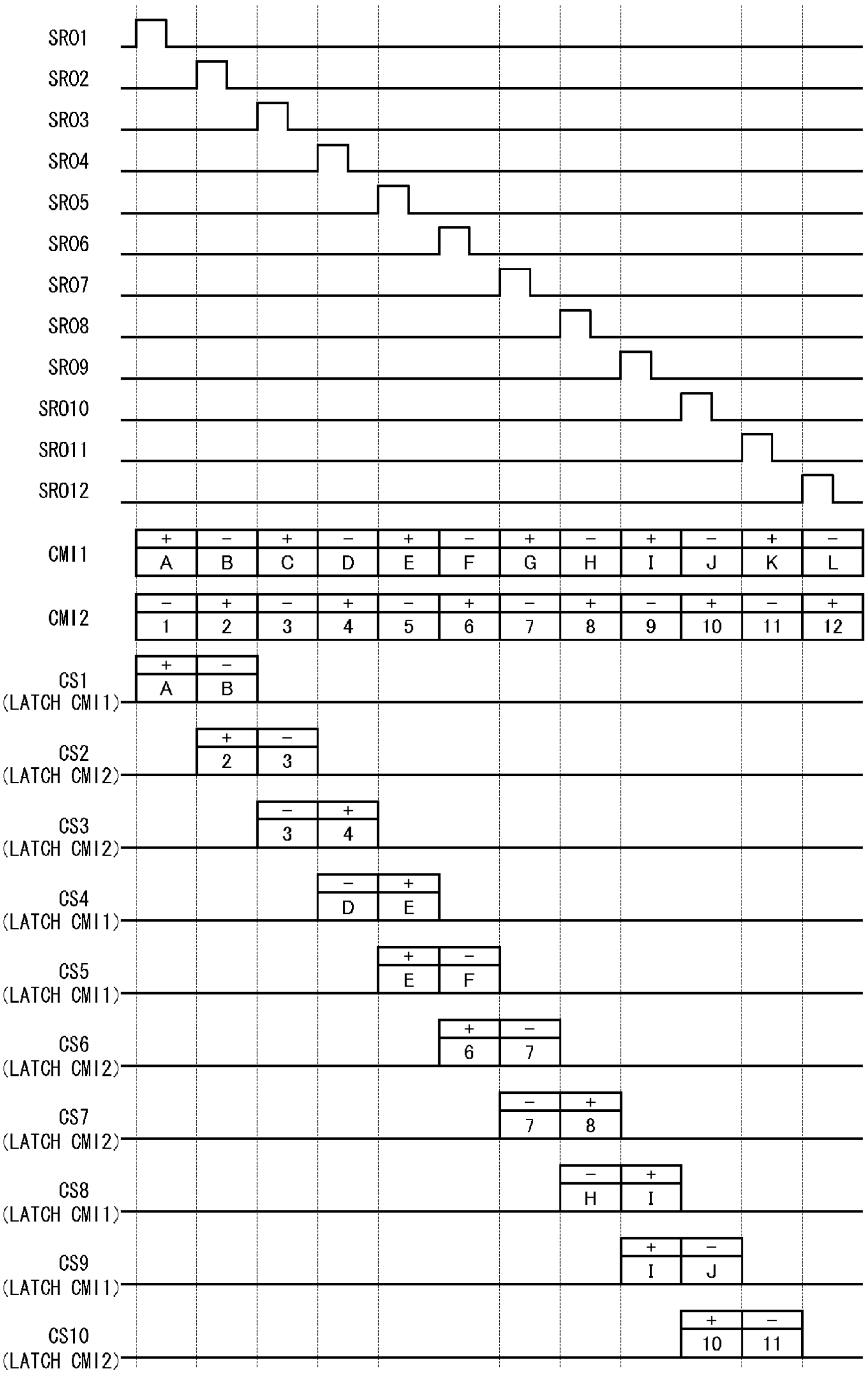
FIG. 31

The following description discusses how the polarity signals CMI1 and CMI2 supplied to the CS circuits 4*n* are related to the shift register outputs SROn. FIG. 31 shows relations between (i) the polarity signal CMI1 (or CMI2) and the shift register outputs SROn which are inputted to the CS circuits 4*n* and (ii) the CS signals CSn outputted from the CS circuits 4*n*.

As to the CMI1 shown in FIG. 31, each of the signs A to L corresponds to a single horizontal scanning period, and indicates a polarity (positive polarity or negative polarity) during that horizontal scanning period. For example, the CMI1 has a negative polarity during the second horizontal scanning period "B", has a positive polarity during the third horizontal scanning period "C", has a negative polarity during the fourth horizontal scanning period "D", and has a positive polarity during the fifth horizontal scanning period "E". As to the CMI2, each of the signs 1 to 12 corresponds to a single horizontal scanning period, and indicates a polarity during that horizontal scanning period. For example, the CMI2 has a negative polarity during the first horizontal scanning period "1", has a positive polarity during the second horizontal scanning period "2", has a negative polarity during the third horizontal scanning period "3", and has a positive polarity during the fourth horizontal scanning period "4". In this way, the CMI1 and the CMI2 reverse their polarities every one horizontal scanning period, and their polarities are reverse to each other. Each of the CS circuits 4*n* receives one of the polarity signals CMI1 and CMI2 which alternate every two rows. For example, the CS circuit 41 receives the CMI1, the CS circuit 42 receives the CMI2, the CS circuit 43 receives the CMI2, the CS circuit 44 receives the CMI1, and the CS circuit 45 receives the CMI1 (see FIG. 29).

The CS circuit 4*n* receives, via its clock terminal CK, a shift register output SROn in the nth row and a shift register output SROn+1 in the next (n+1)th row. This causes the CS circuit 4*n* to latch (i) a CMI1 (or CMI2) that the CS circuit 4*n* receives via its data terminal D during the nth horizontal scanning period and (ii) a CMI1 (or CMI2) that the CS circuit 4*n* receives via its data terminal D during the (n+1)th horizontal scanning period. For example, the CS circuit 41 loads a positive polarity of "A" of the CMI1 during the first horizontal scanning period, and loads a negative polarity of "B" of the CMI1 during the second horizontal scanning period. The CS circuit 42 loads a positive polarity of "2" of the CMI2 during the second horizontal scanning period, and loads a negative polarity of "3" of the CMI2 during the third horizontal scanning period. The CS circuit 43 loads a negative polarity of "3" of the CMI2 during the third horizontal scanning period, and loads a positive polarity of "4" of the CMI2 during the fourth horizontal scanning period. The CS circuit 44 loads a negative polarity of "D" of the CMI1 during the fourth horizontal scanning period, and loads a positive polarity of "E" of the CMI1 during the fifth horizontal scanning period. In this way, the CS signals CSn as shown in FIGS. 28 and 30 are outputted.

Example 9

Figure 32:
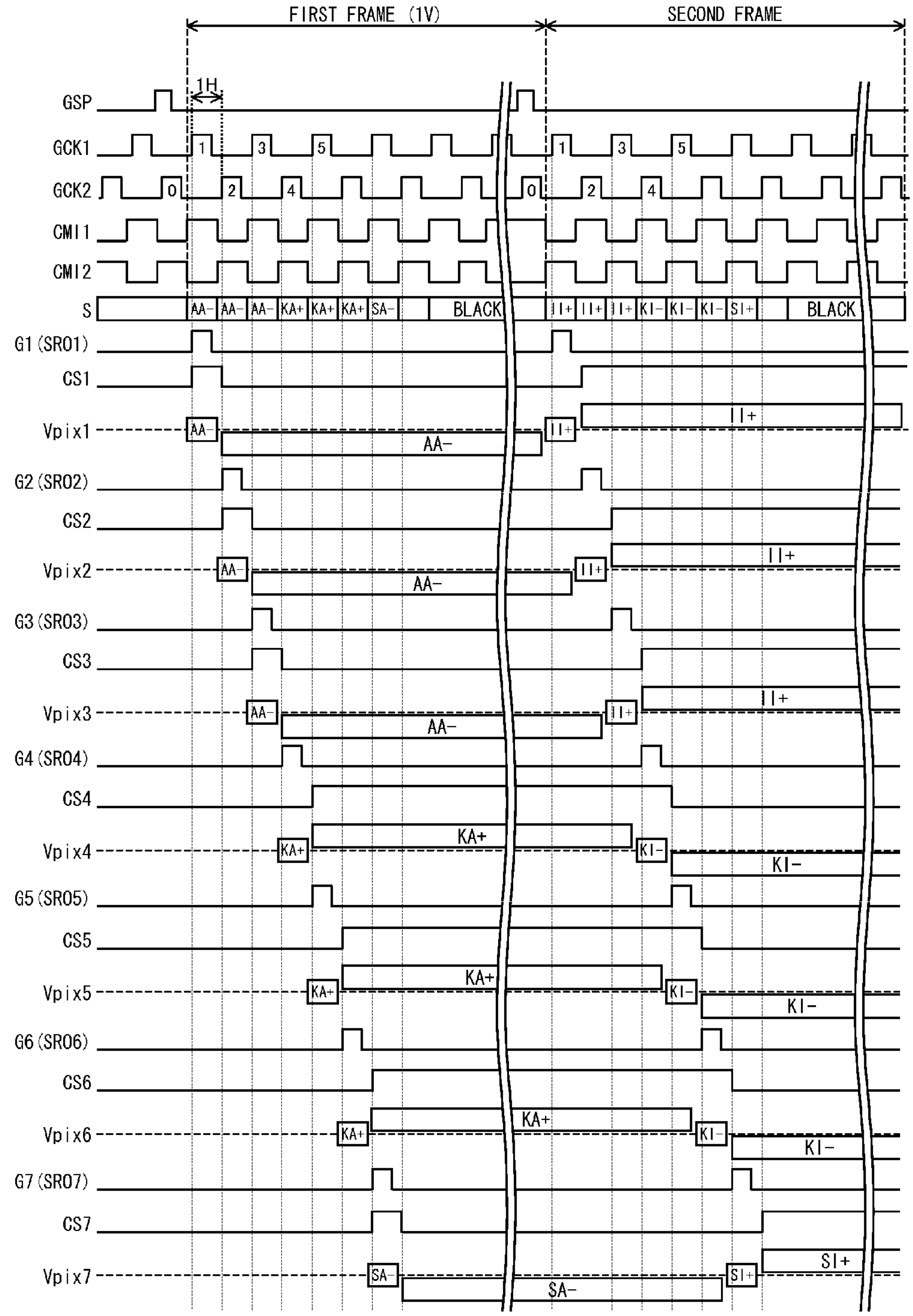
FIG. 32

FIG. 32 is a timing chart showing waveforms of various signals in a liquid crystal display device 3 that employs a-line (3H) inversion driving. In FIG. 32, similarly with Example 8, the polarity signals CMI1 and CMI2 are set so that the polarity signals CMI1 and CMI2 reverse their polarities every one horizontal scanning period (1H) and the polarity signals CMI1 and CMI2 are reverse to each other in their polarity.

As shown in FIG. 32, during an initial state, the CS signals CS1 to CS7 are all fixed at one electric potential (in FIG. 32, at a low level). In the first frame, the CS signal CS1 in the first row is at a high level at a point in time where the corresponding gate signal G1 falls. The CS signal CS2 in the second row is at a high level at a point in time where the corresponding gate signal G2 falls. The CS signal CS3 in the third row is at a high level at a point in time where the corresponding gate signal G3 falls. In contrast, the CS signal CS4 in the fourth row is at a low level at a point in time where the corresponding gate signal G4 falls. The CS signal CS5 in the fifth row is at a low level at a point in time where the corresponding gate signal G5 falls. The CS signal CS6 in the sixth row is at a low level at a point in time where the corresponding gate signal G6 falls. The CS signal CS7 in the seventh row is at a high level at a point in time where the corresponding gate signal G7 falls.

It should be noted here that the source signal S is a signal which has amplitude corresponding to a gray scale represented by a video signal and which reverses its polarity every 3H periods. The source signal S has the same electric potential (gray scale) during three adjacent horizontal scanning periods (3H) and has the same electric potential (gray scale) during next three adjacent horizontal scanning periods (3H). That is, each of the reference signs "AA" to "SA" shown in FIG. 32 corresponds to a single horizontal scanning period, and indicates a signal potential (gray scale) during that horizontal scanning period. For example, the source signal S in the first frame exhibits identical signal potentials of a negative polarity ("AA") during the first, second and third horizontal scanning periods, and exhibits identical signal potentials of a positive polarity ("KA") during the fourth, fifth and sixth horizontal scanning periods. Further, the source signal S in the second frame exhibits identical signal potentials of a positive polarity ("II") during the first, second and third horizontal scanning periods, and exhibits identical signal potentials of a negative polarity ("KI") during the fourth, fifth and sixth horizontal scanning periods. Meanwhile, the gate signals G1 to G7 serve as gate-on potentials during the first to seventh 1H periods, respectively, in an active period (effective scanning period) of each frame, and serve as gate-off potentials during the other periods.

Then, the CS signals CS1 to CS7 switch between high and low electric potential levels after their corresponding gate signals G1 to G7 fall. Specifically, in the first frame, the CS signals CS1, CS2 and CS3 fall after their corresponding gate signals G1, G2 and G3 fall, and the CS signals CS4, CS5 and CS6 rise after their corresponding signals G4, G5 and G6 fall. It should be noted that in the second frame, this relationship is reversed, i.e., the CS signals CS1, CS2 and CS3 rise after their corresponding gate signals G1, G2 and G3 fall, and the CS signals CS4, CS5 and CS6 fall after their corresponding gate signals G4, G5 and G6 fall.

This eliminates appearance of alternate bright and dark transverse stripes in a display picture, and makes it possible to improve display quality.

A specific configuration of the gate line driving circuit 30 and the CS bus line driving circuit 40 for achieving the aforementioned control is described here.

Figure 33:
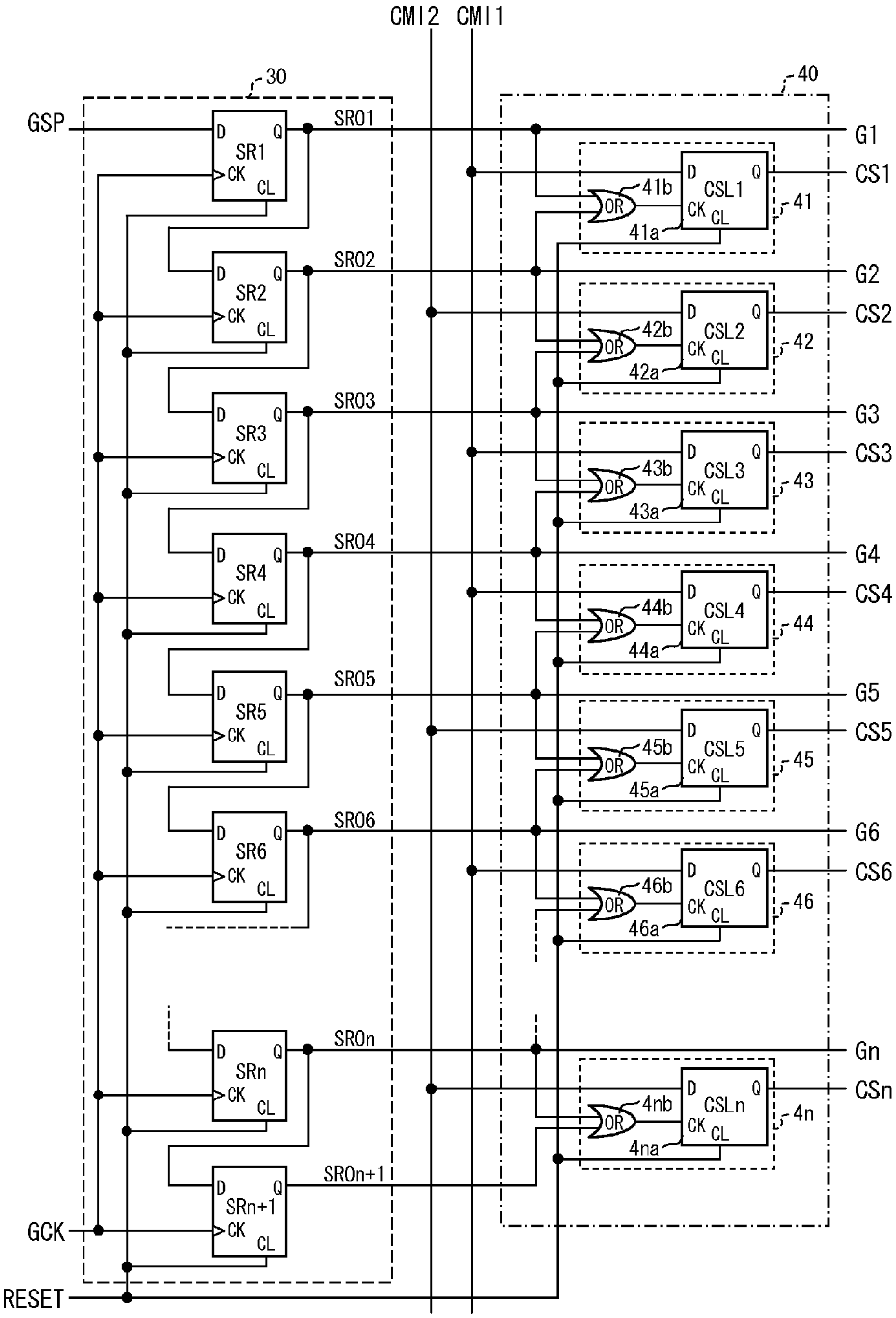
FIG. 33

FIG. 33 shows a configuration of the gate line driving circuit 30 and the CS bus line driving circuit 40. Input signals to the CS circuit 41 are shift register outputs SRO1 and SRO2 corresponding to respective gate signals G1 and G2, a polarity signal CMI1, and a reset signal RESET. Input signals to the CS circuit 42 are shift register outputs SRO2 and SRO3 corresponding to respective gate signals G2 and G3, a polarity signal CMI2, and the reset signal RESET. Input signals to the CS circuit 43 are shift register outputs SRO3 and SRO4 corresponding to respective gate signals G3 and G4, the polarity signal CMI1, and the reset signal RESET. Input signals to the CS circuit 44 are shift register outputs SRO4 and SRO5 corresponding to respective gate signals G4 and G5, the polarity signal CMI1, and the reset signal RESET. As described above, each CS circuit receives a shift register output SROn in the corresponding nth row and a shift register output SROn+1 in the next row, and receives one of the polarity signals CMI1 and CMI2 regularly (from the nth row in the order of CMI1, CMI2, CMI1, CMI1, CMI2, and CMI1). The polarity signals CMI1 and CMI2 and the reset signal RESET are supplied from the control circuit 50.

Figure 34:
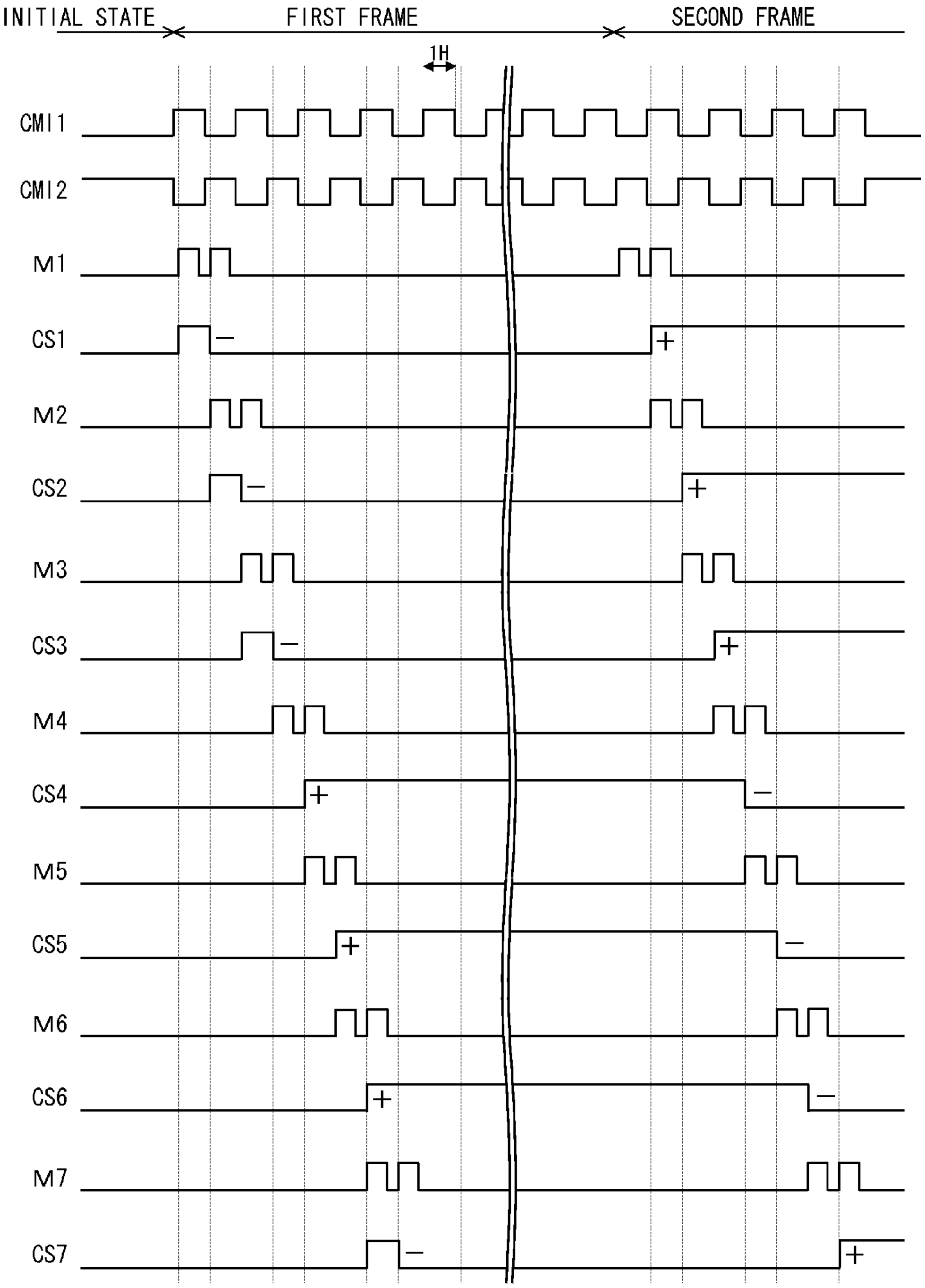
FIG. 34

In the following, for convenience of description, mainly the CS circuits 42, 43, and 44 corresponding to the second, third, and fourth rows, respectively, are taken as an example. FIG. 34 shows waveforms of various signals that are inputted to and outputted from the CS bus line driving circuit 40 of the liquid crystal display device 3 of Example 9.

First, the following describes changes in waveforms of various signals in the second row. During an initial state, the D latch circuit 42*a* of the CS circuit 42 receives the polarity signal CMI2 via its terminal D and receives the reset signal RESET via its reset terminal CL. The reset signal RESET causes the electric potential of the CS signal CS2 that the D latch circuit 42*a* outputs via its output terminal Q to be retained at a low level.

After that, the shift register output SRO2 corresponding to the gate signal G2 to be supplied to the gate line 12 in the second row is outputted from the shift register circuit SR2, and is inputted to one terminal of the OR circuit 42*b* of the CS circuit 42. Then, a change (from low to high) in electric potential of the shift register output SRO2 in the signal M2 is inputted to the clock terminal CK. Upon receiving the change (from low to high) in electric potential of the shift register output SRO2 via its clock terminal CK, the D latch circuit 42*a* transfers an input state of the polarity signal CMI2 that it received via its terminal D at the point in time, i.e., transfers a high level. That is, the electric potential of the CS signal CS2 is switched from a low level to a high level at a time when there is a change (from low to high) in electric potential of the shift register output SRO2. The D latch circuit 42*a* outputs the high level until there is a change (from high to low) in electric potential of the shift register output SRO2 in the signal M2 inputted to the clock terminal CK (i.e., during a period of time in which the signal M2 is at a high level). Then, upon receiving a change (from high to low) in electric potential of the shift register output SRO2 in the signal M2 via its clock terminal CK, the D latch circuit 42*a* latches an input state of the polarity signal CMI2 that it received at the point in time, i.e., latches a high level. After that, the D latch circuit 42*a* retains the high level until the signal M2 is raised to a high level.

Then, the shift register output SRO3 that has been shifted to the third row in the gate line driving circuit 30 is supplied to the other terminal of the OR circuit 42*b*. The shift register output SRO3 is supplied also to one terminal of the OR circuit 43*b* of the CS circuit 43.

The D latch circuit 42*a* receives a change (from low to high) in electric potential of the shift register output SRO3 in the signal M2 via its clock terminal CK, and transfers an input state of the polarity signal CMI2 that it received via its terminal D at the point in time, i.e., transfers a low level. That is, the electric potential of the CS signal CS2 is switched from a high level to a low level at a time when there is a change (from low to high) in electric potential of the shift register output SRO3. The D latch circuit 42*a* outputs the low level until there is a change (from high to low) in electric potential of the shift register output SRO3 in the signal M2 inputted to the clock terminal CK (i.e., during a period of time in which the signal M2 is at a high level). Next, upon receiving a change (from high to low) in electric potential of the shift register output SRO3 in the signal M2 via its clock terminal CK, the D latch circuit 42*a* latches an input state of the polarity signal CMI2 that it received at the point in time, i.e., latches a low level. After that, the D latch circuit 42*a* retains the low level until the signal M2 is raised to a high level in the second frame.

In the second frame, the D latch circuit 42*a* transfers an input state (low level) of the polarity signal CMI2 that it received via its data terminal D during a period of time in which the shift register output SRO2 in the signal M2 is at a high level, latches an input state (low level) of the polarity signal CMI2 that it received at a point in time where it receives a change (from high to low) in electric potential of the shift register output SRO2, and then retains the low level until the next time the signal M2 is raised to a high level.

Then, upon receiving a change (from low to high) in electric potential of the shift register output SRO3 via its clock terminal CK, the D latch circuit 42*a* transfers an input state of the polarity signal CMI2 that it received via its data terminal D at the point in time, i.e., transfers a high level. That is, the electric potential of the CS signal CS2 is switched from a low level to a high level at a time when there is a change (from low to high) in electric potential of the shift register output SRO3. The D latch circuit 42*a* outputs the high level until there is a change (from high to low) in electric potential of the shift register output SRO3 inputted to the clock terminal CK (i.e., during a period of time in which the signal M2 is at a high level). Then, upon receiving a change (from high to low) in electric potential of the shift register output SRO2 via its clock terminal CK, the D latch circuit 42*a* latches an input state of the polarity signal CMI2 at the point in time, i.e. latches a high level. After that, the D latch circuit 42*a* retains the high level until the signal M2 is raised to a high level in the third frame.

It should be noted that, in the first row, the polarity signal CMI1 is latched in accordance with the shift register outputs SRO1 and SRO2, thereby a CS signal CS1 shown in FIG. 34 is outputted.

Next, the following describes changes in waveforms of various signals in the third row. During the initial state, the D latch circuit 43*a* of the CS circuit 43 receives the polarity signal CMI1 via its terminal D and receives the reset signal RESET via its reset terminal CL. The reset signal RESET causes the electric potential of the CS signal CS3 that the D latch circuit 43*a* outputs via its output terminal Q to be retained at a low level.

After that, the shift register output SRO3 corresponding to the gate signal G3 to be supplied to the gate line 12 in the third row is outputted from the shift register circuit SR3, and is inputted to one terminal of the OR circuit 43*b* of the CS circuit 43. Then, a change (from low to high) in electric potential of the shift register output SRO3 in the signal M3 is inputted to the clock terminal CK. Upon receiving the change in electric potential of the shift register output SRO3 in the signal M3 via its clock terminal CK, the D latch circuit 43*a* transfers an input state of the polarity signal CMI1 that it received via its terminal D at the point in time, i.e., transfers a high level. That is, the electric potential of the CS signal CS3 is switched from a low level to a high level at a time when there is a change (from low to high) in electric potential of the shift register output SRO3. Then, the D latch circuit 43*a* outputs the high level until there is a change (from high to low) in electric potential of the shift register output SRO3 in the signal M3 inputted to the clock terminal CK (i.e., during a period of time in which the signal M3 is at a high level). Then, upon receiving a change (from high to low) in electric potential of the shift register output SRO3 in the signal M3 via its clock terminal CK, the D latch circuit 43*a* latches an input state of the polarity signal CMI1 that it received at the point in time, i.e., latches a high level. After that, the D latch circuit 43*a* retains the high level until the signal M3 is raised to a high level.

Then, the shift register output SRO4 that has been shifted to the fourth row in the gate line driving circuit 30 is supplied to the other terminal of the OR circuit 43*b*. The shift register output SRO4 is supplied also to one terminal of the OR circuit 43*b* of the CS circuit 43.

The D latch circuit 43*a* receives a change (from low to high) in electric potential of the shift register output SRO4 in the signal M3 via its clock terminal CK, and transfers an input state of the polarity signal CMI1 that it received via its terminal D at the point in time, i.e., transfers a low level. That is, the electric potential of the CS signal CS3 is switched from a high level to a low level at a time when there is a change (from low to high) in electric potential of the shift register output SRO4. The D latch circuit 43*a* outputs the low level until there is a change (from high to low) in electric potential of the shift register output SRO4 in the signal M3 inputted to the clock terminal CK (i.e., during a period of time in which the signal M3 is at a high level). Next, upon receiving a change (from high to low) in electric potential of the shift register output SRO4 in the signal M3 via its clock terminal CK, the D latch circuit 43*a* latches an input state of the polarity signal CMI1 that it received at the point in time, i.e., latches a low level. After that, the D latch circuit 43*a* retains the low level until the signal M3 is raised to a high level in the second frame.

In the second frame, the D latch circuit 43*a* transfers an input state (low level) of the polarity signal CMI1 that it received via its data terminal D during a period of time in which the shift register output SRO3 in the signal M3 is at a high level, latches an input state (low level) of the polarity signal CMI1 that it received at a point in time where it receives a change (from high to low) in electric potential of the shift register output SRO3, and then retains the low level until the next time when the signal M3 is raised to a high level.

Then, upon receiving a change (from low to high) in electric potential of the shift register output SRO4 via its clock terminal CK, the D latch circuit 43*a* transfers an input state of the polarity signal CMI1 that it received via its data terminal D at the point in time, i.e., transfers a high level. That is, the electric potential of the CS signal CS3 is switched from a low level to a high level at a time when there is a change (from low to high) in electric potential of the shift register output SRO3. The D latch circuit 43*a* outputs the high level until there is a change (from high to low) in electric potential of the shift register output SRO4 inputted to the clock terminal CK (i.e., during a period of time in which the signal M3 is at a high level). Then, upon receiving a change (from high to low) in electric potential of the shift register output SRO3 via its clock terminal CK, the D latch circuit 43*a* latches an input state of the polarity signal CMI1 at the point in time, i.e., latches a high level. After that, the D latch circuit 43*a* retains the high level until the signal M3 is raised to a high level in the third frame.

Next, the following describes changes in waveforms of various signals in the fourth row. During the initial state, the D latch circuit 44*a* of the CS circuit 44 receives the polarity signal CMI1 via its data terminal D and receives the reset signal RESET via its reset terminal CL. The reset signal RESET causes the electric potential of the CS signal CS4 that the D latch circuit 44*a* outputs via its output terminal Q to be retained at a low level.

After that, the shift register output SRO4 in the fourth row is outputted from the shift register circuit SR4, and is inputted to one terminal of the OR circuit 44*b* of the CS circuit 44. Then, a change (from low to high) in electric potential of the shift register output SRO4 in the signal M4 is inputted to the clock terminal CK. Upon receiving the change in electric potential of the shift register output SRO4 in the signal M4 via its clock terminal CK, the D latch circuit 44*a* transfers an input state of the polarity signal CMI1 that it received via its data terminal D at the point in time, i.e., transfers a low level. Then, the D latch circuit 44*a* outputs the low level until the next time when there is a change (from high to low) in electric potential of the shift register output SRO4 in the signal M4 inputted to the clock terminal CK (i.e., during a period of time in which the signal M4 is at a high level). Then, upon receiving a change (from high to low) in electric potential of the shift register output SRO4 in the signal M4 via its clock terminal CK, the D latch circuit 44*a* latches an input state of the polarity signal CMI1 that it received at the point in time, i.e., latches a low level. After that, the D latch circuit 44*a* retains the low level until the signal M4 is raised to a high level.

Then, the shift register output SRO5 that has been shifted to the fifth row in the gate line driving circuit 30 is supplied to the other terminal of the OR circuit 44*b*. The shift register output SRO5 is supplied also to one terminal of the OR circuit 45*b* of the CS circuit 45.

The D latch circuit 44*a* receives a change (from low to high) in electric potential of the shift register output SRO5 in the signal M4 via its clock terminal CK, and transfers an input state of the polarity signal CMI1 that it received via its terminal D at the point in time, i.e., transfers a high level. That is, the electric potential of the CS signal CS4 is switched from a low level to a high level at a time when there is a change (from low to high) in electric potential of the shift register output SRO5. The D latch circuit 44*a* outputs the high level until the next time when there is a change (from high to low) in electric potential of the shift register output SRO5 in the signal M4 inputted to the clock terminal CK (i.e., during a period of time in which the signal M4 is at a high level). Next, upon receiving a change (from high to low) in electric potential of the shift register output SRO5 in the signal M4 via its clock terminal CK, the D latch circuit 44*a* latches an input state of the polarity signal CMI1 that it received at the point in time, i.e., latches a high level. After that, the D latch circuit 44*a* retains the high level until the signal M4 is raised to a high level in the second frame.

In the second frame, the D latch circuit 44*a* transfers an input state (high level) of the polarity signal CMI1 that it received via its data terminal D during a period of time in which the shift register output SRO4 in the signal M4 is at a high level, latches an input state (high level) of the polarity signal CMI2 that it received at a point in time where it received a change (from high to low) in electric potential of the shift register output SRO4, and then retains the high level until the next time when the signal M4 is raised to a high level.

The D latch circuit 44*a* receives a change (from low to high) in electric potential of the shift register output SRO5 via its clock terminal CK, and transfers an input state of the polarity signal CMI1 that it received via its data terminal D at the point in time, i.e., transfers a low level. That is, the electric potential of the CS signal CS4 is switched from a high level to a low level at a time when there is a change (from low to high) in electric potential of the shift register output SRO5.

The D latch circuit 44*a* outputs the low level until there is a change (from high to low) in electric potential of the shift register output SRO5 inputted to the clock terminal CK (i.e., during a period of time in which the signal M4 is at a high level). Next, upon receiving a change (from high to low) in electric potential of the shift register output SRO5 via its clock terminal CK, the D latch circuit 44*a* latches an input state of the polarity signal CMI1 that it received at the point in time, i.e., latches a low level. After that, the D latch circuit 44*a* retains the low level until the signal M4 is raised to a high level in the third frame.

It should be noted that, in the fifth row, the polarity signal CMI2 is latched in accordance with the shift register outputs SRO5 and SRO6, thereby a CS signal CS5 shown in FIG. 34 is outputted.

As has been described, according to Example 9, 3H inversion driving can be carried out by adjusting, in the liquid crystal display device 3 configured as shown in FIG. 33, relations between the polarity signals CMI1 and CMI2 and the CS circuits. This allows the CS bus line driving circuit 40 to operate properly even in the liquid crystal display device 3 that employs triple-size display driving. Accordingly, it is possible to eliminate irregular waveforms that cause transverse stripes. This makes it possible to eliminate the appearance of alternate bright and dark transverse stripes in a display picture, and thus possible to improve display quality.

Figure 35:
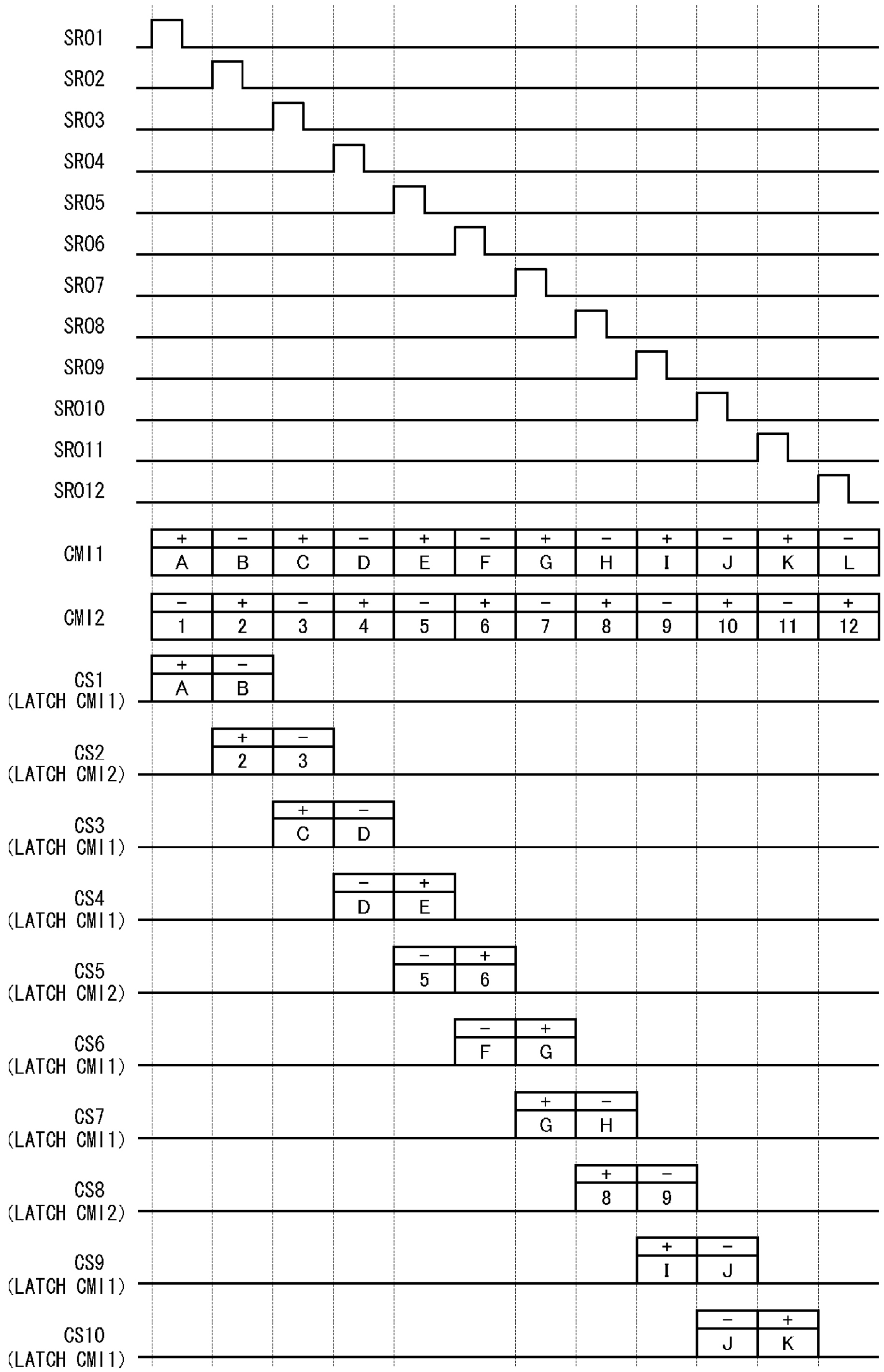
FIG. 35

The following description discusses how the polarity signals CMI1 and CMI2 supplied to the CS circuits 4*n* are related to the shift register outputs SROn. FIG. 35 shows relations between (i) the polarity signal CMI1 (or CMI2) and the shift register outputs SROn which are inputted to the CS circuits 4*n* and (ii) the CS signals CSn outputted from the CS circuits 4*n*.

As to the CMI1 shown in FIG. 35, each of the signs A to L corresponds to a single horizontal scanning period, and indicates a polarity (positive polarity or negative polarity) during that horizontal scanning period. For example, the CMI1 has a negative polarity during the second horizontal scanning period "B", has a positive polarity during the third horizontal scanning period "C", has a negative polarity during the fourth horizontal scanning period "D", and has a positive polarity during the fifth horizontal scanning period "E". As to the CMI2, each of the signs 1 to 12 corresponds to a single horizontal scanning period, and indicates a polarity during that horizontal scanning period. For example, the CMI2 has a negative polarity during the first horizontal scanning period "1", has a positive polarity during the second horizontal scanning period "2", has a negative polarity during the third horizontal scanning period "3", and has a positive polarity during the fourth horizontal scanning period "4". In this way, the CMI1 and the CMI2 reverse their polarities every one horizontal scanning period, and their polarities are reverse to each other. Moreover, each of the CS circuits receives one of the polarity signals CMI1 and CMI2 regularly (the CS circuit 41 receives the CMI1, the CS circuit 42 receives the CMI2, the CS circuit 43 receives the CMI1, the CS circuit 44 receives the CMI1, the CS circuit 45 receives the CMI2, and the CS circuit 46 receives the CMI1). The CS circuit 4*n* receives, via its clock terminal CK, a shift register output SROn in the nth row and a shift register output SROn+1 in the next (n+1)th row. This causes the CS circuit 4*n* to latch (i) a CMI that the CS circuit 4*n* receives via its data terminal D during the nth horizontal scanning period and (ii) a CMI signal that the CS circuit 4*n* receives via its data terminal D during the (n+1)th horizontal scanning period. For example, the CS circuit 41 loads a positive polarity of "A" of the CMI1 during the first horizontal scanning period, and loads a negative polarity of "B" of the CMI1 during the second horizontal scanning period. The CS circuit 42 loads a positive polarity of "2" of the CMI2 during the second horizontal scanning period, and loads a negative polarity of "3" of the CMI2 during the third horizontal scanning period. The CS circuit 43 loads a positive polarity of "C" of the CMI1 during the third horizontal scanning period, and loads a negative polarity of "D" of the CMI1 during the fourth horizontal scanning period. The CS circuit 44 loads a negative polarity of "D" of the CMI1 during the fourth horizontal scanning period, and loads a positive polarity of "E" of the CMI1 during the fifth horizontal scanning period. In this way, the CS signals CSn as shown in FIGS. 32 and 34 are outputted.

As has been described in Examples 8 and 9, by using the two polarity signals CMI1, CMI2 having different phases from each other, 2H inversion driving and 3H inversion driving can be carried out. Similarly, 4H, . . . , nH (n-line) inversion driving can be realized by adjusting relations between the polarity signals CMI1 and CMI2 and the CS circuits 4*n*. This allows carrying out double-size display driving and the triple-size display driving. Similarly, quadruple-size, . . . , n-fold-size display driving can be realized by adjusting timings at which the polarity signals CMI1 and CMI2 reverse their polarities.

Example 10

Figure 37:
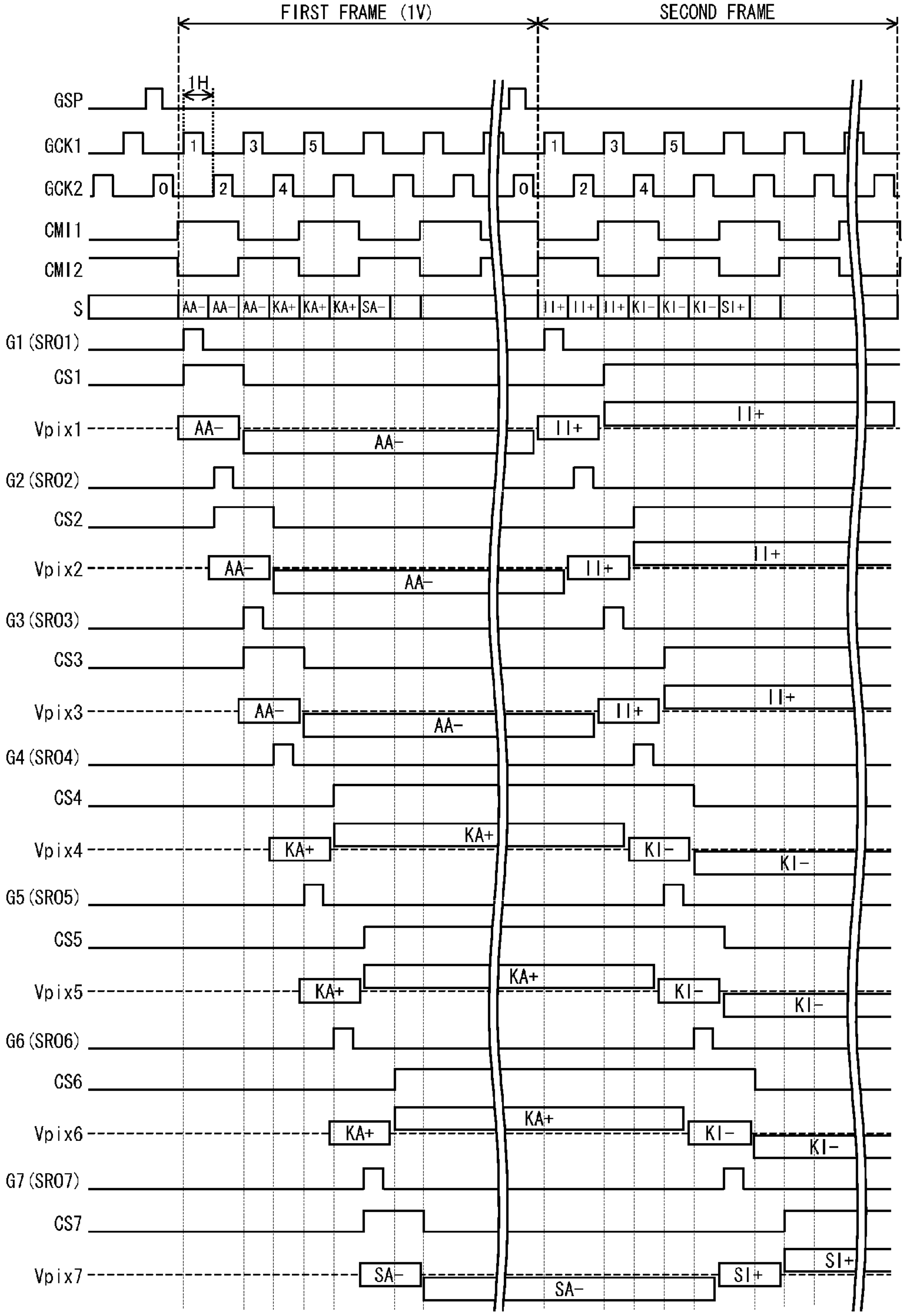
FIG. 37

Another liquid crystal display device 3 which carries out 3-line (3H) inversion driving is described below. FIG. 37 is a timing chart showing waveforms of various signals in the another liquid crystal display device 3. Note that in FIG. 37, the polarity signals CMI1 and CMI2 are set so that the polarity signals CMI1 and CMI2 reverse their polarities every two horizontal scanning periods (2H) and the polarity signals CMI1 and CMI2 are reverse to each other in their polarity.

As shown in FIG. 37, during the initial state, the CS signals CS1 to CS7 are all fixed at one electric potential (in FIG. 37, at a low level). In the first frame, the CS signal CS1 in the first row is at a high level at a point in time where the corresponding gate signal G1 falls, the CS signal CS2 in the second row is at a high level at a point in time where the corresponding gate signal G2 falls, and the CS signal CS3 in the third row is at a high level at a point in time where the corresponding gate signal G3 falls. In contrast, the CS signal CS4 in the fourth row is at a low level at a point in time where the corresponding gate signal G4 falls, the CS signal CS5 in the fifth row is at a low level at a point in time where the corresponding gate signal G5 falls, and the CS signal CS6 in the sixth row is at a low level when the corresponding gate signal G6 falls. The CS signal CS7 in the seventh row is at a high level at a point in time where the corresponding gate signal G7 falls.

It should be noted here that the source signal S is a signal which has amplitude corresponding to a gray scale represented by a video signal and reverses its polarity every 3H periods. The source signal S has the same electric potential during three adjacent horizontal scanning periods (3H) and has the same electric potential in next three adjacent horizontal scanning periods (3H). That is, each of the reference signs "AA" to "SA" shown in FIG. 37 corresponds to a single horizontal scanning period, and indicates a signal potential (gray scale) during that horizontal scanning period. For example, the source signal S in the first frame exhibits identical signal potentials (gray scale) of a negative polarity ("AA") during the first, second, and third horizontal scanning periods, and exhibits identical signal potentials of a positive polarity ("KA") during the fourth, fifth and sixth horizontal scanning periods. Further, the source signal S in the second frame exhibits identical signal potentials of a positive polarity ("II") during the first, second, and third horizontal scanning periods, and exhibits identical signal potentials of a negative polarity ("KI") during the fourth, fifth and sixth horizontal scanning periods. Meanwhile, the gate signals G1 to G7 serve as gate-on potentials during the first to seventh 1H periods, respectively, in an active period (effective scanning period) of each frame, and serve as gate-off potentials during the other periods.

Then, the CS signals CS1 to CS7 switch between high and low electric potential levels after their corresponding gate signals G1 to G7 fall. Specifically, in the first frame, the CS signals CS1, CS2, and CS3 fall after their corresponding gate signals G1, G2, and G3 fall, respectively, and the CS signals CS4, CS5, and CS6 rise after their corresponding gate signals G4, G5, and G6 fall, respectively. It should be noted that in the second frame, this relationship is reversed, i.e., the CS signals CS1, CS2, and CS3 rise after their corresponding gate signals G1, G2, and G3 fall, respectively, and the CS signals CS4, CS5, and CS6 fall after their corresponding gate signals G4, G5, and fall, respectively.

This eliminates appearance of alternate bright and dark transverse stripes in a display picture, and makes it possible to improve display quality.

A specific configuration of the gate line driving circuit 30 and the CS bus line driving circuit 40 for achieving the aforementioned control is described here.

Figure 36:
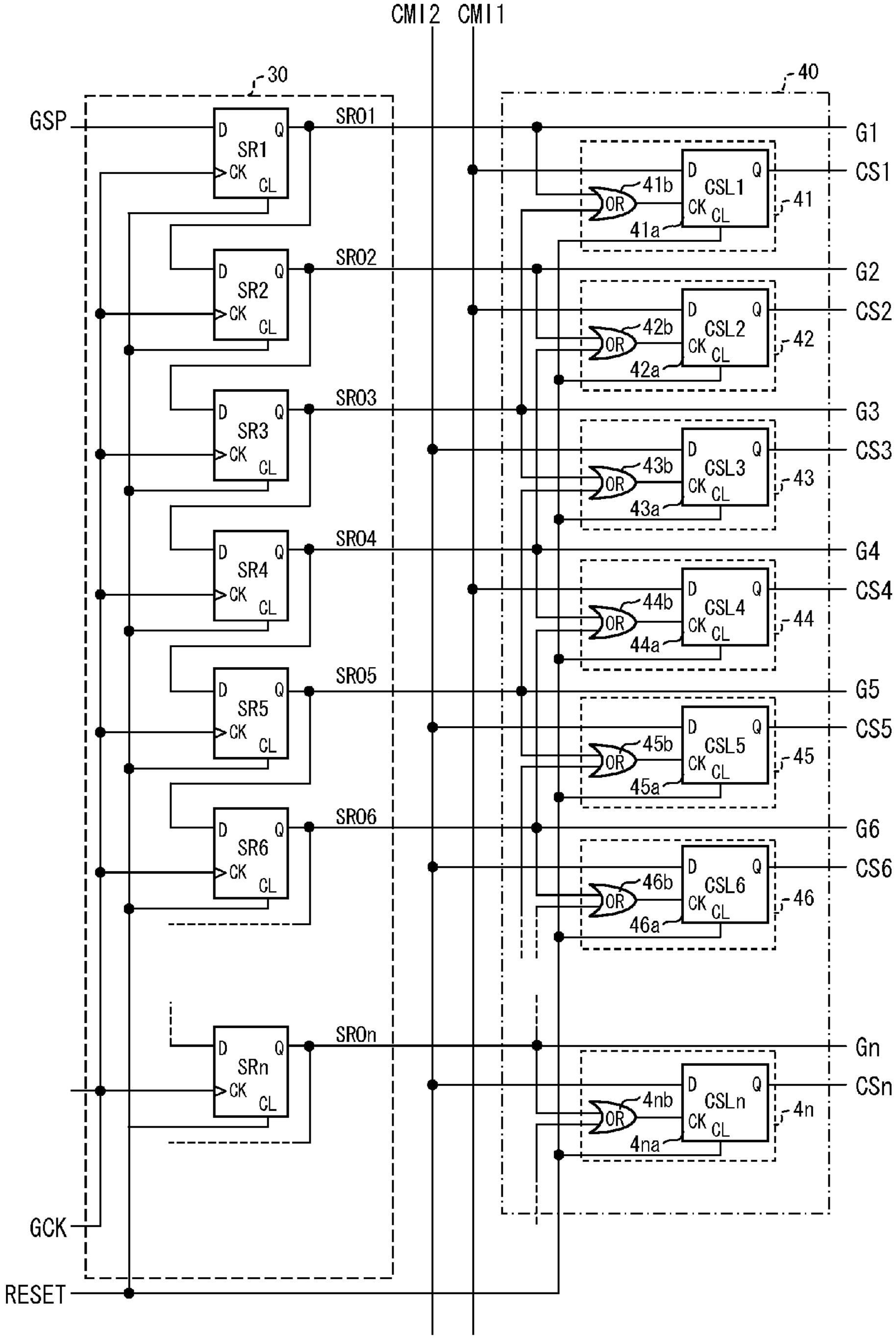
FIG. 36

FIG. 36 shows a configuration of the gate line driving circuit 30 and the CS bus line driving circuit 40. Each of the CS circuits receives a shift register output SROn in the corresponding nth row and a shift register output SROn+2 in the (n+2)th row, and receives the polarity signal CMI1 or CMI2.

Figure 38:
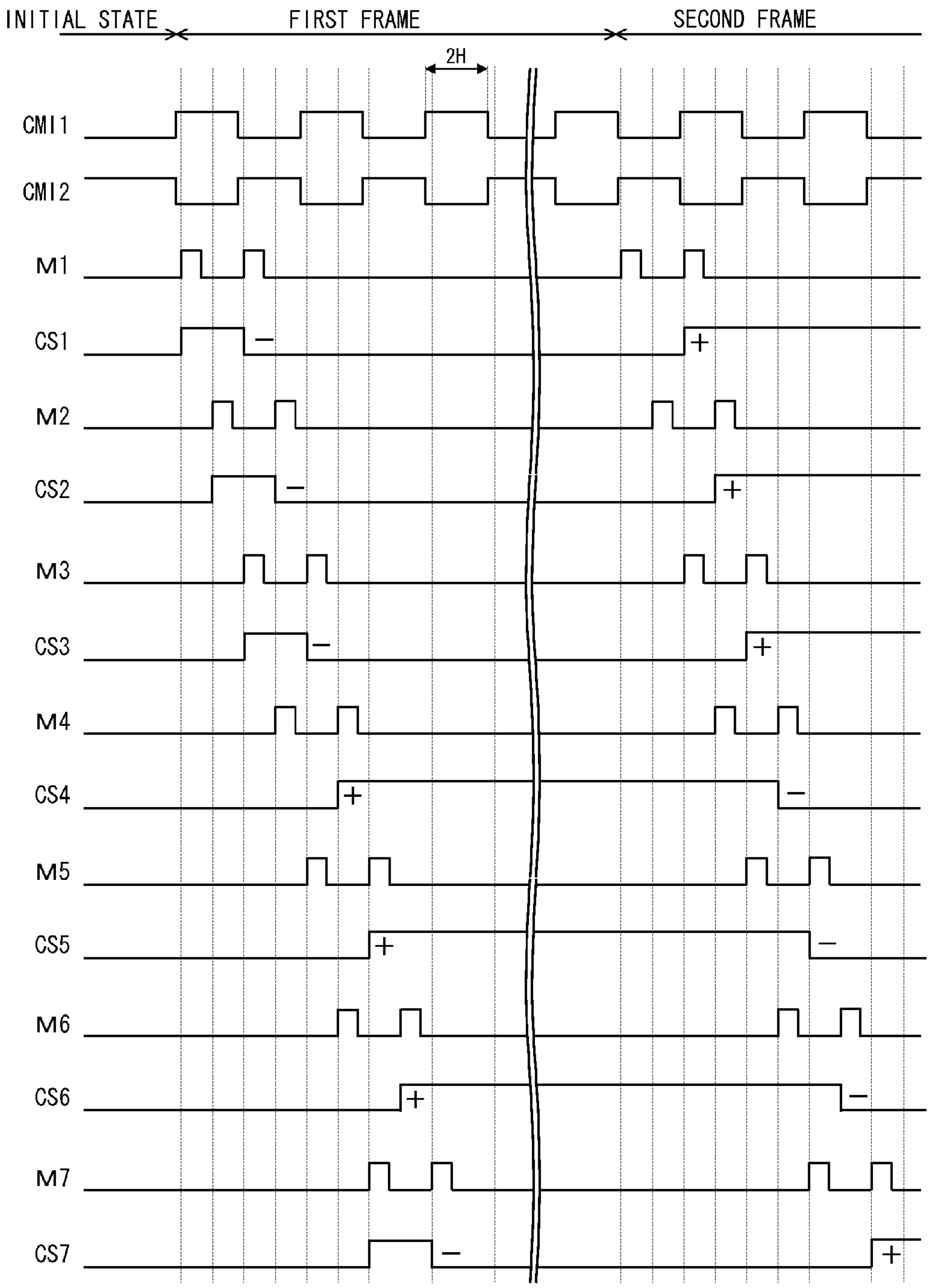
FIG. 38

The following description discusses 3H inversion driving with reference to FIGS. 37 and 38. In the following, descriptions of connections in the gate line driving circuit 30 and the CS bus line driving circuit 40 are omitted. FIG. 38 shows waveforms of various signals that are inputted to and outputted from the CS bus line driving circuit 40 of the liquid crystal display device 3 of Example 10. In the following, for convenience of description, operations in the first frame are explained by taking as an example the CS circuits 42, 43, and 44 corresponding to the second to fourth rows, respectively.

First, the following describes changes in waveforms of various signals in the second row. During an initial state, the D latch circuit 42*a* of the CS circuit 42 receives the polarity signal CMI1 via its terminal D and receives the reset signal RESET via its reset terminal CL. The reset signal RESET causes the electric potential of the CS signal CS2 that the D latch circuit 42*a* outputs via its output terminal Q to be retained at a low level.

After that, the shift register output SRO2 corresponding to the gate signal G2 to be supplied to the gate line 12 in the second row is outputted from the shift register circuit SR2, and is inputted to one terminal of the OR circuit 42*b* of the CS circuit 42. Then, a change (from low to high) in electric potential of the shift register output SRO2 in the signal M2 is inputted to the clock terminal CK. Upon receiving the change (from low to high) in electric potential of the shift register output SRO2 via its clock terminal CK, the D latch circuit 42*a* transfers an input state of the polarity signal CMI1 that it received via its data terminal D at the point in time, i.e., transfers a high level. That is, the electric potential of the CS signal CS2 is switched from a low level to a high level at a time when there is a change (from low to high) in electric potential of the shift register output SRO2. The D latch circuit 42*a* outputs the high level until there is a change (from high to low) in electric potential of the shift register output SRO2 in the signal M2 inputted to the clock terminal CK (i.e., during a period of time in which the signal M2 is at a high level). Then, upon receiving a change (from high to low) in electric potential of the shift register output SRO2 in the signal M2 via its clock terminal CK, the D latch circuit 42*a* latches an input state of the polarity signal CMI1 that it received at the point in time, i.e., latches a high level. After that, the D latch circuit 42*a* retains the high level until the signal M2 is raised to a high level.

Then, the shift register output SRO4 that has been shifted to the fourth row in the gate line driving circuit 30 is supplied to the other terminal of the OR circuit 42*b*. The shift register output SRO4 is supplied also to one terminal of the OR circuit 44*b* of the CS circuit 44.

The D latch circuit 42*a* receives a change (from low to high) in electric potential of the shift register output SRO4 in the signal M2 via its clock terminal CK, and transfers an input state of the polarity signal CMI1 that it received via its terminal D at the point in time, i.e., transfers a low level. That is, the electric potential of the CS signal CS2 is switched from a high level to a low level at a time when there is a change (from low to high) in electric potential of the shift register output SRO4. The D latch circuit 42*a* outputs the low level until there is a change (from high to low) in electric potential of the shift register output SRO4 in the signal M2 inputted to the clock terminal CK (i.e., during a period of time in which the signal M2 is at a high level). Next, upon receiving a change (from high to low) in electric potential of the shift register output SRO4 in the signal M2 via its clock terminal CK, the D latch circuit 42*a* latches an input state of the polarity signal CMI1 that it received at the point in time, i.e., latches a low level. After that, the D latch circuit 42*a* retains the low level until the signal M2 is raised to a high level in the second frame.

Note that, in the first row, the polarity signal CMI1 is latched in accordance with the shift register outputs SRO1 and SRO3, thereby a CS signal CS1 shown in FIG. 38 is outputted.

Next, the following describes changes in waveforms of various signals in the third row. During the initial state, the D latch circuit 43*a* of the CS circuit 43 receives the polarity signal CMI2 via its terminal D and receives the reset signal RESET via its reset terminal CL. The reset signal RESET causes the electric potential of the CS signal CS3 that the D latch circuit 43*a* outputs via its output terminal Q to be retained at a low level.

After that, the shift register output SRO3 corresponding to the gate signal G3 to be supplied to the gate line 12 in the third row is outputted from the shift register circuit SR3, and is inputted to one terminal of the OR circuit 43*b* of the CS circuit 43. Then, a change (from low to high) in electric potential of the shift register output SRO3 in the signal M3 is inputted to the clock terminal CK. Upon receiving the change in electric potential of the shift register output SRO3 in the signal M3, the D latch circuit 43*a* transfers an input state of the polarity signal CMI2 that it received via its terminal D at the point in time, i.e., transfers a high level. That is, the electric potential of the CS signal CS3 is switched from a low level to a high level at a time when there is a change (from low to high) in electric potential of the shift register output SRO3. Then, the D latch circuit 43*a* outputs the high level until the next time when there is a change (from high to low) in electric potential of the shift register output SRO3 in the signal M3 inputted to the clock terminal CK (i.e., during a period of time in which the signal M3 is at a high level). Then, upon receiving a change (from high to low) in electric potential of the shift register output SRO3 in the signal M3 via its clock terminal CK, the D latch circuit 43*a* latches an input state of the polarity signal CMI2 that it received at the point in time, i.e., latches a high level. After that, the D latch circuit 43*a* retains the high level until the signal M3 is raised to a high level.

Then, the shift register output SRO5 which has been shifted to the fifth row in the gate line driving circuit 30 is supplied to the other terminal of the OR circuit 43*b*. Note that the shift register output SRO5 is also supplied to one terminal of the OR circuit 45*b* of the CS circuit 45.

The D latch circuit 43*a* receives a change (from low to high) in electric potential of the shift register output SRO5 in the signal M3 via its clock terminal CK, and transfers an input state of the polarity signal CMI2 that it received via its terminal D at the point in time, i.e., transfers a low level. That is, the electric potential of the CS signal CS3 is switched from a high level to a low level at a time when there is a change (from low to high) in electric potential of the shift register output SRO5. The D latch circuit 43*a* outputs the low level until there is a change (from high to low) in electric potential of the shift register output SRO5 in the signal M3 inputted to the clock terminal CK (i.e., during a period of time in which the signal M3 is at a high level). Next, upon receiving a change (from high to low) in electric potential of the shift register output SRO5 in the signal M3 via its clock terminal CK, the D latch circuit 43*a* latches an input state of the polarity signal CMI2 that it received at the point in time, i.e., latches a low level. After that, the D latch circuit 43*a* retains the low level until the signal M3 is raised to a high level in the second frame.

Next, the following describes changes in waveforms of various signals in the fourth row. During the initial state, the D latch circuit 44*a* of the CS circuit 44 receives the polarity signal CMI1 via its terminal D and receives the reset signal RESET via its reset terminal CL. The reset signal RESET causes the electric potential of the CS signal CS4 that the D latch circuit 44*a* outputs via its output terminal Q to be retained at a low level.

After that, the shift register output SRO4 in the fourth row is outputted from the shift register circuit SR4, and is inputted to one terminal of the OR circuit 44*b* of the CS circuit 44. Then, a change (from low to high) in electric potential of the shift register output SRO4 in the signal M4 is inputted to the clock terminal CK. Upon receiving the change in electric potential of the shift register output SRO4 in the signal M4, the D latch circuit 44*a* transfers an input state of the polarity signal CMI1 that it received via its terminal D at the point in time, i.e., transfers a low level. Then, the D latch circuit 44*a* outputs the low level until the next time when there is a change (from high to low) in electric potential of the shift register output SRO4 in the signal M4 inputted to the clock terminal CK (i.e., during a period of time in which the signal M4 is at a high level). Then, upon receiving a change (from high to low) in electric potential of the shift register output SRO4 in the signal M4 via its clock terminal CK, the D latch circuit 44*a* latches an input state of the polarity signal CMI1 that it received at the point in time, i.e., latches a low level. After that, the D latch circuit 44*a* retains the low level until the signal M4 is raised to a high level.

Then, the shift register output SRO6 which has been shifted to the sixth row in the gate line driving circuit 30 is supplied to the other terminal of the OR circuit 44*b*. Note that the shift register output SRO6 is also supplied to one terminal of the OR circuit 46*b* of the CS circuit 46.

The D latch circuit 44*a* receives a change (from low to high) in electric potential of the shift register output SRO6 in the signal M4 via its clock terminal CK, and transfers an input state of the polarity signal CMI1 that it received via its terminal D at the point in time, i.e., transfers a high level. That is, the electric potential of the CS signal CS4 is switched from a low level to a high level at a time when there is a change (from low to high) in electric potential of the shift register output SRO6. The D latch circuit 44*a* outputs the high level until there is a change (from high to low) in electric potential of the shift register output SRO6 in the signal M4 inputted to the clock terminal CK (i.e., during a period of time in which the signal M4 is at a high level). Next, upon receiving a change (from high to low) in electric potential of the shift register output SRO6 in the signal M4 via its clock terminal CK, the D latch circuit 44*a* latches an input state of the polarity signal CMI1 that it received at the point in time, i.e., latches a high level. After that, the D latch circuit 44*a* retains the high level until the signal M4 is raised to a high level in the second frame.

Note that, in the fifth row, the polarity signal CMI2 is latched in accordance with the shift register outputs SRO5 and SRO7, thereby a CS signal CS5 shown in FIG. 38 is outputted.

This allows the CS bus line driving circuit 40 to operate properly even in the liquid crystal display device 3 that employs triple-size display driving. Accordingly, it is possible to eliminate irregular waveforms that cause transverse stripes. This makes it possible to eliminate the appearance of alternate bright and dark transverse stripes in a display picture, and thus possible to improve display quality.

Figure 39:
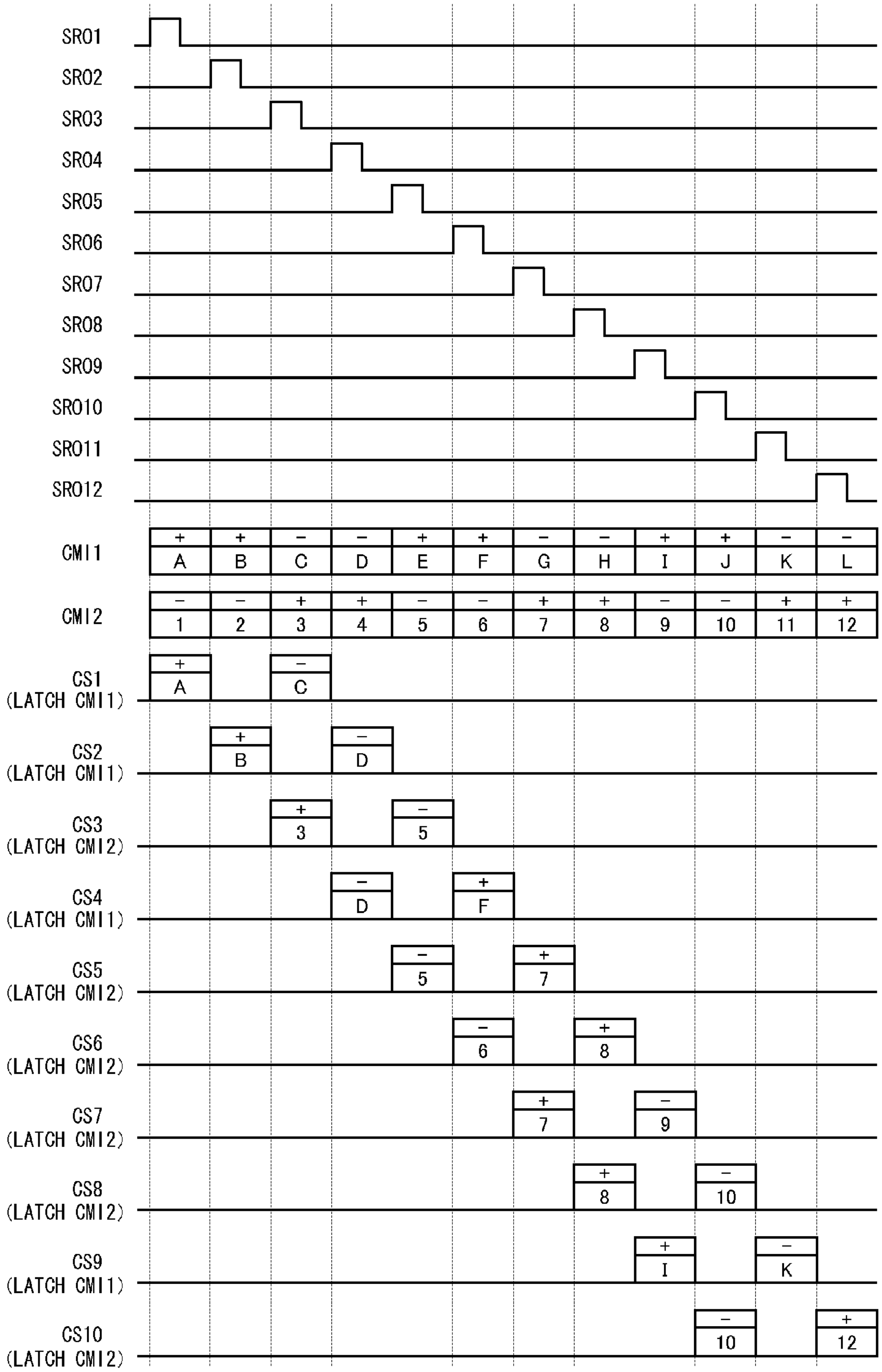
FIG. 39

The following description discusses how the polarity signals CMI1 and CMI2 supplied to the CS circuits 4*n* are related to the shift register outputs SROn. FIG. 39 shows relations between (i) the polarity signal CMI1 (or CMI2) and the shift register outputs SROn which are inputted to the CS circuits 4*n* and (ii) the CS signals CSn outputted from the CS circuits 4*n*.

As to the CMI1 shown in FIG. 39, each of the signs A to L corresponds to a single horizontal scanning period, and indicates a polarity during that horizontal scanning period. For example, the CMI1 has a positive polarity during the second horizontal scanning period "B", has a negative polarity during the third horizontal scanning period "C", has a negative polarity during the fourth horizontal scanning period "D", and has a positive polarity during the fifth horizontal scanning period "E". As to the CMI2, each of the signs 1 to 12 corresponds to a single horizontal scanning period, and indicates a polarity during that horizontal scanning period. For example, the CMI2 has a negative polarity during the first horizontal scanning period "1", has a negative polarity during the second horizontal scanning period "2", has a positive polarity during the third horizontal scanning period "3", and has a positive polarity during the fourth horizontal scanning period "4". Each of the CS circuits 4*n* receives one of the polarity signals CMI1 and CMI2 in accordance with a given rule.

The CS circuit 4*n* receives, via its clock terminal CK, a shift register output SROn in the nth row and a shift register output SROn+2 in the (n+2)th row. This causes the CS circuit 4*n* to latch (i) a CMI that the CS circuit 4*n* receives via its data terminal D during the nth horizontal scanning period and (ii) a CMI that the CS circuit 4*n* receives via its data terminal D during the (n+2)th horizontal scanning period. For example, the CS circuit 41 loads a positive polarity of "A" of the CMI1 during the first horizontal scanning period, and loads a negative polarity of "C" of the CMI1 during the third horizontal scanning period. The CS circuit 42 loads a positive polarity of "B" of the CMI1 during the second horizontal scanning period, and loads a negative polarity of "D" of the CMI1 during the fourth horizontal scanning period. The CS circuit 43 loads a positive polarity of "3" of the CMI2 during the third horizontal scanning period, and loads a negative polarity of "5" of the CMI2 during the fifth horizontal scanning period. The CS circuit 44 loads a negative polarity of "D" of the CMI1 during the fourth horizontal scanning period, and loads a positive polarity of "F" of the CMI1 during the sixth horizontal scanning period. In this way, the CS signals CSn as shown in FIGS. 37 and 38 are outputted.

Example 11

The liquid crystal display device 3 that is described in Example 8 and employs double-size display driving may be arranged as below. Namely, the arrangement is such that a CS circuit 4*n* in the nth row receives a shift register output SROn of the corresponding nth row and a shift register output SROn+3 in the (n+3)th row.

Figure 40:
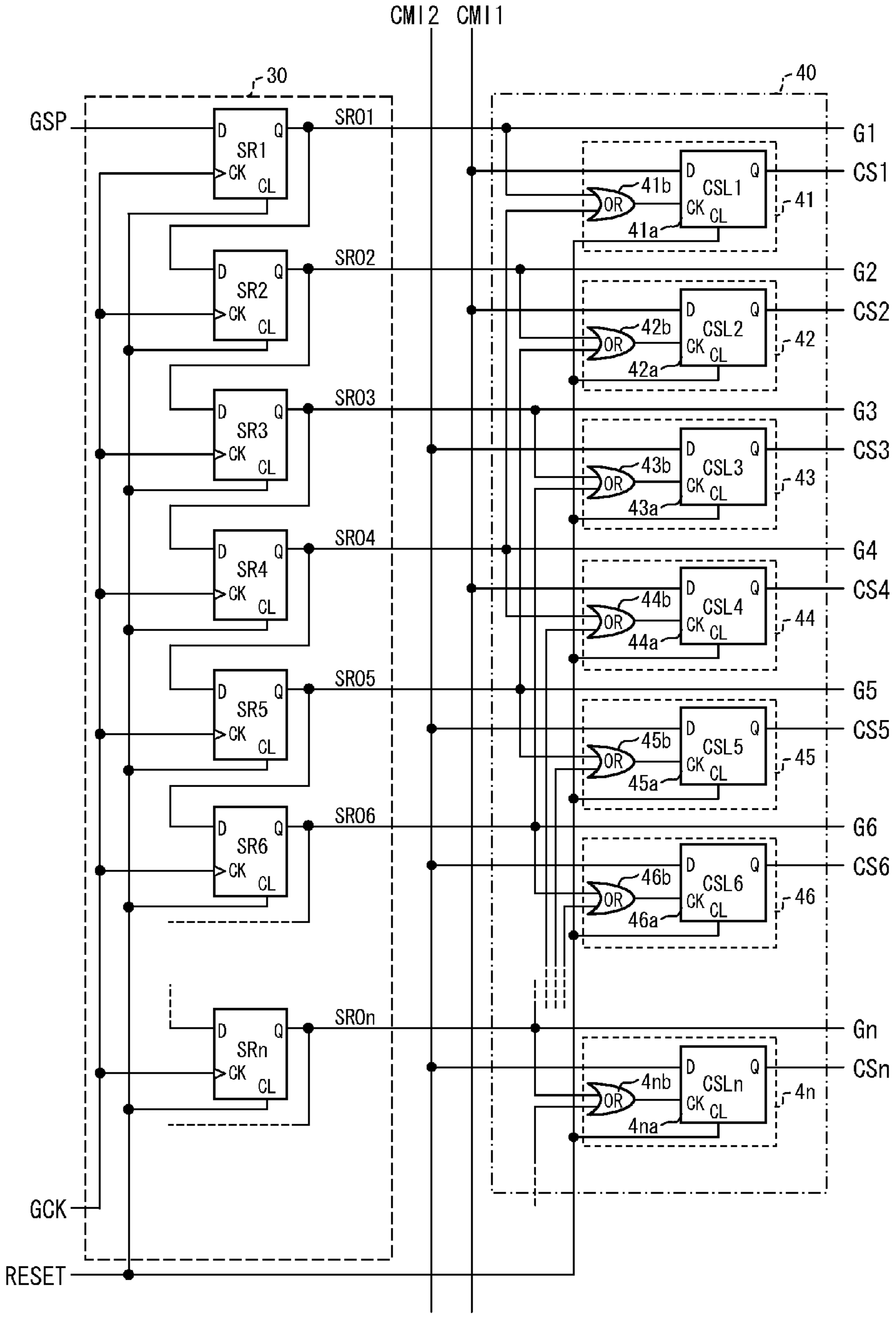
FIG. 40

FIG. 40 shows a configuration of the gate line driving circuit 30 and the CS bus line driving circuit 40. For example, the OR circuit 42*b* of the CS circuit 42 receives the shift register output SRO2 and the shift register output SRO5 in the fifth row, and the D latch circuit 42*a* of the CS circuit 42 receives the polarity signal CMI1 via its terminal D. The OR circuit 43*b* of the CS circuit 43 receives the shift register output SRO3 and the shift register output SRO6 in the sixth row, and the D latch circuit 43*a* of the CS circuit 43 receives the polarity signal CMI2 via its terminal D.

Figure 41:
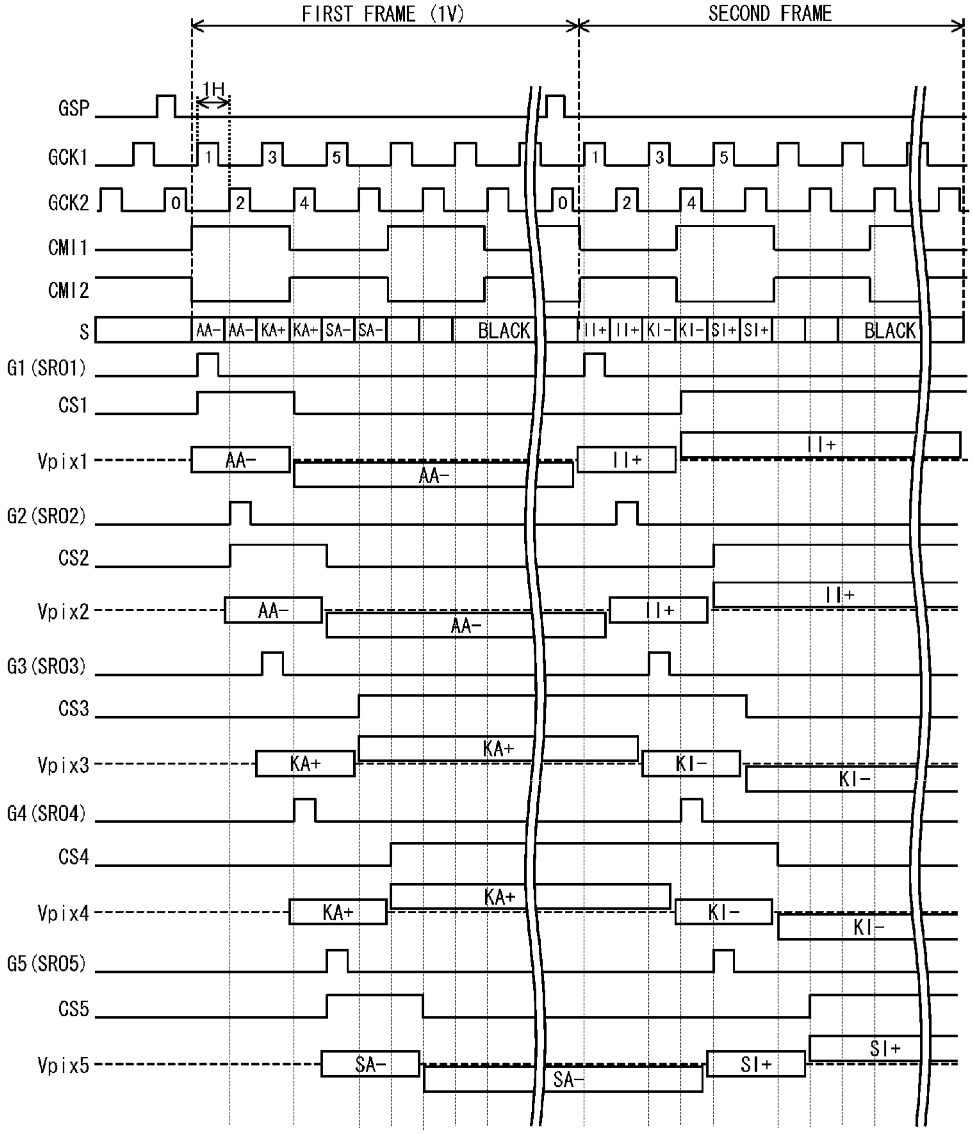
FIG. 41

FIG. 41 is a timing chart showing waveforms of various signals in the liquid crystal display device 3 that has such an arrangement and employs double-size display driving. Note that the polarity signals CMI1 and CMI2 are set so that the polarity signals CMI1 and CMI2 reverse their polarities every two horizontal scanning periods (2H) and the polarity signals CMI1 and CMI2 are reverse to each other in their polarity.

Figure 42:
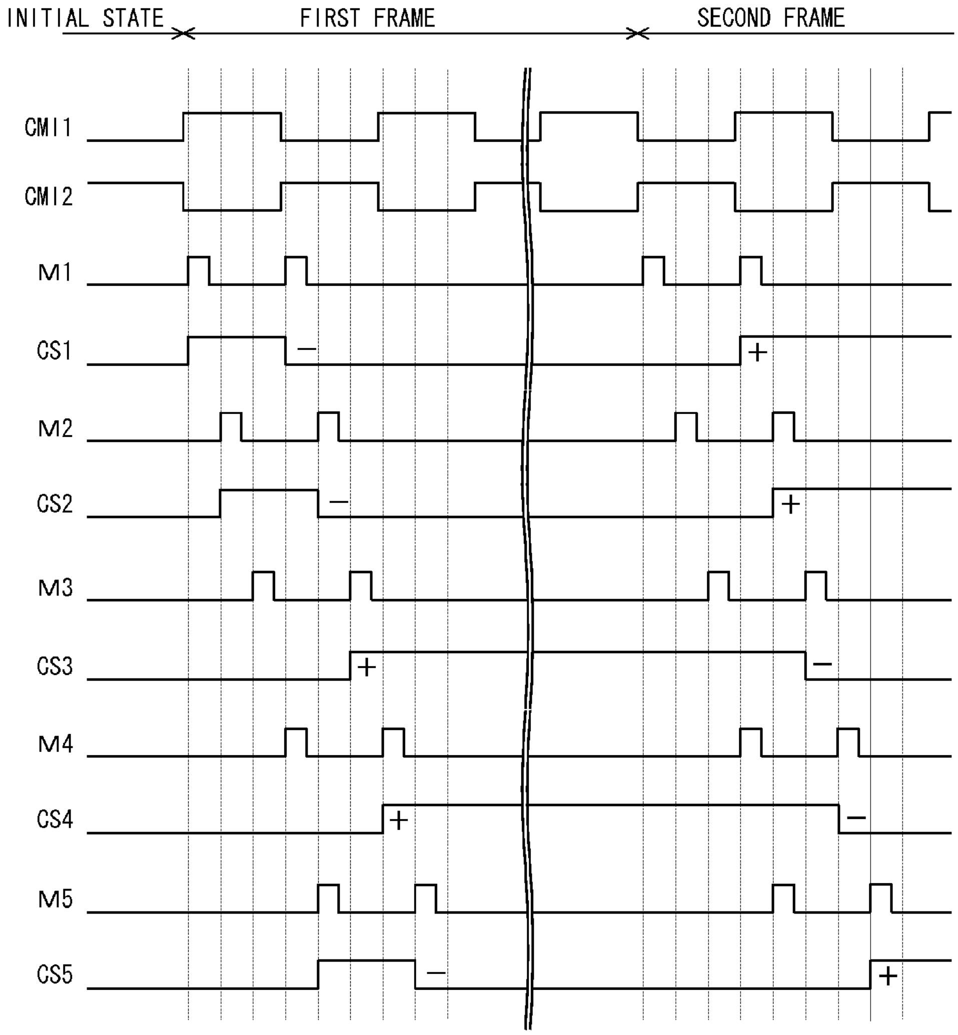
FIG. 42
Figure 43:
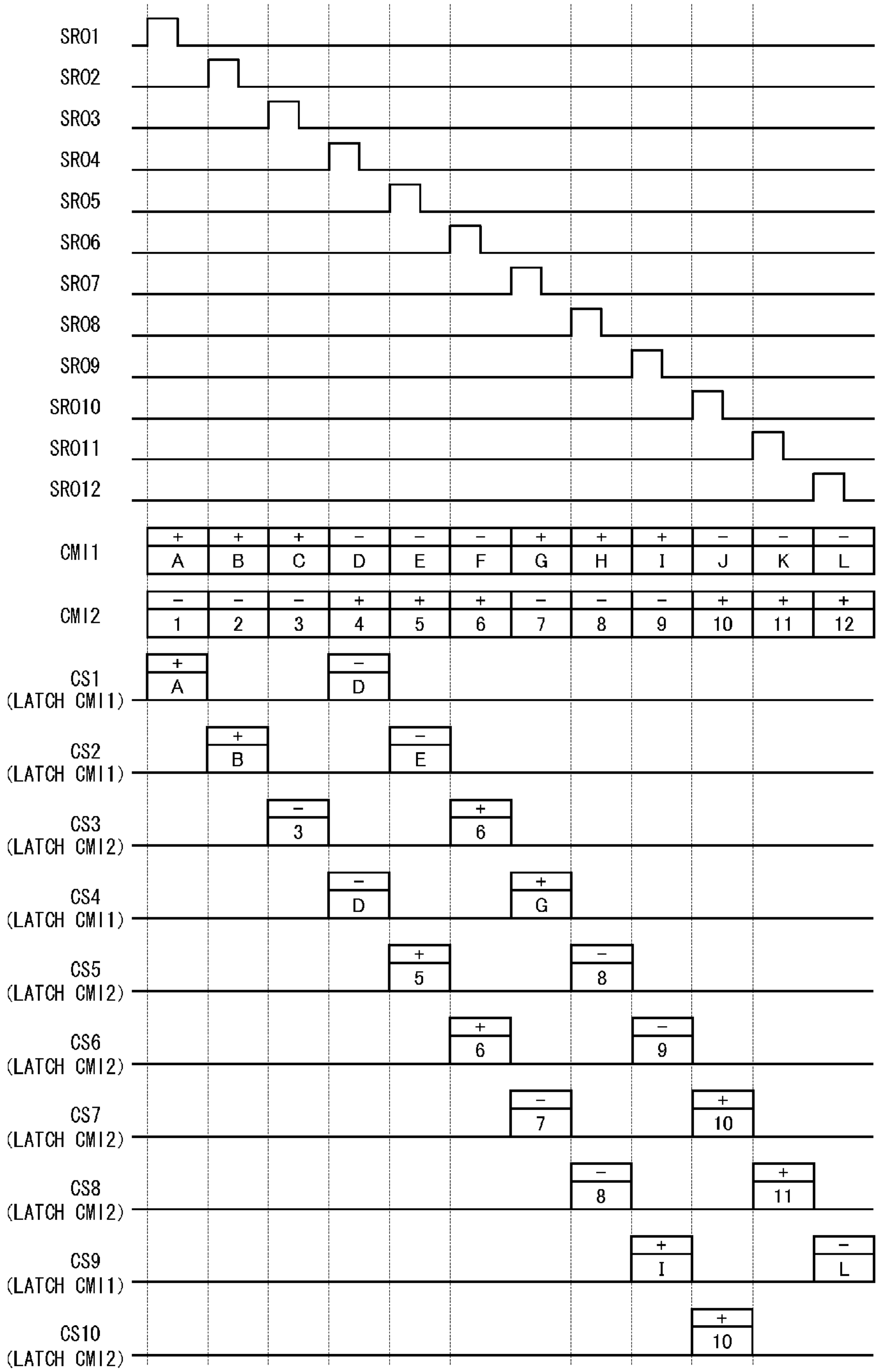
FIG. 43

FIG. 42 shows waveforms of various signals that are inputted to and outputted from the CS bus line driving circuit 40 of the liquid crystal display device 3 of Example 11. FIG. 43 shows relations between (i) the polarity signal CMI1 (or CMI2) and the shift register outputs SROn which are inputted to the CS circuits 4*n* and (ii) the CS signals CSn outputted from the CS circuits 4*n*. A description of operation of the CS circuits is omitted here since the operation is similar to that described earlier in each of the Examples (especially Example 5).

Embodiment 4

A fourth embodiment of the present invention is described below with reference to FIGS. 44 to 51. Note that, for convenience of description, members having functions identical to those of the respective members described in Embodiment 1 are given respective identical reference numerals, and their descriptions are omitted here. Note also that terms defined in Embodiment 1 are used in the present Examples also according to those definitions, unless otherwise noted.

A schematic arrangement of a liquid crystal display device 4 in accordance with the present embodiment is identical to that of the liquid crystal display device 1 of the Embodiment 1 (see FIGS. 1 and 2). Accordingly, a description of the schematic arrangement of the liquid crystal display device 4 is omitted here. The following description specifically discusses a gate line driving circuit 30 and a CS bus line driving circuit 40 of the present embodiment. The liquid crystal display device 4 is provided with a plurality of signal lines for supplying polarity signals CMI from a control circuit 50 (see FIG. 1) to the CS bus line driving circuit 40. In order to realize n-line reversal (nH) driving for carrying out n-fold-size display driving, in such an arrangement, (i) the number of polarity signals CMI and (ii) timings (a frequency) at which the polarity signals CMI reverse their polarities are adjusted. Specific examples are described below.

Example 12

Figure 44:
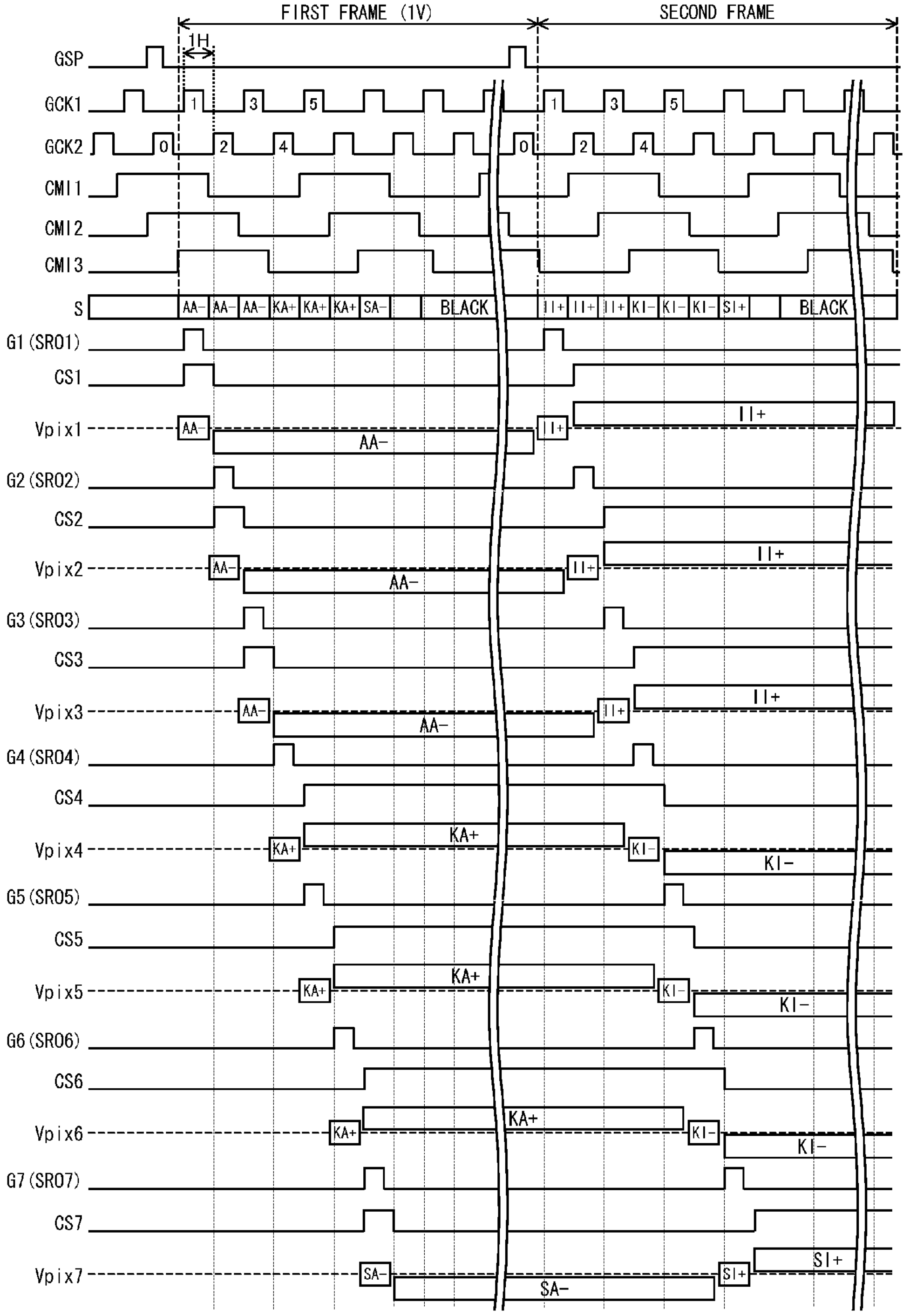
FIG. 44

FIG. 44 is a timing chart showing waveforms of various signals in the liquid crystal display device 4 which carries out 3-line (3H) inversion driving. In FIG. 44, the polarity signals CMI1, CMI2, and CMI3 reverse their polarities every three horizontal scanning periods (3H), and CMI1 and CMI2 are out of phase by one horizontal scanning period (1H), whereas CMI2 and CMI3 are out of phase by one horizontal scanning period (1H).

As shown in FIG. 44, during the initial state, the CS signals CS1 to CS7 are all fixed at one electric potential (in FIG. 44, at a low level). In the first frame, the CS signal CS1 in the first row is at a high level at a point in time where the corresponding gate signal G1 falls, the CS signal CS2 in the second row is at a high level at a point in time where the corresponding gate signal G2 falls, and the CS signal CS3 in the third row is at a high level at a point in time where the corresponding gate signal G3 falls. In contrast, the CS signal CS4 in the fourth row is at a low level at a point in time where the corresponding gate signal G4 falls, the CS signal CS5 in the fifth row is at a low level at a point in time where the corresponding gate signal G5 falls, and the CS signal CS6 in the sixth row is at a low level when the corresponding gate signal G6 falls. The CS signal CS7 in the seventh row is at a high level at a point in time where the corresponding gate signal G7 falls.

It should be noted here that the source signal S is a signal which has amplitude corresponding to a gray scale represented by a video signal and reverses its polarity every 3H periods. The source signal S has the same electric potential during three adjacent horizontal scanning periods (3H) and has the same electric potential during next three adjacent horizontal scanning periods (3H). That is, each of the reference signs “AA” to “SA” shown in FIG. 44 corresponds to a single horizontal scanning period, and indicates a signal potential (gray scale) during that horizontal scanning period. For example, the source signal S in the first frame exhibits identical signal potentials (gray scale) of a negative polarity (“AA”) during the first, second, and third horizontal scanning periods, and exhibits identical signal potentials of a positive polarity (“KA”) during the, fourth, fifth and sixth horizontal scanning periods. Further, the source signal S in the second frame exhibits identical signal potentials of a positive polarity (“II”) during the first, second, and third horizontal scanning periods, and exhibits identical signal potentials of a negative polarity (“KI”) during the fourth, fifth and sixth horizontal scanning periods. Meanwhile, the gate signals G1 to G7 serve as gate-on potentials during the first to seventh 1H periods, respectively, in an active period (effective scanning period) of each frame, and serve as gate-off potentials during the other periods.

Then, the CS signals CS1 to CS7 switch between high and low electric potential levels after their corresponding gate signals G1 to G7 fall. Specifically, in the first frame, the CS signals CS1, CS2, and CS3 fall after their corresponding gate signals G1, G2, and G3 fall, respectively, and the CS signals CS4, CS5, and CS6 rise after their corresponding gate signals G4, G5, and G6 fall, respectively. It should be noted that in the second frame, this relationship is reversed, i.e., the CS signals CS1, CS2, and CS3 rise after their corresponding gate signals G1, G2, and G3 fall, respectively, and the CS signals CS4, CS5, and CS6 fall after their corresponding gate signals G4, G5, and fall, respectively.

This eliminates appearance of alternate bright and dark transverse stripes in a display picture, and makes it possible to improve display quality.

A specific configuration of the gate line driving circuit 30 and the CS bus line driving circuit 40 for achieving the aforementioned control is described here.

Figure 45:
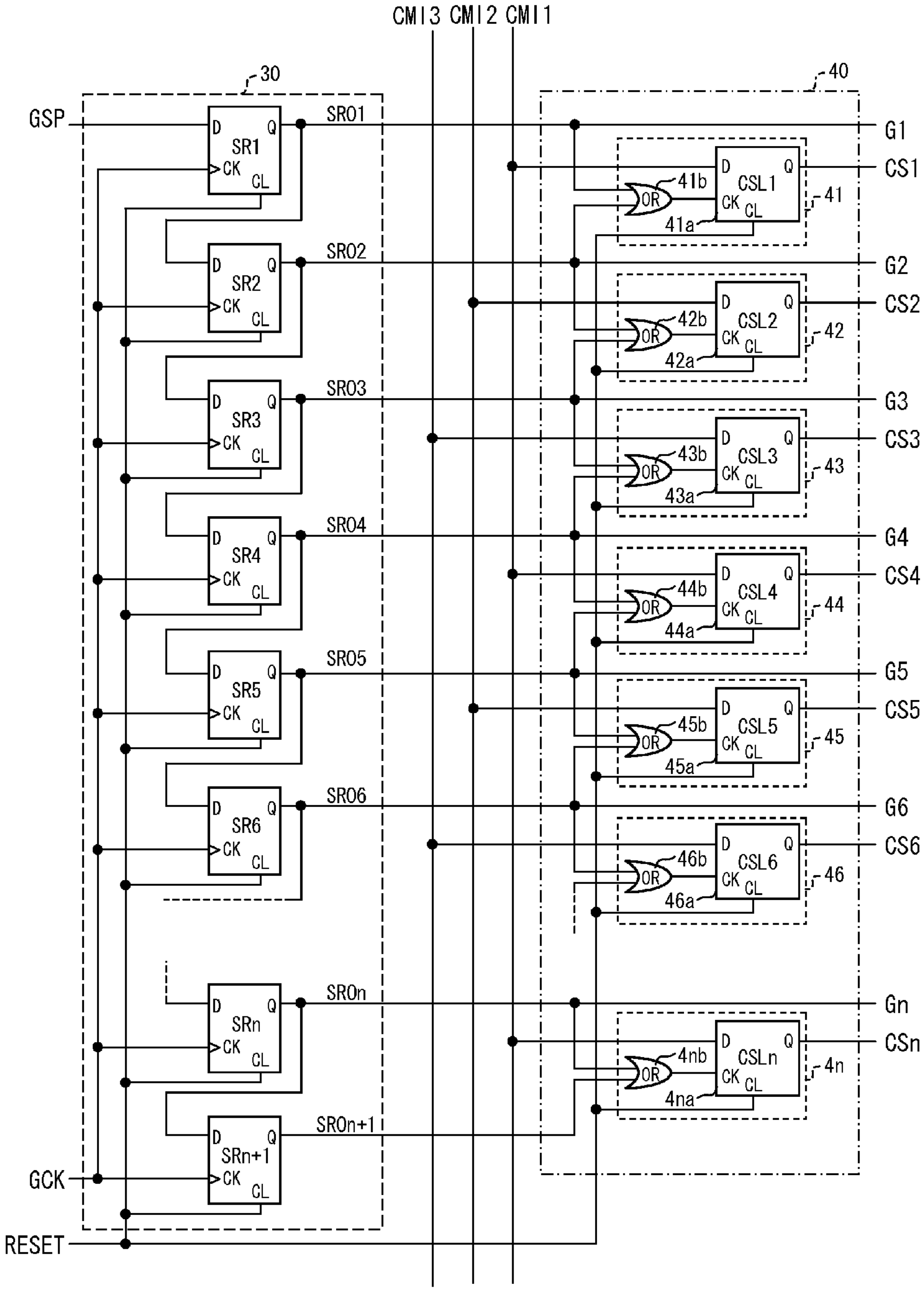
FIG. 45

FIG. 45 shows a configuration of the gate line driving circuit 30 and the CS bus line driving circuit 40. Input signals to the CS circuit 41 are shift register outputs SRO1 and SRO2 corresponding to respective gate signals G1 and G2, a polarity signal CMI1, and a reset signal RESET. Input signals to the CS circuit 42 are shift register outputs SRO2 and SRO3 corresponding to respective gate signals G2 and G3, a polarity signal CMI2, and the reset signal RESET. Input signals to the CS circuit 43 are shift register outputs SRO3 and SRO4 corresponding to respective gate signals G3 and G4, the polarity signal CMI3, and the reset signal RESET. Input signals to the CS circuit 44 are shift register outputs SRO4 and SRO5 corresponding to respective gate signals G4 and G5, the polarity signal CMI1, and the reset signal RESET. As described above, each CS circuit 4*n* receives a shift register output SROn in the corresponding nth row and a shift register output SROn+1 in the next row, and receives one of the polarity signals CMI1 and CMI2 regularly (from the nth row in the order of CMI1, CMI2, CMI3, CMI1, CMI2, and CMI3). The polarity signals CMI1, CMI2, and CMI3, and the reset signal RESET are supplied from the control circuit 50.

Figure 46:
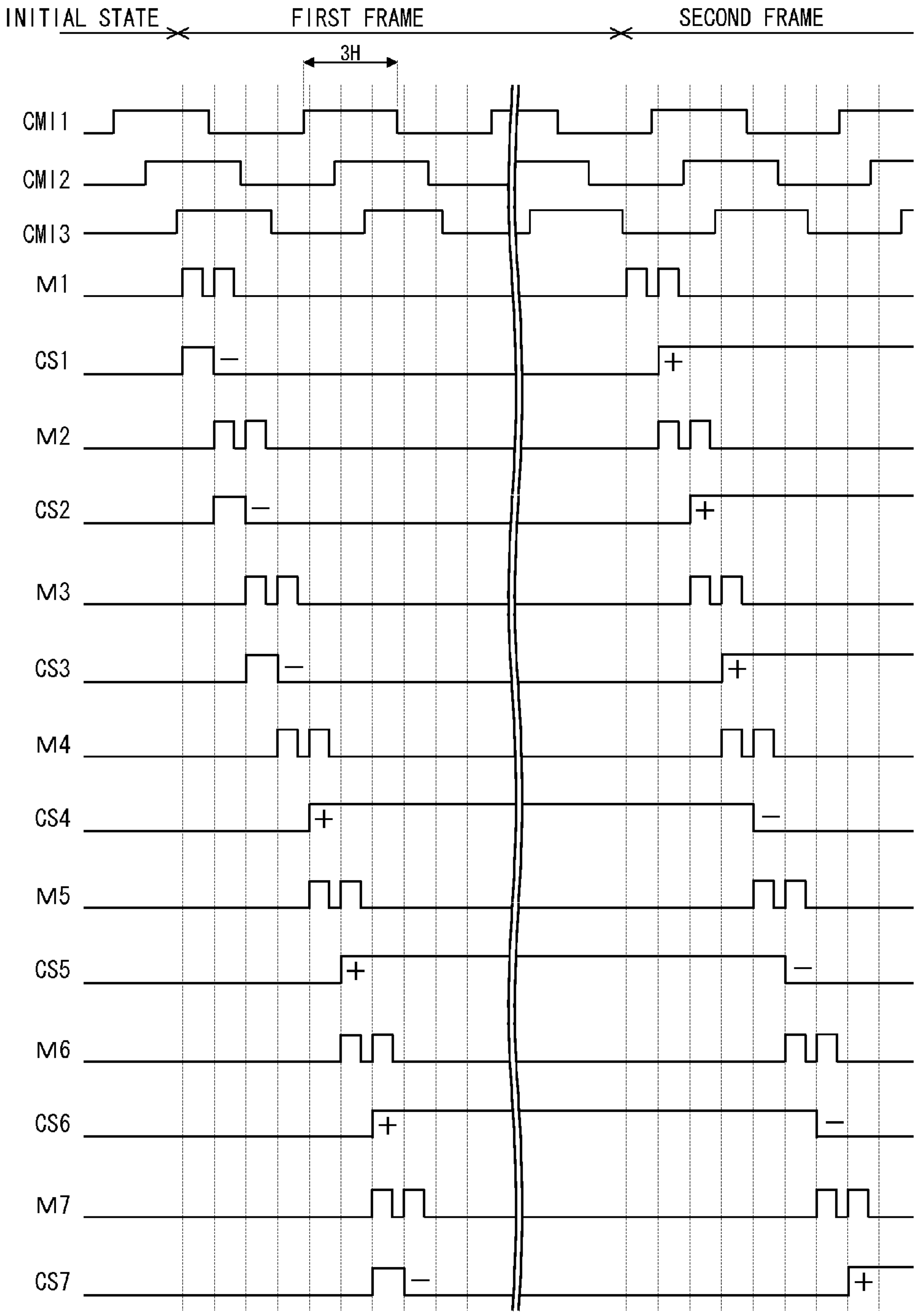
FIG. 46

In the following, for convenience of description, mainly the CS circuits 42 and 43 corresponding to the second and third rows, respectively, are taken as an example. FIG. 46 shows waveforms of various signals that are inputted to and outputted from the CS bus line driving circuit 40 of the liquid crystal display device 4 of Example 12.

First, the following describes changes in waveforms of various signals in the second row. During an initial state, the D latch circuit 42*a* of the CS circuit 42 receives the polarity signal CMI2 via its terminal D and receives the reset signal RESET via its reset terminal CL. The reset signal RESET causes the electric potential of the CS signal CS2 that the D latch circuit 42*a* outputs via its output terminal Q to be retained at a low level.

After that, the shift register output SRO2 corresponding to the gate signal G2 to be supplied to the gate line 12 in the second row is outputted from the shift register circuit SR2, and is inputted to one terminal of the OR circuit 42*b* of the CS circuit 42. Then, a change (from low to high) in electric potential of the shift register output SRO2 in the signal M2 is inputted to the clock terminal CK. Upon receiving the change (from low to high) in electric potential of the shift register output SRO2 via its clock terminal CK, the D latch circuit 42*a* transfers an input state of the polarity signal CMI2 that it received via its data terminal D at the point in time, i.e., transfers a high level. That is, the electric potential of the CS signal CS2 is switched from a low level to a high level at a time when there is a change (from low to high) in electric potential of the shift register output SRO2. The D latch circuit 42*a* outputs the high level until there is a change (from high to low) in electric potential of the shift register output SRO2 in the signal M2 inputted to the clock terminal CK (i.e., during a period of time in which the signal M2 is at a high level). Then, upon receiving a change (from high to low) in electric potential of the shift register output SRO2 in the signal M2 via its clock terminal CK, the D latch circuit 42*a* latches an input state of the polarity signal CMI2 that it received at the point in time, i.e., latches a high level. After that, the D latch circuit 42*a* retains the high level until the signal M2 is raised to a high level.

Then, the shift register output SRO3 that has been shifted to the third row in the gate line driving circuit 30 is supplied to the other terminal of the OR circuit 42*b*. The shift register output SRO3 is supplied also to one terminal of the OR circuit 43*b* of the CS circuit 43.

The D latch circuit 42*a* receives a change (from low to high) in electric potential of the shift register output SRO3 in the signal M2 via its clock terminal CK, and transfers an input state of the polarity signal CMI2 that it received via its terminal D at the point in time, i.e., transfers a low level. That is, the electric potential of the CS signal CS2 is switched from a high level to a low level at a time when there is a change (from low to high) in electric potential of the shift register output SRO3. The D latch circuit 42*a* outputs the low level until there is a change (from high to low) in electric potential of the shift register output SRO3 in the signal M2 inputted to the clock terminal CK (i.e., during a period of time in which the signal M2 is at a high level). Next, upon receiving a change (from high to low) in electric potential of the shift register output SRO3 in the signal M2 via its clock terminal CK, the D latch circuit 42*a* latches an input state of the polarity signal CMI2 that it received at the point in time, i.e., latches a low level. After that, the D latch circuit 42*a* retains the low level until the signal M2 is raised to a high level in the second frame.

In the second frame, the D latch circuit 42*a* transfers an input state (low level) of the polarity signal CMI2 that it received via its data terminal D during a period of time in which the shift register output SRO2 in the signal M2 is at a high level, latches an input state (low level) of the polarity signal CMI2 that it received at a point in time where it received a change (from high to low) in electric potential of the shift register output SRO2, and then retains the low level until the next time when the signal M2 is raised to a high level.

Then, upon receiving a change (from low to high) in electric potential of the shift register output SRO3 in the signal M2 via its clock terminal CK, the D latch circuit 42*a* transfers an input state of the polarity signal CMI2 that it received via its data terminal D at the point in time, i.e., transfers a high level. That is, the electric potential of the CS signal CS2 is switched from a low level to a high level at a time when there is a change (from low to high) in electric potential of the shift register output SRO3. The D latch circuit 42*a* outputs the high level until there is a change (from high to low) in electric potential of the shift register output SRO3 in the signal M2 inputted to the clock terminal CK (i.e., during a period of time in which the signal M2 is at a high level). Next, upon receiving a change (from high to low) in electric potential of the shift register output SRO2 via its clock terminal CK, the D latch circuit 42*a* latches an input state of the polarity signal CMI2 that it received at the point in time, i.e., latches a high level. After that, the D latch circuit 42*a* retains the high level until the signal M2 is raised to a high level in the third frame.

Note that, in the first row, the polarity signal CMI1 is latched in accordance with the shift register outputs SRO1 and SRO2, thereby a CS signal CS1 shown in FIG. 46 is outputted.

Next, the following describes changes in waveforms of various signals in the third row. During the initial state, the D latch circuit 43*a* of the CS circuit 43 receives the polarity signal CMI3 via its terminal D and receives the reset signal RESET via its reset terminal CL. The reset signal RESET causes the electric potential of the CS signal CS3 that the D latch circuit 43*a* outputs via its output terminal Q to be retained at a low level.

After that, the shift register output SRO3 corresponding to the gate signal G3 to be supplied to the gate line 12 in the third row is outputted from the shift register circuit SR3, and is inputted to one terminal of the OR circuit 43*b* of the CS circuit 43. Then, a change (from low to high) in electric potential of the shift register output SRO3 in the signal M3 is inputted to the clock terminal CK. Upon receiving the change in electric potential of the shift register output SRO3 in the signal M3, the D latch circuit 43*a* transfers an input state of the polarity signal CMI3 that it received via its terminal D at the point in time, i.e., transfers a high level. That is, the electric potential of the CS signal CS3 is switched from a low level to a high level at a time when there is a change (from low to high) in electric potential of the shift register output SRO3. Then, the D latch circuit 43*a* outputs the high level until the next time when there is a change (from high to low) in electric potential of the shift register output SRO3 in the signal M3 inputted to the clock terminal CK (i.e., during a period of time in which the signal M3 is at a high level). Then, upon receiving a change (from high to low) in electric potential of the shift register output SRO3 in the signal M3 via its clock terminal CK, the D latch circuit 43*a* latches an input state of the polarity signal CMI3 that it received at the point in time, i.e., latches a high level. After that, the D latch circuit 43*a* retains the high level until the signal M3 is raised to a high level.

Then, the shift register output SRO4 which has been shifted to the fourth row in the gate line driving circuit 30 is supplied to the other terminal of the OR circuit 43*b*. Note that the shift register output SRO4 is also supplied to one terminal of the OR circuit 43*b* of the CS circuit 43.

The D latch circuit 43*a* receives a change (from low to high) in electric potential of the shift register output SRO4 in the signal M3 via its clock terminal CK, and transfers an input state of the polarity signal CMI3 that it received via its terminal D at the point in time, i.e., transfers a low level. That is, the electric potential of the CS signal CS3 is switched from a high level to a low level at a time when there is a change (from low to high) in electric potential of the shift register output SRO4. The D latch circuit 43*a* outputs the low level until there is a change (from high to low) in electric potential of the shift register output SRO4 in the signal M3 inputted to the clock terminal CK (i.e., during a period of time in which the signal M3 is at a high level). Next, upon receiving a change (from high to low) in electric potential of the shift register output SRO4 in the signal M3 via its clock terminal CK, the D latch circuit 43*a* latches an input state of the polarity signal CMI3 that it received at the point in time, i.e., latches a low level. After that, the D latch circuit 43*a* retains the low level until the signal M3 is raised to a high level in the second frame.

In the second frame, the D latch circuit 43*a* transfers an input state (low level) of the polarity signal CMI3 that it received via its data terminal D during a period of time in which the shift register output SRO3 in the signal M3 is at a high level, latches an input state (low level) of the polarity signal CMI3 that it received at a point in time where it received a change (from high to low) in electric potential of the shift register output SRO3, and then retains the low level until the next time when the signal M3 is raised to a high level.

Then, upon receiving a change (from low to high) in electric potential of the shift register output SRO4 in the signal M3 via its clock terminal CK, the D latch circuit 43*a* transfers an input state of the polarity signal CMI3 that it received via its data terminal D at the point in time, i.e., transfers a high level. That is, the electric potential of the CS signal CS3 is switched from a low level to a high level at a time when there is a change (from low to high) in electric potential of the shift register output SRO3. The D latch circuit 43*a* outputs the high level until there is a change (from high to low) in electric potential of the shift register output SRO4 in the signal M3 inputted to the clock terminal CK (i.e., during a period of time in which the signal M3 is at a high level). Next, upon receiving a change (from high to low) in electric potential of the shift register output SRO3 via its clock terminal CK, the D latch circuit 43*a* latches an input state of the polarity signal CMI3 that it received at the point in time, i.e., latches a high level. After that, the D latch circuit 43*a* retains the high level until the signal M3 is raised to a high level in the third frame.

Next, the following describes changes in waveforms of various signals in the fourth row. During the initial state, the D latch circuit 44*a* of the CS circuit 44 receives the polarity signal CMI1 via its terminal D and receives the reset signal RESET via its reset terminal CL. The reset signal RESET causes the electric potential of the CS signal CS4 that the D latch circuit 44*a* outputs via its output terminal Q to be retained at a low level.

After that, the shift register output SRO4 in the fourth row is outputted from the shift register circuit SR4, and is inputted to one terminal of the OR circuit 44*b* of the CS circuit 44. Then, a change (from low to high) in electric potential of the shift register output SRO4 in the signal M4 is inputted to the clock terminal CK. Upon receiving the change in electric potential of the shift register output SRO4 in the signal M4 via its clock terminal CK, the D latch circuit 44*a* transfers an input state of the polarity signal CMI1 that it received via its terminal D at the point in time, i.e., transfers a low level. Then, the D latch circuit 44*a* outputs the low level until the next time when there is a change (from high to low) in electric potential of the shift register output SRO4 in the signal M4 inputted to the clock terminal CK (i.e., during a period of time in which the signal M4 is at a high level). Then, upon receiving a change (from high to low) in electric potential of the shift register output SRO4 in the signal M4 via its clock terminal CK, the D latch circuit 44*a* latches an input state of the polarity signal CMI1 that it received at the point in time, i.e., latches a low level. After that, the D latch circuit 44*a* retains the low level until the signal M4 is raised to a high level.

Next, the shift register output SRO5 which has been shifted to the fifth row in the gate line driving circuit 30 is supplied to the other terminal of the OR circuit 44*b*. Note that the shift register output SRO5 is also supplied to one terminal of the OR circuit 45*b* of the CS circuit 45.

The D latch circuit 44*a* receives a change (from low to high) in electric potential of the shift register output SRO5 in the signal M4 via its clock terminal CK, and transfers an input state of the polarity signal CMI1 that it received via its terminal D at the point in time, i.e., transfers a high level. That is, the electric potential of the CS signal CS4 is switched from a low level to a high level at a time when there is a change (from low to high) in electric potential of the shift register output SRO5. The D latch circuit 44*a* outputs the high level until there is a change (from high to low) in electric potential of the shift register output SRO5 in the signal M4 inputted to the clock terminal CK (i.e., during a period of time in which the signal M4 is at a high level). Next, upon receiving a change (from high to low) in electric potential of the shift register output SRO5 in the signal M4 via its clock terminal CK, the D latch circuit 44*a* latches an input state of the polarity signal CMI1 that it received at the point in time, i.e., latches a high level. After that, the D latch circuit 44*a* retains the high level until the signal M4 is raised to a high level in the second frame.

In the second frame, the D latch circuit 44*a* transfers an input state (high level) of the polarity signal CMI1 that it received via its data terminal D during a period of time in which the shift register output SRO4 in the signal M4 is at a high level, latches an input state (high level) of the polarity signal CMI2 that it received at a point in time where it received a change (from high to low) in electric potential of the shift register output SRO4, and then retains the high level until the next time when the signal M4 is raised to a high level.

Then, upon receiving a change (from low to high) in electric potential of the shift register output SRO5 in the signal M4 via its clock terminal CK, the D latch circuit 44*a* transfers an input state of the polarity signal CMI1 that it received via its data terminal D at the point in time, i.e., transfers a low level. That is, the electric potential of the CS signal CS4 is switched from a high level to a low level at a time when there is a change (from low to high) in electric potential of the shift register output SRO5.

The D latch circuit 44*a* outputs the low level the next time there is a change (from high to low) in electric potential of the shift register output SRO5 in the signal M4 inputted to the clock terminal CK (i.e., during a period of time in which the signal M4 is at a high level). Next, upon receiving a change (from high to low) in electric potential of the shift register output SRO5 via its clock terminal CK, the D latch circuit 44*a* latches an input state of the polarity signal CMI1 that it received at the point in time, i.e., latches a low level. After that, the D latch circuit 44*a* retains the low level until the signal M4 is raised to a high level in the third frame.

Note that, in the fifth row, the polarity signal CMI2 is latched in accordance with the shift register outputs SRO5 and SRO6, thereby a CS signal CS5 shown in FIG. 46 is outputted.

As has been described, according to Example 12, 3H inversion driving can be carried out by use of the polarity signals CMI1, CMI2, and CMI3 which reverse their polarities every 3H and which are out of phase with each other. This allows the CS bus line driving circuit 40 to operate properly even in the liquid crystal display device 4 that employs triple-size display driving. Accordingly, it is possible to eliminate irregular waveforms that cause transverse stripes. This makes it possible to eliminate the appearance of alternate bright and dark transverse stripes in a display picture, and thus possible to improve display quality.

Figure 47:
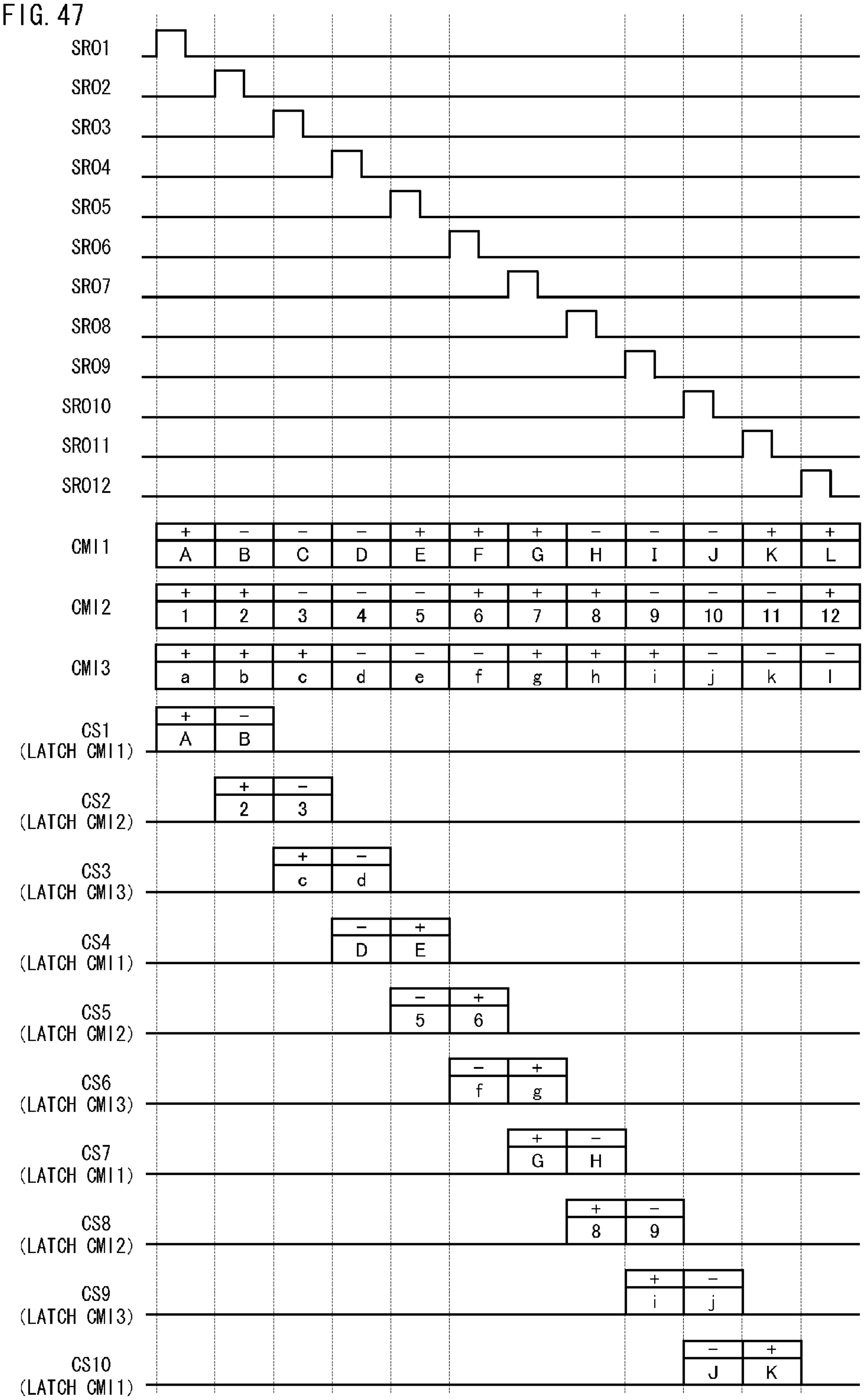
FIG. 47

The following description discusses how the polarity signals CMI1, CMI2, and CMI3 supplied to the CS circuits 4*n* are related to the shift register outputs SROn. FIG. 47 shows relations between (i) the polarity signal (any one of CMI1, CMI2, and CMI3) and the shift register outputs SROn which are inputted to the CS circuits 4*n* and (ii) the CS signals CSn outputted from the CS circuits 4*n*.

As to the CMI1 shown in FIG. 47, each of the signs A to L corresponds to a single horizontal scanning period, and indicates a polarity (positive polarity or negative polarity) during that horizontal scanning period. For example, the CMI1 has a positive polarity during the first horizontal scanning period "A", has a negative polarity during the second horizontal scanning period "B", has a negative polarity during the third horizontal scanning period "C", and has a negative polarity during the fourth horizontal scanning period "D". As to the CMI2, each of the signs 1 to 12 corresponds to a single horizontal scanning period, and indicates a polarity during that horizontal scanning period. For example, the CMI2 has a positive polarity during the first horizontal scanning period "1", has a positive polarity during the second horizontal scanning period "2", has a negative polarity during the third horizontal scanning period "3", and has a negative polarity during the fourth horizontal scanning period "4". As to the CMI3, each of the signs a to l corresponds to a single horizontal scanning period, and indicates a polarity during that horizontal scanning period. For example, the CMI3 has a positive polarity during the first horizontal scanning period "a", has a positive polarity during the second horizontal scanning period "b", has a positive polarity during the third horizontal scanning period "c", and has a negative polarity during the fourth horizontal scanning period "d". In this way, the CMI1, the CMI2, and the CMI3 reverse their polarities every three horizontal scanning periods, and the CMI1 and the CMI2 are out of phase with each other by one horizontal scanning period, whereas the CMI2 and the CMI3 are out of phase with each other by one horizontal scanning period. Further each of the CS circuits receives one of the polarity signals CMI1, CMI2, and CMI3 regularly (the CS circuit 41 receives the CMI1, the CS circuit 42 receives the CMI2, the CS circuit 43 receives the CMI3, the CS circuit 44 receives the CMI1, the CS circuit 45 receives the CMI2, and the CS circuit 46 receives the CMI3).

The CS circuit 4*n* receives, via its clock terminal CK, a shift register output SROn in the nth row and a shift register output SROn+1 in the next (n+1)th row. This causes the CS circuit 4*n* to latch (i) a CMI that the CS circuit 4*n* receives via its data terminal D during the nth horizontal scanning period and (ii) a CMI signal that the CS circuit 4*n* receives via its data terminal D during the (n+1)th horizontal scanning period. For example, the CS circuit 41 loads a positive polarity of "A" of the CMI1 during the first horizontal scanning period, and loads a negative polarity of "B" of the CMI1 during the second horizontal scanning period. The CS circuit 42 loads a positive polarity of "2" of the CMI2 during the second horizontal scanning period, and loads a negative polarity of "3" of the CMI2 during the third horizontal scanning period. The CS circuit 43 loads a positive polarity of "c" of the CMI3 during the third horizontal scanning period, and loads a negative polarity of "d" of the CMI3 during the fourth horizontal scanning period. The CS circuit 44 loads a negative polarity of "D" of the CMI1 during the fourth horizontal scanning period, and loads a positive polarity of "E" of the CMI1 during the fifth horizontal scanning period. In this way, the CS signals CSn as shown in FIGS. 44 and 46 are outputted.

As has been described in Example 12, by using a plurality of polarity signals CMI1, CMI2, and CMI3 which are different from each other in frequency, 3H inversion driving can be carried out. Similarly, 4H, . . . , nH (n-line) inversion driving can be realized by changing a frequency and the number of polarity signals. For example, 4H inversion driving may be realized by (i) using four polarity signals CMI1 to CMI4, (ii) setting a frequency of each of the polarity signals so that the polarity signals reverse their polarities every 4H, and (iii) sequentially supplying the polarity signals to the CS circuits. This allows carrying out double-size display driving and triple-size display driving. Similarly, quadruple-size, . . . , n-fold-size display driving can be realized by adjusting timings at which the polarity signals CMI1 and CMI2 reverse their polarities.

Example 13

Figure 48:
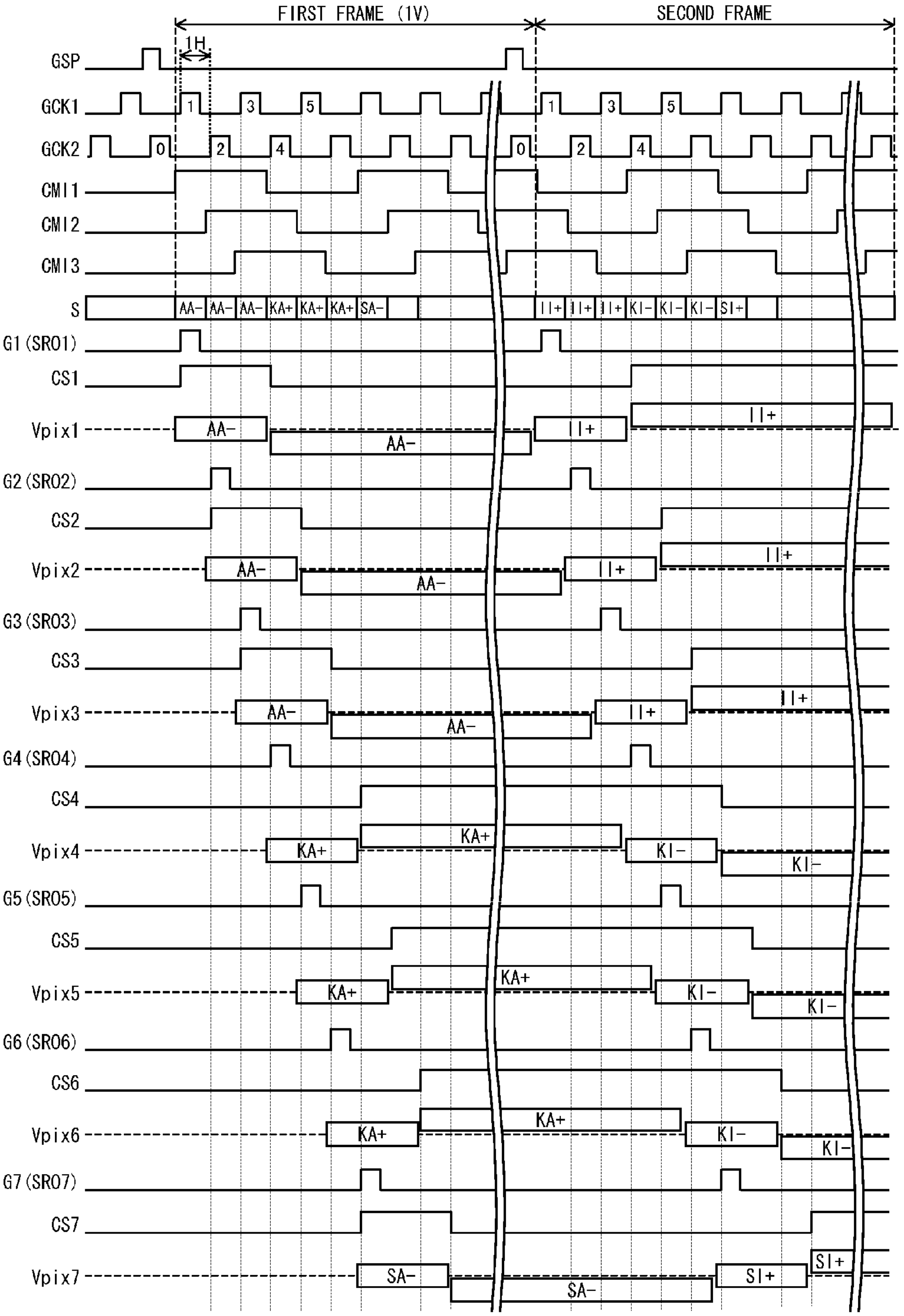
FIG. 48
Figure 49:
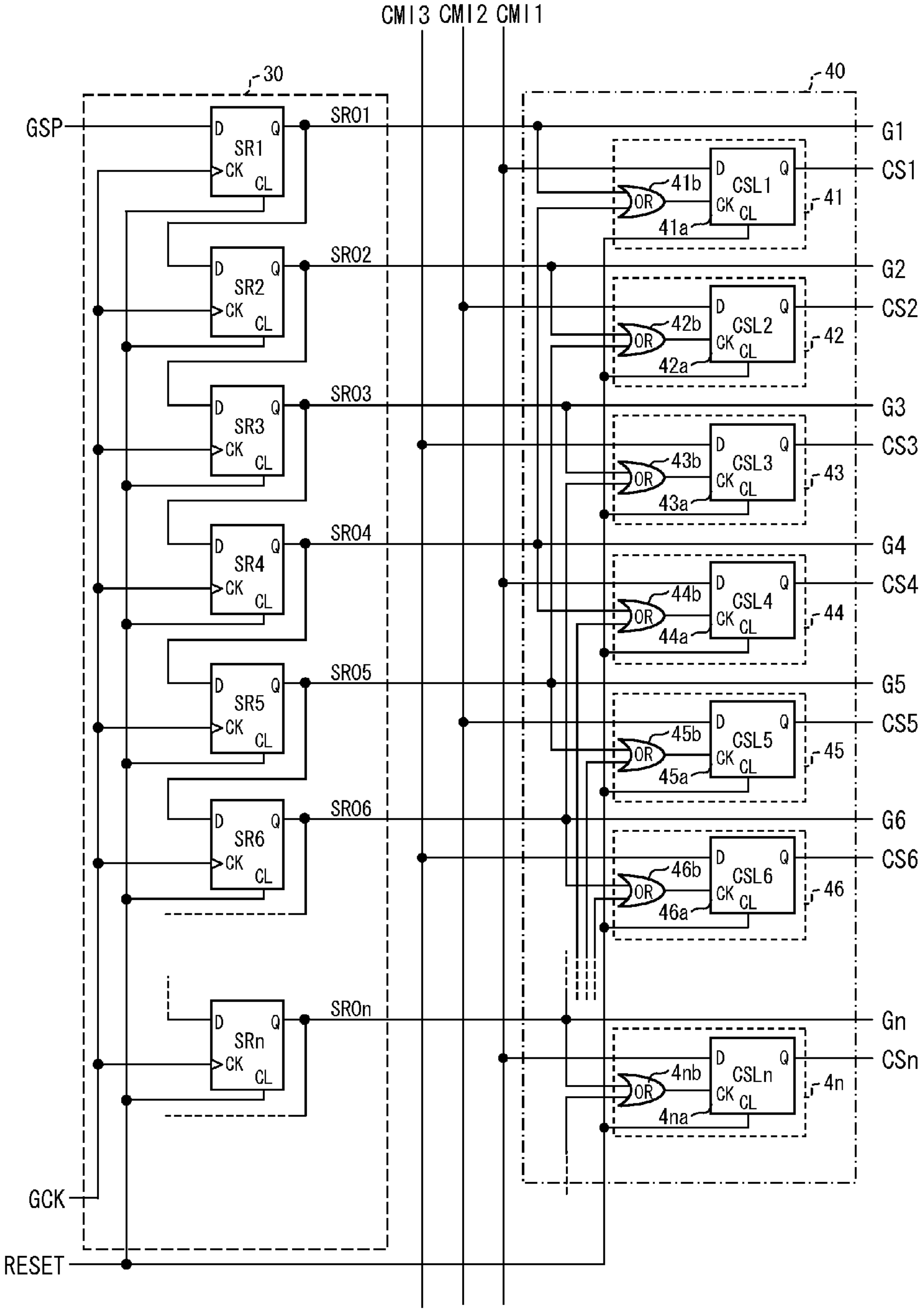
FIG. 49

Example 12 is arranged such that a CS circuit 4*n* in the nth row receives a shift register output SROn in the corresponding nth row and a shift register output SROn+1 in the next (n+1)th row. However, an arrangement of the liquid crystal display device 4 of the present invention is not limited to such an arrangement. For example, as shown in FIG. 49, the liquid crystal display device 4 may also be arranged such that a CS circuit 4*n* in the nth row receives a shift register output SROn in the corresponding nth row and a shift register output SROn+3 in the (n+3)th row. That is, the CS circuit 41 receives the shift register output SRO1 in the corresponding first row and the shift register output SRO4 in the fourth row. FIG. 48 is a timing chart showing waveforms of various signals of the liquid crystal display device 4 that has such an arrangement and employs triple-size display driving. In FIG. 48, as in the case of Example 12, the polarity signals CMI1, CMI2, and CMI3 reverse their polarities every three horizontal scanning periods (3H), and the CMI1 and the CMI2 are out of phase with each other by one horizontal scanning period (1H), whereas the CMI2 and the CMI3 are out of phase with each other by one horizontal scanning period (1H). Further, the polarity signals CMI1, CMI2, and CMI3 in Example 13 reverse their polarities at timings different from those in Example 12.

As shown in FIG. 48, during the initial state, the CS signals CS1 to CS7 are all fixed at one electric potential (in FIG. 48, at a low level). During the first frame, the CS signal CS1 in the first row is at a high level at a point in time where the corresponding gate signal G1 falls, the CS signal CS2 in the second row is at a high level at a point in time where the corresponding gate signal G2 falls, and the CS signal CS3 in the third row is at a high level at a point in time where the corresponding gate signal G3 falls. In contrast, the CS signal CS4 in the fourth row is at a low level at a point in time where the corresponding gate signal G4 falls, the CS signal CS5 in the fifth row is at a low level at a point in time where the corresponding gate signal G5 falls, and the CS signal CS6 in the sixth row is at a low level at a point in time where the corresponding gate signal G6 falls. The CS signal CS7 in the seventh row is at a high level at a point in time where the corresponding gate signal G7 falls.

It should be noted here that the source signal S is a signal which has amplitude corresponding to a gray scale represented by a video signal and reverses its polarity every 3H periods. The source signal S has the same electric potential during three adjacent horizontal scanning periods (3H) and has the same electric potential during next three adjacent horizontal scanning periods (3H). That is, each of the reference signs "AA" to "SA" shown in FIG. 48 corresponds to a single horizontal scanning period, and indicates a signal potential (gray scale) during that horizontal scanning period. For example, the source signal S in the first frame exhibits identical signal potentials (gray scale) of a negative polarity ("AA") during the first, second, and third horizontal scanning periods, and exhibits identical signal potentials of a positive polarity ("KA") during the fourth, fifth, and sixth horizontal scanning periods. Further, the source signal S in the second frame exhibits identical signal potentials of a positive polarity ("II") during the first, second, and third horizontal scanning periods, and exhibits identical signal potentials of a negative polarity ("KI") during the fourth, fifth, and sixth horizontal scanning periods. Meanwhile, the gate signals G1 to G7 serve as gate-on potentials during the first to seventh 1H periods, respectively, in an active period (effective scanning period) of each frame, and serve as gate-off potentials during the other periods.

Then, the CS signals CS1 to CS7 switch between high and low electric potential levels after their corresponding gate signals G1 to G7 fall. Specifically, in the first frame, the CS signals CS1, CS2, and CS3 fall after their corresponding gate signals G1, G2, and G3 fall, respectively, and the CS signals CS4, CS5, and CS6 rise after their corresponding gate signals G4, G5, and G6 fall, respectively. It should be noted that in the second frame, this relationship is reversed, i.e., the CS signals CS1, CS2, and CS3 rise after their corresponding gate signals G1, G2, and G3 fall, respectively, and the CS signals CS4, CS5, and CS6 fall after their corresponding gate signals G4, G5, and fall, respectively.

This eliminates appearance of alternate bright and dark transverse stripes in a display picture, and makes it possible to improve display quality.

A specific configuration of the gate line driving circuit 30 and the CS bus line driving circuit 40 for achieving the aforementioned control is described here.

FIG. 49 shows a configuration of the gate line driving circuit 30 and the CS bus line driving circuit 40. Input signals to the CS circuit 41 are shift register outputs SRO1 and SRO4 corresponding to respective gate signals G1 and G4, a polarity signal CMI1, and a reset signal RESET. Input signals to the CS circuit 42 are shift register outputs SRO2 and SRO5 corresponding to respective gate signals G2 and G5, a polarity signal CMI2, and the reset signal RESET. Input signals to the CS circuit 43 are shift register outputs SRO3 and SRO6 corresponding to respective gate signals G3 and G6, the polarity signal CMI3, and the reset signal RESET. Input signals to the CS circuit 44 are shift register outputs SRO4 and SRO7 corresponding to respective gate signals G4 and G7, the polarity signal CMI1, and the reset signal RESET. As described above, each CS circuit 4*n* receives a shift register output SROn in the corresponding nth row and a shift register output SROn+3 in the next row, and receives one of the polarity signals CMI1, CMI2, and CMI3 that are sequentially supplied row by row (from the nth row in the order of CMI1, CMI2, CMI3, CMI1, CMI2, and CMI3). The polarity signals CMI1, CMI2, and CMI3, and the reset signal RESET are supplied from the control circuit 50.

In the following, for convenience of description, operations in the first frame are explained by taking as an example the CS circuits 42, 43, and 44 corresponding to the second to fourth rows, respectively.

First, the following describes changes in waveforms of various signals in the second row. During an initial state, the D latch circuit 42*a* of the CS circuit 42 receives the polarity signal CMI2 via its terminal D and receives the reset signal RESET via its reset terminal CL. The reset signal RESET causes the electric potential of the CS signal CS2 that the D latch circuit 42*a* outputs via its output terminal Q to be retained at a low level.

After that, the shift register output SRO2 corresponding to the gate signal G2 to be supplied to the gate line 12 in the second row is outputted from the shift register circuit SR2, and is inputted to one terminal of the OR circuit 42*b* of the CS circuit 42. Then, a change (from low to high) in electric potential of the shift register output SRO2 in the signal M2 is inputted to the clock terminal CK. Upon receiving the change (from low to high) in electric potential of the shift register output SRO2 via its clock terminal CK, the D latch circuit 42*a* transfers an input state of the polarity signal CMI2 that it received via its data terminal D at the point in time, i.e., transfers a high level. That is, the electric potential of the CS signal CS2 is switched from a low level to a high level at a time when there is a change (from low to high) in electric potential of the shift register output SRO2. The D latch circuit 42*a* outputs the high level until there is a change (from high to low) in electric potential of the shift register output SRO2 in the signal M2 inputted to the clock terminal CK (i.e., during a period of time in which the signal M2 is at a high level). Then, upon receiving a change (from high to low) in electric potential of the shift register output SRO2 in the signal M2 via its clock terminal CK, the D latch circuit 42*a* latches an input state of the polarity signal CMI2 that it received at the point in time, i.e., latches a high level. After that, the D latch circuit 42*a* retains the high level until the signal M2 is raised to a high level.

Then, the shift register output SRO5 that has been shifted to the fifth row in the gate line driving circuit 30 is supplied to the other terminal of the OR circuit 42*b*. The shift register output SRO5 is supplied also to one terminal of the OR circuit 45*b* of the CS circuit 45.

The D latch circuit 42*a* receives a change (from low to high) in electric potential of the shift register output SRO5 in the signal M2 via its clock terminal CK, and transfers an input state of the polarity signal CMI2 that it received via its terminal D at the point in time, i.e., transfers a low level. That is, the electric potential of the CS signal CS2 is switched from a high level to a low level at a time when there is a change (from low to high) in electric potential of the shift register output SRO5. The D latch circuit 42*a* outputs the low level until there is a change (from high to low) in electric potential of the shift register output SRO5 in the signal M2 inputted to the clock terminal CK (i.e., during a period of time in which the signal M2 is at a high level). Next, upon receiving a change (from high to low) in electric potential of the shift register output SRO5 in the signal M2 via its clock terminal CK, the D latch circuit 42*a* latches an input state of the polarity signal CMI2 that it received at the point in time, i.e., latches a low level. After that, the D latch circuit 42*a* retains the low level until the signal M2 is raised to a high level in the second frame.

Next, the following describes changes in waveforms of various signals in the third row. During the initial state, the D latch circuit 43*a* of the CS circuit 43 receives the polarity signal CMI3 via its terminal D and receives the reset signal RESET via its reset terminal CL. The reset signal RESET causes the electric potential of the CS signal CS3 that the D latch circuit 43*a* outputs via its output terminal Q to be retained at a low level.

After that, the shift register output SRO3 corresponding to the gate signal G3 to be supplied to the gate line 12 in the third row is outputted from the shift register circuit SR3, and is inputted to one terminal of the OR circuit 43*b* of the CS circuit 43. Then, a change (from low to high) in electric potential of the shift register output SRO3 in the signal M3 is inputted to the clock terminal CK. Upon receiving the change in electric potential of the shift register output SRO3 in the signal M3, the D latch circuit 43*a* transfers an input state of the polarity signal CMI3 that it received via its terminal D at the point in time, i.e., transfers a high level. That is, the electric potential of the CS signal CS3 is switched from a low level to a high level at a time when there is a change (from low to high) in electric potential of the shift register output SRO3. Then, the D latch circuit 43*a* outputs the high level until the next time when there is a change (from high to low) in electric potential of the shift register output SRO3 in the signal M3 inputted to the clock terminal CK (i.e., during a period of time in which the signal M3 is at a high level). Then, upon receiving a change (from high to low) in electric potential of the shift register output SRO3 in the signal M3 via its clock terminal CK, the D latch circuit 43*a* latches an input state of the polarity signal CMI3 that it received at the point in time, i.e., latches a high level. After that, the D latch circuit 43*a* retains the high level until the signal M3 is raised to a high level.

Then, the shift register output SRO6 which has been shifted to the sixth row in the gate line driving circuit 30 is supplied to the other terminal of the OR circuit 43*b*. Note that the shift register output SRO6 is also supplied to one terminal of the OR circuit 45*b* of the CS circuit 46.

The D latch circuit 43*a* receives a change (from low to high) in electric potential of the shift register output SRO6 in the signal M3 via its clock terminal CK, and transfers an input state of the polarity signal CMI3 that it received via its terminal D at the point in time, i.e., transfers a low level. That is, the electric potential of the CS signal CS3 is switched from a high level to a low level at a time when there is a change (from low to high) in electric potential of the shift register output SRO6. The D latch circuit 43*a* outputs the low level until there is a change (from high to low) in electric potential of the shift register output SRO6 in the signal M3 inputted to the clock terminal CK (i.e., during a period of time in which the signal M3 is at a high level). Next, upon receiving a change (from high to low) in electric potential of the shift register output SRO6 in the signal M3 via its clock terminal CK, the D latch circuit 43*a* latches an input state of the polarity signal CMI3 that it received at the point in time, i.e., latches a low level. After that, the D latch circuit 43*a* retains the low level until the signal M3 is raised to a high level in the second frame.

Next, the following describes changes in waveforms of various signals in the fourth row. During the initial state, the D latch circuit 44*a* of the CS circuit 44 receives the polarity signal CMI1 via its terminal D and receives the reset signal RESET via its reset terminal CL. The reset signal RESET causes the electric potential of the CS signal CS4 that the D latch circuit 44*a* outputs via its output terminal Q to be retained at a low level.

After that, the shift register output SRO4 in the fourth row is outputted from the shift register circuit SR4, and is inputted to one terminal of the OR circuit 44*b* of the CS circuit 44. Then, a change (from low to high) in electric potential of the shift register output SRO4 in the signal M4 is inputted to the clock terminal CK. Upon receiving the change in electric potential of the shift register output SRO4 in the signal M4, the D latch circuit 44*a* transfers an input state of the polarity signal CMI1 that it received via its terminal D at the point in time, i.e., transfers a low level. Then, the D latch circuit 44*a* outputs the low level until the next time when there is a change (from high to low) in electric potential of the shift register output SRO4 in the signal M4 inputted to the clock terminal CK (i.e., during a period of time in which the signal M4 is at a high level). Then, upon receiving a change (from high to low) in electric potential of the shift register output SRO4 in the signal M4 via its clock terminal CK, the D latch circuit 44*a* latches an input state of the polarity signal CMI1 that it received at the point in time, i.e., latches a low level. After that, the D latch circuit 44*a* retains the low level until the signal M4 is raised to a high level.

Next, the shift register output SRO7 which has been shifted to the seventh row in the gate line driving circuit 30 is supplied to the other terminal of the OR circuit 44*b*. Note that the shift register output SRO7 is also supplied to one terminal of the OR circuit 47*b* of the CS circuit 47.

The D latch circuit 44*a* receives a change (from low to high) in electric potential of the shift register output SRO7 in the signal M4 via its clock terminal CK, and transfers an input state of the polarity signal CMI1 that it received via its terminal D at the point in time, i.e., transfers a high level. That is, the electric potential of the CS signal CS4 is switched from a low level to a high level at a time when there is a change (from low to high) in electric potential of the shift register output SRO7. The D latch circuit 44*a* outputs the high level until there is a change (from high to low) in electric potential of the shift register output SRO7 in the signal M4 inputted to the clock terminal CK (i.e., during a period of time in which the signal M4 is at a high level). Next, upon receiving a change (from high to low) in electric potential of the shift register output SRO7 in the signal M4 via its clock terminal CK, the D latch circuit 44*a* latches an input state of the polarity signal CMI1 that it received at the point in time, i.e., latches a high level. After that, the D latch circuit 44*a* retains the high level until the signal M4 is raised to a high level in the second frame.

Figure 50:
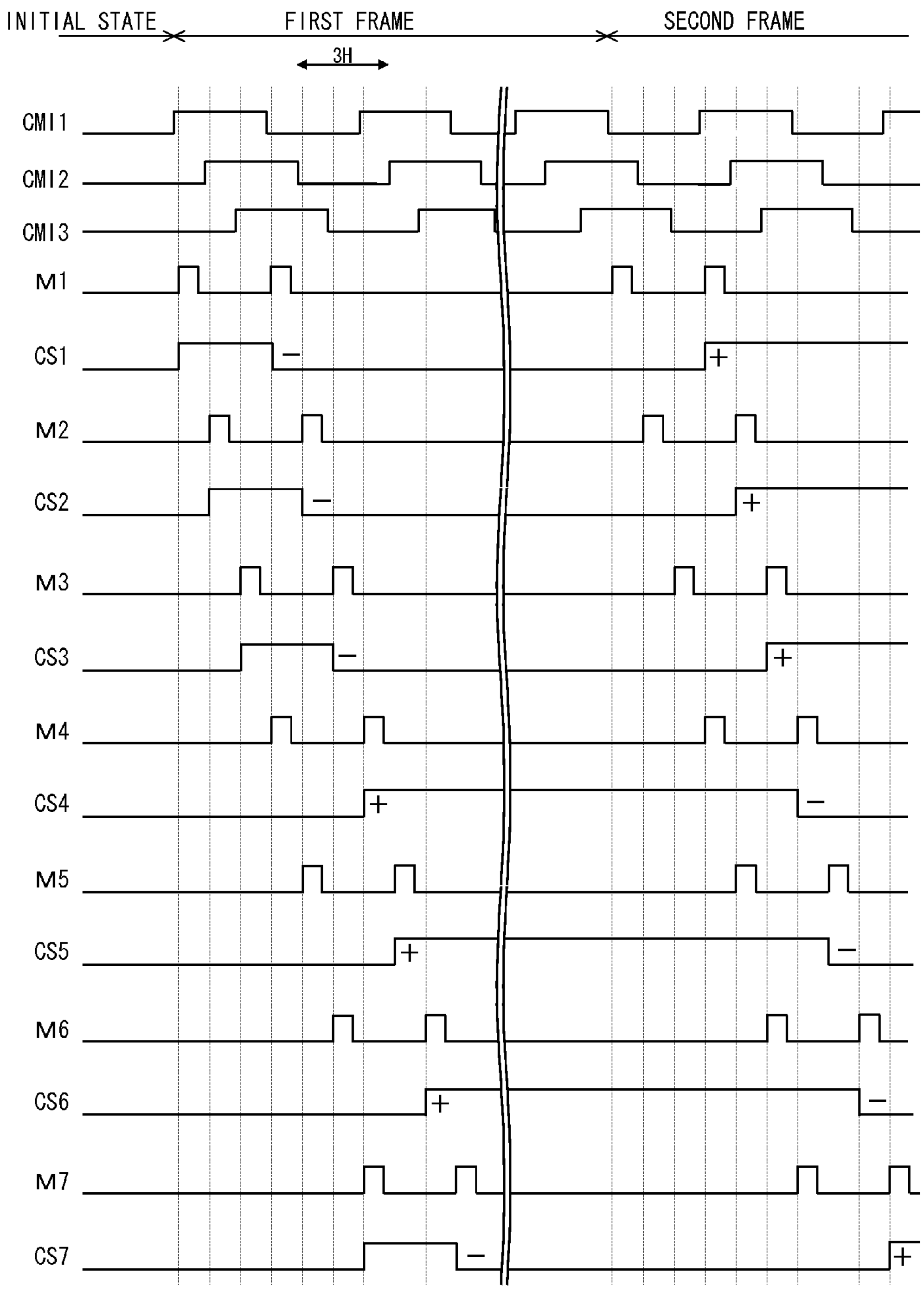
FIG. 50

By the operation as so far described, (i) in the first to third rows, electric potentials of CS signals at points in time where gate signals in their corresponding rows fall (at points in time where TFTs 13 are switched from on to off) are caused to fall after the gate signals in these rows fall and (ii) in the fourth to sixth rows, electric potentials of CS signals at points in time where gate signals in their corresponding rows fall (at a point in time where TFTs 13 are switched from on to off) are caused to rise after the gate signal in these row fall (see FIGS. 49 and 50).

As has been described, according to Example 13, even in the arrangement such that a CS circuit 4*n* in the nth row receives a shift register output SROn in the corresponding nth row and a shift register output SROn+α in a row (the (n+3)th row in the above example) later than the next row ((n+1)th row), nH inversion driving (3H inversion driving in the above example) can be carried out by adjusting timings at which the polarity signals CMI1, CMI2, and CMI3 reverse their polarities.

Figure 51:
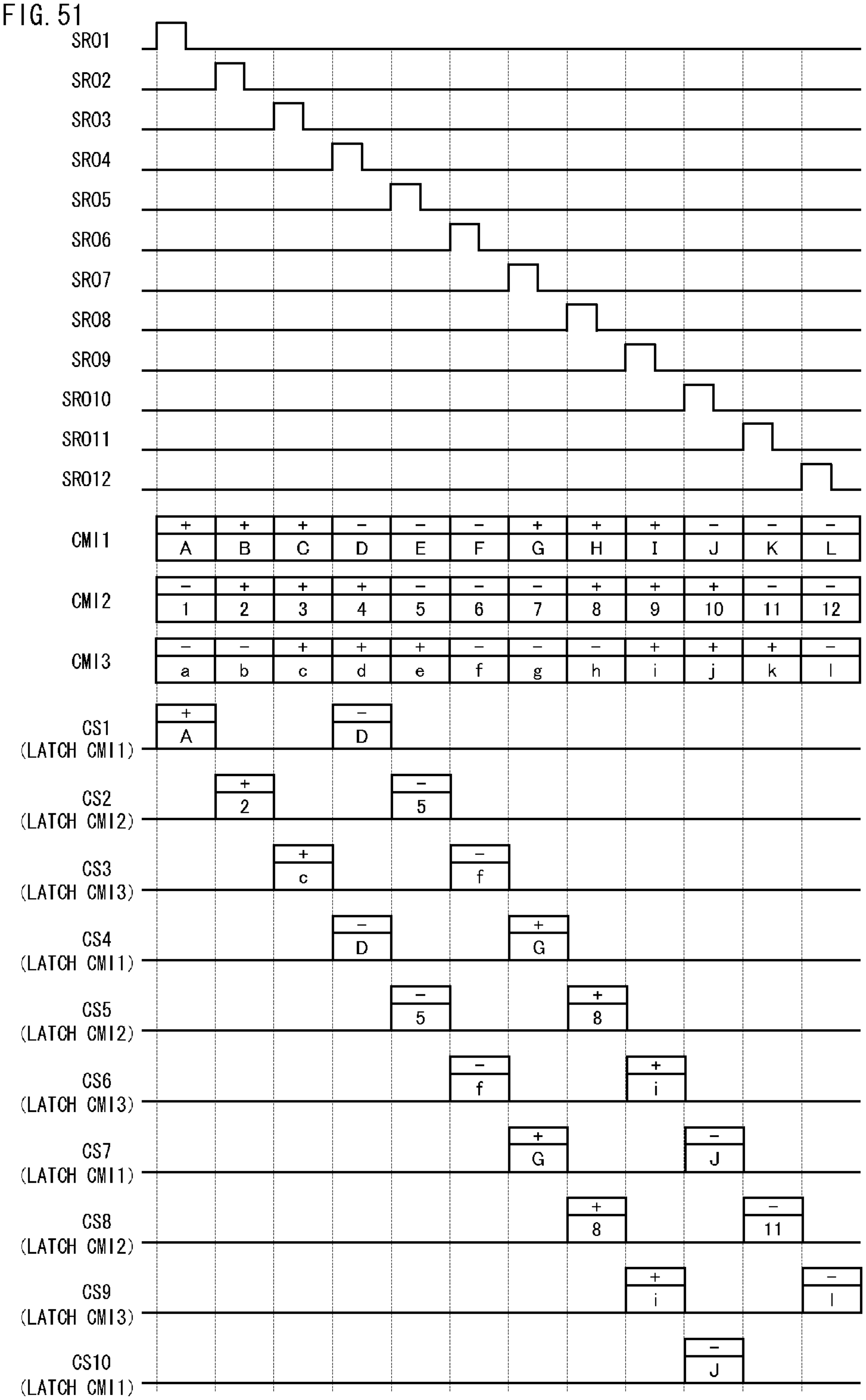
FIG. 51

The following description discusses how the polarity signals CMI1, CMI2, and CMI3 supplied to the CS circuits 4*n* are related to the shift register outputs SROn. FIG. 51 shows relations between (i) the polarity signal (any one of CMI1, CMI2, and CMI3) and the shift register outputs SROn which are inputted to the CS circuits 4*n* and (ii) the CS signals CSn outputted from the CS circuits 4*n*.

As to the CMI1 shown in FIG. 51, each of the signs A to L corresponds to a single horizontal scanning period, and indicates a polarity (positive polarity or negative polarity) during that horizontal scanning period. For example, the CMI1 has a positive polarity during the first horizontal scanning period "A", has a positive polarity during the second horizontal scanning period "B", has a positive polarity during the third horizontal scanning period "C", and has a negative polarity during the fourth horizontal scanning period "D". As to the CMI2, each of the signs 1 to 12 corresponds to a single horizontal scanning period, and indicates a polarity during that horizontal scanning period. For example, the CMI2 has a negative polarity during the first horizontal scanning period "1", has a positive polarity during the second horizontal scanning period "2", has a positive polarity during the third horizontal scanning period "3", and has a positive polarity during the fourth horizontal scanning period "4". As to the CMI3, each of the signs a to l corresponds to a single horizontal scanning period, and indicates a polarity during that horizontal scanning period. For example, the CMI3 has a negative polarity during the first horizontal scanning period "a", has a negative polarity during the second horizontal scanning period "b", has a positive polarity during the third horizontal scanning period "c", and has a positive polarity during the fourth horizontal scanning period "d". In this way, the CMI1, the CMI2, and the CMI3 reverse their polarities every three horizontal scanning periods, and the CMI1 and the CMI2 are out of phase with each other by one horizontal scanning period, whereas the CMI2 and the CMI3 are out of phase with each other by one horizontal scanning period. Further, each of the CS circuits receives one of the polarity signals CMI1, CMI2, and CMI3 regularly (the CS circuit 41 receives the CMI1, the CS circuit 42 receives the CMI2, the CS circuit 43 receives the CMI3, the CS circuit 44 receives the CMI1, the CS circuit 45 receives the CMI2, and the CS circuit 46 receives the CMI3).

The CS circuit 4*n* receives, via its clock terminal CK, a shift register output SROn in the nth row and a shift register output SROn+3 in the next (n+3)th row. This causes the CS circuit 4*n* to latch (i) a CMI that the CS circuit 4*n* receives via its data terminal D during the nth horizontal scanning period and (ii) a CMI signal that the CS circuit 4*n* receives via its data terminal D during the (n+3)th horizontal scanning period. For example, the CS circuit 41 loads a positive polarity of "A" of the CMI1 during the first horizontal scanning period, and loads a negative polarity of "D" of the CMI1 during the fourth horizontal scanning period. The CS circuit 42 loads a positive polarity of "2" of the CMI2 during the second horizontal scanning period, and loads a negative polarity of "5" of the CMI2 during the fifth horizontal scanning period. The CS circuit 43 loads a positive polarity of "c" of the CMI3 during the third horizontal scanning period, and loads a negative polarity of "f" of the CMI3 during the sixth horizontal scanning period. The CS circuit 44 loads a negative polarity of "D" of the CMI1 during the fourth horizontal scanning period, and loads a positive polarity of "G" of the CMI1 during the seventh horizontal scanning period. In this way, the CS signals CSn as shown in FIGS. 48 and 50 are outputted.

As has been described in Example 13, by using a plurality of polarity signals CMI1, CMI2, and CMI3 which are different from each other in frequency, 3H inversion driving can be carried out. Similarly, 4H, . . . , nH (n-line) inversion driving can be realized by changing a frequency and the number of polarity signals. For example, 4H inversion driving may be realized by (i) using four polarity signals CMI1 to CMI4, (ii) setting a frequency of each of the polarity signals so that the polarity signals reverse their polarities every 4H, and (iii) sequentially supplying the polarity signals to the CS circuits. This allows carrying out double-size display driving and triple-size display driving. Similarly, quadruple-size, . . . , n-fold-size display driving can be realized by adjusting timings at which the polarity signals CMI1 and CMI2 reverse their polarities.

Figure 52:
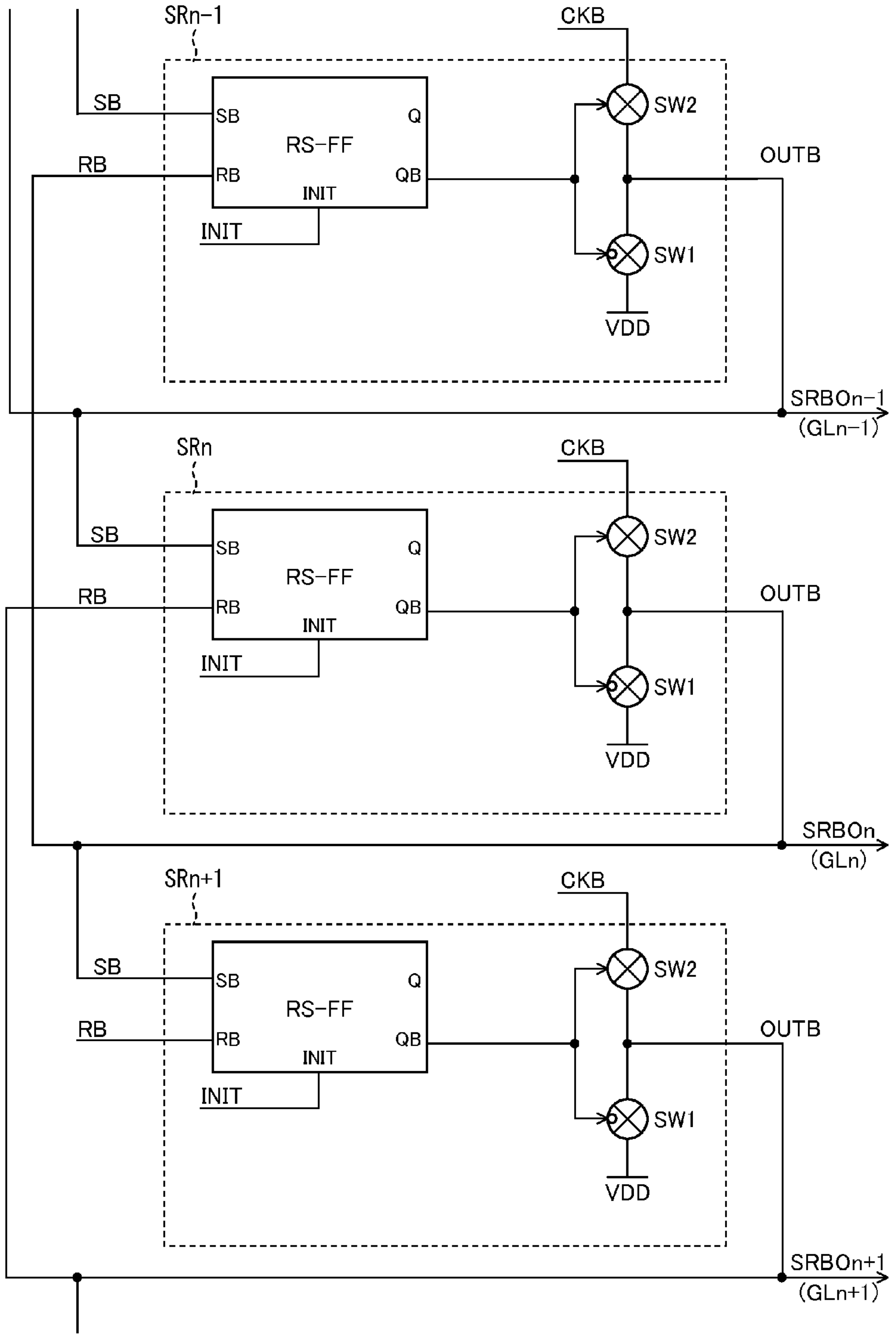
FIG. 52
Figure 53:
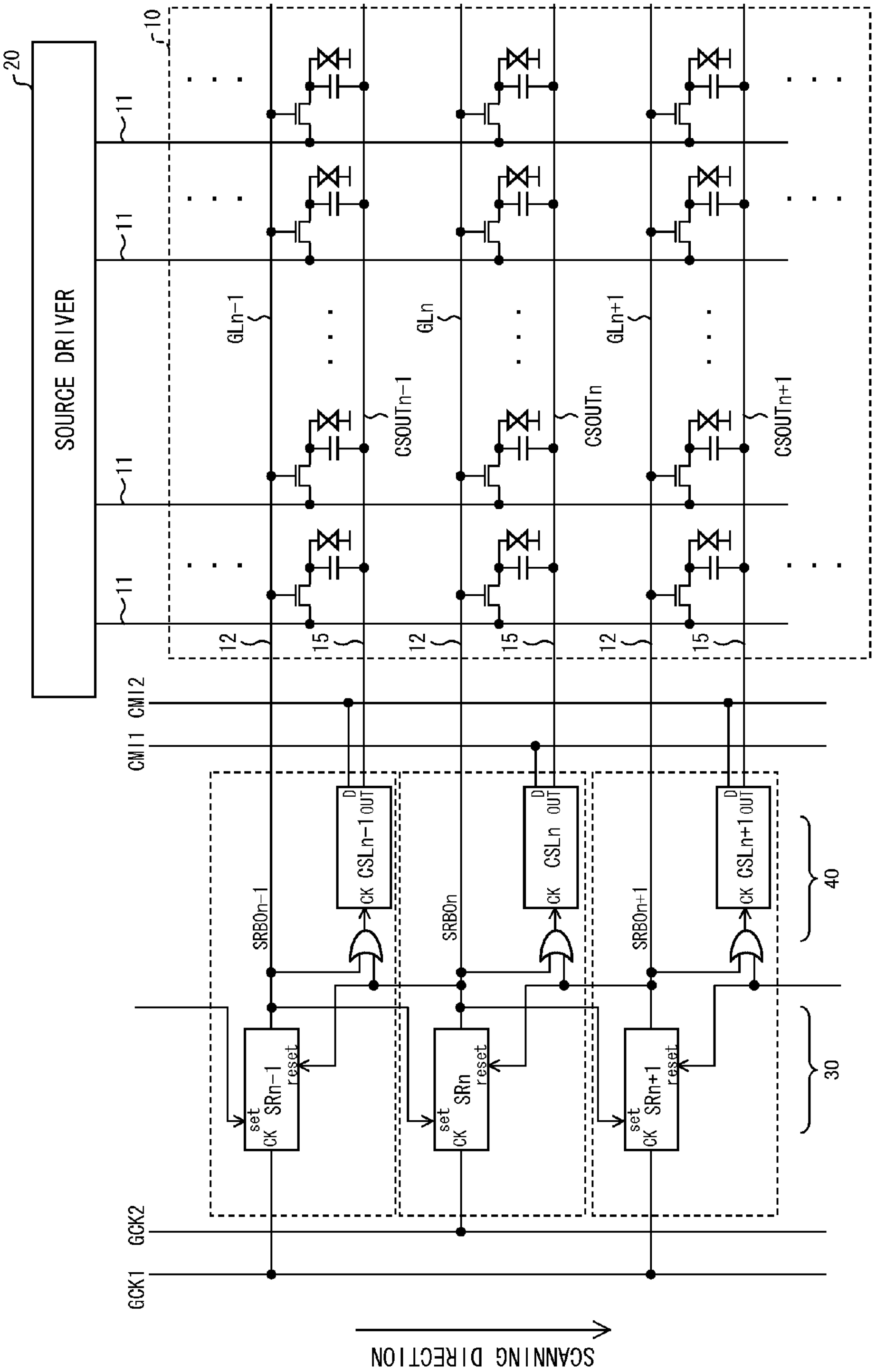
FIG. 53
Figure 54:
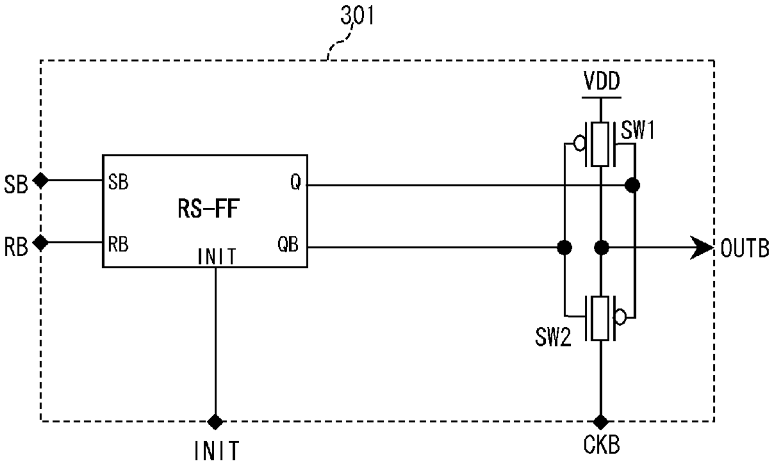
FIG. 54
Figure 55:
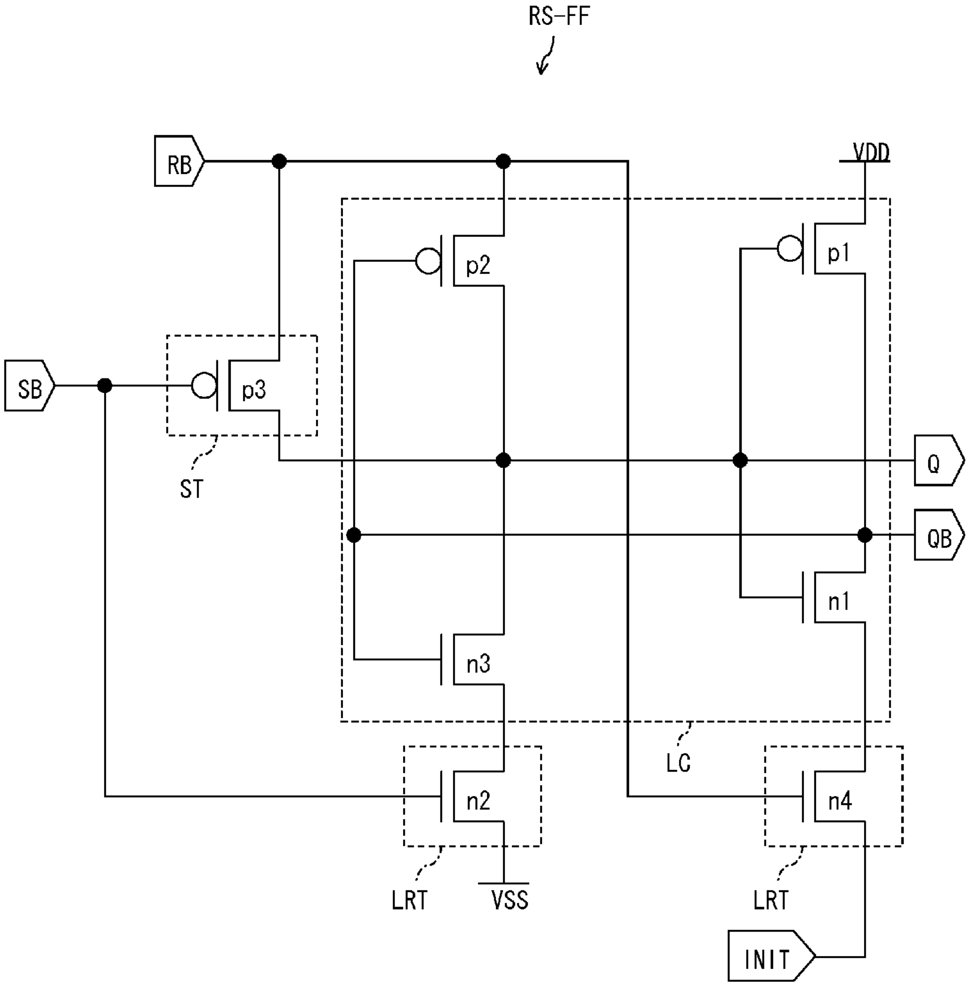
FIG. 55

The gate line driving circuit 30 in the liquid crystal display device in accordance with the present invention can be configured as shown in FIG. 52. FIG. 53 is a block diagram showing a configuration of a liquid crystal display device including this gate line driving circuit 30. FIG. 54 is a block diagram showing a configuration of a shift register circuit 301 constituting this gate line driving circuit 30. The shift register circuit 301 in each stage includes a flip-flop RS-FF and switch circuits SW1 and SW2. FIG. 55 is a circuit diagram showing a configuration of the flip-flop RS-FF.

As shown in FIG. 55, the flip-flop RS-FF has: a P-channel transistor p2 and an N-channel transistor n3 which constitute a CMOS circuit; a P-channel transistor p1 and an N-channel transistor n1 which constitute a CMOS circuit; a P-channel transistor p3; an N-channel transistor n2; an N-channel transistor 4; an SB terminal; an RB terminal; an INIT terminal; a Q terminal; and a QB terminal. In the flip-flop RS-FF, a gate of the p2, a gate of the n3, a drain of the p1, a drain of the n1 and the QB terminal are connected with one another; a drain of the p2, a drain of the n3, a drain of the p3, a gate of the p1, a gate of the n1 and the Q terminal are connected with one another; a source of the n3 is connected with a drain of the n2; the SB terminal is connected with a gate of the p3 and a gate of the n2; the RB terminal is connected with a source of the p3, a source of the p2 and a gate of the n4; a source of the n1 and a drain of the n4 are connected with each other; the INIT terminal is connected with a source of the n4; a source of the p1 is connected with a VDD; and a source of the n2 is connected with a VSS. Note here that the p2, n3, p1 and n1 constitute a latch circuit LC; the p3 functions as a set transistor ST; and the n2 and n4 each function as a latch release transistor LRT.

Figure 56:
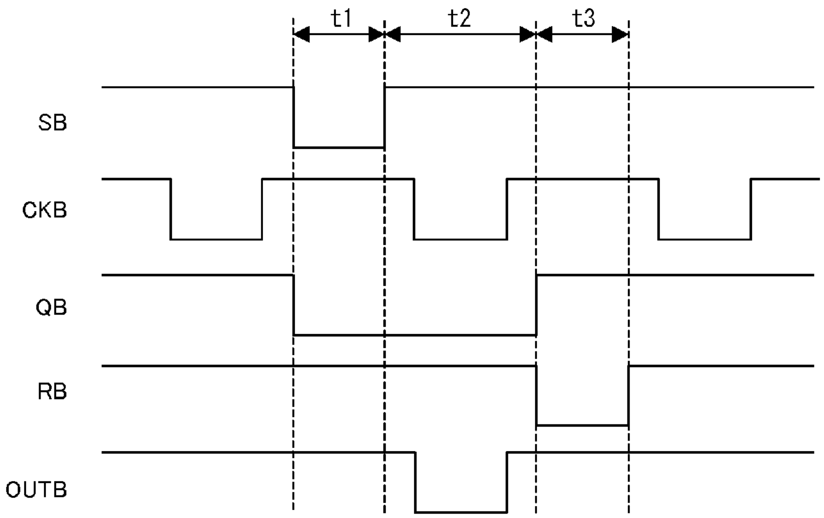
FIG. 56
Figure 57:
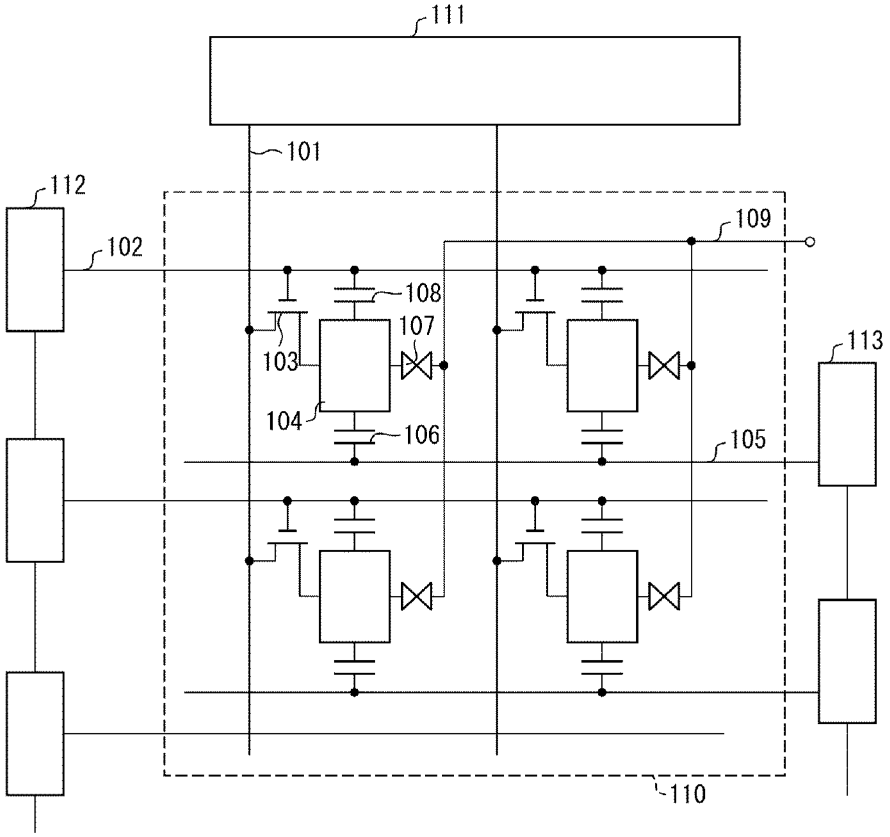
FIG. 57
Figure 58:
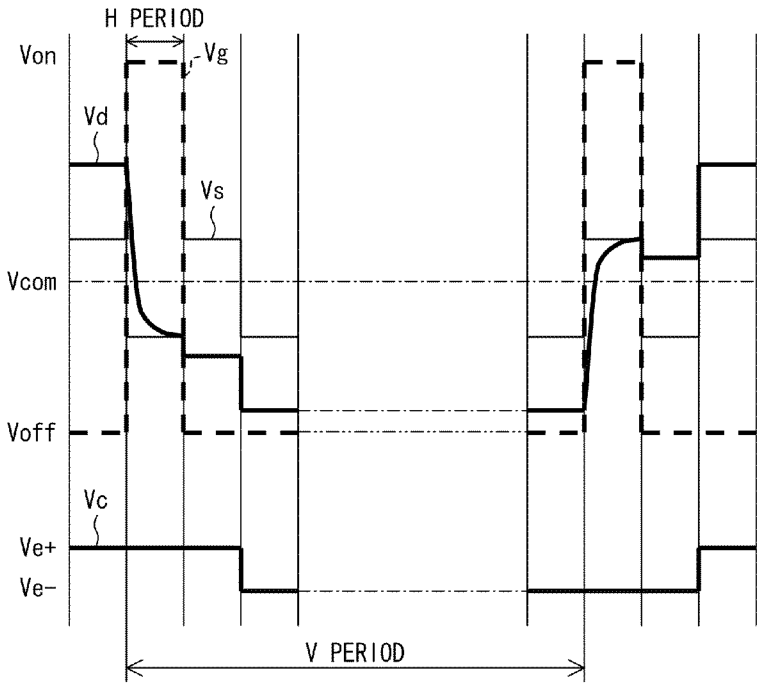
FIG. 58
Figure 59:
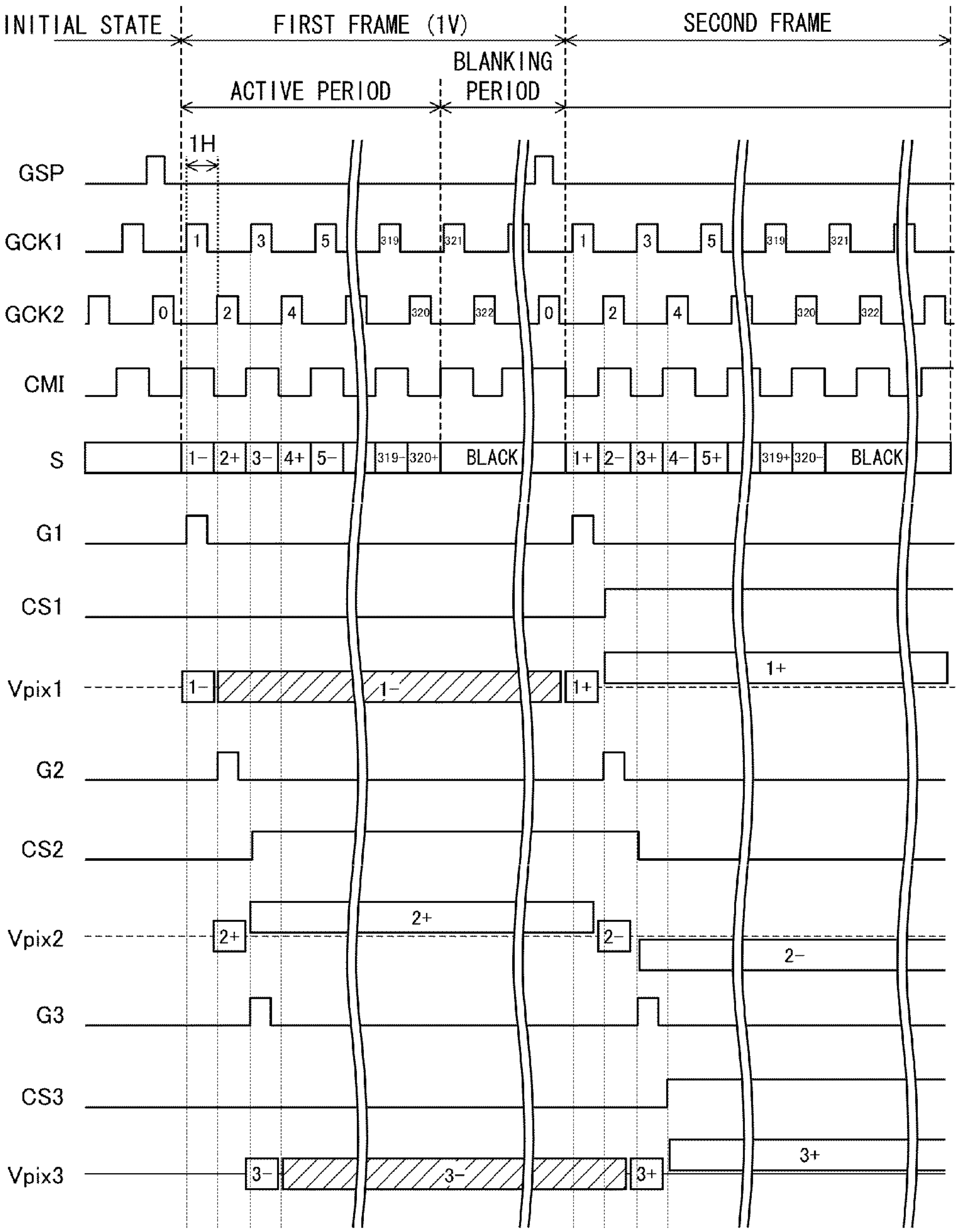
FIG. 59

FIG. 56 is a timing chart showing how the flip-flop RS-FF operates. For example, at t1 in FIG. 56, Vdd from the RB terminal is supplied to the Q terminal, whereby the n1 is switched ON and INIT (Low) is supplied to the QB terminal. At t2, the SB signal becomes High and the p3 is switched OFF and the n2 is switched ON, whereby the state at t1 is maintained. At t3, the RB signal becomes Low, whereby the p1 is switched ON and Vdd (High) is supplied to the QB terminal.

As shown in FIG. 54, the QB terminal of the flip-flop RS-FF is connected with a gate of the switch circuit SW1 which gate is on the N-channel side, and with a gate of the switch circuit SW2 which gate is on the P-channel side. A conductive electrode of the switch circuit SW1 is connected with the VDD. The other conductive electrode of the switch circuit SW1 is connected with an OUTB terminal serving as an output terminal in this stage and with a conductive electrode of the switch circuit SW2. The other conductive electrode of the switch circuit SW2 is connected with a CKB terminal for receiving a clock signal.

According to the shift register circuit 301, while the QB signal from the flip-flop FF is Low, the switch SW2 is OFF and the switch circuit SW1 is ON, whereby the OUTB signal becomes High. While the QB signal is High, the switch circuit SW2 is turned ON and the switch circuit SW1 is turned OFF, whereby the CKB signal is loaded and outputted from the OUTB terminal.

According to the shift register circuit 301, an OUTB terminal of a current stage is connected with an SB terminal of a next stage, and an OUTB terminal of the next stage is connected with an RB terminal of the current stage. For example, the OUTB terminal of the shift register circuit SRn in the nth stage is connected with the SB terminal of the shift register circuit SRn+1 in the (n+1)th stage, and the OUTB terminal of the shift register circuit SRn+1 in the (n+1)th stage is connected with the RB terminal of the shift register circuit SRn in the nth stage. Note that the shift register circuit SR in the first stage, i.e., the shift register circuit SR1, receives a GSPB signal via its SB terminal. Further, in a gate driver GD, CKB terminals in the odd-numbered stages and CKB terminals in the even-numbered stages are connected with different GCK lines (lines that supplies GCK), and INIT terminals in respective stages are connected with an identical INIT line (line that supplies INIT signal). For example, the CKB terminal of the shift register circuit SRn in the nth stage is connected with a GCK2 line, the CKB terminal of the shift register circuit SRn+1 in the (n+1)th stage is connected with a GCK1 line, and the INIT terminal of the shift register circuit SRn in the nth stage and the INIT terminal of the shift register circuit SRn+1 in the (n+1)th stage are connected with an identical INIT signal line.

A display driving circuit in accordance with the present invention is a display driving circuit for use in a display device (i) which carries out a display based on a video signal whose resolution has been converted to higher resolution and (ii) in which by supplying retention capacitor wire signals to retention capacitor wires forming capacitors with pixel electrodes included in pixels, signal potentials written to the pixel electrodes from data signal lines are changed in a direction corresponding to polarities of the signal potentials, wherein, assuming that a direction in which scanning signal lines extend is a row-wise direction, when the resolution of the video signal is converted by a factor of n (n is an integer of two or greater) at least in a column-wise direction, signal potentials having the same polarity and the same gray scale are supplied to pixel electrodes included in respective n pixels that correspond to n adjacent scanning signal lines and that are adjacent to each other in the column-wise direction, and a direction of change in the signal potentials written to the pixel electrodes from the data signal lines varies every n adjacent rows according to the polarities of the signal potentials.

According to the display driving circuit, signal potentials written to the pixel electrodes are changed, by the retention capacitor wire signals, in a direction corresponding to polarities of the signal potentials. This realizes CC driving. Further, according to the display driving circuit, a display is carried out based on a video signal whose resolution has been converted by a factor of n (n is an integer of two or greater) at least in the column-wise direction. This realizes high-resolution conversion driving (n-fold display driving).

Further, according to the configuration, a direction of change in the signal potentials written to the pixel electrodes from the data signal lines varies every n adjacent rows according to the polarities of the signal potentials. For example, in a case of carrying out a display based on a video signal whose resolution as been converted by a factor of 2 (double-size display driving) in both the column-wise and row-wise directions, a direction of change in the signal potentials written to the pixel electrodes varies every two adjacent rows. This eliminates appearance of alternate bright and dark transverse stripes in a display picture (see FIG. 64). Accordingly, it is possible to eliminate appearance of alternate bright and dark transverse stripes in a display picture when a display device employing CC driving carries out high-resolution conversion driving (n-fold display driving), and thus possible to improve display quality of the display device.

The display driving circuit can be a display driving circuit including a shift register including a plurality of stages provided in such a way as to correspond to a plurality of scanning signal lines, respectively, the display driving circuit having retaining circuits being provided in such a way as to correspond one-by-one to the respective stages of the shift register, a retention target signal being inputted to each of the retaining circuits, an output signal from a current stage and an output signal from a subsequent stage that is later than the current stage being inputted to a logic circuit corresponding to the current stage, when an output from the logic circuit becomes active, a retaining circuit corresponding to the current stage loading and retaining the retention target signal, the output signal from the current stage being supplied to a scanning signal line connected to pixels corresponding to the current stage, and an output from the retaining circuit corresponding to the current stage being supplied as the retention capacitor wire signal to a retention capacitor wire that forms capacitors with pixel electrodes of the pixels corresponding to the current stage, and a retention target signal that is inputted to a plurality of retaining circuits and a retention target signal that is inputted to another plurality of retaining circuits being different in phase from each other.

The display driving circuit can be a display driving circuit including a shift register including a plurality of stages provided in such a way as to correspond to a plurality of scanning signal lines, respectively, the display driving circuit having retaining circuits being provided in such a way as to correspond one-by-one to the respective stages of the shift register, a retention target signal being inputted to each of the retaining circuits, an output signal from a current stage and an output signal from a subsequent stage that is later than a next stage being inputted to a logic circuit corresponding to the current stage, when an output from the logic circuit becomes active, a retaining circuit corresponding to the current stage loading and retaining the retention target signal, and the output signal from the current stage being supplied to a scanning signal line connected to pixels corresponding to the current stage, and an output from the retaining circuit corresponding to the current stage being supplied as the retention capacitor wire signal to a retention capacitor wire that forms capacitors with pixel electrodes of the pixels corresponding to the current stage.

The display driving circuit can be configured such that: each of the retaining circuits retains the retention target signal at a time when an output signal from one of the plurality of stages in the shift register becomes active and at a time when an output signal from another one of the plurality of stages in the shift register becomes active; and the retention target signal is a signal which reverses its polarity at a predetermined timing, and (i) a polarity of the retention target signal at a point in time where the output signal which is outputted from the current stage and inputted to the logic circuit becomes active and (ii) a polarity of the retention target signal at a point in time where the output signal which is outputted from the subsequent stage and inputted to the logic circuit becomes active are different from each other.

The display driving circuit can be configured such that, as to two retaining circuits that carry out retention during the same horizontal scanning period, one of the two retaining circuits receives a first retention target signal and the other receives a second retention target signal.

The display driving circuit can be configured such that the first and second retention target signals reverse their polarities at respective different timings.

The display driving circuit can be configured such that: the retaining circuit corresponding to the current stage includes a first input section via which the retaining circuit receives the output signal from the current stage of the shift register, a second input section via which the retaining circuit receives the retention target signal, and an output section via which the retaining circuit outputs the retention capacitor wire signal to a retention capacitor wire corresponding to the current stage; the retaining circuit outputs, as a first electric potential of the retention capacitor wire signal, a first electric potential of the retention target signal that the retaining circuit received via the second input section when the output signal that the retaining circuit received from the current stage via the first input section became active; during a period of time in which the output signal that the retaining circuit received from the current stage via the first input section is active, the retention capacitor wire signal changes in electric potential in accordance with a change in electric potential of the retention target signal that the retaining circuit received via the second input section; and the retaining circuit outputs, as a second electric potential of the retention capacitor wire signal, a second electric potential of the retention target signal that the retaining circuit received via the second input section when the output signal that the retaining circuit received from the current stage via the first input section became non-active.

The display driving circuit can be configured such that: an output signal from a mth stage of the shift register and an output signal from a (m+n)th stage of the shift register are supplied to a logic circuit corresponding to the mth stage; and a polarity of the retention target signal supplied to the mth retaining circuit is reversed every n horizontal scanning periods.

The display driving circuit can be configured such that each of the retaining circuits is constituted as a D latch circuit or a memory circuit.

A display device in accordance with the present invention includes: any one of the foregoing display driving circuits; and a display panel.

A display driving method in accordance with the present invention is a method for driving a display device (i) which carries out a display based on a video signal whose resolution has been converted to higher resolution and (ii) in which by supplying retention capacitor wire signals to retention capacitor wires forming capacitors with pixel electrodes included in pixels, signal potentials written to the pixel electrodes from data signal lines are changed in a direction corresponding to polarities of the signal potentials, said method including: when the resolution of the video signal is converted by a factor of n (n is an integer of two or greater) at least in a column-wise direction, supplying signal potentials having the same polarity and the same gray scale to pixel electrodes included in respective n pixels that correspond to n adjacent scanning signal lines and that are adjacent to each other in the column-wise direction, assuming that a direction in which scanning signal lines extend is a row-wise direction; and causing a direction of change in the signal potentials written to the pixel electrodes from the data signal lines to vary every n adjacent rows according to the polarities of the signal potentials.

The display driving method can bring about the same effects as those brought about by the configuration of the display driving circuit.

It should be noted that it is desirable that a display device according to the present invention be a liquid crystal display device.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention can be suitably applied, in particular, to driving of an active-matrix liquid crystal display device.

REFERENCE SIGNS LIST

1 Liquid crystal display device (display device)
10 Liquid crystal display panel (display panel)
11 Source bus line (data signal line)
12 Gate line (scanning signal line)
13 TFT (switching element)
14 Pixel electrode
15 CS bus line (retention capacitor wire)
20 Source bus line driving circuit (data signal line driving circuit)
30 Gate line driving circuit (scanning signal line driving circuit)
40 CS bus line driving circuit (retention capacitor wire driving circuit)
**4*n*** CS circuit
**4*na*** D latch circuit (retaining circuit, retention capacitor wire driving circuit)
**4*nb*** OR circuit (logic circuit)
50 Control circuit
SR Shift register circuit
CMI Polarity signal (retention target signal)

The invention claimed is:

1. A display driving circuit for use in a display device (i) which carries out a display based on a video signal whose resolution has been converted to higher resolution and (ii) in which by supplying retention capacitor wire signals to retention capacitor wires forming capacitors with pixel electrodes included in pixels, signal potentials written to the pixel electrodes from data signal lines are changed in a direction corresponding to polarities of the signal potentials, the display driving circuit comprising:

a shift register including a plurality of stages provided in such a way as to correspond to a plurality of scanning signal lines, respectively; and retaining circuits provided in such a way as to correspond one-by-one to the respective stages of the shift register, one of a first retention target signal and a second retention target signal being inputted to each of the retaining circuits, each of the retaining circuits retaining a corresponding one of the first and second retention target signals at a time when an output signal from one of the plurality of stages in the shift register becomes active and at a time when an output signal from another one of the plurality of stages in the shift register becomes active, wherein an output signal from a current one of the plurality of stages and an output signal from a subsequent one of the plurality of stages that is later than the current stage are inputted to a logic circuit corresponding to the current stage, when an output from the logic circuit becomes active, one of the retaining circuits corresponding to the current stage loads and retains the corresponding one of the first and second retention target signals, each of the first and second retention target signals is a signal which reverses its polarity at a timing, and (i) a polarity of the first retention target signal at a point in time where the output signal which is outputted from the current stage and inputted to the logic circuit becomes active and (ii) a polarity of the second retention target signal at a point in time where the output signal which is outputted from the subsequent stage and inputted to the logic circuit becomes active are different from each other, the output signal from the current stage is supplied to one of the plurality of scanning signal lines connected to pixels corresponding to the current stage, and an output from the one of the retaining circuits is supplied as the retention capacitor wire signal to a retention capacitor wire that forms capacitors with pixel electrodes of the pixels corresponding to the current stage, the first retention target signal that is inputted to a plurality of retaining circuits and the second retention target signal that is inputted to another plurality of retaining circuits are different in phase from each other, assuming that a direction in which the plurality of scanning signal lines extend is a row-wise direction, when the resolution of the video signal is converted by a factor of n (n is an integer of two or greater) at least in a column-wise direction, signal potentials having the same polarity and the same gray scale are supplied to pixel electrodes included in respective n pixels that correspond to n adjacent ones of the plurality of scanning signal lines and that are adjacent to each other in the column-wise direction, and a direction of change in the signal potentials written to the pixel electrodes from the data signal lines varies every n adjacent rows according to the polarities of the signal potentials.

2. The display driving circuit according to claim 1, wherein, as to two of the retaining circuits that carry out retention during the same horizontal scanning period, one of the two retaining circuits receives the first retention target signal and the other receives the second retention target signal.

3. The display driving circuit according to claim 2, wherein the first and second retention target signals reverse their polarities at respective different timings.

4. The display driving circuit according to claim 1, wherein:

the one of the retaining circuits corresponding to the current stage includes a first input section via which the one of the retaining circuits receives the output signal from the current stage of the shift register, a second input section via which the one of the retaining circuits receives the retention target signal, and an output section via which the one of the retaining circuits outputs the retention capacitor wire signal to a retention capacitor wire corresponding to the current stage;

the retaining circuit outputs, as a first electric potential of the retention capacitor wire signal, a first electric potential of the corresponding one of the first and second retention target signals that the one of the retaining circuits received via the second input section when the output signal that the one of the retaining circuits received from the current stage via the first input section became active;

during a period of time in which the output signal that the one of the retaining circuits t received from the current stage via the first input section is active, the retention capacitor wire signal changes in electric potential in accordance with a change in electric potential of the corresponding one of the first and second retention target signals that the one of the retaining circuits received via the second input section; and the one of the retaining circuits outputs, as a second electric potential of the retention capacitor wire signal, a second electric potential of the corresponding one of the first and second retention target signals that the one of the retaining circuits received via the second input section when the output signal that the one of the retaining circuits received from the current stage via the first input section became non-active.

5. The display driving circuit as set forth in claim 1, wherein each of the retaining circuits is constituted as a D latch circuit or a memory circuit.

6. A display device comprising:

a display driving circuit as set forth in claim 1; and a display panel.

7. A display driving method for driving a display device (i) which carries out a display based on a video signal whose resolution has been converted to higher resolution and (ii) in which by supplying retention capacitor wire signals to retention capacitor wires forming capacitors with pixel electrodes included in pixels, signal potentials written to the pixel electrodes from data signal lines are changed in a direction corresponding to polarities of the signal potentials, said method comprising:

when the resolution of the video signal is converted by a factor of n (n is an integer of two or greater) at least in a column-wise direction, supplying signal potentials having the same polarity and the same gray scale to pixel electrodes included in respective n pixels that correspond to n adjacent scanning signal lines and that are adjacent to each other in the column-wise direction, assuming that a direction in which scanning signal lines extend is a row-wise direction; and causing a direction of change in the signal potentials written to the pixel electrodes from the data signal lines to vary every n adjacent rows according to the polarities of the signal potentials, wherein a shift register including a plurality of stages is provided in such a way as to correspond to a plurality of scanning signal lines, respectively, and retaining circuits are provided in such a way as to correspond one-by-one to the respective stages of the shift register, one of a first retention target signal and a second retention target signal is inputted to each of the retaining circuits, each of the retaining circuits retaining a corresponding one of the first and second retention target signals at a time when an output signal from one of the plurality of stages in the shift register becomes active and at a time when an output signal from another one of the plurality of stages in the shift register becomes active, wherein an output signal from a current one of the plurality of stages and an output signal from a subsequent one of the plurality of stages that is later than the current stage are inputted to a logic circuit corresponding to the current stage, when an output from the logic circuit becomes active, one of the retaining circuits corresponding to the current stage loads and retains the corresponding one of the first and second retention target signals, each of the first and second retention target signals is a signal which reverses its polarity at a timing, and (i) a polarity of the first retention target signal at a point in time where the output signal which is outputted from the current stage and inputted to the logic circuit becomes active and (ii) a polarity of the second retention target signal at a point in time where the output signal which is outputted from the subsequent stage and inputted to the logic circuit becomes active are different from each other, the output signal from the current stage is supplied to one of the plurality of scanning signal lines connected to pixels corresponding to the current stage, and an output from the one of the retaining circuits is supplied as the retention capacitor wire signal to a retention capacitor wire that forms capacitors with pixel electrodes of the pixels corresponding to the current stage, and the first retention target signal that is inputted to a plurality of retaining circuits and the second retention target signal that is inputted to another plurality of retaining circuits are different in phase from each other.

8. A display driving circuit for use in a display device (i) which carries out a display based on a video signal whose resolution has been converted to higher resolution and (ii) in which by supplying retention capacitor wire signals to retention capacitor wires forming capacitors with pixel electrodes included in pixels, signal potentials written to the pixel electrodes from data signal lines are changed in a direction corresponding to polarities of the signal potentials, the display driving circuit comprising:

a shift register including a plurality of stages provided in such a way as to correspond to a plurality of scanning signal lines, respectively; and retaining circuits provided in such a way as to correspond one-by-one to the respective stages of the shift register, one of a first retention target signal and a second retention target signal being inputted to each of the retaining circuits, wherein an output signal from a current one of the plurality of stages and an output signal from a subsequent one of the plurality of stages that is later than a next stage are inputted to a logic circuit corresponding to the current stage, when an output from the logic circuit becomes active, one of the retaining circuits corresponding to the current stage loads and retains the corresponding one of the first and second retention target signals, the output signal from the current stage is supplied to one of the plurality of scanning signal lines connected to pixels corresponding to the current stage, and an output from the one of the retaining circuits is supplied as the retention capacitor wire signal to a retention capacitor wire that forms capacitors with pixel electrodes of the pixels corresponding to the current stage, assuming that a direction in which the plurality of scanning signal lines extend is a row-wise direction, when the resolution of the video signal is converted by a factor of n (n is an integer of two or greater) at least in a column-wise direction, signal potentials having the same polarity and the same gray scale are supplied to pixel electrodes included in respective n pixels that correspond to n adjacent ones of the plurality of scanning signal lines and that are adjacent to each other in the column-wise direction, and a direction of change in the signal potentials written to the pixel electrodes from the data signal lines varies every n adjacent rows according to the polarities of the signal potentials.

9. A display driving circuit for use in a display device (i) which carries out a display based on a video signal whose resolution has been converted to higher resolution and (ii) in which by supplying retention capacitor wire signals to retention capacitor wires forming capacitors with pixel electrodes included in pixels, signal potentials written to the pixel electrodes from data signal lines are changed in a direction corresponding to polarities of the signal potentials, the display driving circuit comprising:

a shift register including a plurality of stages provided in such a way as to correspond to a plurality of scanning signal lines, respectively; and retaining circuits provided in such a way as to correspond one-by-one to the respective stages of the shift register, one of a first retention target signal and a second retention target signal being inputted to each of the retaining circuits, wherein an output signal from a mth stage of the shift register and an output signal from a (m+n)th stage of the shift register are supplied to a logic circuit corresponding to the mth stage, a polarity of a corresponding one of the first and second retention target signals supplied to the mth retaining circuit being reversed every n horizontal scanning periods, when an output from the logic circuit becomes active, one of the retaining circuits corresponding to the mth stage loads and retains the retention target signal, the output signal from the mth stage is supplied to one of the plurality of scanning signal lines connected to pixels corresponding to the mth stage, and an output from the one of the retaining circuits is supplied as the retention capacitor wire signal to a retention capacitor wire that forms capacitors with pixel electrodes of the pixels corresponding to the mth stage, the first retention target signal that is inputted to a plurality of retaining circuits and the second retention target signal that is inputted to another plurality of retaining circuits are different in phase from each other, assuming that a direction in which the plurality of scanning signal lines extend is a row-wise direction, when the resolution of the video signal is converted by a factor of n (n is an integer of two or greater) at least in a column-wise direction, signal potentials having the same polarity and the same grey scale are supplied to pixel electrodes included in respective n pixels that correspond to n adjacent ones of the plurality of scanning signal lines and that are adjacent to each other in the column-wise direction, and a direction of change in the signal potentials written to the pixel electrodes from the data signal lines varies every n adjacent rows according to the polarities of the signal potentials.

10. A display driving method for driving a display device (i) which carries out a display based on a video signal whose resolution has been converted to higher resolution and (ii) in which by supplying retention capacitor wire signals to retention capacitor wires forming capacitors with pixel electrodes included in pixels, signal potentials written to the pixel electrodes from data signal lines are changed in a direction corresponding to polarities of the signal potentials, said method comprising:

when the resolution of the video signal is converted by a factor of n (n is an integer of two or greater) at least in a column-wise direction, supplying signal potentials having the same polarity and the same gray scale to pixel electrodes included in respective n pixels that correspond to n adjacent scanning signal lines and that are adjacent to each other in the column-wise direction, assuming that a direction in which scanning signal lines extend is a row-wise direction; and causing a direction of change in the signal potentials written to the pixel electrodes from the data signal lines to vary every n adjacent rows according to the polarities of the signal potentials, wherein a shift register including a plurality of stages is provided in such a way as to correspond to a plurality of scanning signal lines, respectively, and retaining circuits are provided in such a way as to correspond one-by-one to the respective stages of the shift register, one of a first retention target signal and a second retention target signal is inputted to each of the retaining circuits, an output signal from a current one of the plurality of stages and an output signal from a subsequent one of the plurality of stages that is later than a next stage are inputted to a logic circuit corresponding to the current stage, when an output from the logic circuit becomes active, one of the retaining circuits corresponding to the current stage loads and retains the corresponding one of the first and second retention target signals, and the output signal from the current stage is supplied to one of the plurality of scanning signal lines connected to pixels corresponding to the current stage, and an output from the one of the retaining circuits is supplied as the retention capacitor wire signal to a retention capacitor wire that forms capacitors with pixel electrodes of the pixels corresponding to the current stage.

11. A display driving method for driving a display device (i) which carries out a display based on a video signal whose resolution has been converted to higher resolution and (ii) in which by supplying retention capacitor wire signals to retention capacitor wires forming capacitors with pixel electrodes included in pixels, signal potentials written to the pixel electrodes from data signal lines are changed in a direction corresponding to polarities of the signal potentials, said method comprising:

when the resolution of the video signal is converted by a factor of n (n is an integer of two or greater) at least in a column-wise direction, supplying signal potentials having the same polarity and the same gray scale to pixel electrodes included in respective n pixels that correspond to n adjacent scanning signal lines and that are adjacent to each other in the column-wise direction, assuming that a direction in which scanning signal lines extend is a row-wise direction; and causing a direction of change in the signal potentials written to the pixel electrodes from the data signal lines to vary every n adjacent rows according to the polarities of the signal potentials, wherein a shift register including a plurality of stages is provided in such a way as to correspond to a plurality of scanning signal lines, respectively, and retaining circuits are provided in such a way as to correspond one-by-one to the respective stages of the shift register, one of a first retention target signal and a second retention target signal is inputted to each of the retaining circuits, an output signal from a mth stage of the shift register and an output signal from a (m+n)th stage of the shift register are supplied to a logic circuit corresponding to the mth stage, a polarity of a corresponding one of the first and second retention target signals supplied to the mth retaining circuit is reversed every n horizontal scanning periods, when an output from the logic circuit becomes active, one of the retaining circuits corresponding to the mth stage loads and retains the retention target signal, the output signal from the mth stage is supplied to one of the plurality of scanning signal lines connected to pixels corresponding to the mth stage, and an output from the one of the retaining circuits is supplied as the retention capacitor wire signal to a retention capacitor wire that forms capacitors with pixel electrodes of the pixels corresponding to the mth stage, and the first retention target signal that is inputted to a plurality of retaining circuits and the second retention target signal that is inputted to another plurality of retaining circuits are different in phase from each other.

* * * * *